United States Patent [19]

Hirose et al.

[11] Patent Number: 4,576,886

[45] Date of Patent: Mar. 18, 1986

[54] AZO PHOTORECEPTOR

[75] Inventors: Naohiro Hirose; Osamu Sasaki; Yoshio Takizawa, all of Hino, Japan

[73] Assignee: Konishiroku Photo Industry Co., Ltd., Tokyo, Japan

[21] Appl. No.: 700,531

[22] Filed: Feb. 11, 1985

[30] Foreign Application Priority Data

| | | | |
|---|---|---|---|
| Feb. 13, 1984 | [JP] | Japan | 59-24658 |
| Mar. 19, 1984 | [JP] | Japan | 59-53237 |
| Mar. 27, 1984 | [JP] | Japan | 59-60418 |
| Apr. 10, 1984 | [JP] | Japan | 59-72376 |
| Apr. 10, 1984 | [JP] | Japan | 59-72377 |
| Apr. 11, 1984 | [JP] | Japan | 59-73820 |

[51] Int. Cl.[4] .......... G03G 5/06; G03G 5/14

[52] U.S. Cl. .......... 430/59; 430/58; 430/73; 430/75; 430/78; 430/79; 430/76; 534/653

[58] Field of Search .......... 430/58, 59, 73, 75, 430/76, 78, 79; 534/653

[56] References Cited

U.S. PATENT DOCUMENTS

| | | | |
|---|---|---|---|
| 4,400,455 | 8/1983 | Hashimoto et al. | 430/59 |
| 4,427,753 | 1/1984 | Fujimura et al. | 430/59 X |
| 4,474,865 | 10/1984 | Ong et al. | 430/59 X |
| 4,515,881 | 5/1985 | Sawada et al. | 430/58 |

*Primary Examiner*—Roland E. Martin

*Attorney, Agent, or Firm*—Frishauf, Holtz, Goodman & Woodward

[57] ABSTRACT

A photoreceptor comprising a support and a photosensitive layer which contains an azo compound of the formula [I]:

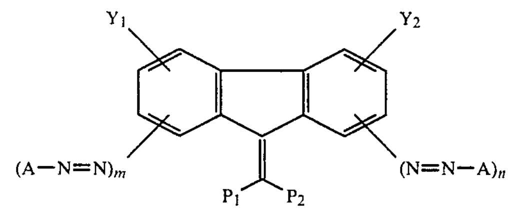

[I]

wherein $P_1$ and $P_2$ are independently a halogen atom, a hydrogen atom, an alkyl group, an alkoxy group, an aryl group, an acetylamido group, an alkylsulfonyl group,

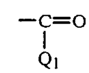

($Q_1$ is an alkyl group, an alkoxy group, a phenyl group, an amino group, a hydroxy group or a hydrogen atom) or

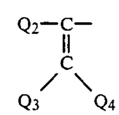

($Q_2$, $Q_3$ and $Q_4$ independently are a halogen atom, a hydrogen atom, an alkyl group, an alkoxy group, a phenyl group, an acyl group, an ester group, a hydroxy group or a vinyl group), the alkyl group, alkoxy group, aryl group, amino group and vinyl group may have a substituent; $Y_1$ and $Y_2$ independently are a hydrogen atom, a halogen atom, a cyano group, a hydroxy group, an alkyl group or an alkoxy group; m and n each represent an integer of 0 to 2, and m and n cannot be both 0; A is one of the following formulae:

(Abstract continued on next page.)

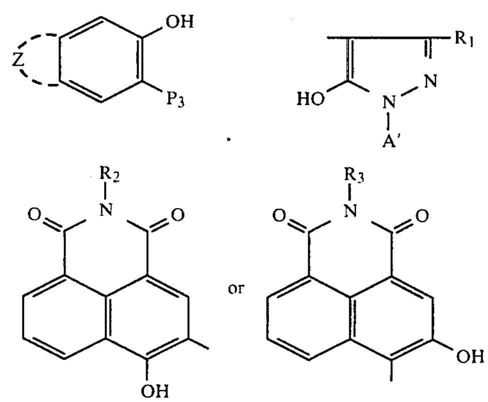

wherein Z is a group of atoms necessary for constituting a substituted or unsubstituted aromatic carbon ring or an aromatic heterocyclic ring, $P_3$ is a substituted or unsubstituted carbamoyl group or a substituted or unsubstituted sulfamoyl group, $R_1$ is a hydrogen atom, a substituted or unsubstituted alkyl group, a substituted or unsubstituted amino group, a substituted or unsubstituted carbamoyl group, a carboxyl group and its ester group or a cyano group, A' is a substituted or unsubstituted aryl group, $R_2$ and $R_3$ independently are a substituted or unsubstituted alkyl group, a substituted or unsubstituted aralkyl group or a substituted or unsubstituted aryl group.

20 Claims, 6 Drawing Figures

AZO PHOTORECEPTOR

BACKGROUND OF THE INVENTION

This invention relates to a photoreceptor, particularly to a novel photoreceptor having a photosensitive layer containing an azo compound.

In the prior art, as electrophotographic receptors, there have widely been employed inorganic photoreceptors having photosensitive layers composed mainly of inorganic photoconductive compounds such as selenium, zinc oxide, cadmium sulfide, silicon, etc. However, these are not necessarily satisfactory in sensitivity, heat stability, humidity resistance, durability, etc. For example, selenium will be deteriorated in characteristics as the photoreceptor when crystallized and can be manufactured with difficulty, and also heat or fingerprint may cause crystallization to result in deterioration of performance as the photoreceptor. On the other hand, problems are involved in cadmium sulfide with respect to humidity resistance or durability, while zinc oxide poses problems in durability, etc.

In order to overcome the drawbacks possessed by inorganic photoreceptors, developments and researches have aggressively been made of organic photoreceptors having photosensitive layers composed mainly of various organic photoconductive compounds. For example, Japanese Patent Publication No. 10496/1975 discloses an organic photoreceptor having a photosensitive layer containing poly-N-vinylcarbazole and 2,4,7-trinitro-9-fluorenone. However, this photoreceptor is not necessarily satisfactory in sensitivity and durability. For improving such drawbacks, an organic photoreceptor with higher performance has been attempted to be developed by having the carrier generating function and the carrier transporting function assigned to different materials. Many studies have been made on such a photoreceptor of the so-called function separation type, since the respective materials can be selected from a wide scope of materials and photoreceptors having any desired performance can be prepared with relative ease.

In such a photoreceptor of the function separation type, a large number of compounds have been proposed. As an example employing an inorganic compound as the carrier generating material, Japanese Patent Publication No. 16198/1968 discloses an amorphous selenium, which can be employed in combination with an organic photoconductive compound. However, the carrier generating layer comprising the amorphous selenium is not improved in the drawback of being crystallized by heat to be deteriorated in charcteristics as the photoreceptor.

There have also been made many proposals about using organic dyes or organic dyes as the carrier generating material. For example, photoreceptors containing bisazo compounds or trisazo compounds in the photosensitive layer are already known as disclosed in Japanese Unexamined Patent Publication Nos. 22834/1979, 46558/1979, 46237/1981 and 196241/1982. However, these bisazo compounds or trisazo compounds are not necessarily satisfactory in characteristics of sensitivity, residual potential or stability during repeated uses, and also limited in scope of carrier transporting materials which can be selected, thus failing to satisfy sufficiently the wide range of requirements demanded by electrophotographic process.

Further, recourse has recently been made to gas lasers such as Ar laser, He-Ne laser, etc. or semiconductor lasers as the light source for photoreceptor. These lasers are characterized by capability of ON/OFF in time series, and expected to be promising as the light source for a copying having an image processing function, typically an intelligent copier as well as for a printer for output of a computer. Among them, semiconductor lasers are attracting attention, because they require no electrical signal/light signal transducing element such as acousatic optical element in nature, and also because they can be made to small scale and light weight. However, these semiconductor lasers are low in output as compared with gas lasers and the oscillated wavelength is longer (about 780 nm or longer), and therefore the photoreceptor of the prior art, of which spectral sensitivity is too much greater on the shorter wavelength side, can not be used as such as a photoreceptor using a semiconductor laser as the light source.

Moreover, an electrophotographic photosensitive member containing bisazo compounds in the photosensitive layer is already known as disclosed in Japanese Unexamined Patent Publication No. 194035/1983 (Our co-pending U.S. patent application Ser. No. 549,589). However, bisazo compounds used in a photoreceptor of the present invention are excellent in dispersibility and coating characteristics than the above application, and the photoreceptor of the present invention is excellent in electrified potential, durability and sensitivity than the above.

SUMMARY OF THE INVENTION

An object of this invention is to provide a photoreceptor containing a specific azo compound which is stable to heat and light, and also excellent in carrier generating ability.

Another object of this invention is to provide a photoreceptor which is high in sensitivity and small in residual potential, and also excellent in durability without change in those characteristics even when repeatedly used.

Still another object of this invention is to provide a photoreceptor containing an azo compound which can act effectively as the carrier generating material even when combined with a variety of carrier transporting materials.

It is also another object of this invention to provide a photoreceptor having sufficient practical sensitivity even to a long wavelength light source such as a semiconductor laser.

Further objects of this invention will become apparent from the following description in the specification.

The present inventors have made intensive studies to attain the objects as mentioned above and found that the azo compound represented by the following formula [I] can act as the effective component in the photoreceptor to accomplish this invention:

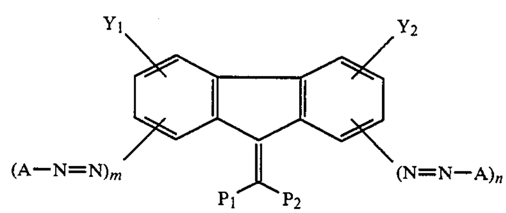

[I]

wherein $P_1$ and $P_2$ are independently a halogen atom, a hydrogen atom, an alkyl group, an alkoxy group, an aryl group, an acetylamido group, an alkylsulfonyl group,

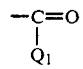

($Q_1$ is an alkyl group, an alkoxy group, a phenyl group, an amino group, a hydroxy group or a hydrogen atom) or

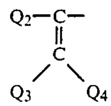

($Q_2$, $Q_3$ and $Q_4$ independently are a halogen atom, a hydrogen atom, an alkyl group, an alkoxy group, a phenyl group, an acyl group, an ester group, a hydroxy group or a vinyl group), said alkyl group, alkoxy group, aryl group, amino group, acetylamido group, alkylsulfonyl group and vinyl group may have a substituent; $Y_1$ and $Y_2$ independently are a hydrogen atom, a halogen atom, a cyano group, a hydroxy group, an alkyl group or an alkoxy group; m and n each represent an integer of 0 to 2, and m and n cannot be both 0; A represents a group represented by any one of the following formulae:

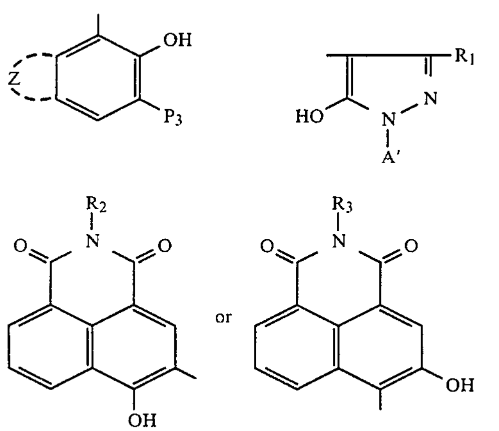

wherein Z is a group of atoms necessary for constituting a substituted or unsubstituted aromatic carbon ring or an aromatic heterocyclic ring, $P_3$ is a substituted or unsubstituted carbamoyl group or a substituted or unsubstituted sulfamoyl group, $R_1$ is a hydrogen atom, a substituted or unsubstituted alkyl group, a substituted or unsubstituted amino group, a substituted or unsubstituted carbamoyl group, a carboxyl group and its ester group or a cyano group, A' is a substituted or unsubstituted aryl group, $R_2$ and $R_3$ independently are a substituted or unsubstituted alkyl group, a substituted or unsubstituted aralkyl group or a substituted or unsubstituted aryl group.

DESCRIPTION OF THE PREFERRED EMBODIMENTS

Figure 1:
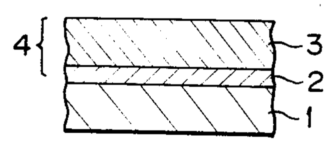
FIGS. 1 through 6 show schematically sectional views of some examples of mechanical construction of photoreceptors of this invention.

The azo compound represented comprehensively by the above formula [I] are inclusive of various embodiments, typically Embodiments A through F as described in detail below.

EMBODIMENT A

This embodiment is repesented by the following formula [IA]:

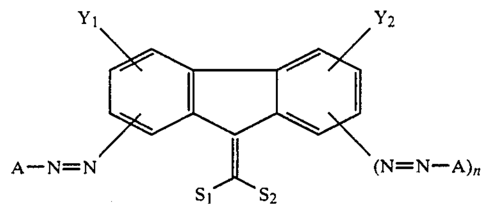

[IA]

wherein $S_1$ and $S_2$ independently are an alkyl group, an ester group or a substituted or unsubstituted benzene ring; and $Y_1$, $Y_2$, n and A are the same as defined in the above formula [I].

In the above formula, $P_3$ is a substituted or unsubstituted carbamoyl group of the formula:

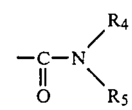

or a substituted or unsubstituted sulfamoyl group of the formula:

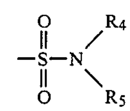

wherein $R_4$ represents a hydrogen atom, a substituted or unsubstituted alkyl group having 1 to 4 carbon atoms, a substituted or unsubstituted aralkyl group or a substituted or unsubstituted phenyl group; $R_5$ represents a hydrogen atom, a substituted or unsubstitued alkyl group having 1 to 4 carbon atoms, a substituted or unsubstituted aromatic hydrocarbon group (e.g. substituted or unsubstituted phenyl group, substituted or unsubstituted naphthyl group, substituted or unsubstituted anthryl group, etc.), or a substituted or unsubstituted aromatic heterocyclic group (e.g. substituted or unsubstituted carbazolyl group, substituted or unsubstituted dibenzofuryl group, etc.).

The substituents on these groups may include, for example, a substituted or unsubstituted alkyl group having 1 to 4 carbon atoms (e.g. methyl, ethyl, isopropyl, t-butyl, trifluoromethyl, etc.), a substituted or unsubstituted aralkyl group (e.g. benzyl, phenethyl, etc.), a halogen atom (chlorine, bromine, fluorine, iodine), a substituted or unsubstituted alkoxy group having 1 to 4 carbon atoms (e.g. methoxy, ethoxy, isopropoxy, t-butoxy, 2-chloroethoxy, etc.), a hydroxy group, a substituted or unsubstituted aryloxy group (e.g. p-chlorophenoxy, 1-naphthoxy, etc.), a acyloxy group (e.g. acetyloxy, p-cyanobenzoyloxy, etc.), a carboxyl group or its ester group (e.g. ethoxycarbonyl, m-bromophenoxycarbonyl, etc.), a carbamoyl group (e.g. amonocarbonyl, t-butylaminocarbonyl, anilinocarbonyl, etc.), an acyl group (e.g. acetyl, o-nitrobenzoyl, etc.), a sulfo group, a sulfamoyl group (e.g. aminosufonyl, t-butylamiosulfonyl, p-tolylaminosulfonyl, etc.), an amino group, an acylamino group (e.g. acetylamino, benzoylamino, etc.), a sulfonamido group (e.g. methanesulfonamido, p-toluenesulfonamido, etc.), a cyano group, a nitro group and so on. Among them, preferable ones are a substituted or unsubstituted alkyl group having 1 to 4 carbon atoms (e.g. methyl, ethyl, isopropyl, n-butyl, trifluoromethyl, etc.), a halogen atom (chlorine, bromine, fluorine, iodine), a substituted or unsubstituted alkoxy group having 1 to 4 carbon atoms (e.g. methoxy, ethoxy, t-butoxy, 2-chloroethoxy, etc.), a cyano group and a nitro group.

Z is a group of atoms necessary for forming a substituted or unsubstituted aromatic hydrocarbon ring or a substituted or unsubstituted aromatic heterocyclic ring, specifically representing, for example, a group of atoms for forming a substituted or unsubstituted benzene ring, a substituted or unsubstituted naphthalene ring, a substituted or unsubstituted indole ring, a substituted or unsubstituted carbazole ring, and the like.

As the substituents on the group of atoms for forming these rings, there may be enumerated a series of substituents as mentioned as the substituents for $R_4$ and $R_5$, but preferably they are a halogen atom (chlorine, bromine, fluorine, iodine), a sulfo group and a sulfamoyl group (e.g. aminosulfonyl, p-tolylaminosulfonyl, etc.).

$R_1$ is a hydrogen atom, a substituted or unsubstituted alkyl group, a substituted or unsubstituted amino group, a carboxyl group or its ester group, a substituted or unsubstituted carbamoyl group, a cyano group, preferably a hydrogen atom, a substituted or unsubstituted alkyl group having 1 to 4 carbon atoms (e.g. methyl, ethyl, isopropyl, t-butyl, trifluoromethyl, etc.) or a cyano group.

A' is a substituted or unsubstituted aryl group, preferably a substituted or unsubstituted phenyl group, and the substituents on these groups may include a series of those as mentioned for $R_4$ and $R_5$, but they are preferably a halogen atom (chlorine, bromine, fluorine, iodine), a substituted or unsubstituted alkyl group having 1 to 4 carbon atoms (e.g. methyl, ethyl, isopropyl, t-butyl, trifluoromethyl, etc.), a substituted or unsubstituted alkoxy group having 1 to 4 carbon atoms (e.g. methoxy, ethoxy, isopropoxy, t-butoxy, 2-chloroethoxy, etc.).

$R_2$ and $R_3$ represent a substituted or unsubstituted alkyl group, a substituted or unsubstituted aralkyl group and a substituted or unsubstituted aryl group, preferably a substituted or unsubstituted alkyl groups having 1 to 4 carbon atoms (e.g. methyl, ethyl, isopropyl, t-butyl, trifluoromethyl, etc.) and a substituted or unsubstituted phenyl group (e.g. phenyl, p-methoxyphenyl, m-chlorophenyl, etc.).

Of the Embodiment A rpresented by the above formula [IA], particularly preferable compounds with respect to sensitivity and stability to heat and light have the structure as represented by the formula [IA]-II shown below:

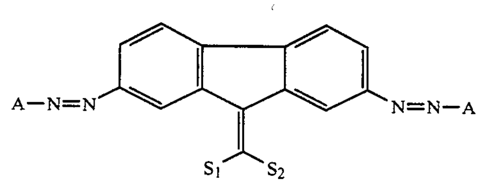

[IA]-II wherein $S_1$, $S_2$ and A are the same as defined in the formula [IA].

Specific examples of useful azo compounds represented by the above formula [IA] may include, for example, those having the following formula:

Those having the formula [IA]-III:

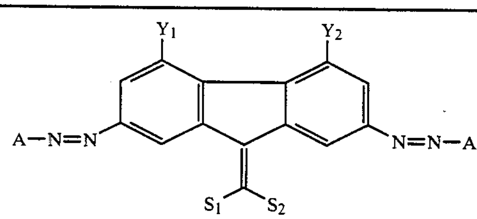

| Compound No. | A | $S_1$ | $S_2$ | $Y_1$ | $Y_2$ |
|---|---|---|---|---|---|
| A-(1) | 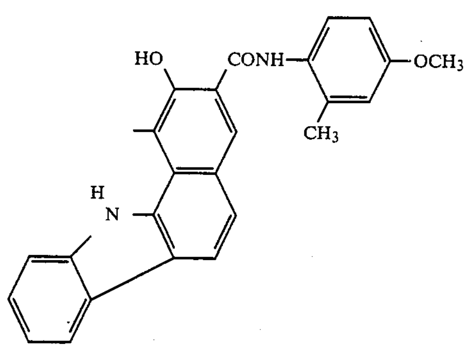 | 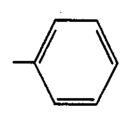 | 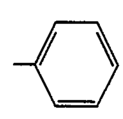 | H | H |

-continued
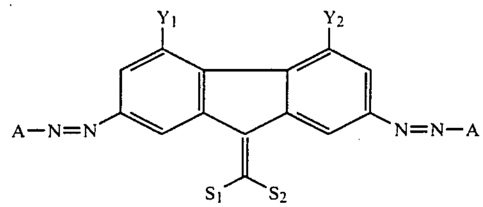
| Compound No. | A | $S_1$ | $S_2$ | $Y_1$ | $Y_2$ |
|---|---|---|---|---|---|
| A-(2) | " | 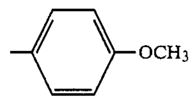 | 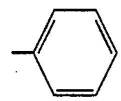 | H | H |
| A-(3) | " | 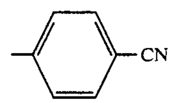 | 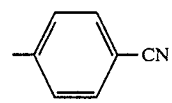 | H | H |
| A-(4) | " | $CH_3$ | $CH_3$ | H | H |
| A-(5) | " | $-OCH_3$ | $-C_2H_5$ | H | H |
| A-(6) | " | $-COOC_2H_5$ | $-COOC_2H_5$ | H | H |
| A-(7) | " | $-CH_3$ | $C_3H_7$ | H | Cl |
| A-(8) | 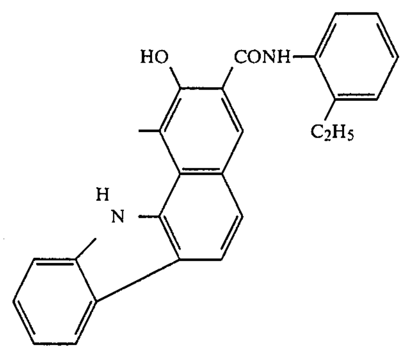 | 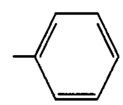 | 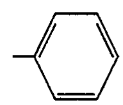 | H | H |
| A-(9) | " | $-COOC_2H_5$ | $-COOC_2H_5$ | H | H |
| A-(10) | 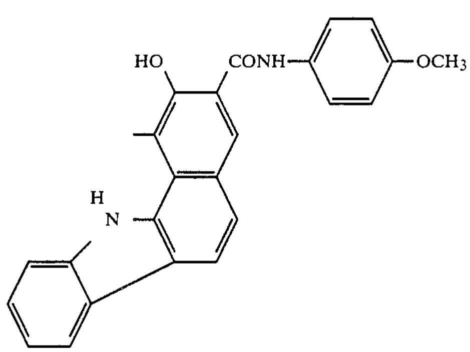 | 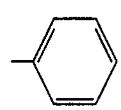 | 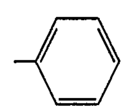 | H | H |
| A-(11) | " | 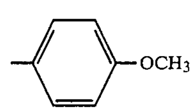 | 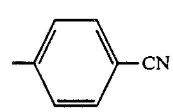 | H | H |

-continued
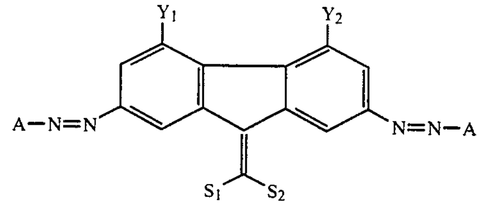
| Compound No. | A | $S_1$ | $S_2$ | $Y_1$ | $Y_2$ |
|---|---|---|---|---|---|
| A-(12) | 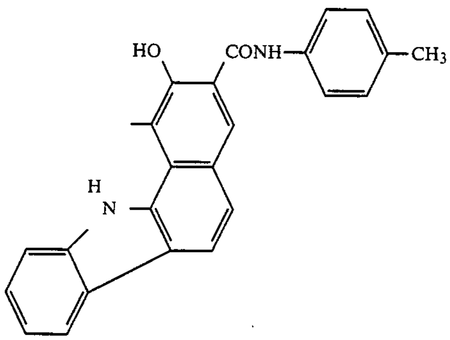 | 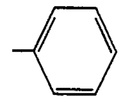 | 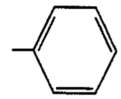 | H | H |
| A-(13) | " | $-COOCH_3$ | $-COOCH_3$ | H | H |
| A-(14) | 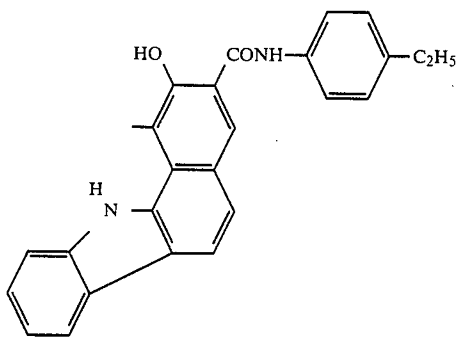 | 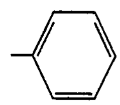 | 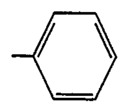 | H | H |
| A-(15) | " | $-CH_3$ | $-CH_3$ | H | H |
| A-(16) | 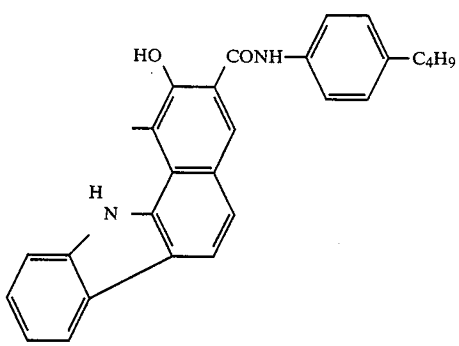 | 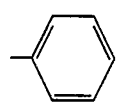 | 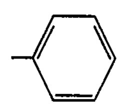 | H | H |
| A-(17) | " | 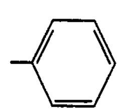 | $-COOC_2H_5$ | Br | Br |

-continued
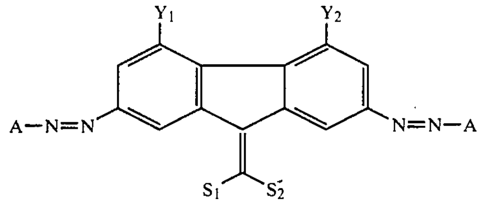
| Compound No. | A | $S_1$ | $S_2$ | $Y_1$ | $Y_2$ |
|---|---|---|---|---|---|
| A-(18) | 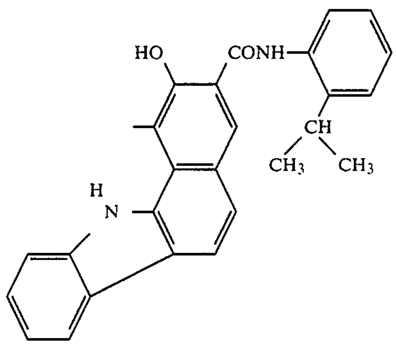 | 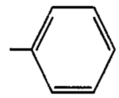 | 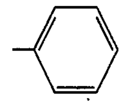 | H | H |
| A-(19) | " | $-CH_3$ | $-OCH_3$ | H | H |
| A-(20) | 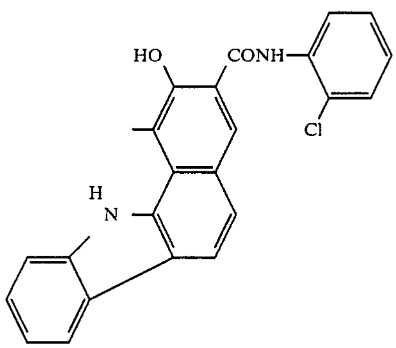 | 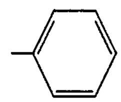 | 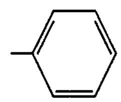 | H | H |
| A-(21) | " | $-COOC_2H_5$ | $-COOC_2H_5$ | CN | CN |
| A-(22) | 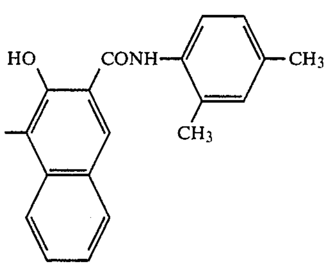 | 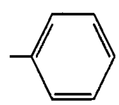 | 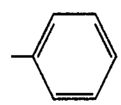 | H | H |
| A-(23) | 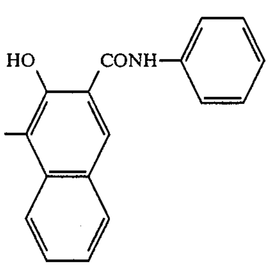 | $-COOC_2H_5$ | $-COOC_2H_5$ | H | H |

-continued
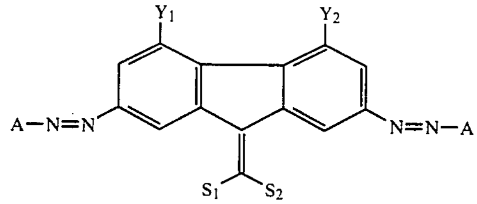
| Compound No. | A | $S_1$ | $S_2$ | $Y_1$ | $Y_2$ |
|---|---|---|---|---|---|
| A-(24) | 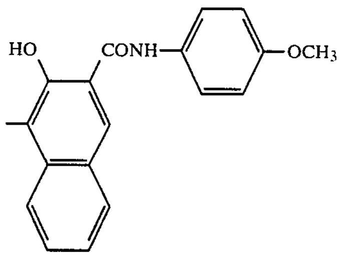 | $-CH_3$ | $-C_2H_5$ | H | H |
| A-(25) | 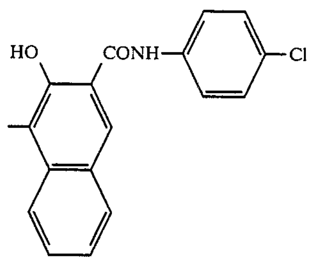 | 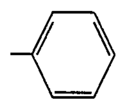 | 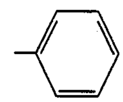 | H | H |
| A-(26) | 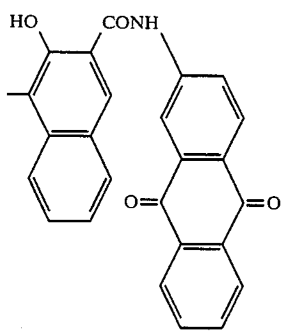 | 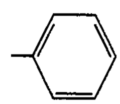 | 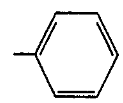 | H | H |
| A-(27) | 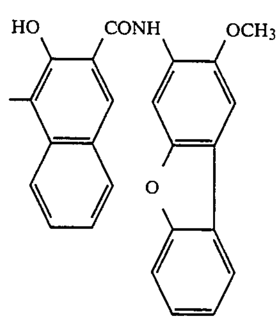 | 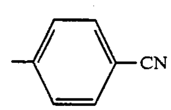 | $CH_3$ | H | H |

-continued
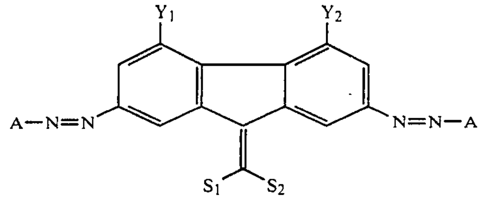
| Compound No. | A | $S_1$ | $S_2$ | $Y_1$ | $Y_2$ |
|---|---|---|---|---|---|
| A-(28) | 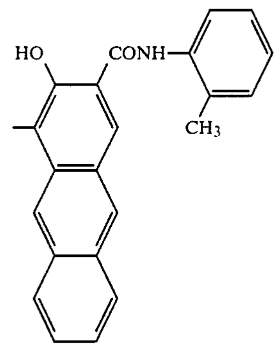 | $C_2H_5$ | $C_2H_5$ | $CH_3$ | $CH_3$ |
| A-(29) | 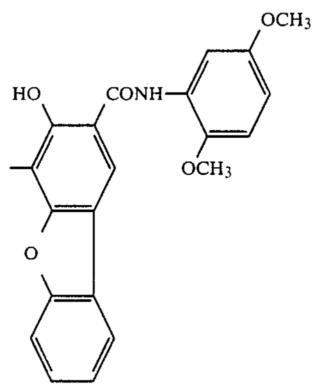 | 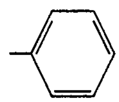 | 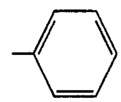 | H | H |
| A-(30) | 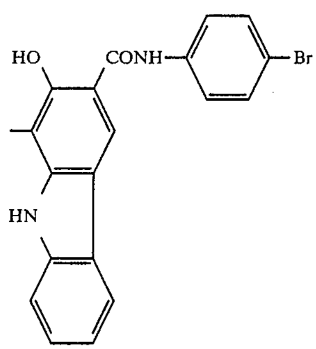 | $-OCH_3$ | $C_2H_5$ | H | H |
| A-(31) | 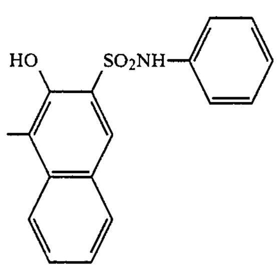 | 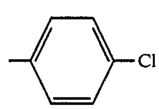 | 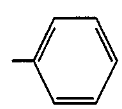 | H | H |

-continued
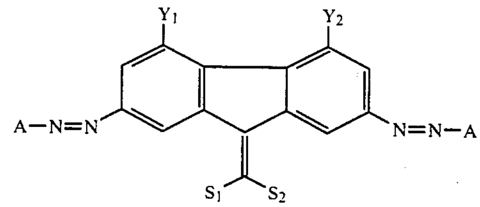
| Compound No. | A | $S_1$ | $S_2$ | $Y_1$ | $Y_2$ |
|---|---|---|---|---|---|
| A-(32) | 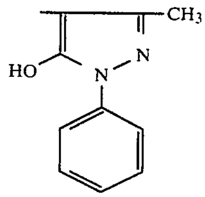  | 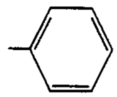 | 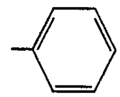 | Cl | Cl |
| A-(33) | 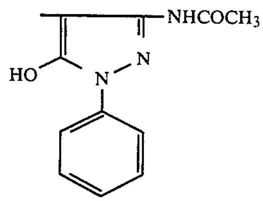  | $COOCH_3$ | $COOCH_3$ | H | H |
| A-(34) | 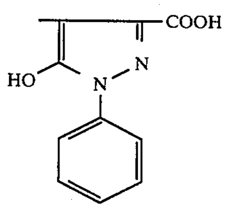  | $-CH_3$ | $-C_4H_9$ | H | H |
| A-(35) | 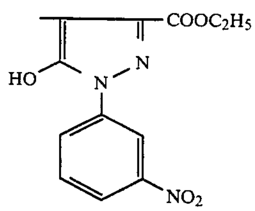  | 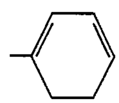 | 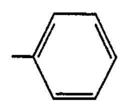 | CN | H |
| A-(36) | 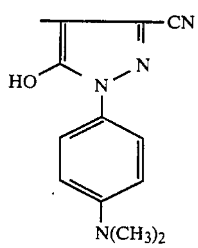  | $CH_3$ | $C_2H_5$ | H | H |
| A-(37) | 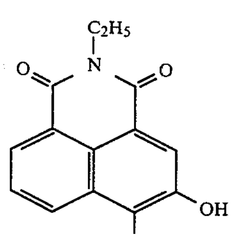  | 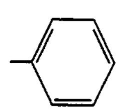 | 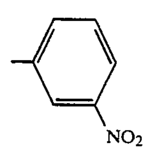  | H | H |

-continued
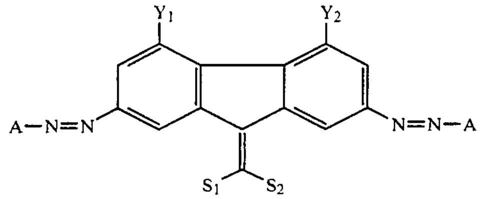
| Compound No. | A | $S_1$ | $S_2$ | $Y_1$ | $Y_2$ |
|---|---|---|---|---|---|
| A-(38) | 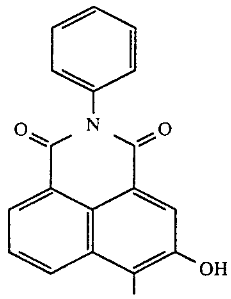 | $-OCH_3$ | $CH_3$ | Cl | Cl |
| A-(39) | 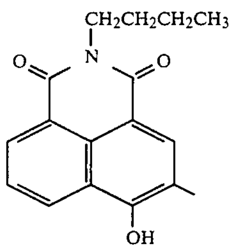 | 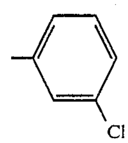 | 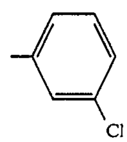 | H | H |
| A-(40) | 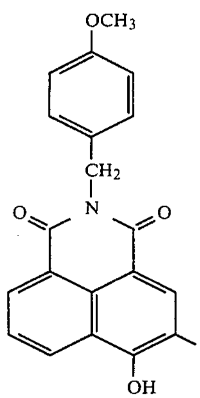 | 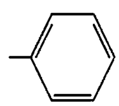 | 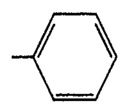 | $-OCH_3$ | H |
| A-(41) | 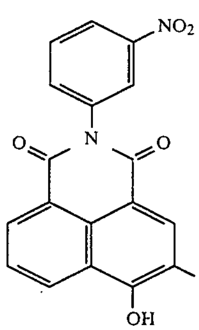 | $CH_3$ | $C_3H_7$ | H | H |
Those having the formula [IA]-IV

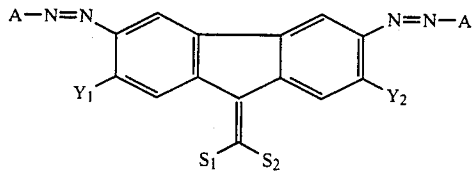
| Compound No. | A | S1 | S2 | Y1 | Y2 |
|---|---|---|---|---|---|
| A-(42) | 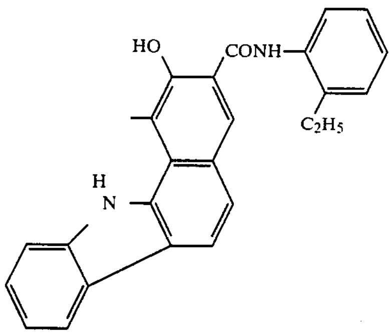 | 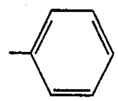 | 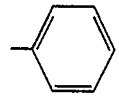 | H | H |
| A-(43) | 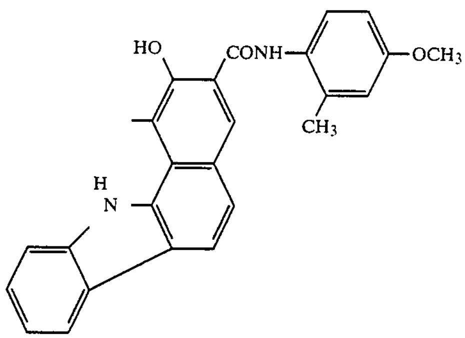 | 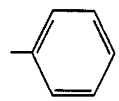 | 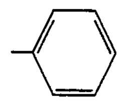 | H | H |
| A-(44) | 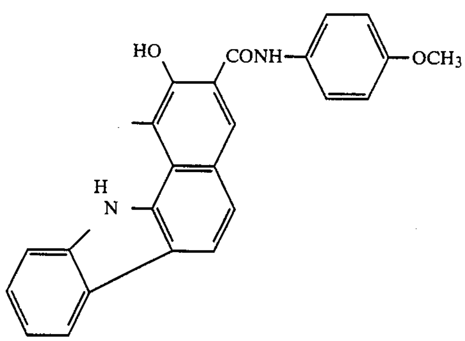 | 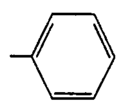 | 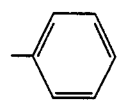 | H | H |
| A-(45) | 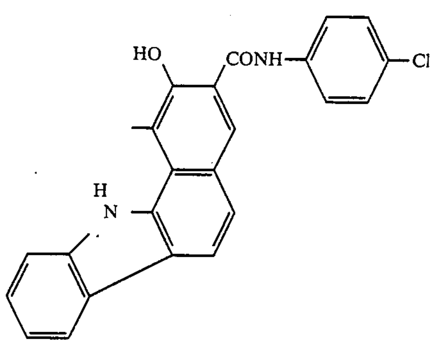 | $-OCH_3$ | $-CH_3$ | H | H |

-continued
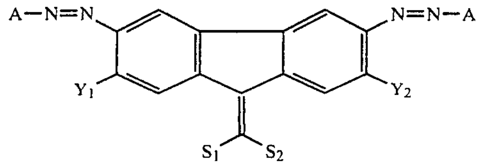
| Compound No. | A | $S_1$ | $S_2$ | $Y_1$ | $Y_2$ |
|---|---|---|---|---|---|
| A-(46) | 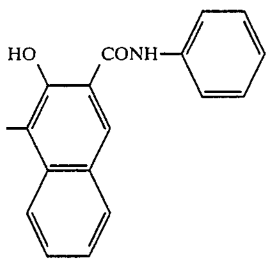 | 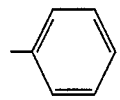 | 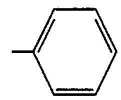 | H | H |
| A-(47) | 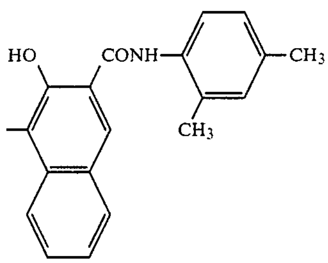 | 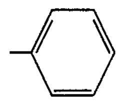 | 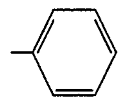 | H | H |
| A-(48) | 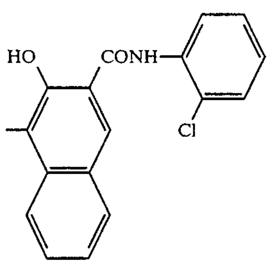 | $-COOC_2H_5$ | $-COOC_2H_5$ | H | Cl |
| A-(49) | 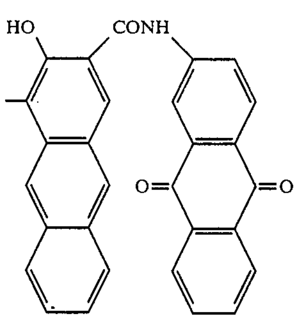 | 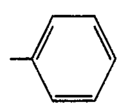 | 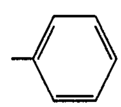 | H | H |

-continued
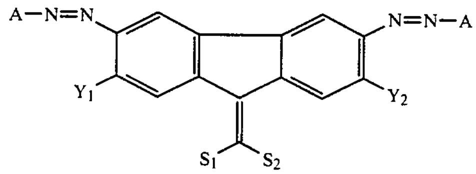
| Compound No. | A | $S_1$ | $S_2$ | $Y_1$ | $Y_2$ |
| --- | --- | --- | --- | --- | --- |
| A-(50) | 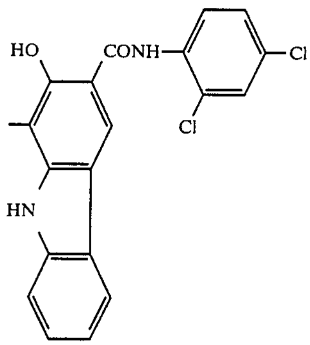 | 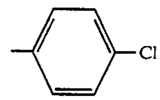 | 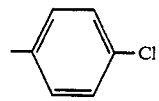 | Cl | Cl |
| A-(51) | 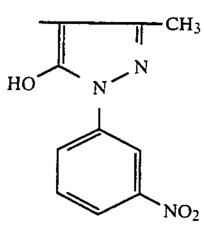 | $CH_3$ | $C_2H_5$ | $CH_3$ | H |
| A-(52) | 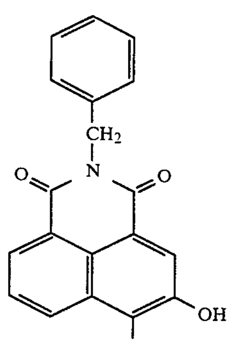 | 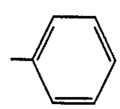 | 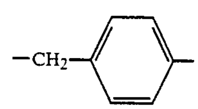 | H | H |
Others:
A-(53)
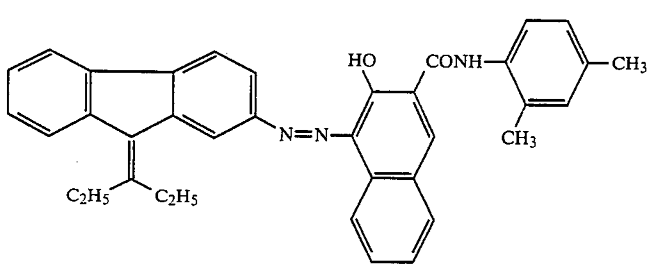

-continued
A-(54)
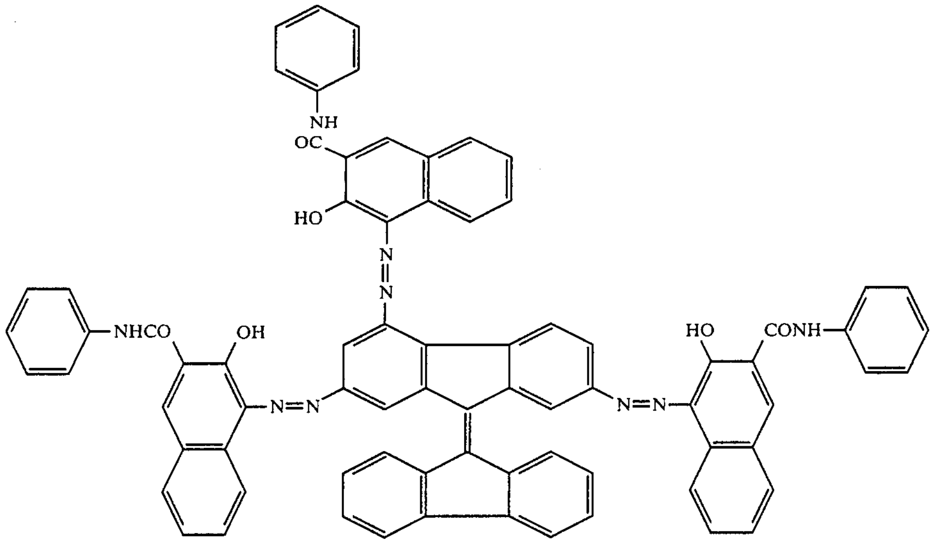
The azo compounds as set forth above can be synthesized easily according to the known method. A typical example is shown below.
SYNTHESIS EXAMPLE 1
[Synthesis of the exemplary compound A-(1)]
The synthesis route is schematically shown below:
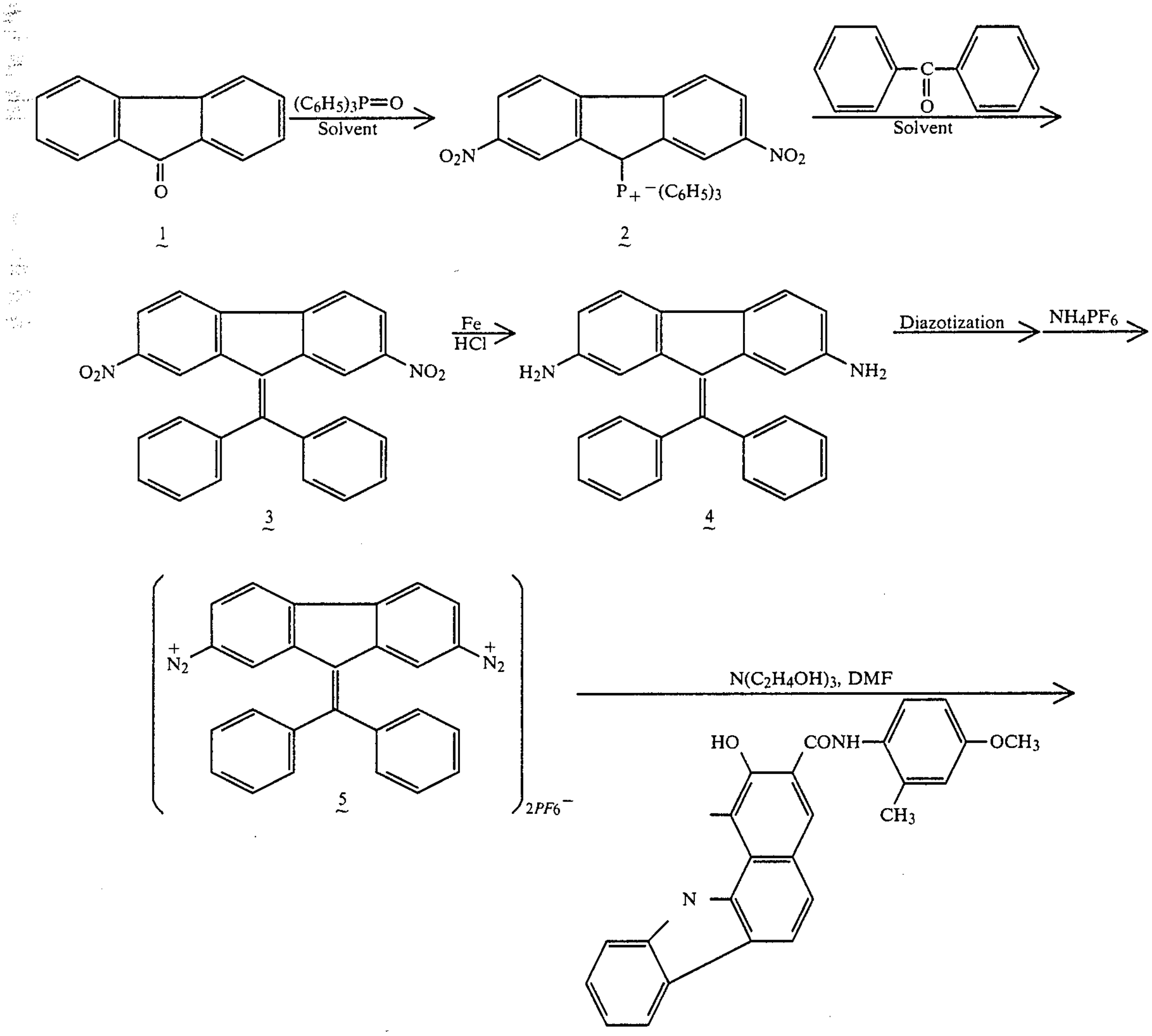

-continued

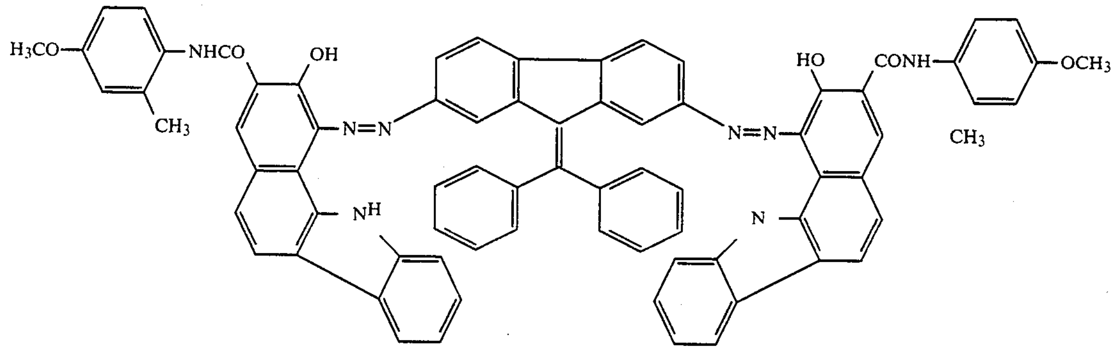

A-(1)

That is 2,7-dinitrofluorenone 1 (produced by Tokyo Kasei K.K.) was allowed to react with triphenylphosphine to be converted to a dinitro derivative 2, which was then allowed to react with benzophenone to form a dinitro derivative 3 (Journal of Chemistry, 24, 282, 1959), followed by reduction with iron to prepare a diamino derivative 4. The diamino derivative 4 (36.0 g, 0.1 mole) was dispersed by adding into a mixture of 1 liter of conc. HCl and 1 liter of water and a solution of 13.8 g (0.2 mole) of sodium nitrite dissolved in 0.1 liter of water was added dropwise at 5° C. under ice-cooling. After completion of the dropwise addition, the reaction mixture was filtered, and 1 liter of an aqueous 50% ammonium hexafluorophosphate solution was added to the filtrate. The resultant precipitate was recovered by filtration, washed with water and thoroughly dried. The salt obtained was dissolved in 1.5 liters of N,N-dimethylformamide (DMF) to provide a tetrazonium salt solution to be used in the subsequent reaction.

As the next step, 79.3 g (0.2 mole) of 2-hydroxy-3-(4-methoxy-2-methylphenylcarbamoyl)-benzo[a]carbazole (Naphthol AS-SR, produced by Hoechst AG) and 60 g of triethanolamine were dissolved in 4 liters of N,N-dimethylformamide, and the tetrazonium salt solution as prepared above was added dropwise under ice-cooling to the resultant solution, followed further by stirring for 2 hours to carry out the reaction. The crystal formed was recovered by filtration, and the crystal was washed twice with 5 liters of N,N-dimethylformamide and twice with 5 liters of acetone, followed by drying, to obtain 43.5 g of the desired bisazo compound A-(1) (Yield: 37%). From the analytical results of m.p. 300° C. or higher, FD-MS spectrum which indicates a peak of $M^+$ at m/Z 1175 and the elemental analysis of C=77.66%, N=9.48%, H=4.67% (Calcd. values, C=77.55%, N=9.54%, H=4.63%), it can be understood that the desired substance was synthesized.

EMBODIMENT B

This embodiment is represented by the following formula [IB]:

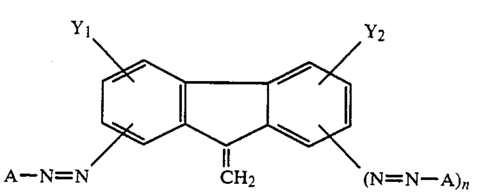

[IB]

wherein $Y_1$, $Y_2$, n and A are the same as defined in the above formula [I].

The detailed description for the symbols $Y_1$, $Y_2$ and A as given for the above embodiment [IA] are also applicable for this embodiment.

Of the Embodiment B represented by the above formula [IB], particularly preferable compounds with respect to sensitivity and stability to heat and light have the structure as represented by the formula [IB]-II shown below:

[IB]-II

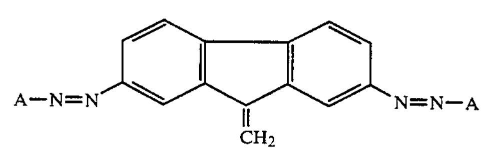

wherein A is the same as defined above.

Specific examples of useful azo compounds represented by the above formula [IB] may include, for example, those having the following formula:

Those having the following formula:

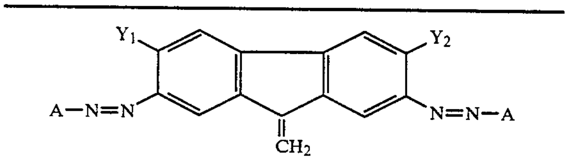

| Compound No. | A | $Y_1$ | $Y_2$ |
|---|---|---|---|
| B-(1) | 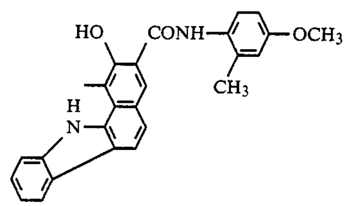 | H | H |

-continued
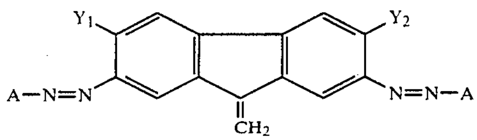
| Compound No. | A | $Y_1$ | $Y_2$ |
|---|---|---|---|
| B-(2) | 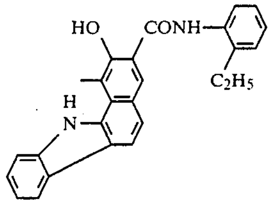 | H | H |
| B-(3) | 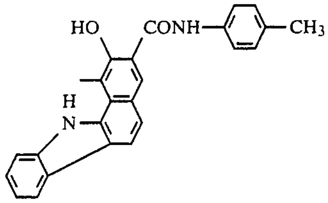 | H | H |
| B-(4) | 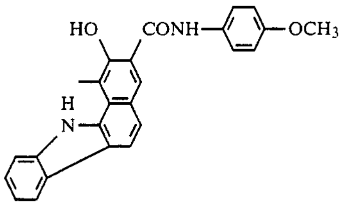 | H | H |
| B-(5) | 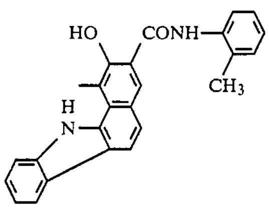 | H | H |
| B-(6) | 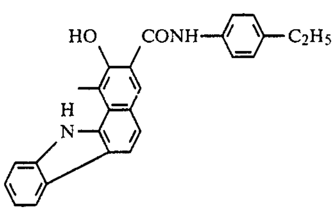 | H | H |
| B-(7) | 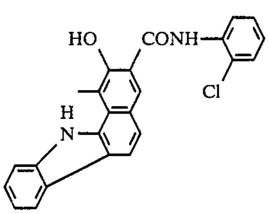 | H | H |
-continued
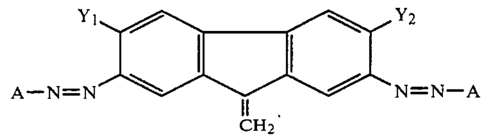
| Compound No. | A | $Y_1$ | $Y_2$ |
|---|---|---|---|
| B-(8) | 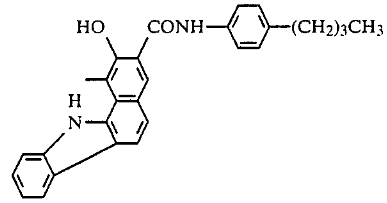 | H | H |
| B-(9) | 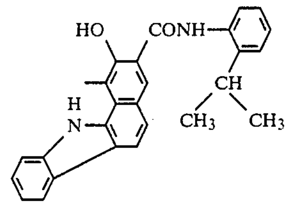 | H | H |
| B-(10) | 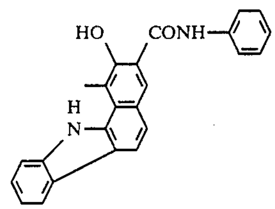 | H | H |
| B-(11) | 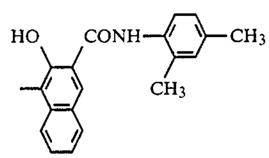 | H | H |
| B-(12) | 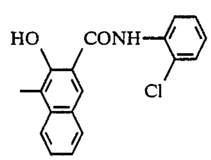 | H | H |
| B-(13) | 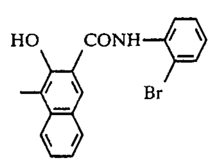 | H | H |
| B-(14) | 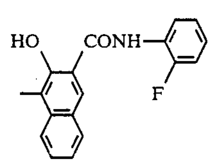 | H | H |

-continued
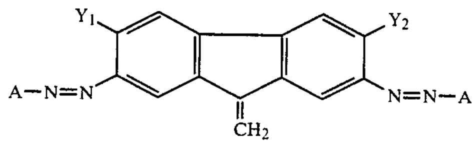
| Compound No. | A | $Y_1$ | $Y_2$ |
|---|---|---|---|
| B-(15) | 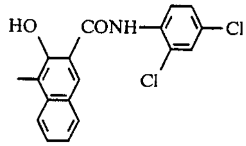 | H | H |
| B-(16) | 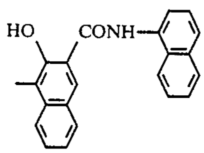 | H | H |
| B-(17) | 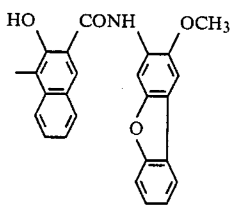 | H | H |
| B-(18) | 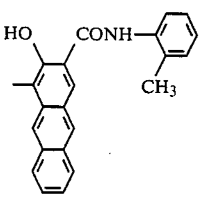 | H | H |
| B-(19) | 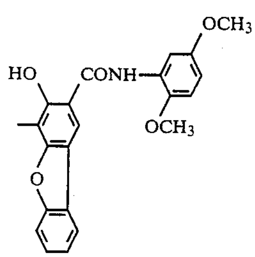 | H | H |
| B-(20) | 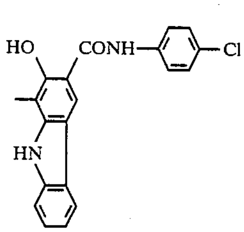 | CN | CN |
| B-(21) | 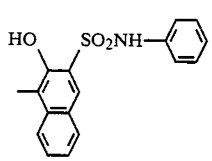 | H | H |
-continued
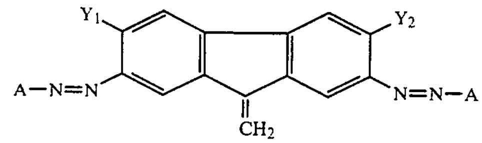
| Compound No. | A | $Y_1$ | $Y_2$ |
|---|---|---|---|
| B-(22) | 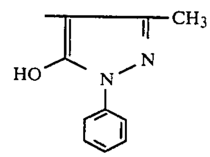 | Cl | Cl |
| B-(23) | 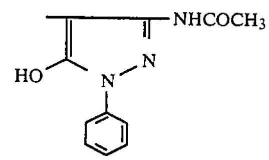 | H | H |
| B-(24) | 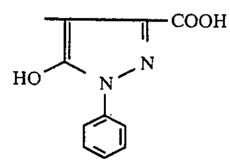 | H | H |
| B-(25) | 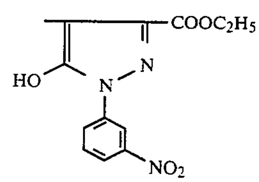 | H | H |
| B-(26) | 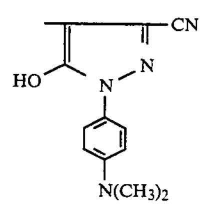 | H | H |
| B-(27) | 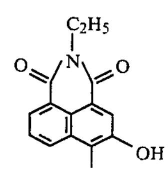 | H | H |
| B-(28) | 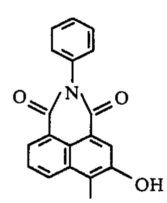 | H | H |

-continued
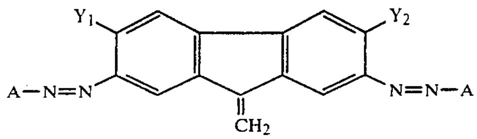
| Compound No. | A | $Y_1$ | $Y_2$ |
|---|---|---|---|
| B-(29) | 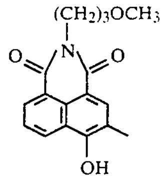 | H | H |
| B-(30) | 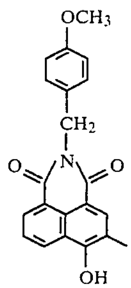 | CN | Br |
Those having the formula [IB]-III:
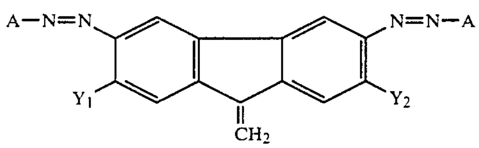
| | | | |
|---|---|---|---|
| B-(31) | 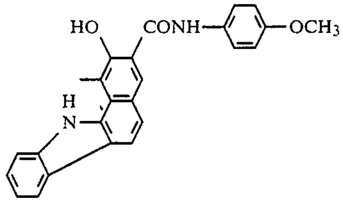 | H | H |
-continued
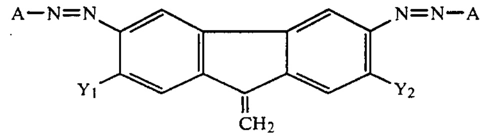
| | | | |
|---|---|---|---|
| B-(32) | 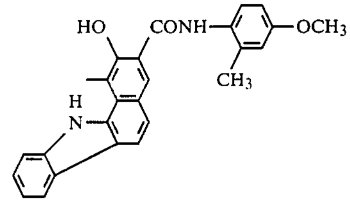 | H | H |
| B-(33) | 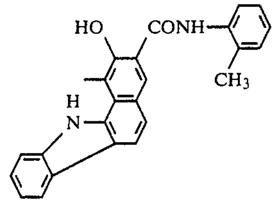 | H | H |
| B-(34) | 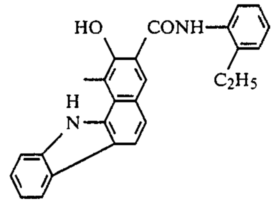 | H | H |
| B-(39) | 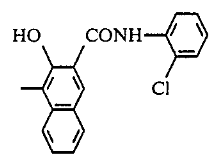 | H | H |
| B-(40) | 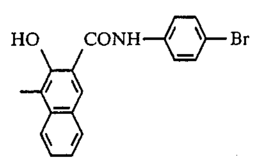 | H | H |
Others:
B-(41)
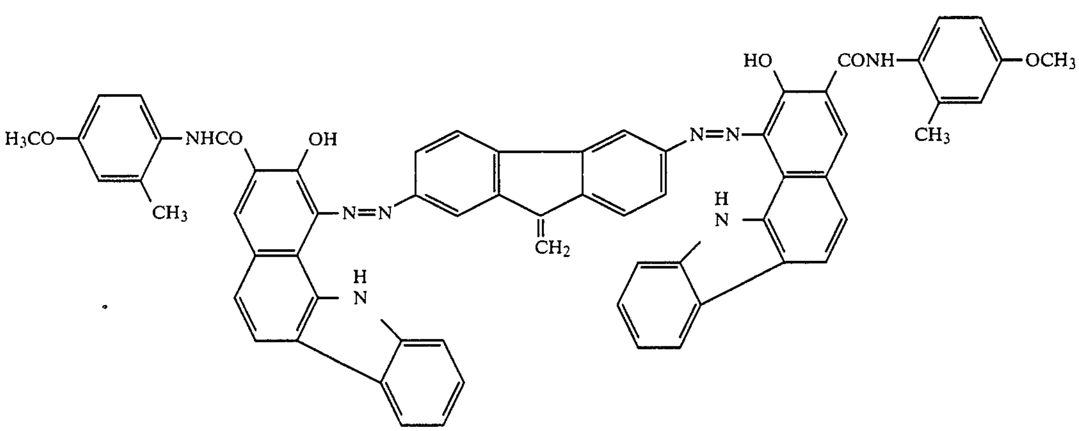

-continued
B-(42)
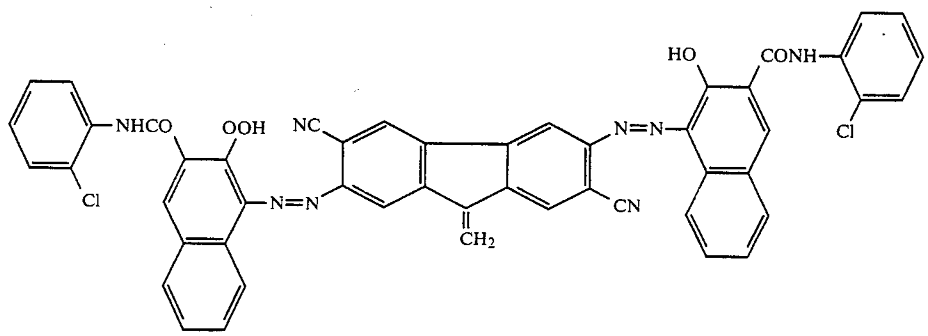
B-(43)
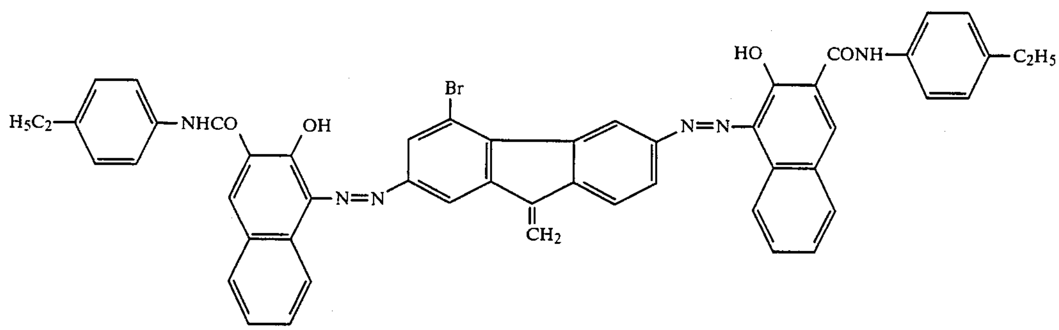
B-(44)
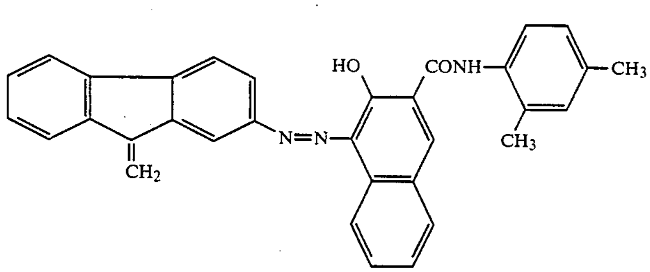
B-(45)
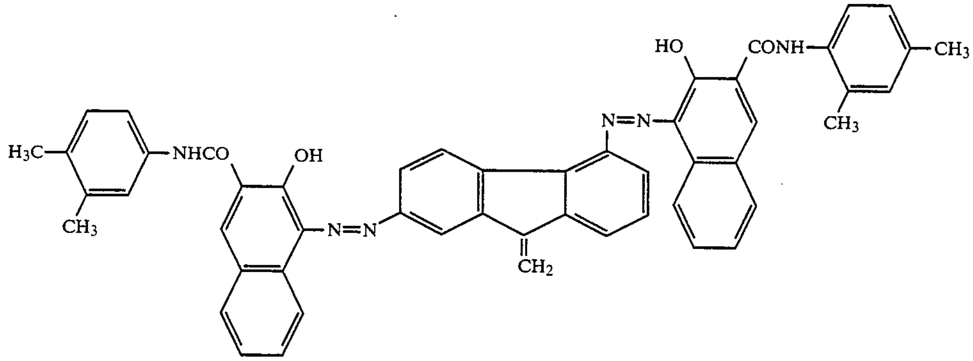

-continued
B-(46)
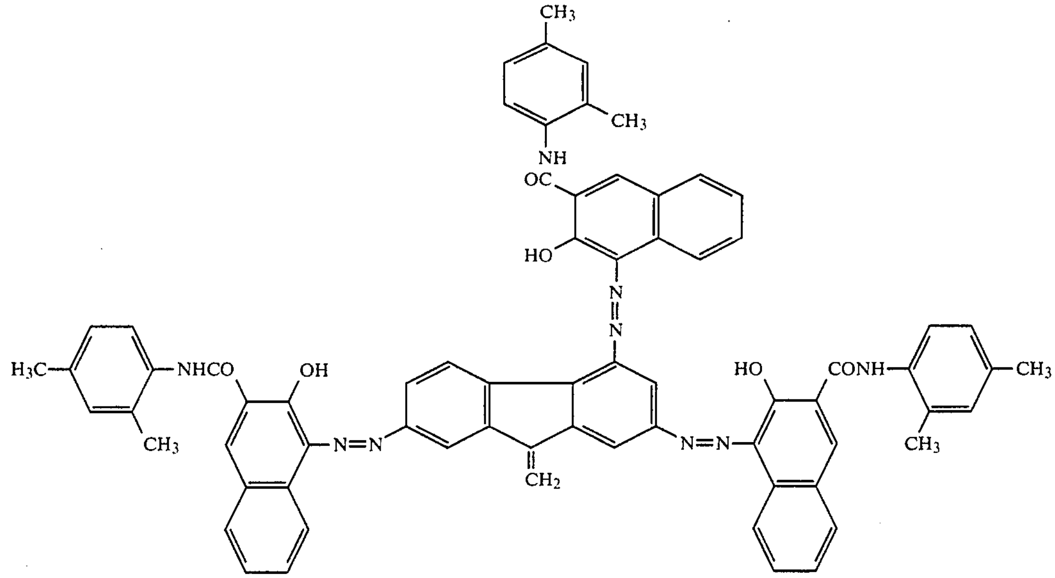
The azo compounds as set forth above can be synthesized easily according to the known method. A typical example is shown below.
SYNTHESIS EXAMPLE 2
[Synthesis of the exemplary compound B-(1)]
The synthesis route is schematically shown below:
B - (1)
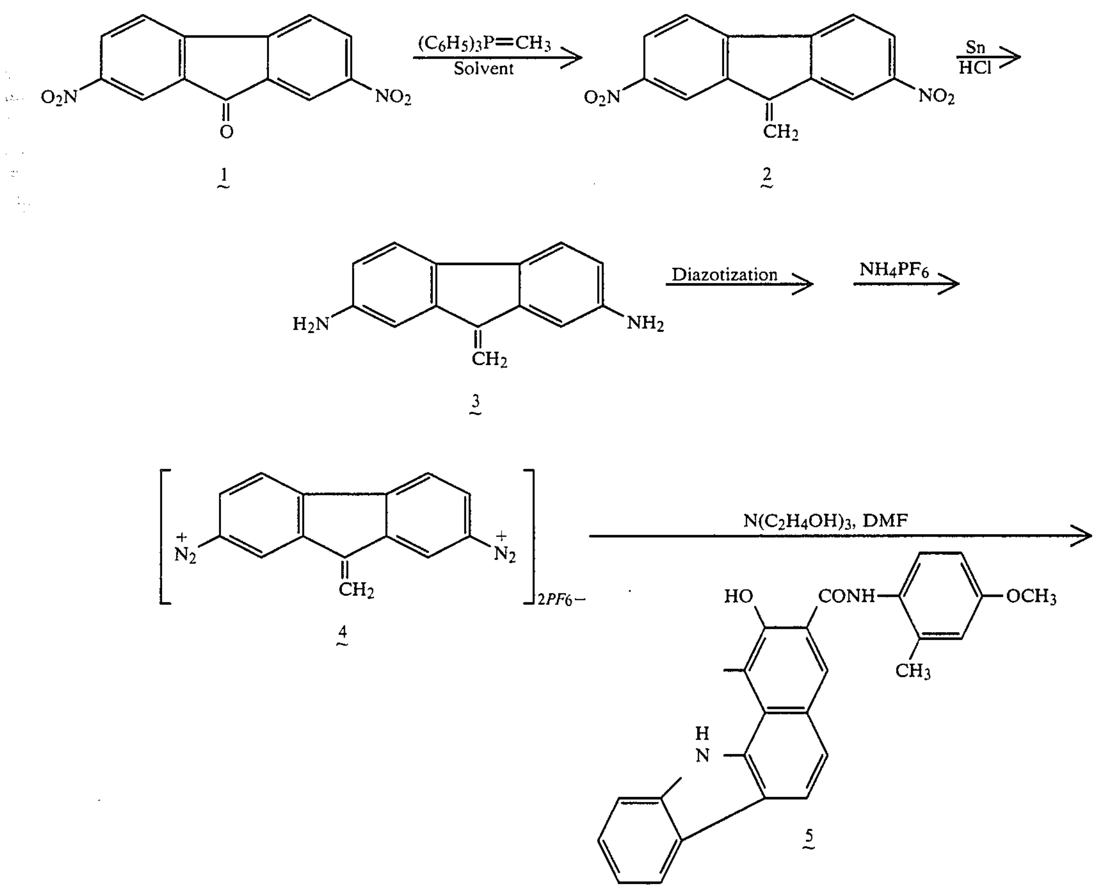

-continued

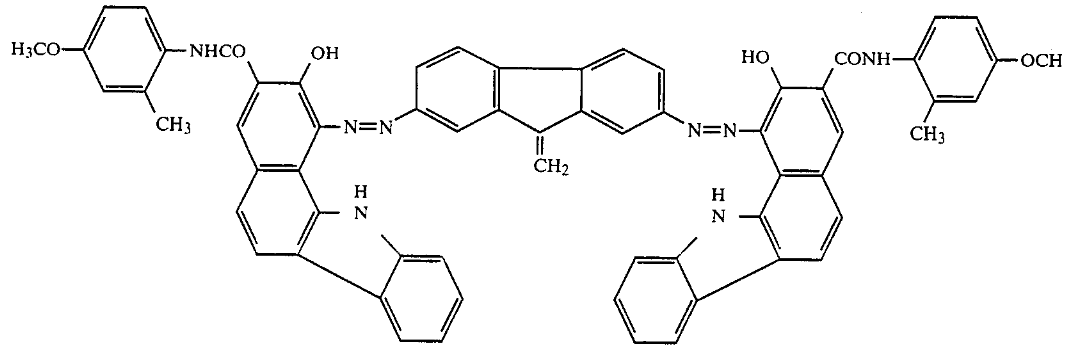

That is 2,7-dinitrofluorenone 1 (produced by Tokyo Kasei K.K.) was allowed to react with triphenylphosphinemethylene (Journal of American Chemical Society, 80, 4386, 1958) to be converted to a dinitro derivative 2, which was then reduced with tin to form a diamino derivative 3. The diamino derivative 3 (21 g, 0.1 mole) was dispersed by adding into a mixture of 1 liter of conc. HCl and 0.5 liter of water and a solution of 14 g (0.2 mole) of sodium nitrite dissolved in 0.5 liter of water was added dropwise at 5° C. under ice-cooling. After completion of the reaction, the reaction mixture was filtered, and 1 liter of an aqueous 50% ammonium hexafluorophosphate solution was added to the filtrate. The resultant precipitate was recovered by filtration, washed with water and thoroughly dried. The salt obtained was dissolved in 1.5 liters of N,N-dimethylformamide (DMF) to provide a tetrazonium salt solution to be used in the subsequent reaction.

As the next step, 80 g (0.2 mole) of 2-hydroxy-3-(4-methoxy-2-methylphenylcarbamoyl)-benzo[a]carbazole (Naphthol AS-SR, produced by Hoechst AG) and 60 g of triethanolamine were dissolved in 4 liters of N,N-dimethylformamide, and the tetrazonium salt solution as prepared above was added dropwise under ice-cooling to the resultant solution, followed further by stirring for 2 hours to carry out the reaction. The crystal formed was recovered by filtration, and the crystal was washed twice with 5 liters of N,N-dimethylformamide and twice with 5 liters of acetone, followed by drying, to obtain 31 g of the desired bisazo compound B-(1) (Yield: 30%). From the analytical results of m.p. 300° C. or higher, FD-MS spectrum which indicates a peak of $M^+$ at m/Z 1022, IR spectrum which indicates a peak at 1680 $cm^{-1}$ (absorption by amide), and the elemental analysis of C=73.80%, N=10.80%, H=6.29% (Calcd. values, C=73.82%, N=10.76%, H=6.20%), it was confirmed that the desired substance was synthesized.

EMBODIMENT C

This embodiment is represented by the following formula [IC]:

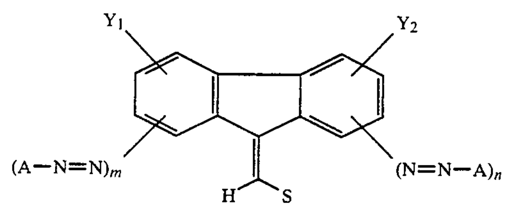

[IC]

wherein S is a substituted or unsubstituted benzene ring or an alkyl group; $Y_1$, $Y_2$, m, n and A are the same as defined in the above formula [I].

The detailed description for the symbols $Y_1$, $Y_2$ and A as given for the above embodiment [IA] are also applicable for this embodiment.

Of the Embodiment C represented by the above formula [IC], particularly preferable compounds with respect to sensitivity and stability to heat and light have the structure as represented by the formula [IC]-II shown below:

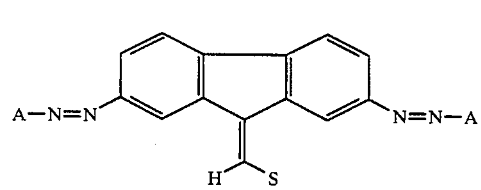

[IC]-II wherein A and S are the same as defined above. Specific examples of useful azo compounds represented by the above formula [IA] may include, for example, those having the following formula:

Those having the following formula [IC]-III:

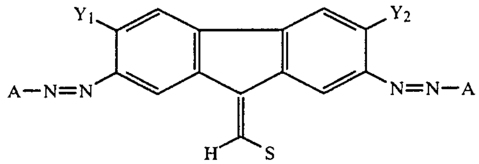
| Compound No. | A | S | $Y_1$ | $Y_2$ |
|---|---|---|---|---|
| c-(1) | 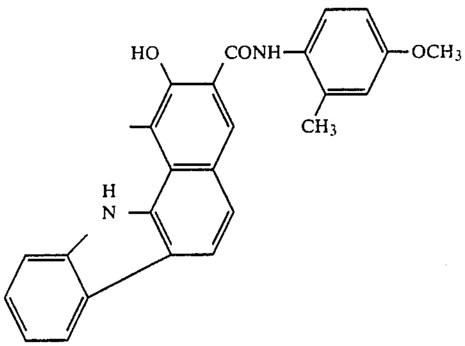 | 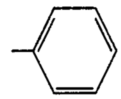 | H | H |
| c-(2) | 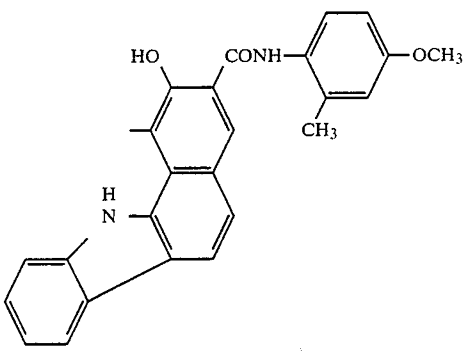 | 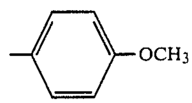 | H | H |
| c-(3) | 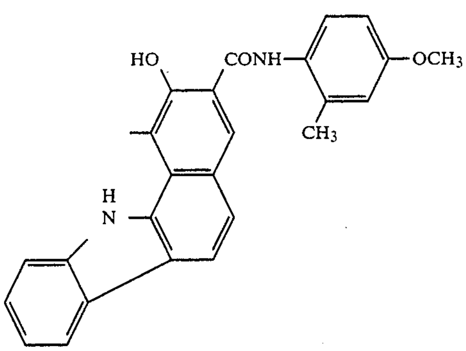 | 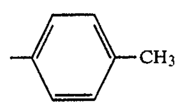 | H | H |
| c-(4) | 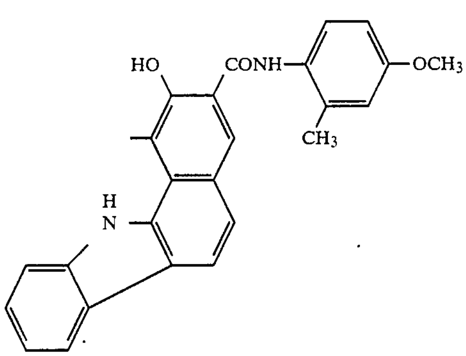 | 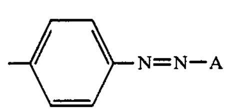 | H | H |

-continued
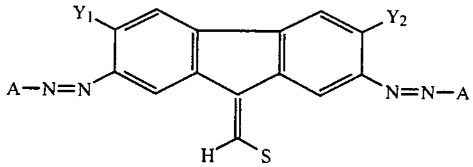
| Compound No. | A | S | $Y_1$ | $Y_2$ |
|---|---|---|---|---|
| c-(5) | 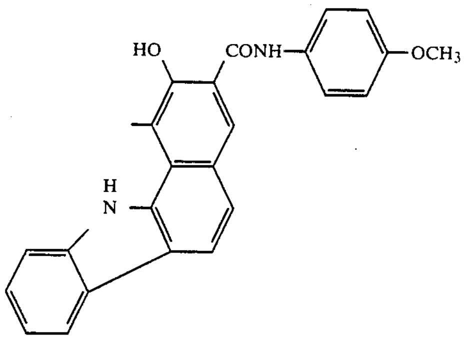 | 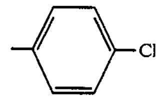 | H | H |
| c-(6) | 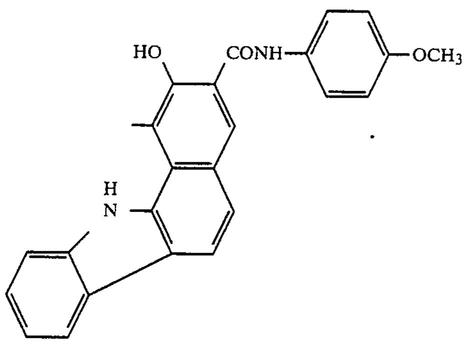 | $-OCH_3$ | H | H |
| c-(7) | 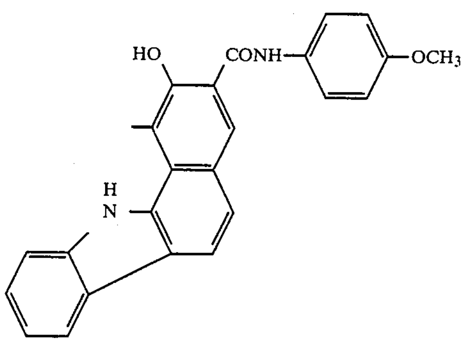 | $-CH_3$ | H | H |
| c-(8) | 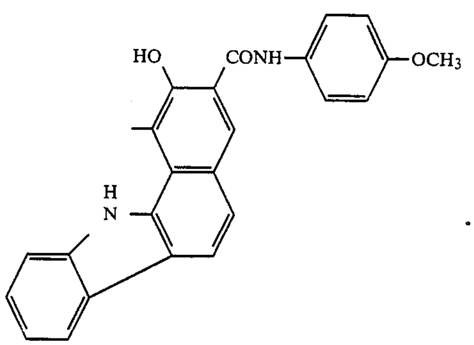 | $-C_3H_7$ | H | H |

-continued
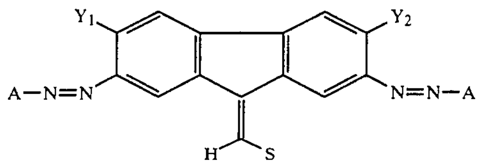
| Compound No. | A | S | $Y_1$ | $Y_2$ |
| --- | --- | --- | --- | --- |
| c-(9) | 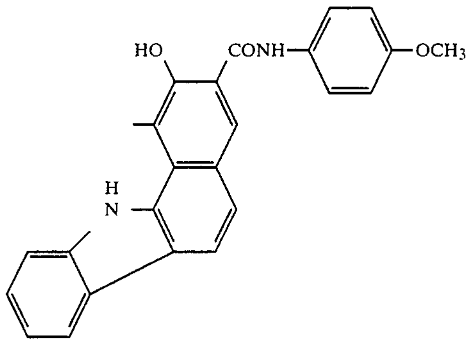 | 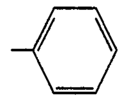 | H | H |
| c-(10) | 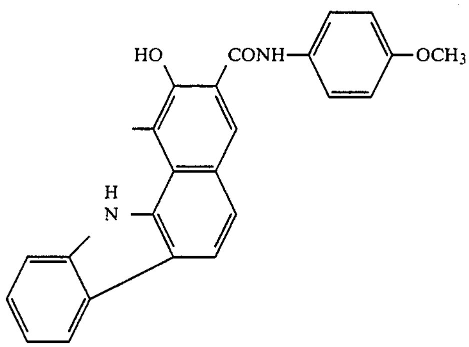 | $-OCH_3$ | H | H |
| c-(11) | 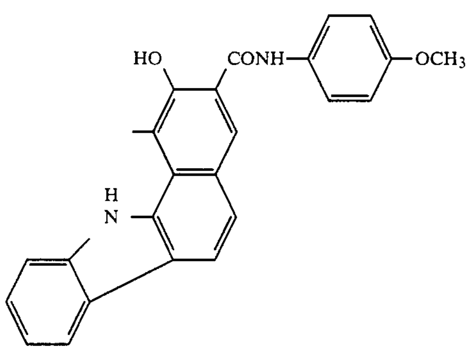 | $-C_3H_7$ | H | H |
| c-(12) | 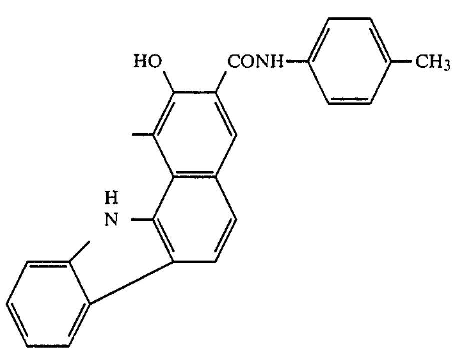 | 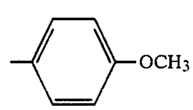 | H | H |

-continued
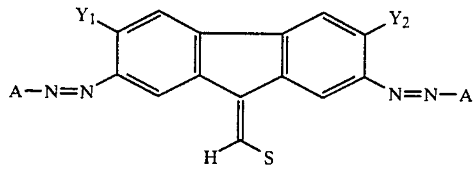
| Compound No. | A | S | $Y_1$ | $Y_2$ |
|---|---|---|---|---|
| c-(13) | 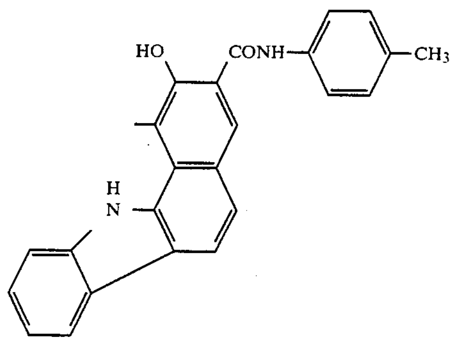 | $-C_2H_5$ | H | H |
| c-(14) | 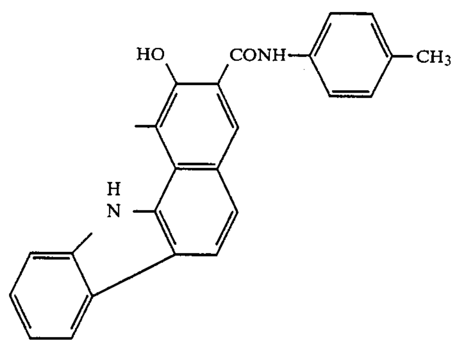 | $-OC_2H_5$ | H | H |
| c-(15) | 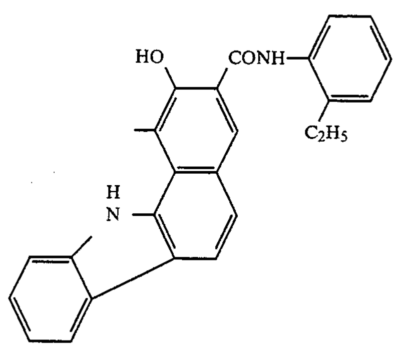 | 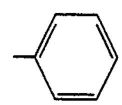 | H | H |
| c-(16) | 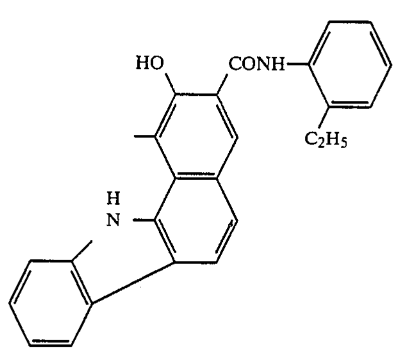 | $-C_3H_7$ | H | H |

-continued
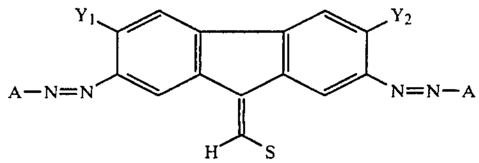
| Compound No. | A | S | $Y_1$ | $Y_2$ |
|---|---|---|---|---|
| c-(17) | 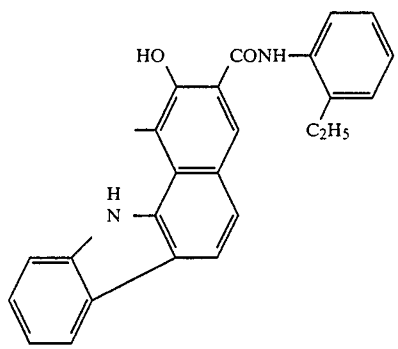 | $-OCH_3$ | H | H |
| c-(18) | 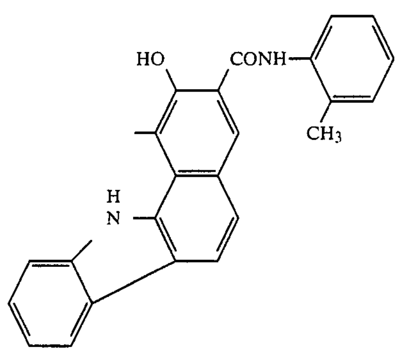 | 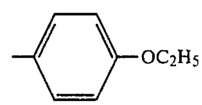 | H | H |
| c-(19) | 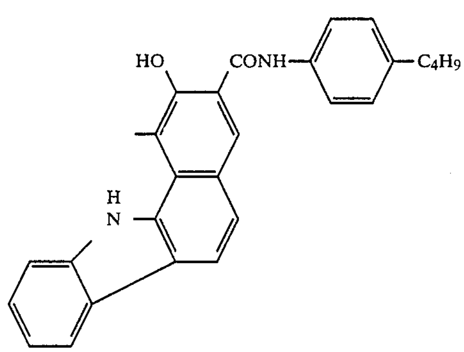 | $-C_3H_7$ | H | H |
| c-(20) | 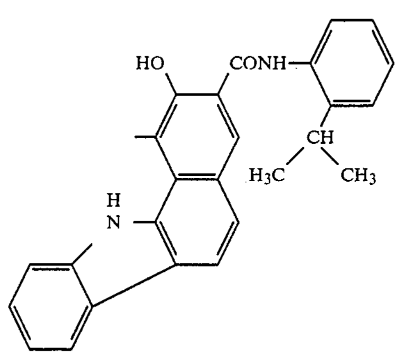 | $-C_2H_5$ | H | H |

-continued
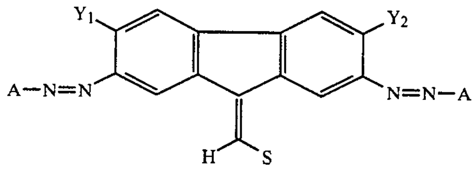
| Compound No. | A | S | $Y_1$ | $Y_2$ |
| --- | --- | --- | --- | --- |
| c-(21) | 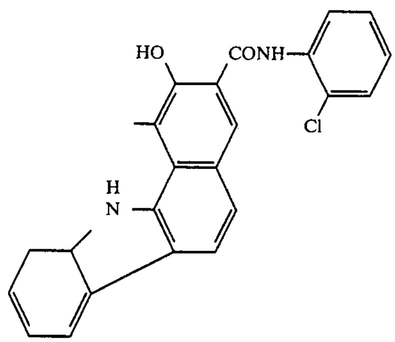 | 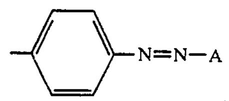 | Cl | Cl |
| c-(22) | 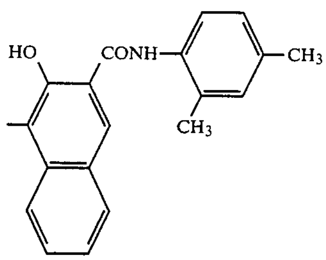 | 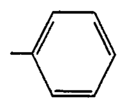 | H | H |
| c-(23) | 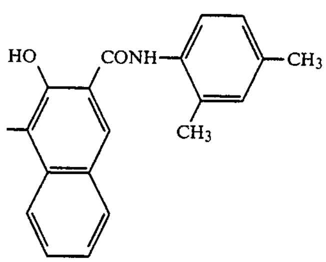 | $-C_3H_7$ | H | H |
| c-(24) | 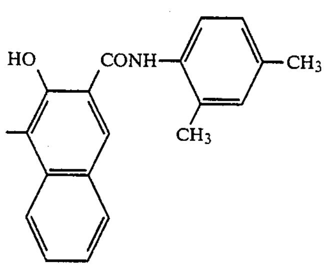 | $-OCH_3$ | H | H |
| c-(25) | 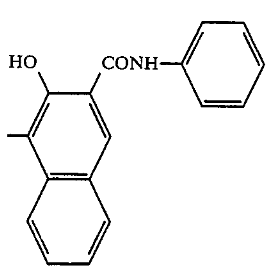 | 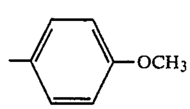 | H | H |

-continued
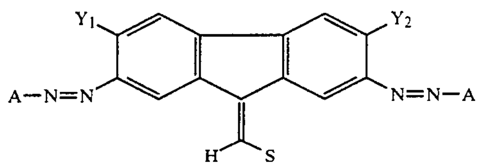
| Compound No. | A | S | $Y_1$ | $Y_2$ |
| --- | --- | --- | --- | --- |
| c-(26) | 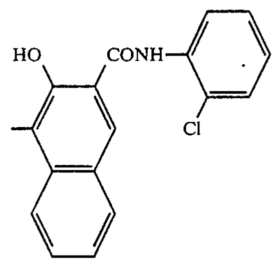 | 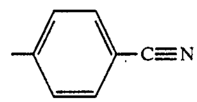 | H | H |
| c-(27) | 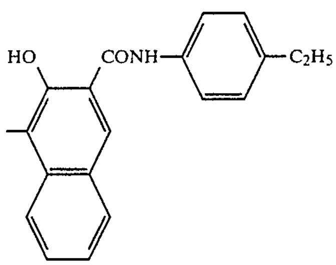 | $—CH_3$ | H | Cl |
| c-(28) | 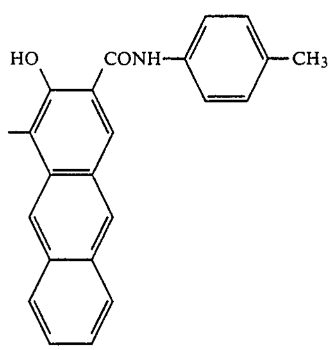 | 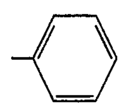 | Cl | Cl |
| c-(29) | 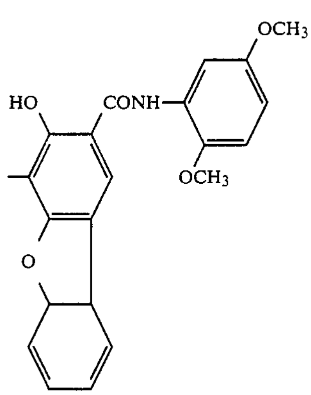 | 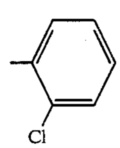 | H | H |

-continued
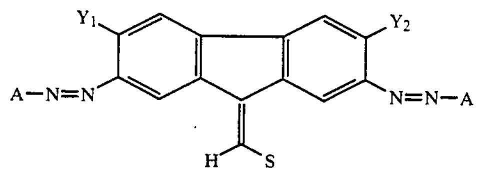
| Compound No. | A | S | $Y_1$ | $Y_2$ |
|---|---|---|---|---|
| c-(30) | 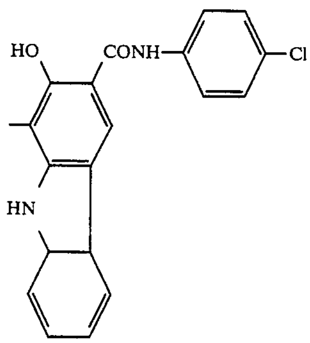 | $-OCH_3$ | H | H |
| c-(31) | 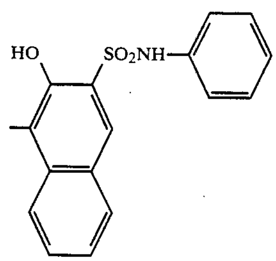 | 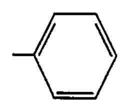 | H | H |
| c-(32) | 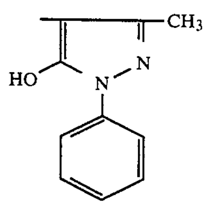 | 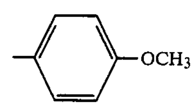 | H | H |
| c-(33) | 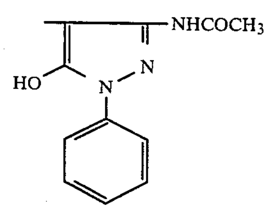 | $-C_3H_7$ | H | H |
| c-(34) | 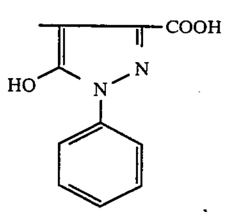 | 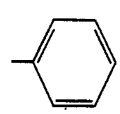 | H | H |

-continued
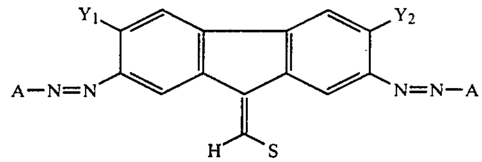
| Compound No. | A | S | $Y_1$ | $Y_2$ |
|---|---|---|---|---|
| c-(35) | 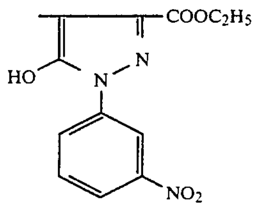 | 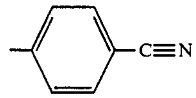 | CN | CN |
| c-(36) | 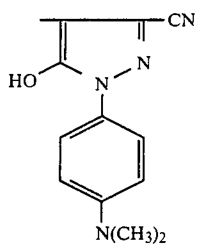 | 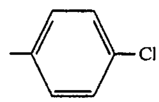 | H | H |
| c-(37) | 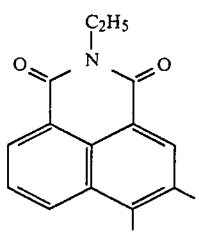 | $-C_2H_5$ | H | H |
| c-(38) | 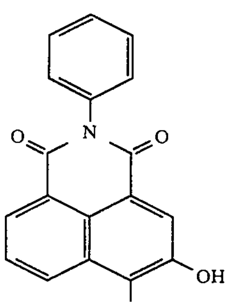 | $-C_3H_7$ | $CH_3$ | $CH_3$ |
| c-(39) | 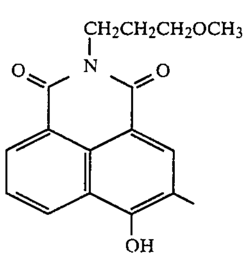 | 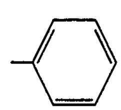 | H | H |

-continued
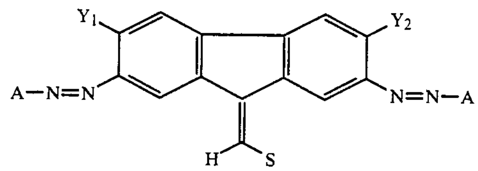
| Compound No. | A | S | $Y_1$ | $Y_2$ |
|---|---|---|---|---|
| c-(40) | 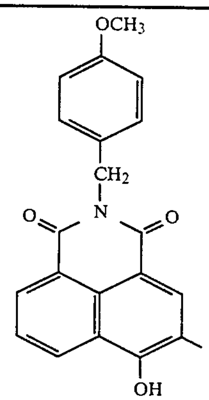 | 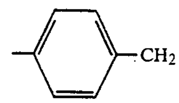 | H | H |
Those having the formula [IC]-IV:
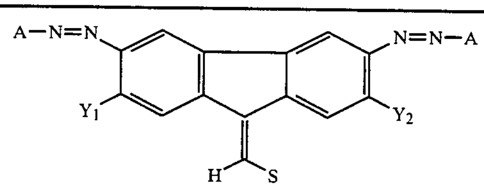
| Compound No. | A | S | $Y_1$ | $Y_2$ |
|---|---|---|---|---|
| C-(41) | 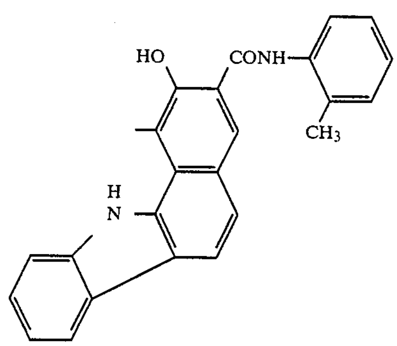 | 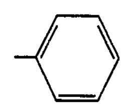 | H | H |
| C-(42) | 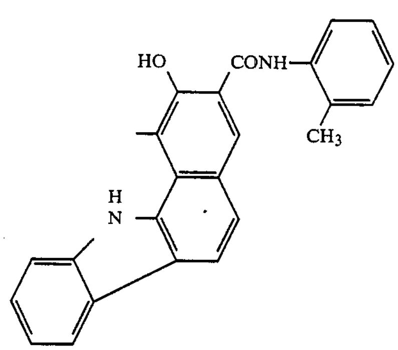 | 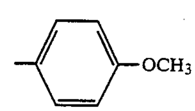 | H | H |

-continued
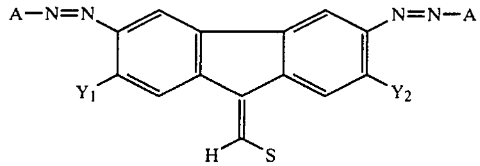
| Compound No. | A | S | $Y_1$ | $Y_2$ |
|---|---|---|---|---|
| C-(43) | 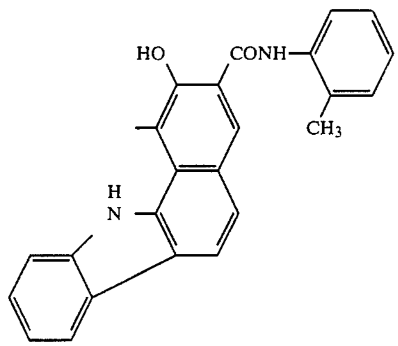 | 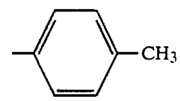 | H | H |
| C-(44) | 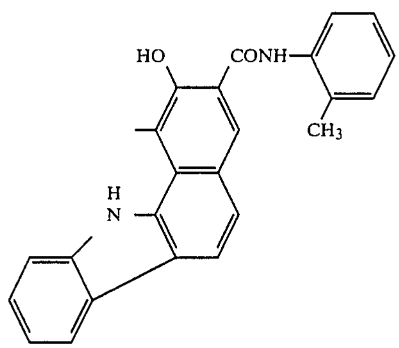 | 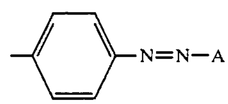 | H | H |
| C-(45) | 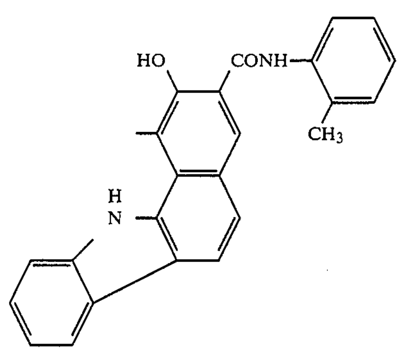 | 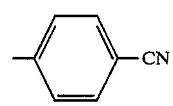 | H | H |
| C-(46) | 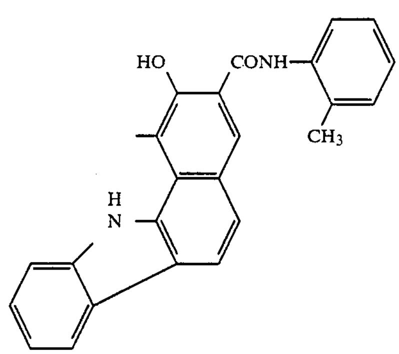 | 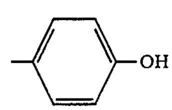 | H | H |

-continued
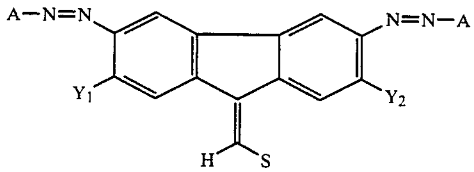
| Compound No. | A | S | $Y_1$ | $Y_2$ |
|---|---|---|---|---|
| C-(47) | 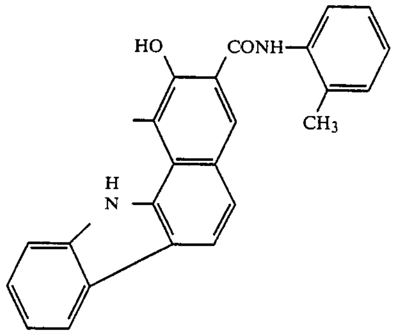 | 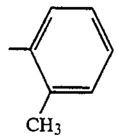 | H | H |
| C-(48) | 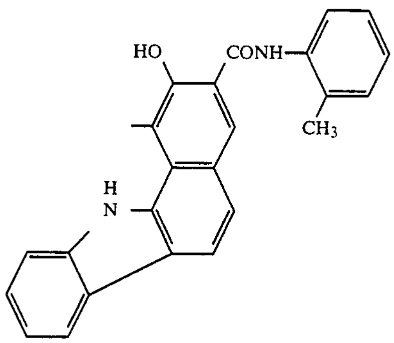 | 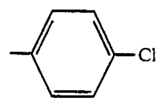 | H | H |
| C-(49) | 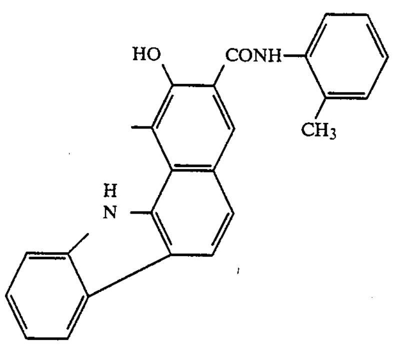 | 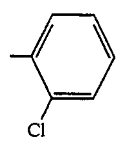 | H | H |
| C-(50) | 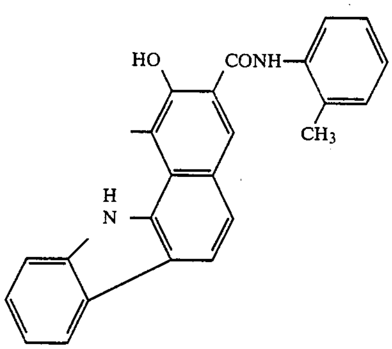 | 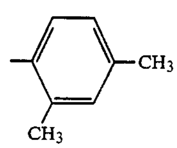 | H | H |

-continued
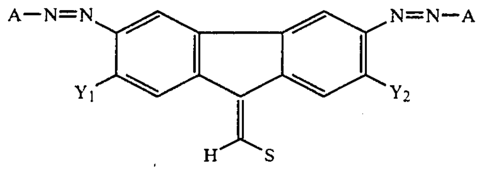
| Compound No. | A | S | $Y_1$ | $Y_2$ |
|---|---|---|---|---|
| C-(51) | 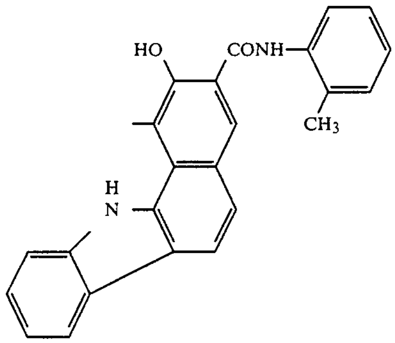 | 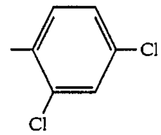 | Cl | Cl |
| C-(52) | 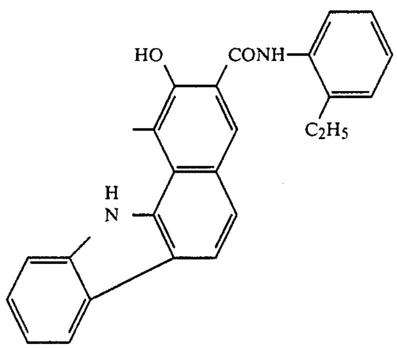 | $-CH_3$ | Br | CN |
| C-(53) | 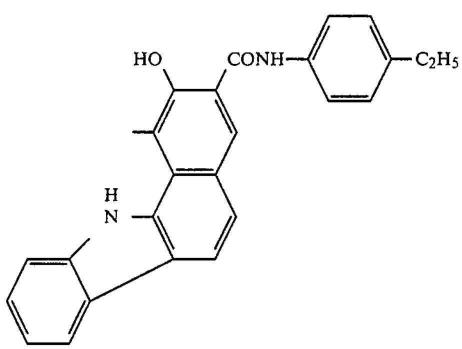 | $-C_2H_5$ | H | H |
| C-(54) | 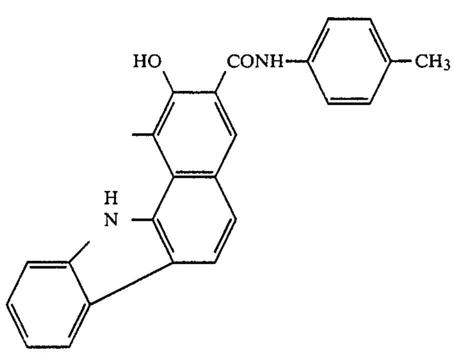 | $-C_3H_7$ | H | H |

-continued
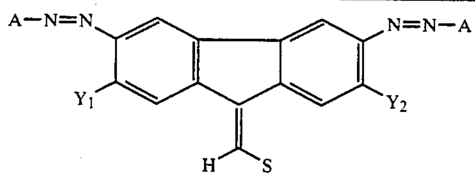
| Compound No. | A | S | Y1 | Y2 |
|---|---|---|---|---|
| C-(55) | 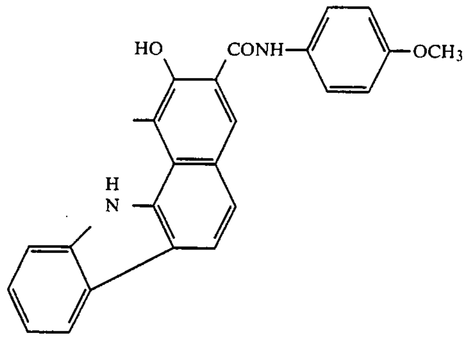 | 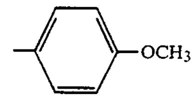 | H | H |
| C-(56) | 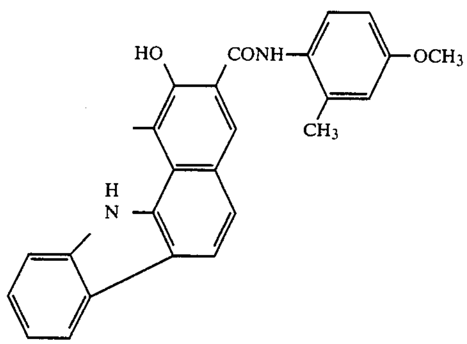 | 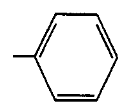 | H | H |
| C-(57) | 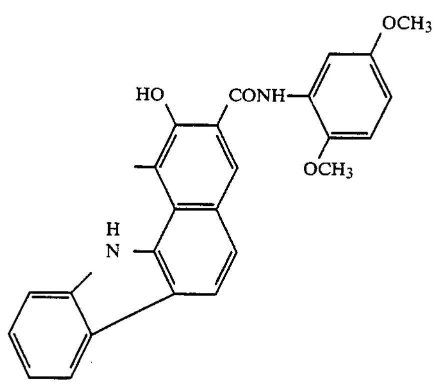 | 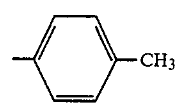 | H | H |
| C-(58) | 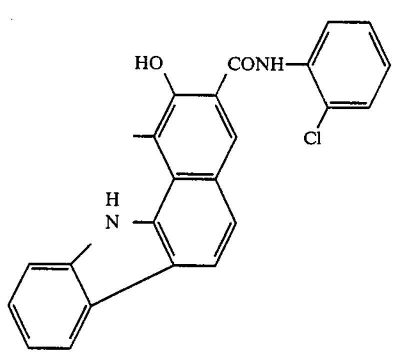 | $—C_3H_7$ | H | H |

-continued
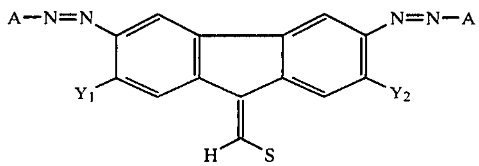
| Compound No. | A | S | $Y_1$ | $Y_2$ |
|---|---|---|---|---|
| C-(59) | 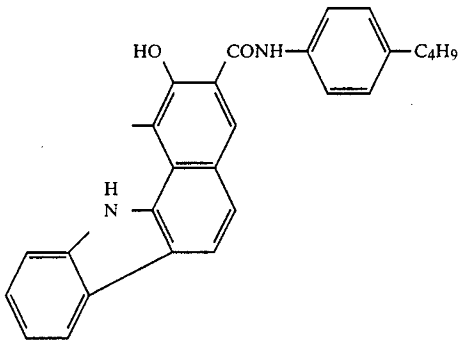 | $-OCH_3$ | H | H |
| C-(60) | 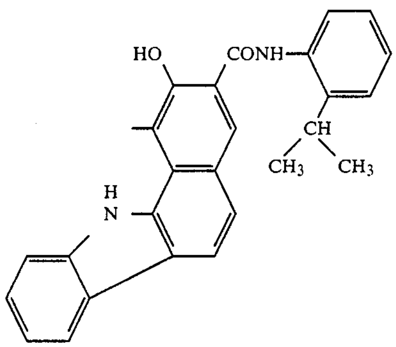 | $-CH_3$ | H | H |
| C-(61) | 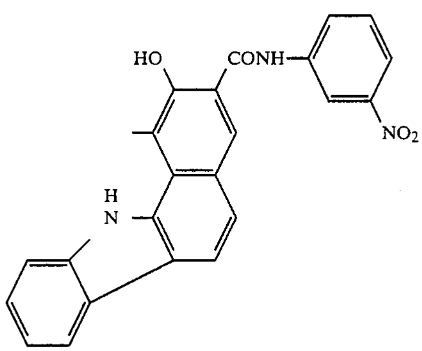 | 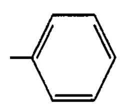 | CN | CN |
| C-(62) | 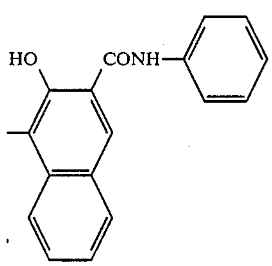 | 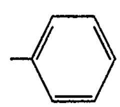 | H | H |

-continued
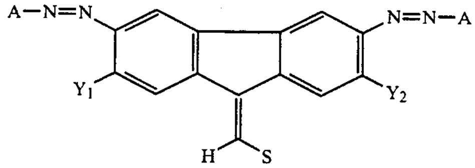
| Compound No. | A | S | $Y_1$ | $Y_2$ |
| --- | --- | --- | --- | --- |
| C-(63) | 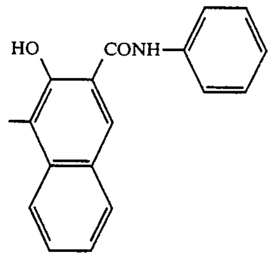 | $-CH_3$ | H | H |
| C-(64) | 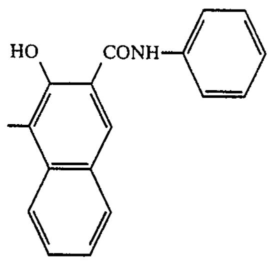 | $-C_3H_7$ | H | H |
| C-(65) | 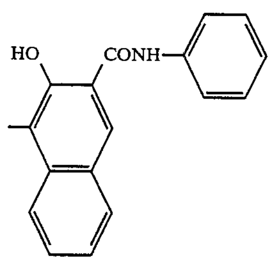 | $-OCH_3$ | H | H |
| C-(66) | 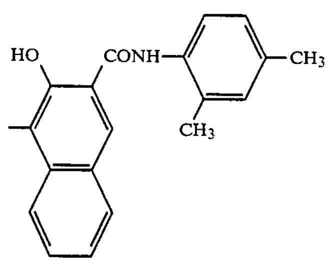 | 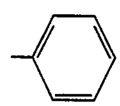 | H | H |
| C-(67) | 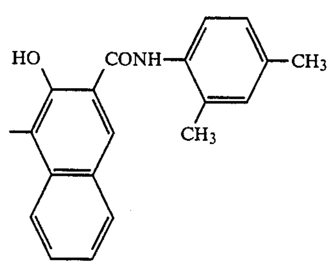 | $-CH_3$ | H | H |

-continued
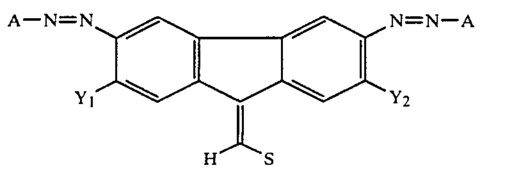
| Compound No. | A | S | $Y_1$ | $Y_2$ |
| --- | --- | --- | --- | --- |
| C-(68) | 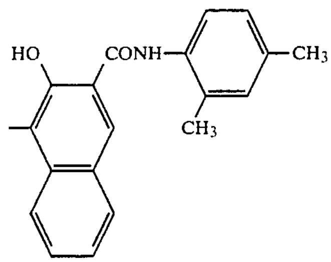 | $-C_3H_7$ | H | H |
| C-(69) | 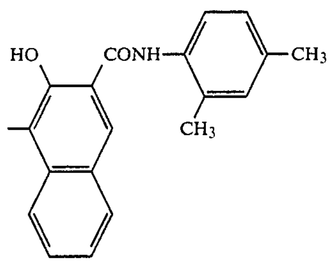 | $-OCH_3$ | H | H |
| C-(70) | 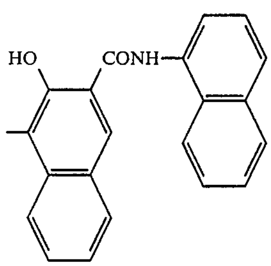 | 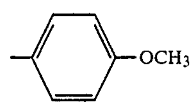 | H | H |
| C-(71) | 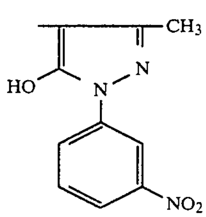 | 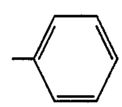 | H | H |
Others:
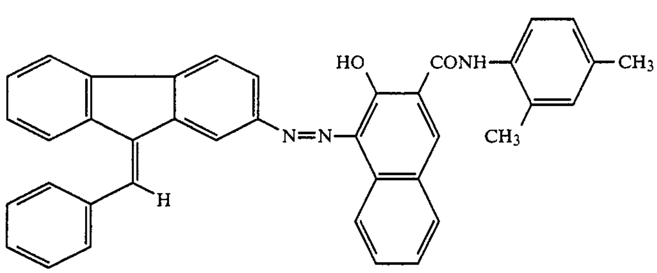
C-(72)

-continued
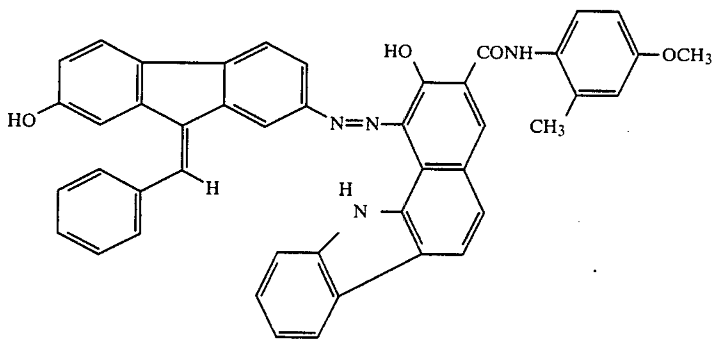
C-(72)'
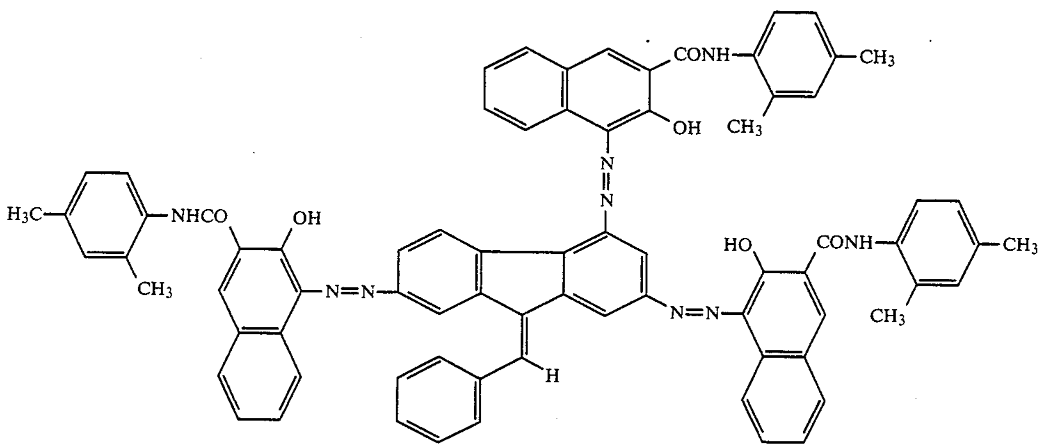
C-(72)''
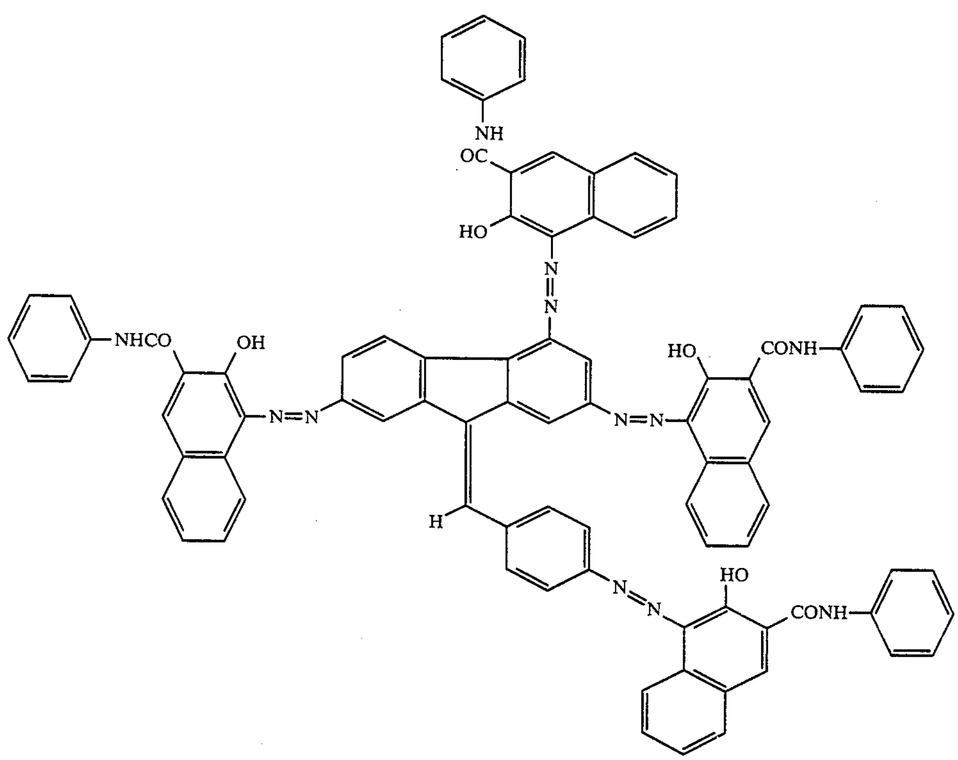
C-(73)
The azo compounds as set forth above can be synthesized easily according to the known method. A typical example is shown below.
SYNTHESIS EXAMPLE 3
[Synthesis of the exemplary compound C-(1)]
The synthesis route is schematically shown below:

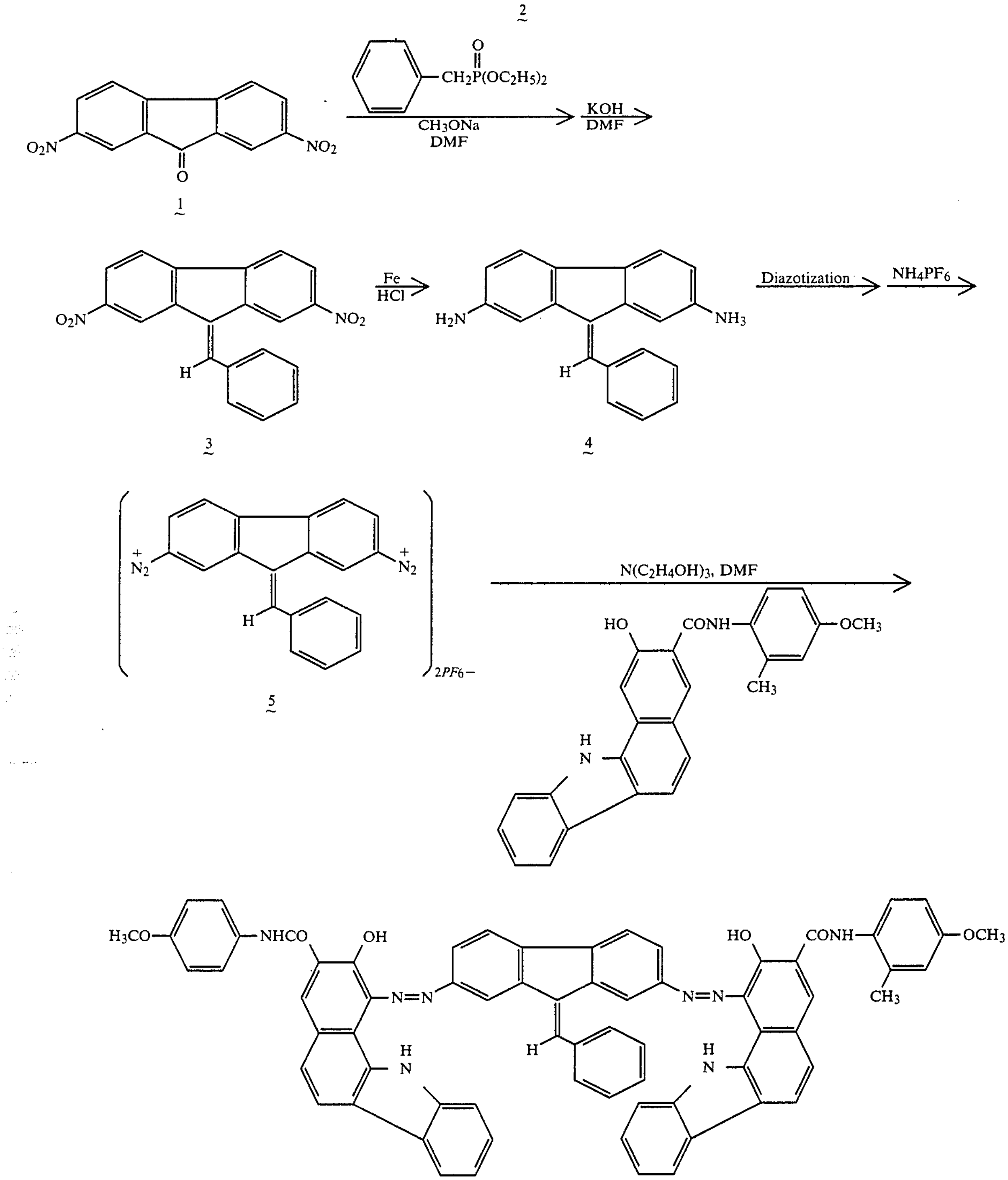

C-(1)

That is, 2,7-dinitrofluorenone 1 (produced by Tokyo Kasei K.K.) was allowed to react with benzylcyanide 2 to be converted to a dinitro derivative 3, which was then reduced with iron to form a diamino derivative 4. The diamino derivative 4 (28.4 g, 0.1 mole) was dispersed by adding into a mixture of 1 liter of conc. HCl and 1 liter of water and a solution of 13.8 g (0.2 mole) of sodium nitrite dissolved in 1 liter of water was added dropwise at 5° C. under ice-cooling. After completion of the addition, the reaction mixture was filtered, and 1 liter of an aqueous 50% ammonium hexafluorophosphate solution was added to the filtrate. The resultant precipitate was recovered by filtration, washed with water and thoroughly dried. The salt obtained was dissolved in 1.5 liters of N,N-dimethylformamide (DMF) to provide a tetrazonium salt solution to be used in the subsequent reaction.

As the next step, 79.3 g (0.2 mole) of 2-hydroxy-3-(4-methoxy-2-methylphenylcarbamoyl)-benzo[a]carbazole (Naphthol AS-SR, produced by Hoechst AG) and 60 g of triethanolamine were dissolved in 4 liters of N,N- dimethylformamide, and the tetrazonium salt solution as prepared above was added dropwise under ice-cooling to the resultant solution, followed further by stirring for 2 hours to carry out the reaction. The crystal formed was recovered by filtration, and the crystal was washed twice with 5 liters of N,N-dimethylformamide and twice with 5 liters of acetone, followed by drying, to obtain 27.5 g of the desired bisazo compound C-(1) (Yield: 25%). From the analytical results of m.p. 300° C. or higher, FD-MS spectrum which indicates a peak of $M^+$ at m/Z 1099, and the elemental analysis of C=76.28%, N=10.00%, H=6.50% (Calcd. values, C=76.48%, N=10.20%, H=4.59%), it was confirmed that the desired substance was synthesized.

EMBODIMENT D

This embodiment is represented by the following formula [ID]:

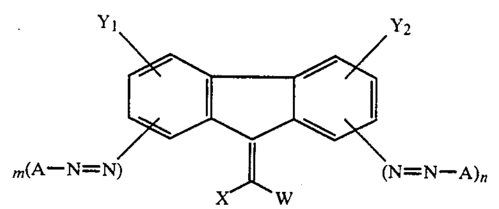

[ID]

wherein X is a halogen atom; W is a halogen atom, a hydrogen atom, an alkyl group, a cyano group, a phenyl group which may have a substituent or substituents, an ester group, an acyl group, an acetylamido group, an alkylsulfone group or a vinyl group; $Y_1$, $Y_2$, m, n and A are the same as defined in the formula [I].

In the above formula [ID], X represents a halogen atom (fluorine, chlorine, bromine or iodine), W represents a halogen atom (fluorine, chlorine, bromine or iodine), a hydrogen atom, an alkyl group (having desirably 1 to 5 atoms), an alkoxy group, a cyano group, a phenyl group which may have a substituent or substituents, an ester group, an acyl group, an acetylamido group, an alkylsulfone group or a vinyl group, and other symbols have the same meanings as described in detail for the compound of the formula [IA].

Of the Embodiment D represented by the above formula [ID], particularly preferable compounds with respect to sensitivity and stability to heat and light have the structure as represented by the formula [ID]-II shown below:

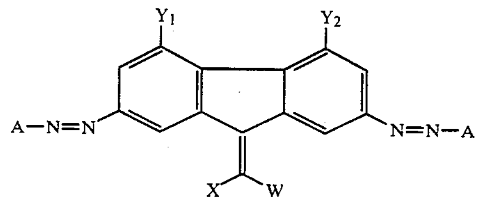

[ID]-II wherein X, W, $Y_1$, $Y_2$ and A are the same as defined in the above formula [ID].

Specific examples of useful azo compounds represented by the above formula [ID] may include, for example, those having the following formula:

Those having the following formula [ID]-III:

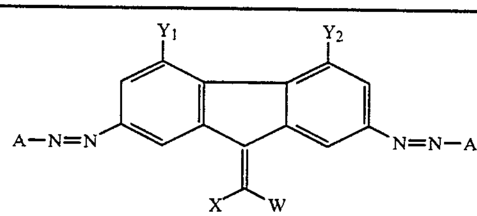

| Compound No. | A | X | W | $Y_1$ | $Y_2$ |
|---|---|---|---|---|---|
| D-(1) | 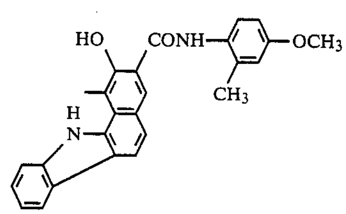 | Cl | Cl | H | H |
| D-(2) | 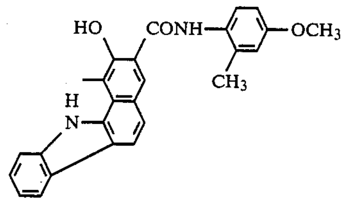 | Cl | H | H | H |

-continued
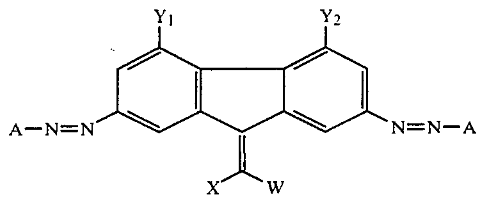
| Compound No. | A | X | W | $Y_1$ | $Y_2$ |
|---|---|---|---|---|---|
| D-(3) | 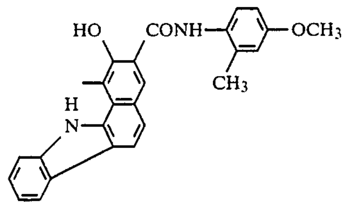 | Br | $CH_3$ | H | H |
| D-(4) | 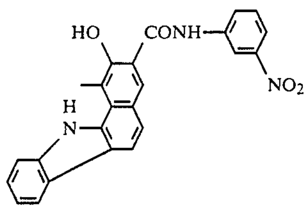 | Br | Br | H | H |
| D-(5) | 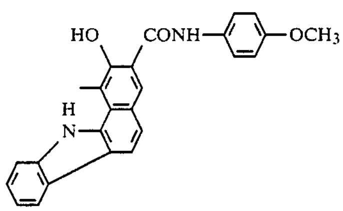 | Cl | H | H | H |
| D-(6) | 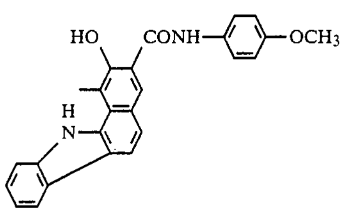 | Br | H | H | H |
| D-(7) | 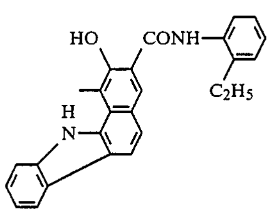 | Cl | Cl | H | H |

-continued
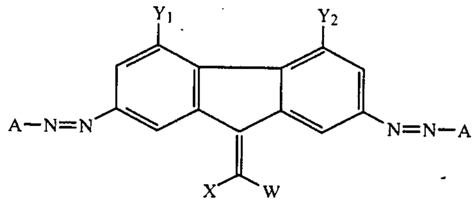
| Compound No. | A | X | W | $Y_1$ | $Y_2$ |
|---|---|---|---|---|---|
| D-(8) | 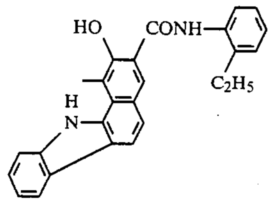 | Br | Br | H | H |
| D-(9) | 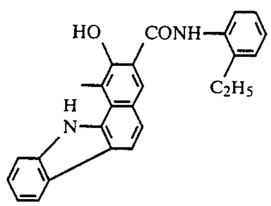 | I | H | H | H |
| D-(10) | 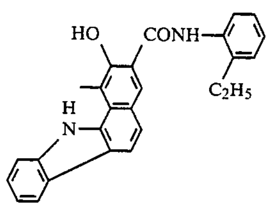 | Cl | $-\overset{O}{\overset{\Vert}{C}}-CH_3$ | H | H |
| D-(11) | 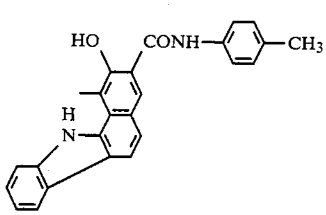 | Cl | Cl | H | H |
| D-(12) | 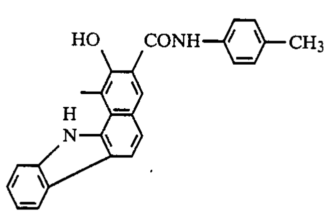 | I | H | H | H |

-continued
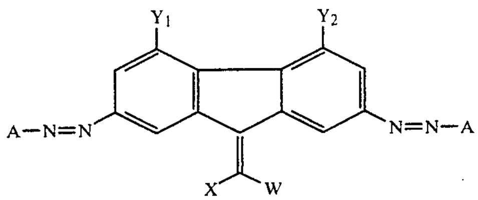
| Compound No. | A | X | W | $Y_1$ | $Y_2$ |
|---|---|---|---|---|---|
| D-(13) | 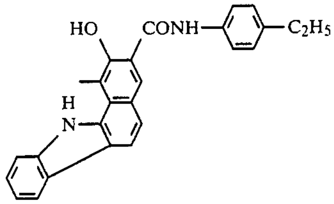 | Cl | Cl | H | H |
| D-(14) | 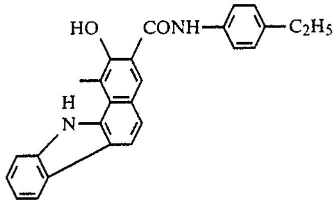 | Br | H | H | H |
| D-(15) | 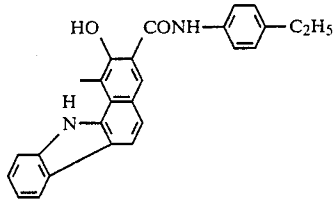 | I | COOEt | H | H |
| D-(16) | 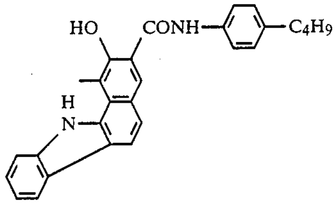 | Cl | Cl | H | H |
| D-(17) | 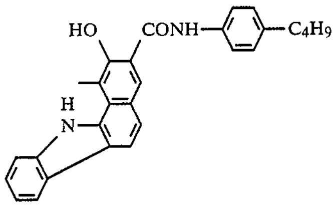 | Cl | $-CH=CH_2$ | H | H |

-continued
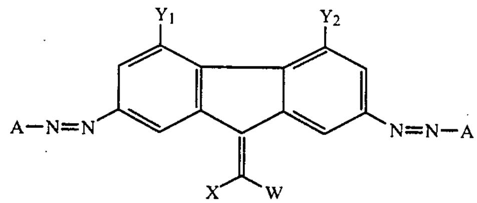
| Compound No. | A | X | W | $Y_1$ | $Y_2$ |
|---|---|---|---|---|---|
| D-(18) | 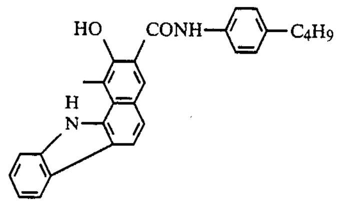 | Br | 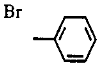 | H | H |
| D-(19) | 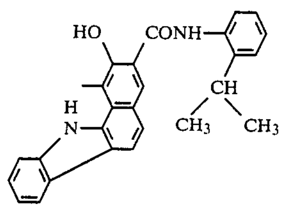 | Cl | H | H | H |
| D-(20) | 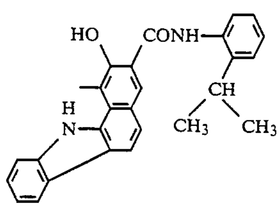 | Br | H | H | H |
| D-(21) | 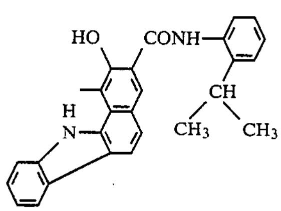 | I | 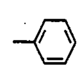 | H | H |
| D-(22) | 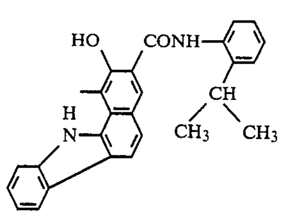 | F | H | $CH_3$ | $CH_3$ |

-continued
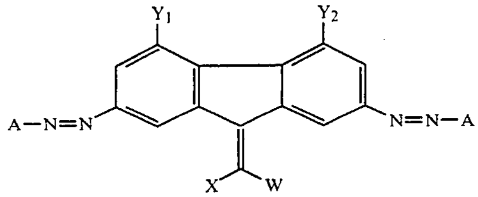
| Compound No. | A | X | W | $Y_1$ | $Y_2$ |
|---|---|---|---|---|---|
| D-(23) | 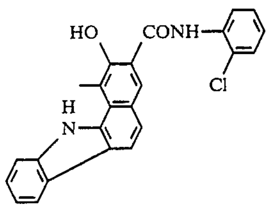 | Cl | Cl | H | H |
| D-(24) | 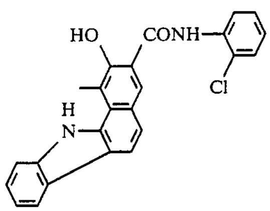 | Cl | H | H | H |
| D-(25) | 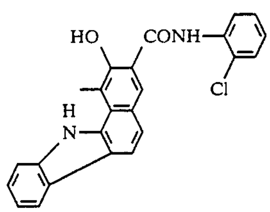 | Br | 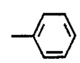 | $CH_3$ | H |
| D-(26) | 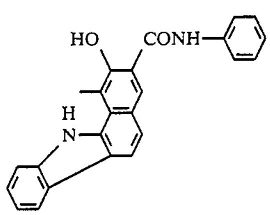 | Br | Br | H | H |
| D-(27) | 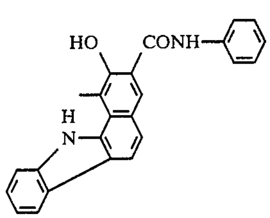 | Br | 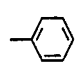 | H | H |

-continued
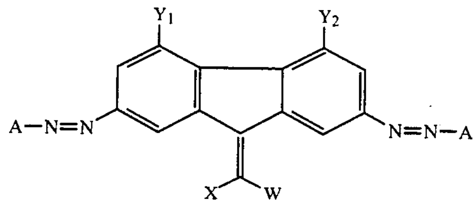
| Compound No. | A | X | W | $Y_1$ | $Y_2$ |
|---|---|---|---|---|---|
| D-(28) | 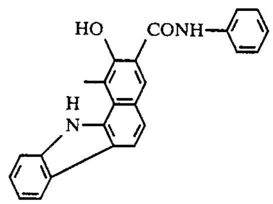 | I | Br | H | H |
| D-(29) | 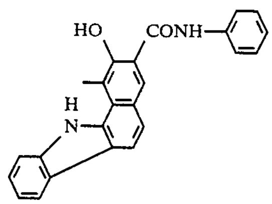 | Cl | $-CH=CH_2$ | $CH_3$ | CN |
| D-(30) | 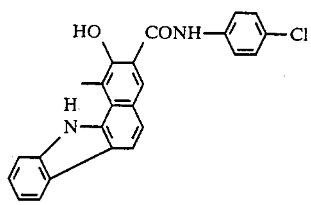 | Br | Br | H | H |
| D-(31) | 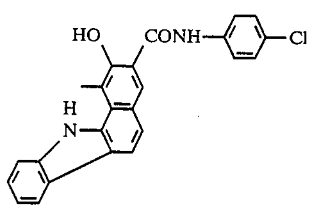 | Cl | Cl | $CH_3$ | $CH_3$ |
| D-(32) | 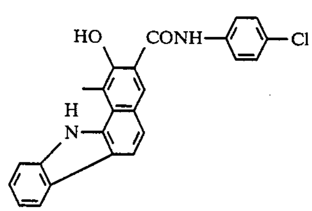 | I | $-CH=CH_2$ | H | CN |

-continued
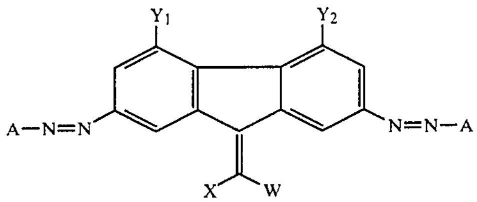
| Compound No. | A | X | W | $Y_1$ | $Y_2$ |
|---|---|---|---|---|---|
| D-(33) | 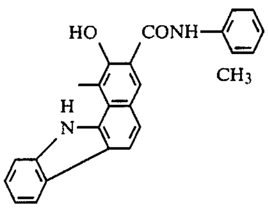 | Br | H | H | H |
| D-(34) | 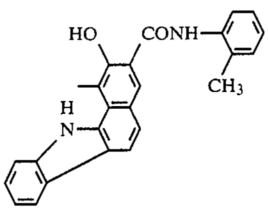 | I | Br | H | H |
| D-(35) | 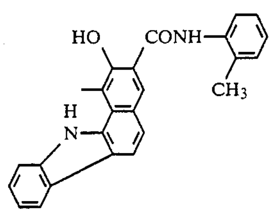 | I | 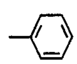 | H | H |
| D-(36) | 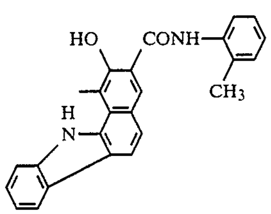 | Cl | —COOEt | H | H |
| D-(37) | 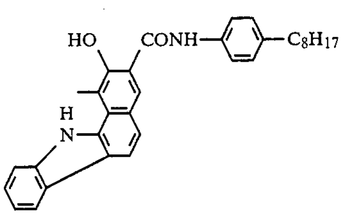 | Br | Cl | H | H |

-continued
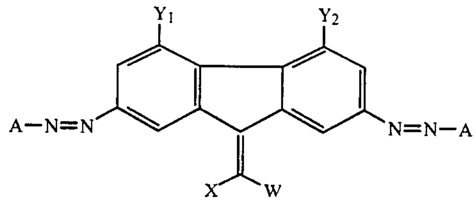
| Compound No. | A | X | W | $Y_1$ | $Y_2$ |
|---|---|---|---|---|---|
| D-(38) | 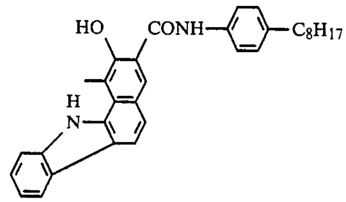 | I | 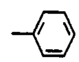 | H | $-CH_2$ 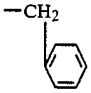 |
| D-(39) | 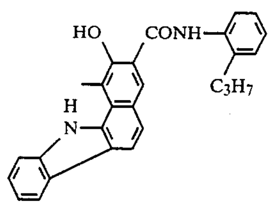 | Br | Br | Br | Br |
| D-(40) | 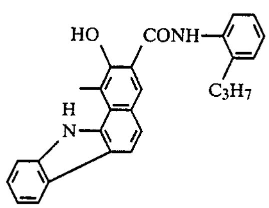 | F | $-CH=CH_2$ | $-OCH_3$ | H |
| D-(41) | 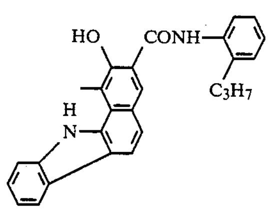 | I | H | H | H |
| D-(42) | 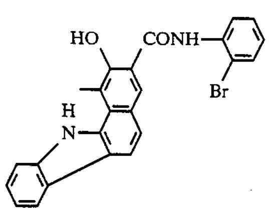 | Cl | Cl | Cl | Cl |

-continued
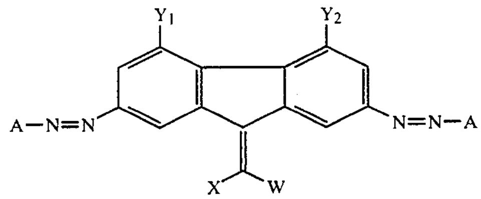
| Compound No. | A | X | W | $Y_1$ | $Y_2$ |
|---|---|---|---|---|---|
| D-(43) | 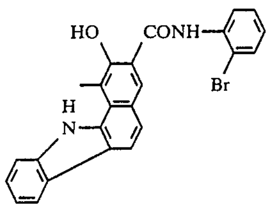 | Cl | 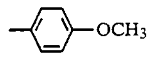 | H | H |
| D-(44) | 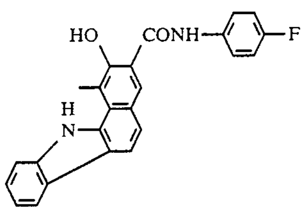 | Cl | 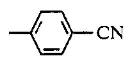 | H | H |
| D-(45) | 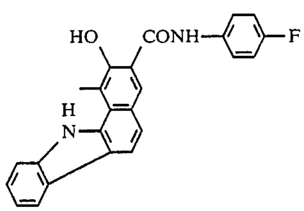 | Br | H | Br | H |
| D-(46) | 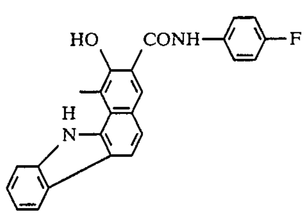 | Cl | H | H | H |
| D-(47) | 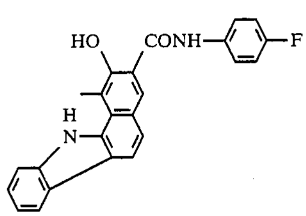 | I | I | I | I |

-continued
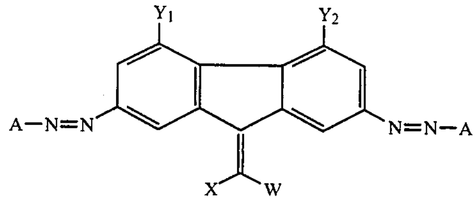
| Compound No. | A | X | W | $Y_1$ | $Y_2$ |
|---|---|---|---|---|---|
| D-(48) | 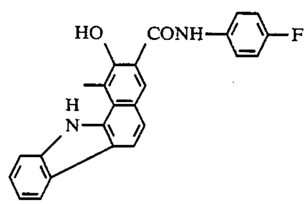 | F | F | F | F |
| D-(49) | 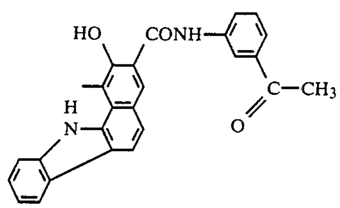 | Br | Br | H | H |
| D-(50) | 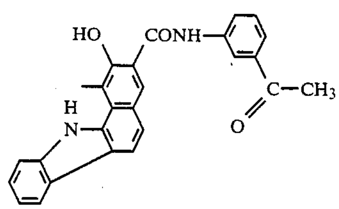 | Br | Cl | H | H |
| D-(51) | 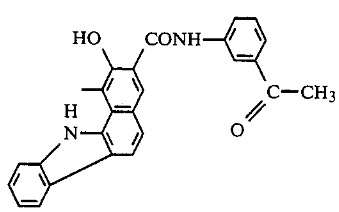 | Br | H | H | H |
| D-(52) | 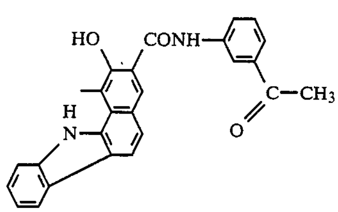 | Br | $-CH=CH_2$ | $CH_3$ | $-OCH_3$ |

-continued
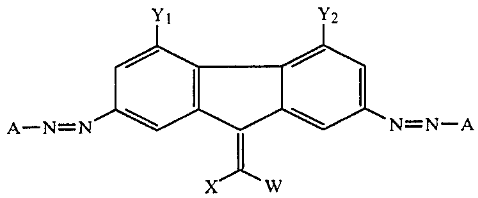
| Compound No. | A | X | W | $Y_1$ | $Y_2$ |
|---|---|---|---|---|---|
| D-(53) | 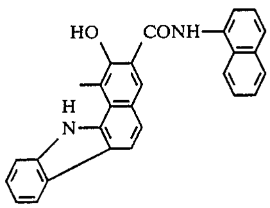 | Cl | Cl | Cl | Cl |
| D-(54) | 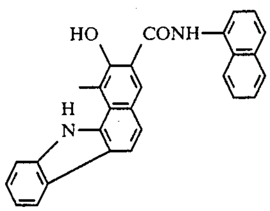 | Cl | Br | Cl | Br |
| D-(55) | 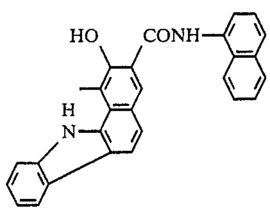 | Cl | H | Cl | Cl |
| D-(56) | 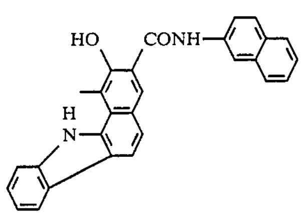 | Br | Br | H | H |
| D-(57) | 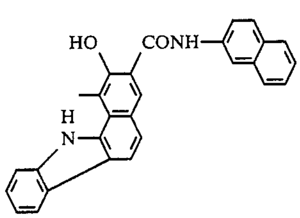 | Br | Cl | H | H |

-continued
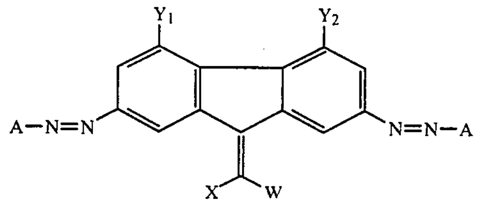
| Compound No. | A | X | W | Y1 | Y2 |
|---|---|---|---|---|---|
| D-(58) | 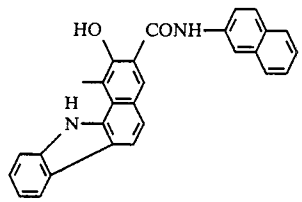 | Br | 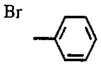 | H | H |
| D-(59) | 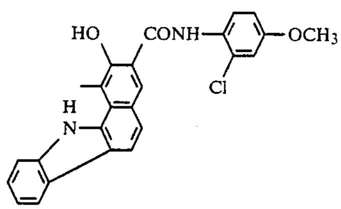 | Cl | H | H | H |
| D-(60) | 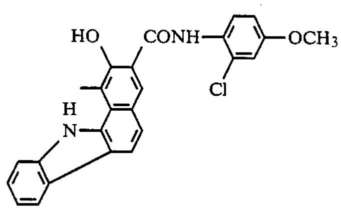 | Cl | Cl | H | H |
| D-(61) | 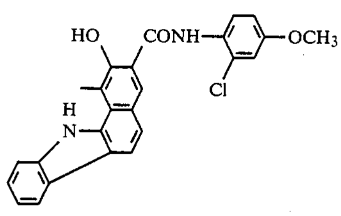 | Br | Br | H | H |
| D-(62) | 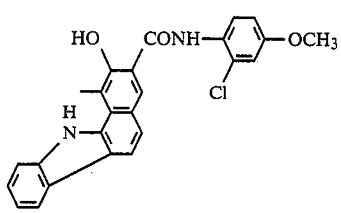 | Br | COOMe | H | H |

-continued
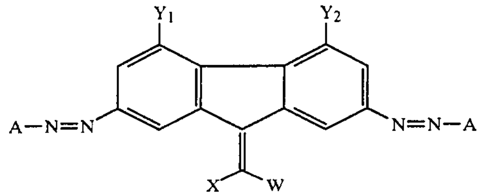
| Compound No. | A | X | W | $Y_1$ | $Y_2$ |
|---|---|---|---|---|---|
| D-(63) | 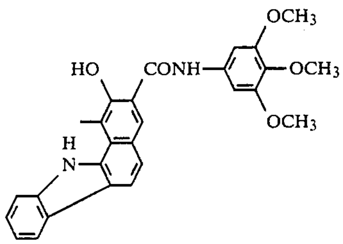 | Cl | $-SO_2-CH_3$ | H | H |
| D-(64) | 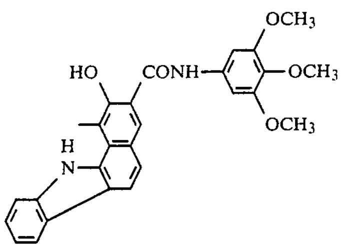 | Cl | $-CONH_2$ | H | H |
| D-(65) | 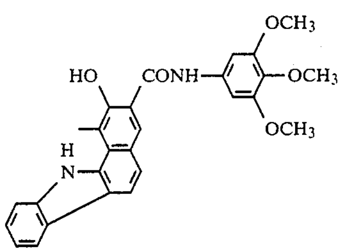 | Cl | $-CON(Et)_2$ | H | H |
| D-(66) | 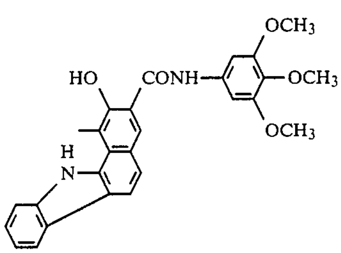 | Cl | Br | $CH_3$ | H |
| D-(67) | 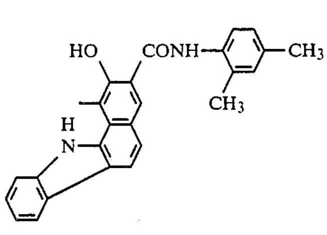 | Br | H | H | H |

-continued
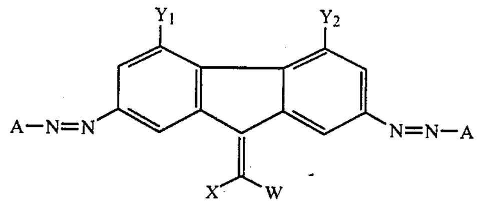
| Compound No. | A | X | W | $Y_1$ | $Y_2$ |
|---|---|---|---|---|---|
| D-(68) | 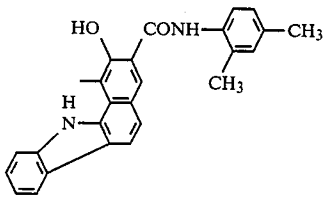 | I | $CH{=}CH_2$ | H | I |
| D-(69) | 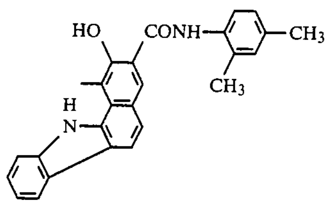 | Cl | 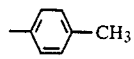 | H | H |
| D-(70) | 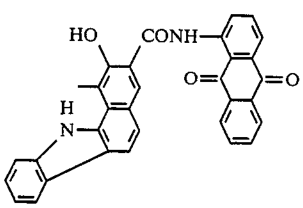 | Cl | H | H | H |
| D-(71) | 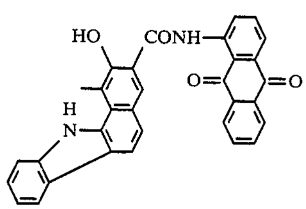 | Cl | 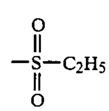 | H | H |
| D-(72) | 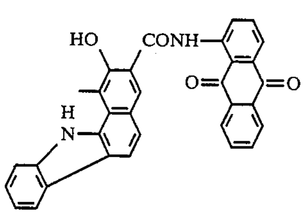 | Br | 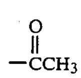 | H | H |

-continued
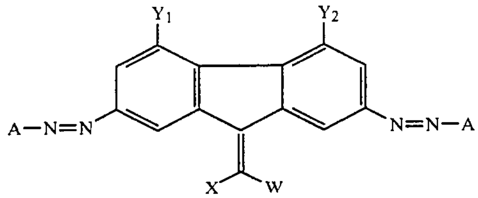
| Compound No. | A | X | W | $Y_1$ | $Y_2$ |
|---|---|---|---|---|---|
| D-(73) | 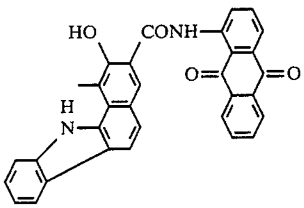 | Br | 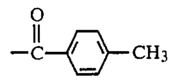 | H | H |
| D-(74) | 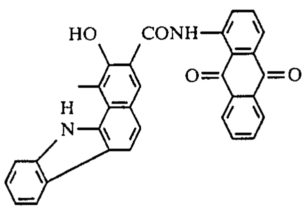 | I | 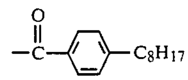 | H | H |
| D-(75) | 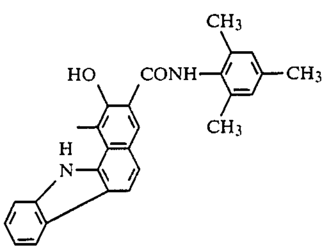 | Br | Br | H | H |
| D-(76) | 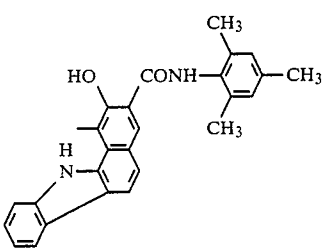 | Cl | H | H | H |
| D-(77) | 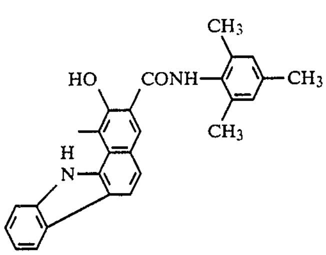 | F | H | $CH_3$ | $OCH_3$ |

-continued
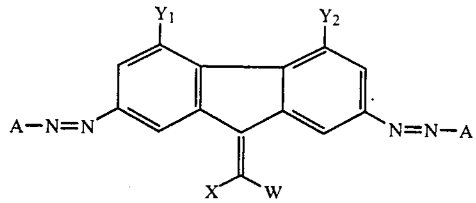
| Compound No. | A | X | W | $Y_1$ | $Y_2$ |
|---|---|---|---|---|---|
| D-(78) | 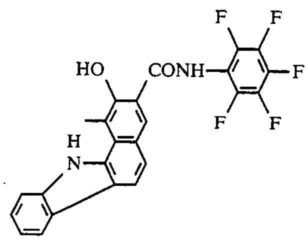 | Cl | Cl | H | H |
| D-(79) | 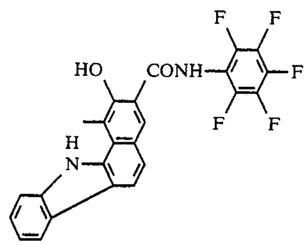 | Cl | H | H | H |
| D-(80) | 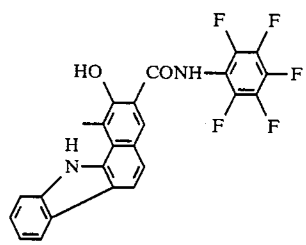 | Cl | 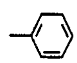 | H | H |
| D-(81) | 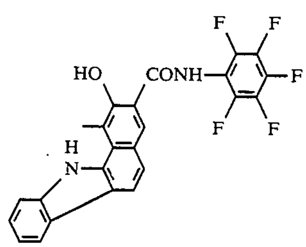 | Br | 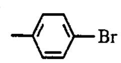 | H | Br |
| D-(82) | 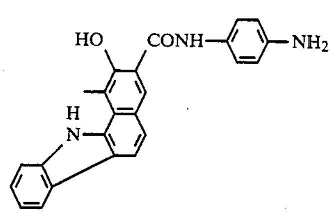 | Cl | Cl | Cl | Cl |

-continued
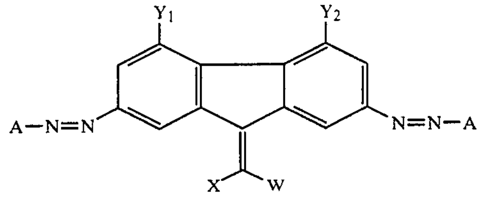
| Compound No. | A | X | W | $Y_1$ | $Y_2$ |
|---|---|---|---|---|---|
| D-(83) | 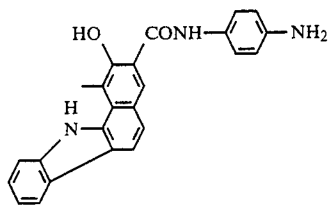 | Cl | Br | H | $OCH_3$ |
| D-(84) | 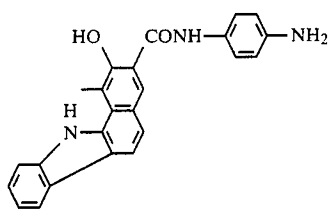 | Br | H | $CH_3$ | $CH_3$ |
| D-(85) | 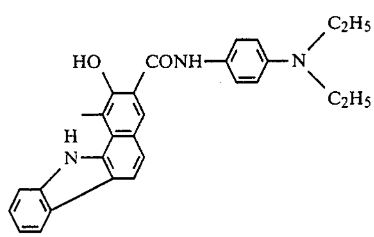 | Cl | H | H | H |
| D-(86) | 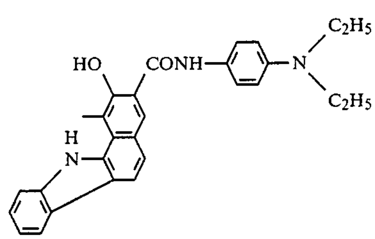 | I | I | I | I |
| D-(87) | 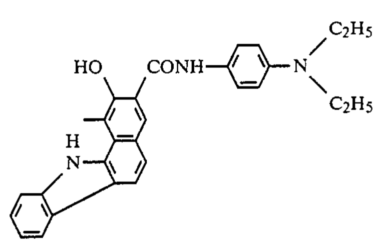 | Cl | H | H | H |

-continued
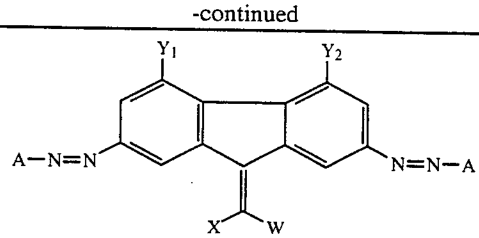
| Compound No. | A | X | W | $Y_1$ | $Y_2$ |
|---|---|---|---|---|---|
| D-(88) | 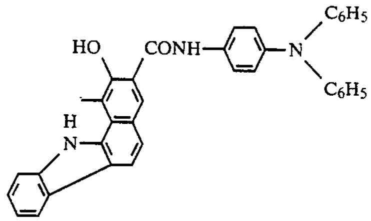 | Cl | Cl | Cl | Cl |
| D-(89) | 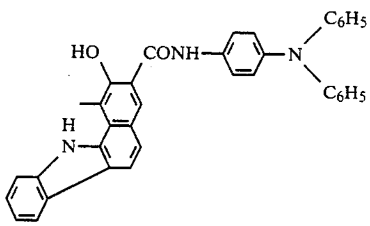 | Cl | Br | H | H |
| D-(90) | 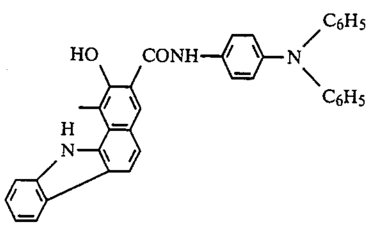 | Cl | COOEt | H | H |
| D-(91) | 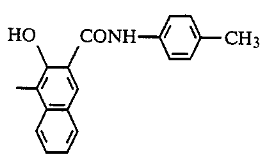 | Cl | Cl | Cl | Cl |
| D-(92) | 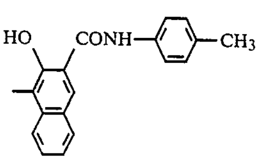 | Cl | H | H | H |
| D-(93) | 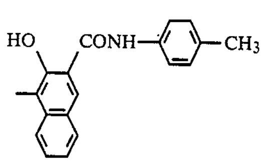 | Cl | Cl | H | H |

-continued
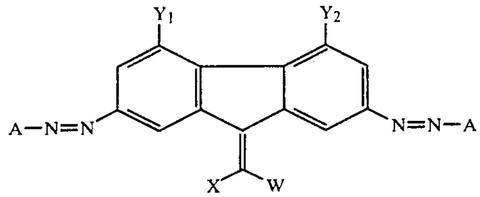
| Compound No. | A | X | W | $Y_1$ | $Y_2$ |
|---|---|---|---|---|---|
| D-(94) | 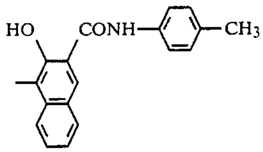 | Br | Br | H | H |
| D-(95) | 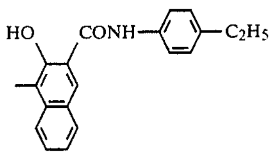 | Cl | Cl | H | H |
| D-(96) | 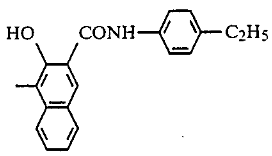 | Br | $COOC_2H_5$ | H | H |
| D-(97) | 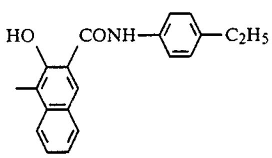 | Br | I | H | Br |
| D-(98) | 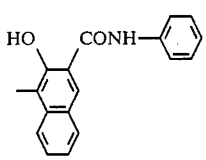 | Cl | Cl | H | H |
| D-(99) | 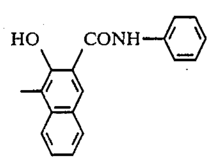 | Cl | H | H | H |
| D-(100) | 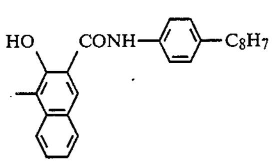 | Br | $-\overset{O}{\overset{\|}{C}}CH_3$ | H | H |

-continued
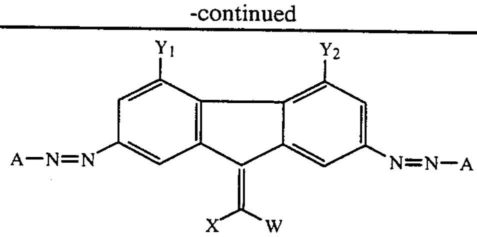
| Compound No. | A | X | W | $Y_1$ | $Y_2$ |
|---|---|---|---|---|---|
| D-(101) | 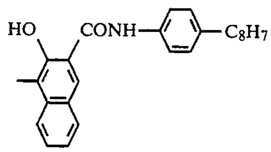  | I | $-CH=CH_2$ | $-OCH_3$ | CN |
| D-(102) | 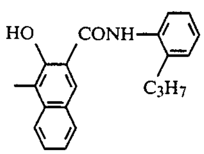  | Br | H | H | H |
| D-(103) | 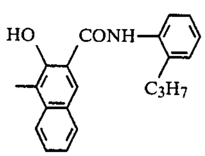  | Br | 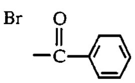  | H | H |
| D-(104) | 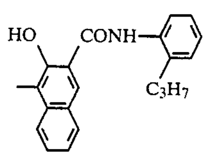  | Br | $CH_3$ | H | H |
| D-(105) | 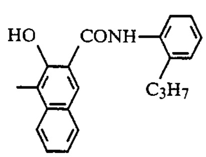  | Br | 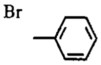 | H | H |
| D-(106) | 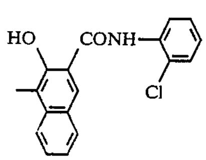  | Cl | H | H | H |
| D-(107) | 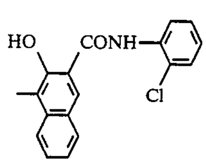  | Cl | Cl | H | H |

-continued
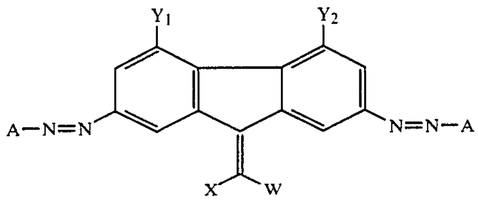
| Compound No. | A | X | W | $Y_1$ | $Y_2$ |
|---|---|---|---|---|---|
| D-(108) | 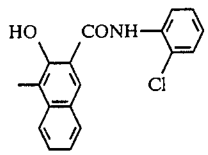 | I | $-OCH_3$ | H | H |
| D-(109) | 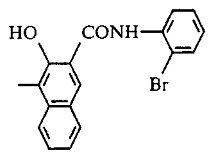 | Cl | H | $CH_3$ | $CH_3$ |
| D-(110) | 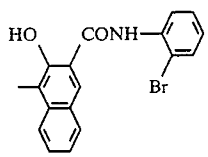 | Cl | Cl | H | H |
| D-(111) | 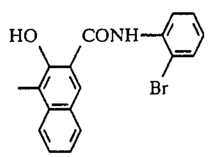 | Br | 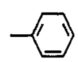 | H | H |
| D-(112) | 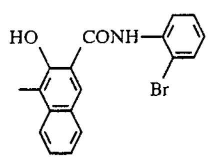 | Br | $-CH=CH_2$ | H | $CH_3$ |
| D-(113) | 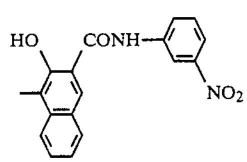 | Cl | Cl | Cl | Cl |
| D-(114) | 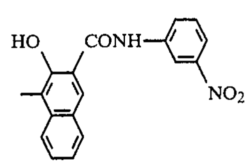 | Br | $-\overset{O}{\overset{\|}{C}}NH_2$ | H | H |

-continued
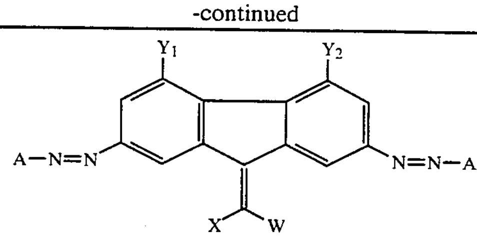
| Compound No. | A | X | W | $Y_1$ | $Y_2$ |
|---|---|---|---|---|---|
| D-(115) | 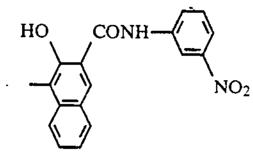 | F | 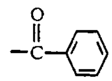 | H | H |
| D-(116) | 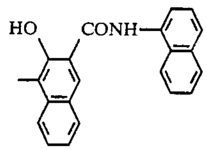 | Br | Br | H | H |
| D-(117) | 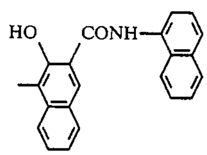 | Cl | Br | H | H |
| D-(118) | 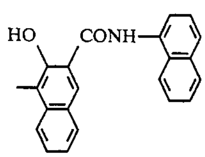 | Br | 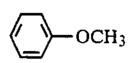 | $-OCH_3$ | $-OCH_3$ |
| D-(119) | 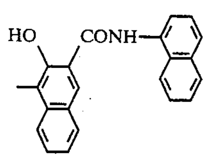 | I | $-SO_2NH_2$ | 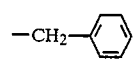 | H |
| D-(120) | 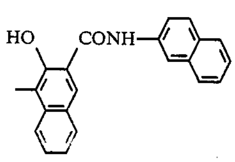 | Cl | Cl | Cl | Cl |
| D-(121) | 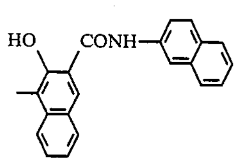 | Br | Br | Br | Br |

-continued
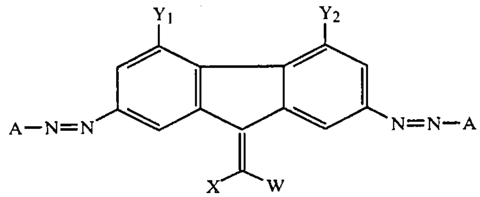
| Compound No. | A | X | W | $Y_1$ | $Y_2$ |
|---|---|---|---|---|---|
| D-(122) | 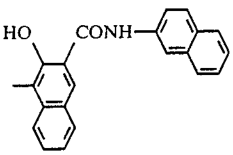 | F | $OCH_3$ | F | $OCH_3$ |
| D-(123) | 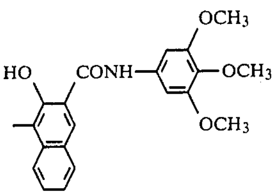 | Cl | Cl | Br | Br |
| D-(124) | 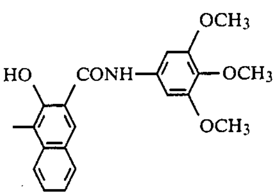 | Cl | H | H | H |
| D-(125) | 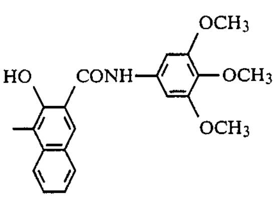 | Br | 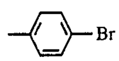 | H | H |
| D-(126) | 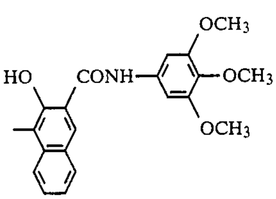 | F | 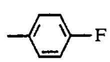 | H | H |
| D-(127) | 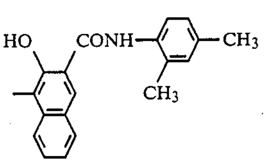 | Cl | H | H | H |

-continued
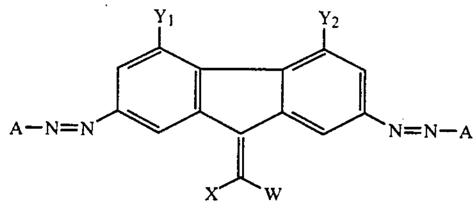
| Compound No. | A | X | W | $Y_1$ | $Y_2$ |
|---|---|---|---|---|---|
| D-(128) | 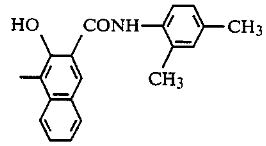 | Br | Br | H | H |
| D-(129) | 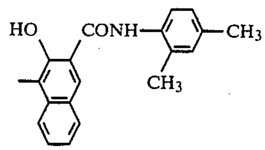 | Br | Cl | H | H |
| D-(130) | 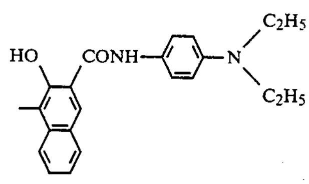 | Cl | H | H | H |
| D-(131) | 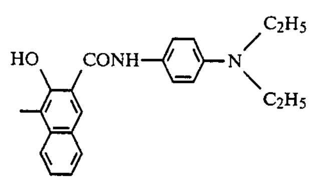 | Cl | Cl | Cl | Cl |
| D-(132) | 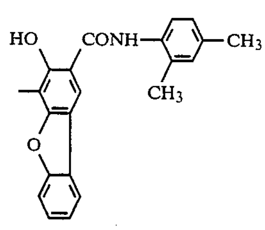 | Br | H | $CH_3$ | $CH_3$ |
| D-(133) | 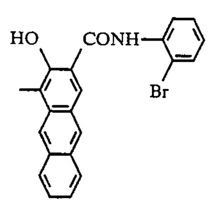 | F | H | 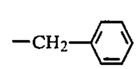 | H |

-continued
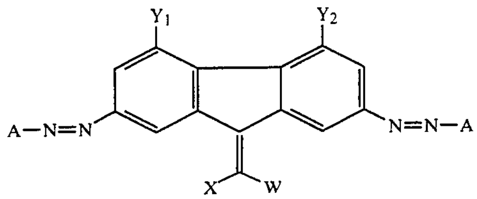
| Compound No. | A | X | W | $Y_1$ | $Y_2$ |
|---|---|---|---|---|---|
| D-(134) | 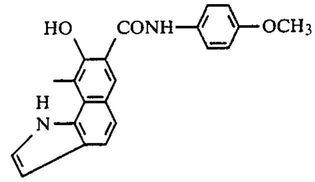 | I | H | $-OCH_3$ | $-CN$ |
| D-(135) | 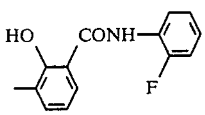 | Cl | H | Br | Br |
| D-(136) | 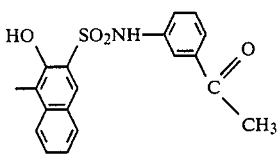 | Br | H | Cl | Cl |
| D-(137) | 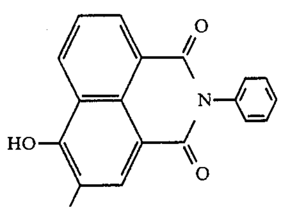 | Cl | Cl | H | H |
| D-(138) | 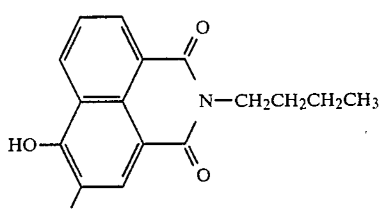 | Cl | H | H | H |
| D-(139) | 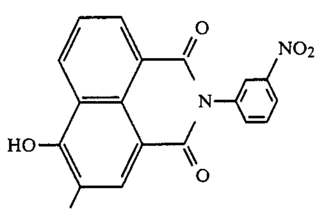 | Br | Cl | $CH_3$ | H |

-continued
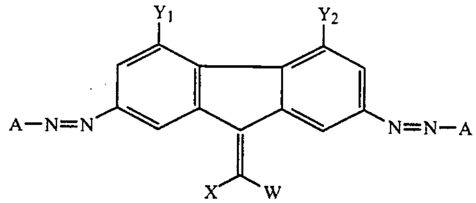
| Compound No. | A | X | W | $Y_1$ | $Y_2$ |
|---|---|---|---|---|---|
| D-(140) | 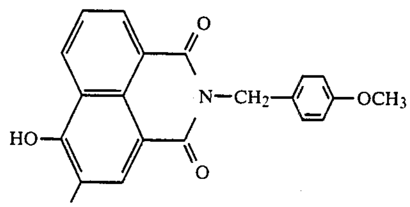 | Br | COOEt | H | H |
| D-(141) | 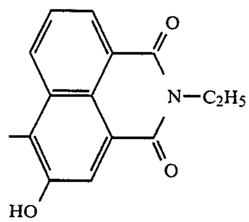 | Cl | H | H | H |
| D-(142) | 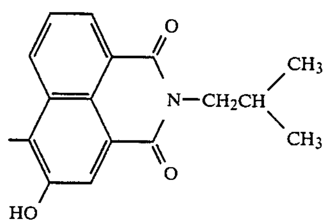 | Br | COOEt | Cl | Cl |
| D-(143) | 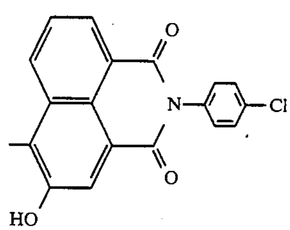 | Cl |  | H | H |
| D-(144) | 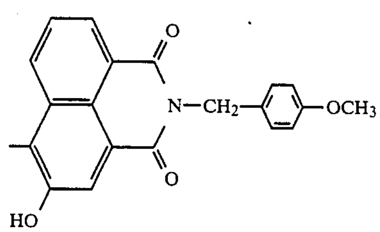 | Br | $CH_3$ | $-OCH_3$ | $-OCH_3$ |

-continued
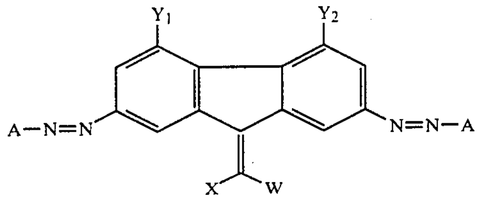
| Compound No. | A | X | W | $Y_1$ | $Y_2$ |
|---|---|---|---|---|---|
| D-(145) | 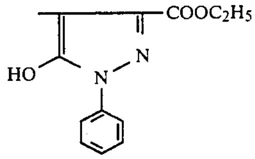 | Br | H | H | H |
| D-(146) | 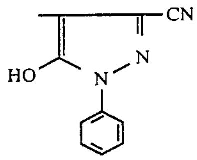 | I | $CH_3$ | $CH_3$ | $CH_3$ |
| D-(147) | 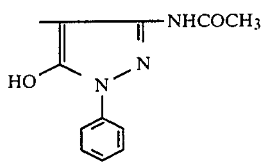 | F | 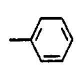 | Cl | Cl |
| D-(148) | 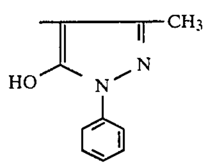 | Cl | $-OCH_3$ | Br | Br |
Those having the formula [ID]-IV:

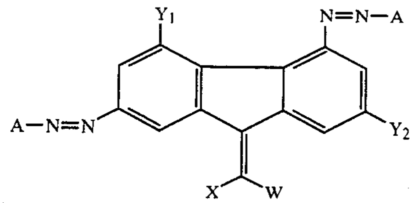
| | | | | | |
|---|---|---|---|---|---|
| D-(149) | 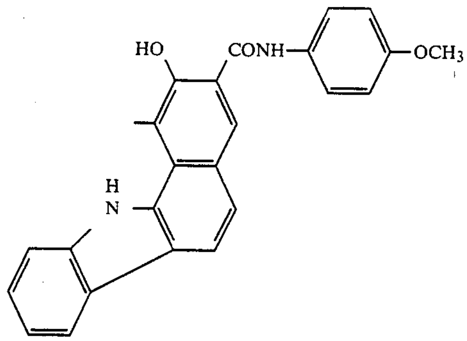 | Cl | H | H | H |
| D-(150) | 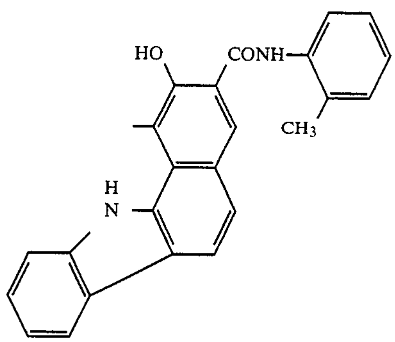 | Cl | Cl | H | H |
| D-(151) | 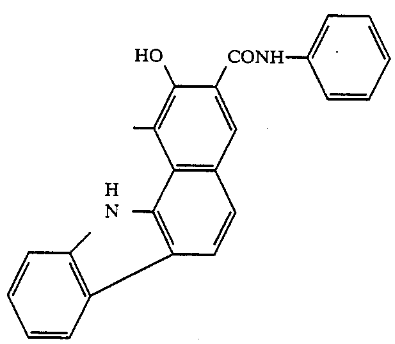 | Cl | Br | H | H |
| D-(152) | 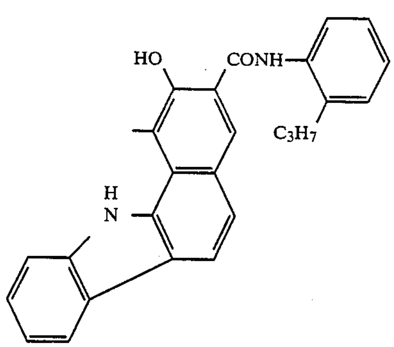 | Cl | COOEt | Cl | Cl |

-continued
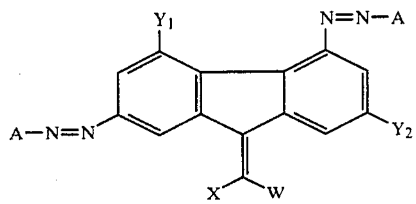
| | | | | | |
|---|---|---|---|---|---|
| D-(153) | 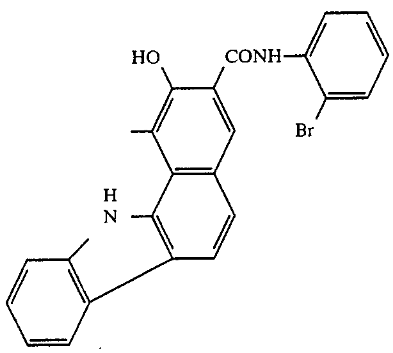 | F | 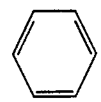 | $OCH_3$ | H |
| D-(154) | 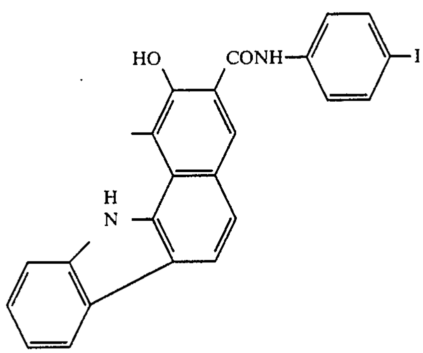 | I | $CH_3$ | CN | $CH_3$ |
| D-(155) | 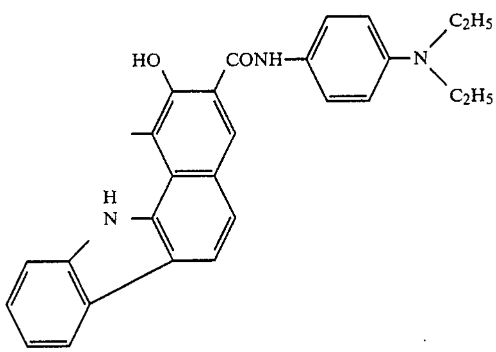 | Br | $-SO_2NH_2$ | Br | Br |
| D-(156) | 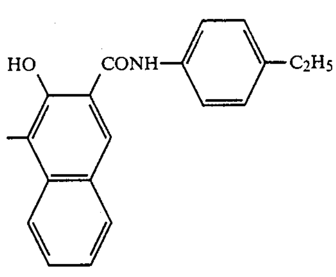 | Cl | H | H | H |

-continued
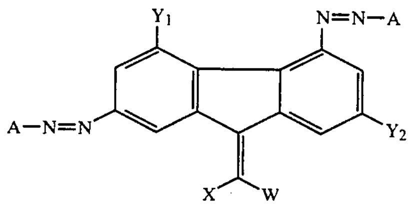
| | | | | | |
|---|---|---|---|---|---|
| D-(157) | 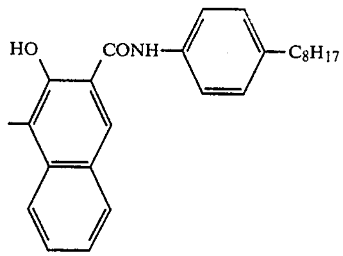 | Cl | 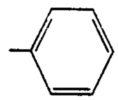 | H | H |
| D-(158) | 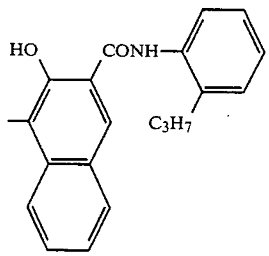 | Br | COOEt | H | H |
| D-(159) | 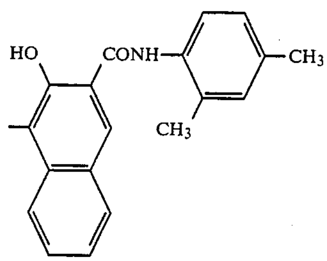 | Cl | H | CN | CN |
| D-(160) | 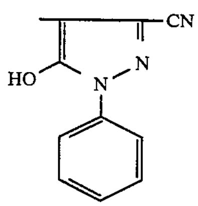 | Cl | Cl | H | H |
| D-(161) | 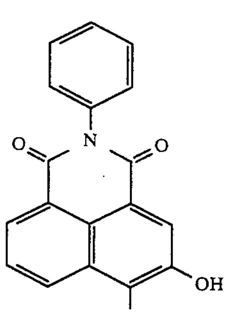 | Cl | H | H | H |
Others:

D-(162)
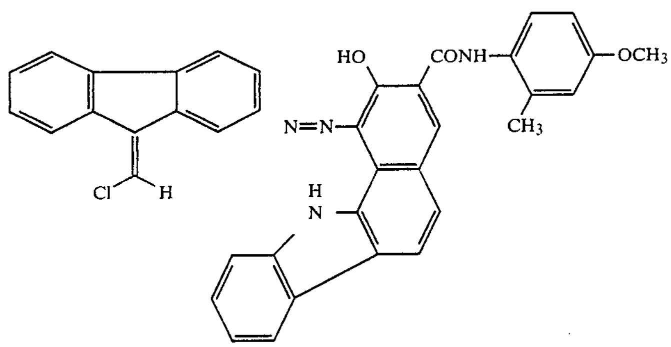
D-(163)
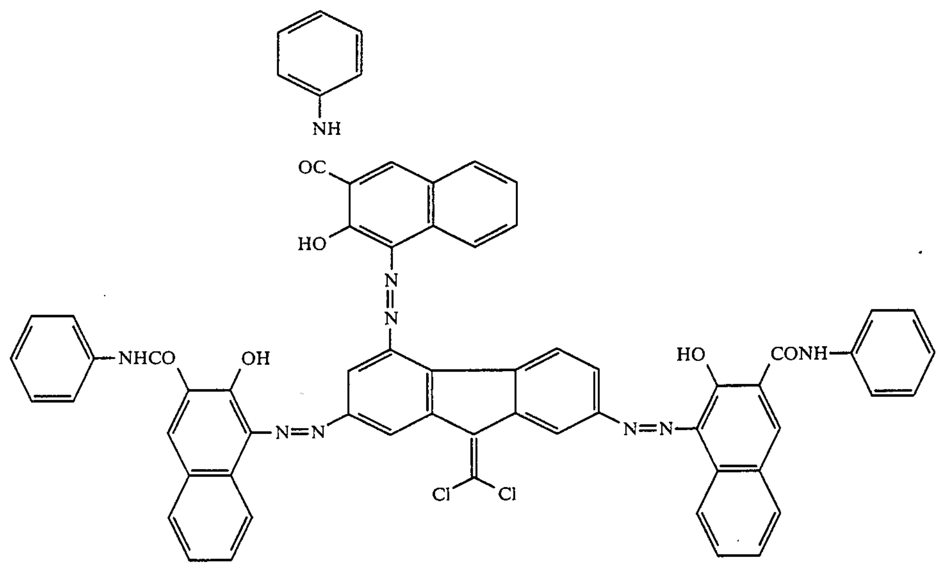
D-(164)
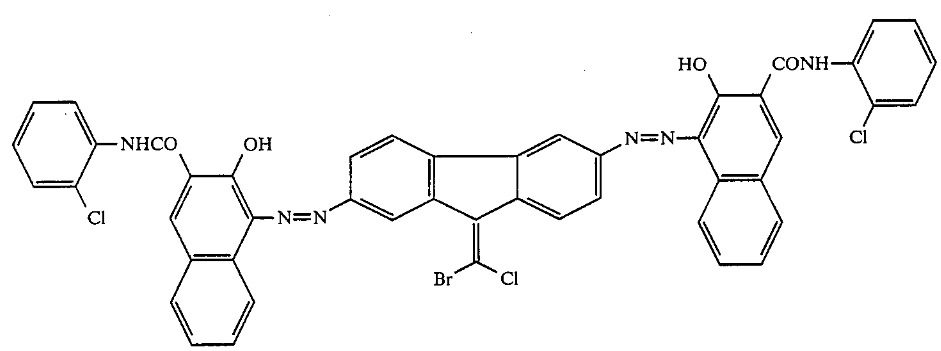

-continued

D-(165)

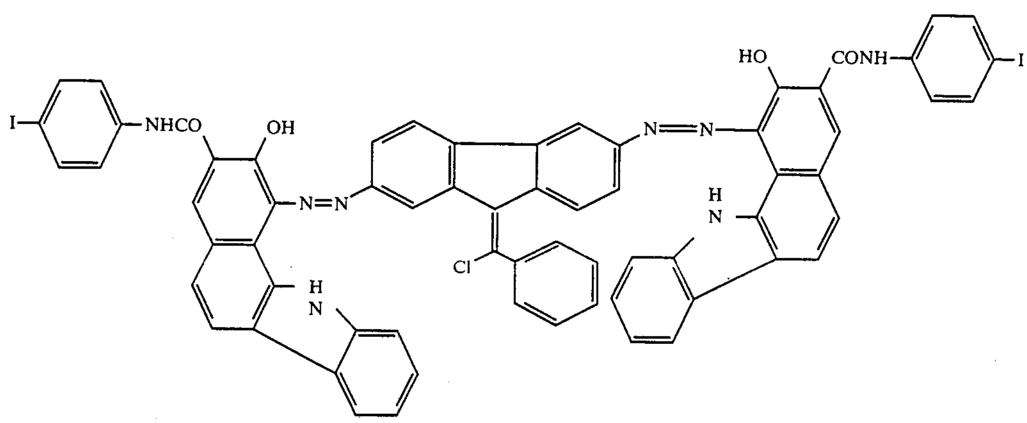

The azo compounds as set forth above can be synthesized easily according to the known method.

EMBODIMENT E

This embodiment is represented by the following formula [IE]:

[IE]

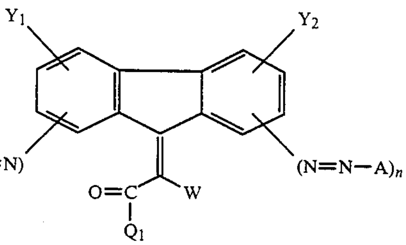

wherein $Q_1$, $Y_1$, $Y_2$, m, n and A are the same as defined in the above formula [I] and W is the same as defined in the above formula [ID].

In the above formula, $Q_1$ represents, for example, an alkyl group (having desirably 1 to 5 carbon atoms), a phenyl group which may have a substituent or substituents, a hydrogen atom, an amino group, an alkylamino group, a phenylamino group or a hydroxyl group, and other symbols may be exemplified as detailed above.

Of the Embodiment E represented by the above formula [IE], particularly preferable compounds with respect to sensitivity and stability to heat and light have the structure as represented by the formula [IE]-II shown below:

[IE]-II

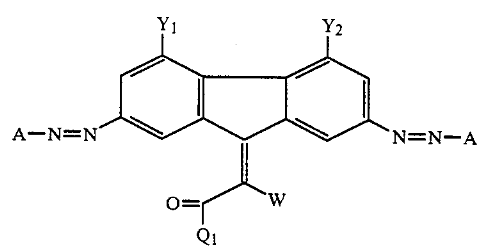

wherein $Q_1$, W, $Y_1$, $Y_2$ and A are the same as defined in the above formula [ID].

Specific examples of useful azo compounds represented by the above formula [IE] may include, for example, those having the following formula:

Those having the formula [IE]-II:

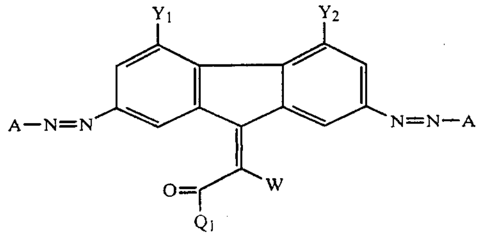
| Compound No. | A | $Q_1$ | W | $Y_1$ | $Y_2$ |
|---|---|---|---|---|---|
| E-(1) | 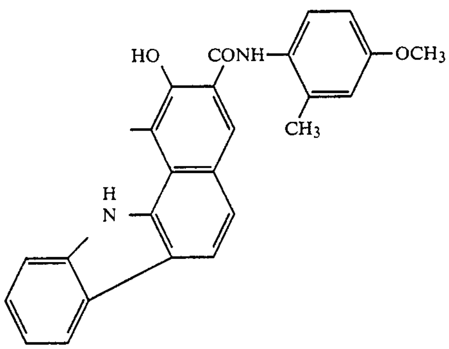 | $C_2H_5$ | $-\overset{O}{\overset{\|}{C}}C_2H_5$ | H | H |
| E-(2) | 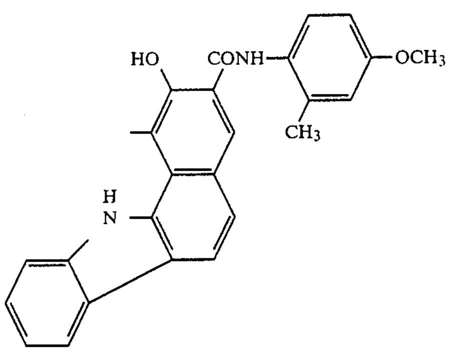 | 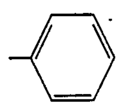 | 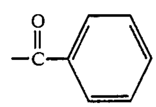 | H | H |
| E-(3) | 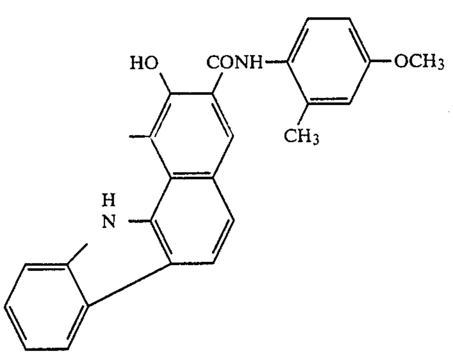 | $-OCH_3$ | $-\overset{O}{\overset{\|}{C}}OCH_3$ | H | H |

-continued
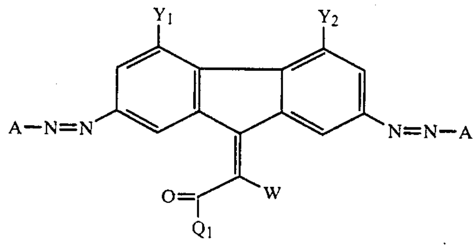
| Compound No. | A | $Q_1$ | W | $Y_1$ | $Y_2$ |
|---|---|---|---|---|---|
| E-(4) | 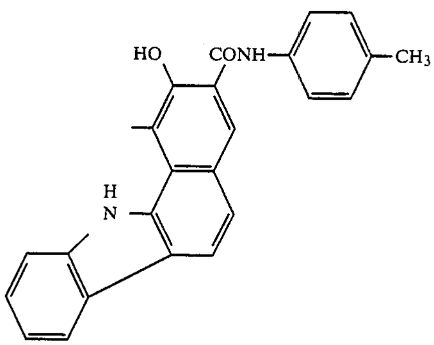 | $OCH_3$ | $OCH_3$ | H | H |
| E-(5) | 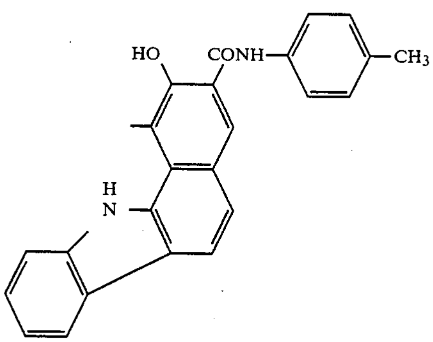 | 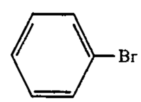 | H | H | H |
| E-(6) | 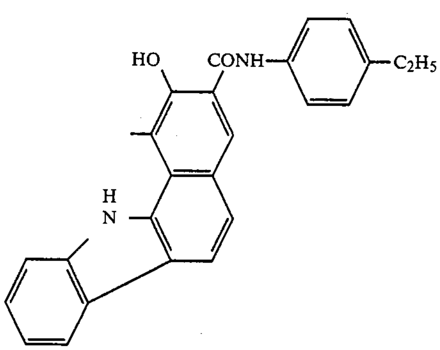 | $C_2H_5$ | $-\overset{\displaystyle O}{\overset{\|}{C}}CH_3$ | H | H |

-continued
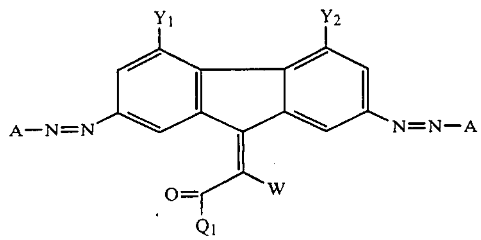
| Compound No. | A | $Q_1$ | W | $Y_1$ | $Y_2$ |
|---|---|---|---|---|---|
| E-(7) | 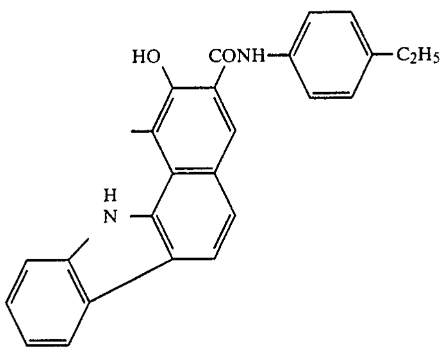 | $-OCH_3$ | H | H | H |
| E-(8) | 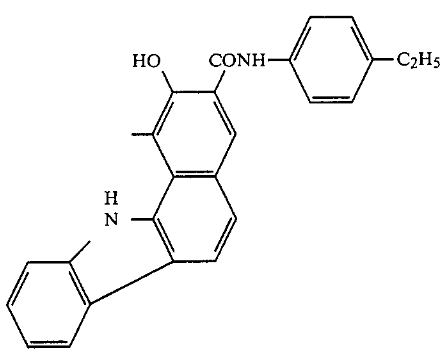 | $-OH$ | Cl | H | H |
| E-(9) | 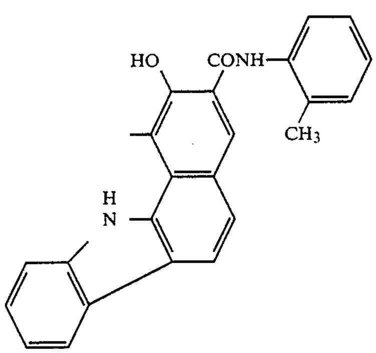 | $CH_3$ | H | H | H |

-continued
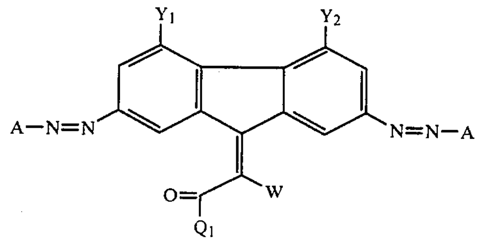
| Compound No. | A | $Q_1$ | W | $Y_1$ | $Y_2$ |
|---|---|---|---|---|---|
| E-(10) | 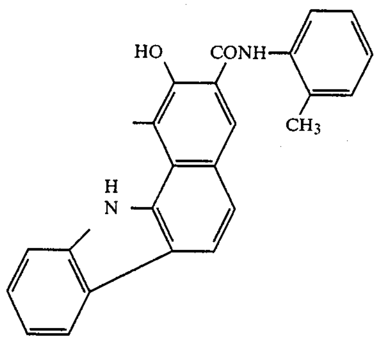 | $C_2H_5$ | H | H | H |
| E-(11) | 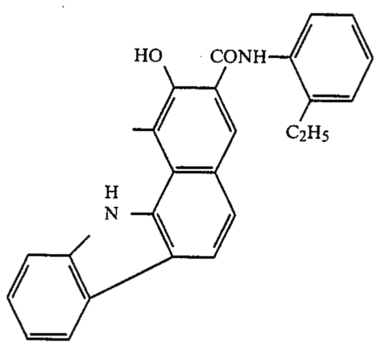 | $CH_3$ | H | H | H |
| E-(12) | 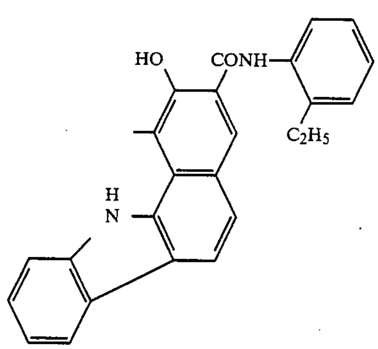 | $C_2H_5$ | H | H | H |

-continued
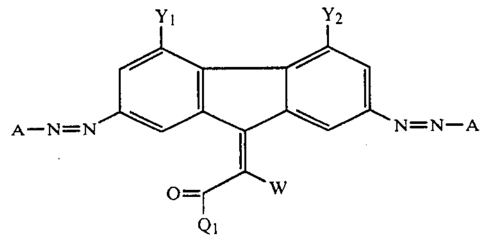
| Compound No. | A | $Q_1$ | W | $Y_1$ | $Y_2$ |
|---|---|---|---|---|---|
| E-(13) | 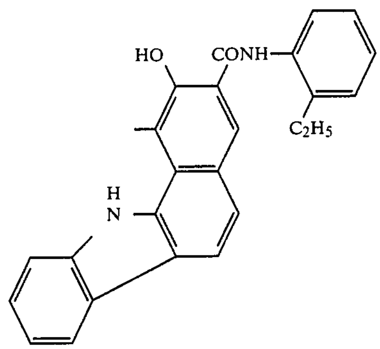 | 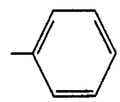 | 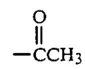 | H | H |
| E-(14) | 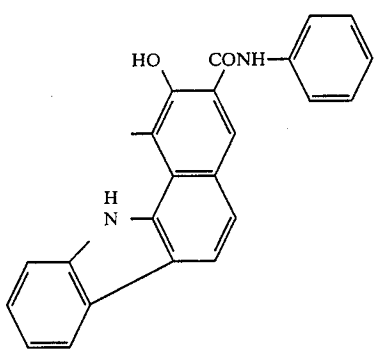 | $CH_3$ | H | H | H |
| E-(15) | 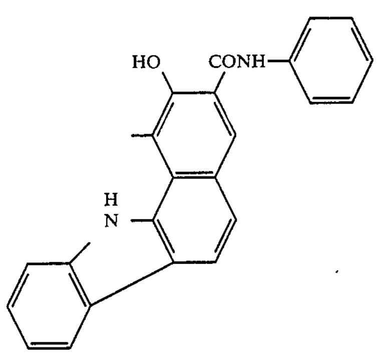 | $C_2H_5$ | H | H | H |

-continued
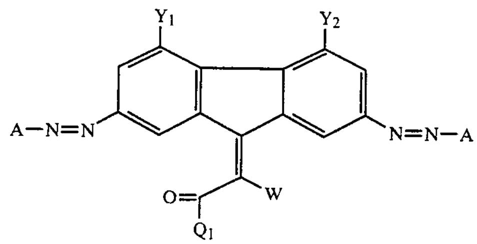
| Compound No. | A | $Q_1$ | W | $Y_1$ | $Y_2$ |
|---|---|---|---|---|---|
| E-(16) | 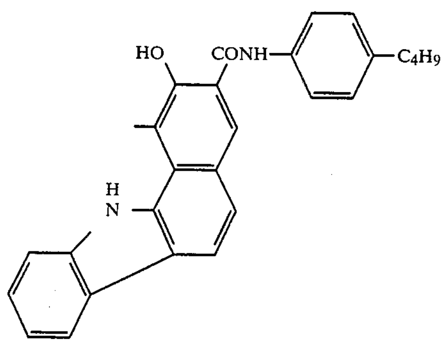 | $CH_3$ | $-\overset{O}{\overset{\parallel}{C}}CH_3$ | H | H |
| E-(17) | 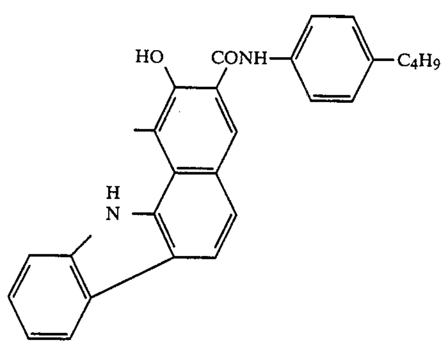 | $N(CH_3)_2$ | H | H | H |
| E-(18) | 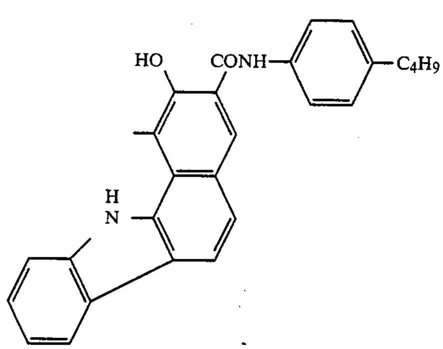 | $-OCH_3$ | Cl | H | H |

-continued
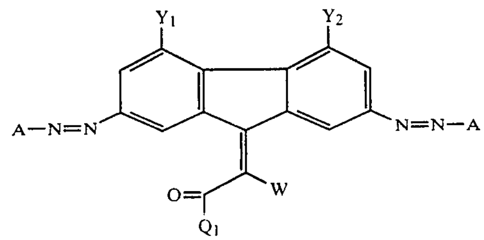
| Compound No. | A | $Q_1$ | W | $Y_1$ | $Y_2$ |
|---|---|---|---|---|---|
| E-(19) | 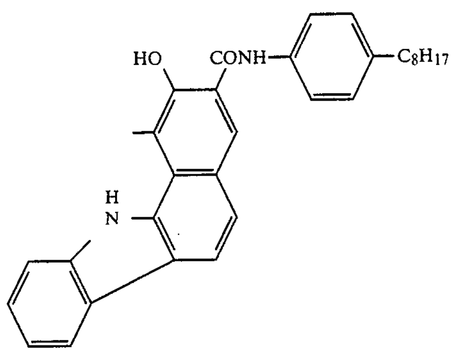 | 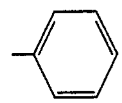 | Cl | H | H |
| E-(20) | 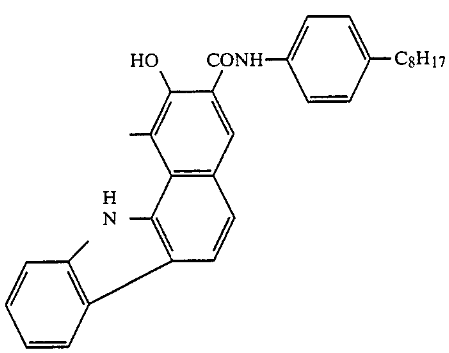 | 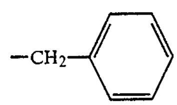 | H | H | H |
| E-(21) | 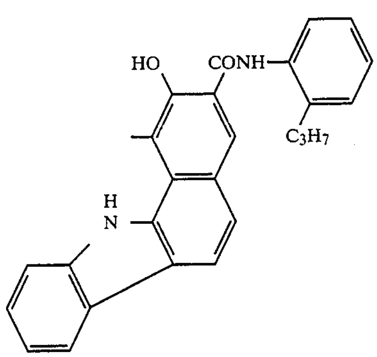 | 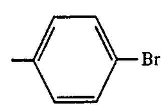 | $-\overset{\overset{\large O}{\|}}{C}CH_3$ | $CH_3$ | $CH_3$ |

-continued
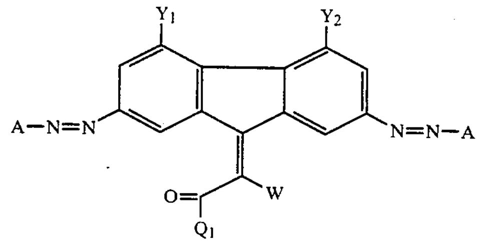
| Compound No. | A | $Q_1$ | W | $Y_1$ | $Y_2$ |
|---|---|---|---|---|---|
| E-(22) | 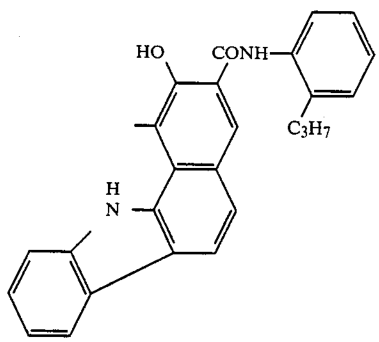 | $-OCH_3$ | $-\overset{O}{\overset{\Vert}{C}}OCH_3$ | $CH_3$ | CN |
| E-(23) | 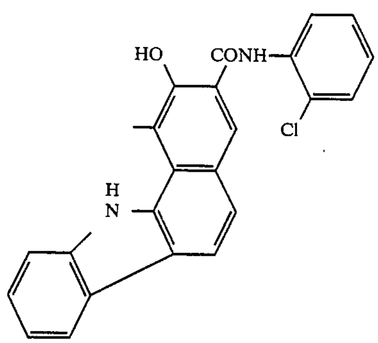 | $-N(CH_3)_2$ | H | H | H |
| E-(24) | 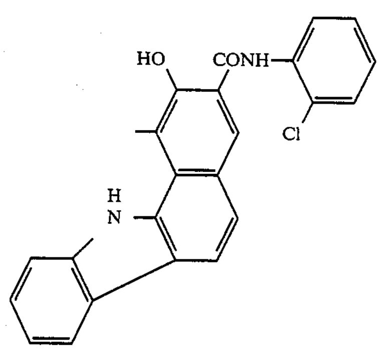 | $-NH_2$ | Cl | H | H |

-continued
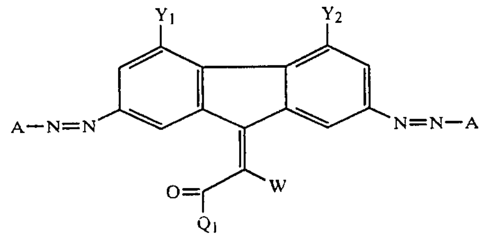
| Compound No. | A | $Q_1$ | W | $Y_1$ | $Y_2$ |
|---|---|---|---|---|---|
| E-(25) | 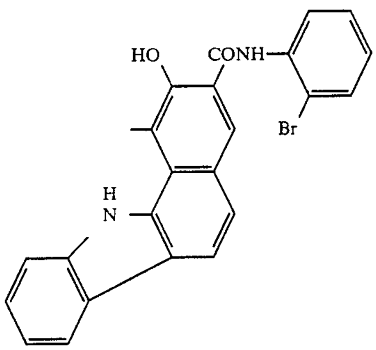 | $CH_3$ | $-\overset{\overset{O}{\|}}{C}CH_3$ | H | H |
| E-(26) | 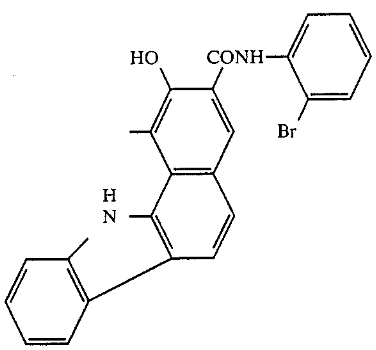 | 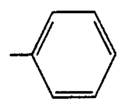 | $-\overset{\overset{O}{\|}}{C}C_2H_5$ | H | H |
| E-(27) | 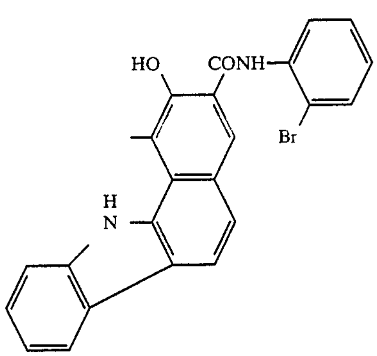 | 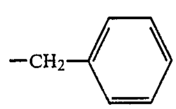 | $-OCH_3$ | H | H |

-continued
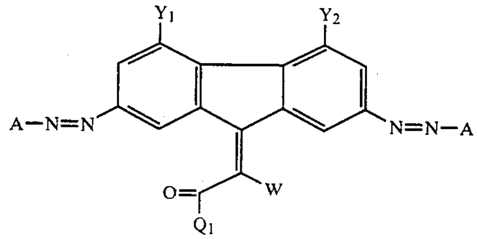
| Compound No. | A | $Q_1$ | W | $Y_1$ | $Y_2$ |
| --- | --- | --- | --- | --- | --- |
| E-(28) | 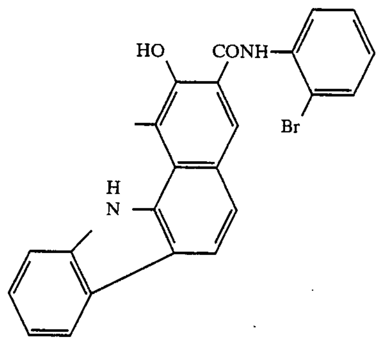 | $C_2H_5$ | $CH_3$ | H | H |
| E-(29) | 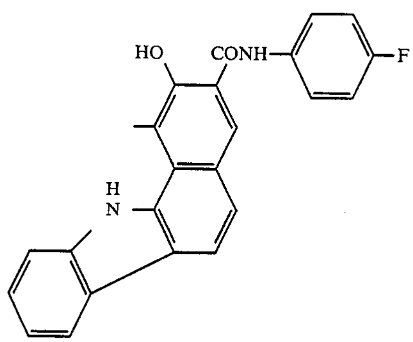 | $C_3H_7$ | H | H | H |
| E-(30) | 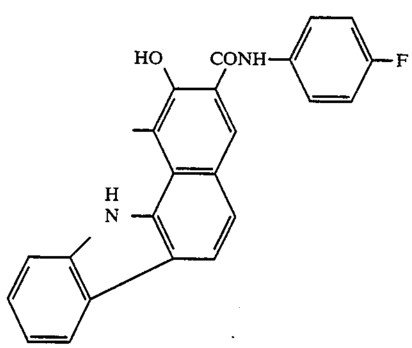 | $C_8H_{17}$ | $-\overset{O}{\overset{\parallel}{C}}C_8H_{17}$ | H | H |

-continued
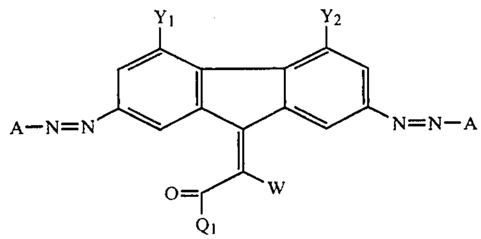
| Compound No. | A | $Q_1$ | W | $Y_1$ | $Y_2$ |
| --- | --- | --- | --- | --- | --- |
| E-(31) | 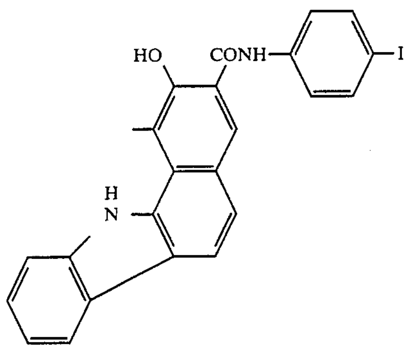 | 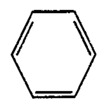 | 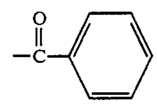 | H | H |
| E-(32) | 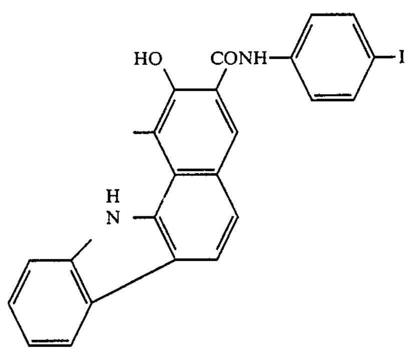 | $C_2H_5$ | $-\overset{O}{\overset{\|\|}{C}}C_2H_5$ | H | H |
| E-(33) | 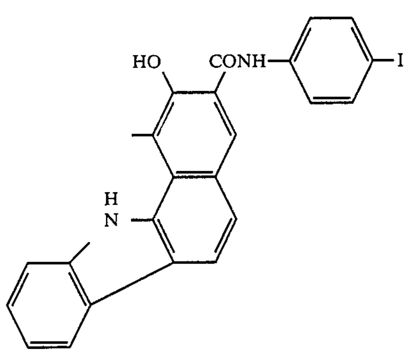 | $OCH_3$ | $-\overset{O}{\overset{\|\|}{C}}CH_3$ | H | H |

-continued
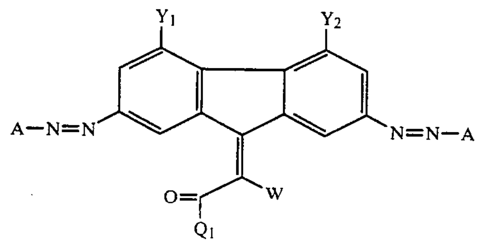
| Compound No. | A | $Q_1$ | W | $Y_1$ | $Y_2$ |
|---|---|---|---|---|---|
| E-(34) | 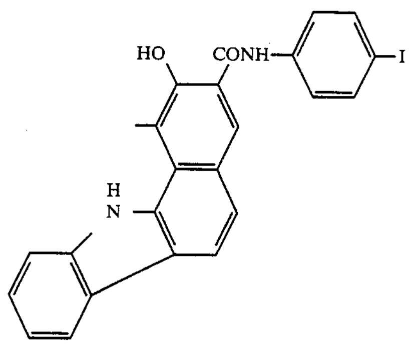 | 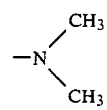 | $CH_3$ | H | H |
| E-(35) | 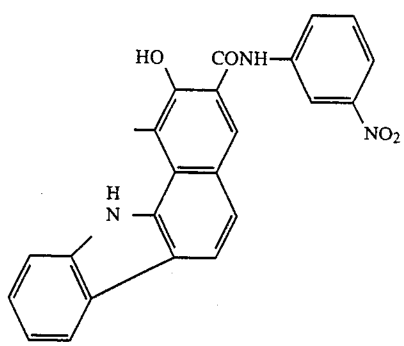 | $CH_3$ | 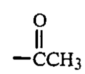 | H | H |
| E-(36) | 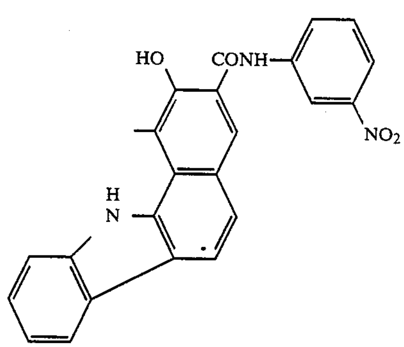 | $C_2H_5$ | 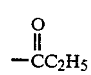 | H | H |

-continued
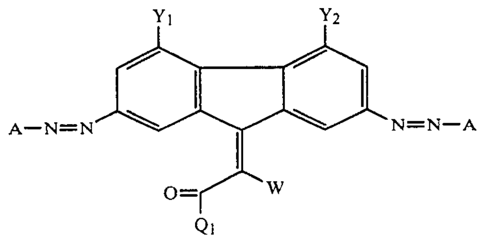
| Compound No. | A | $Q_1$ | W | $Y_1$ | $Y_2$ |
|---|---|---|---|---|---|
| E-(37) | 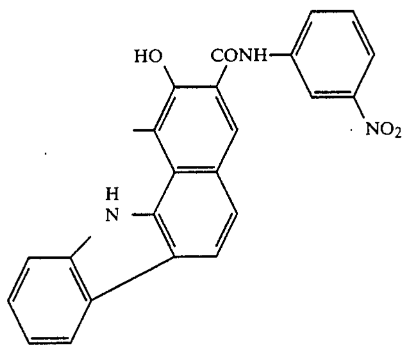 | $C_2H_5$ | 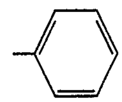 | H | H |
| E-(38) | 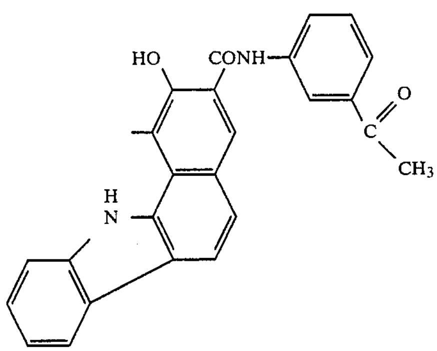 | $CH_3$ | H | H | H |
| E-(39) | 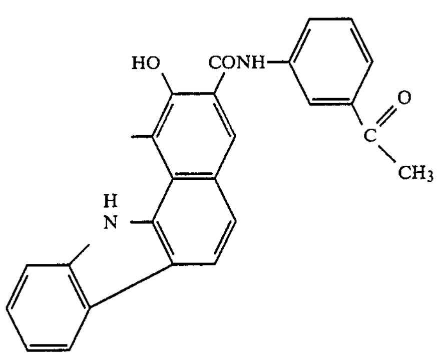 | $C_2H_5$ | 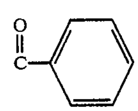 | H | H |

-continued
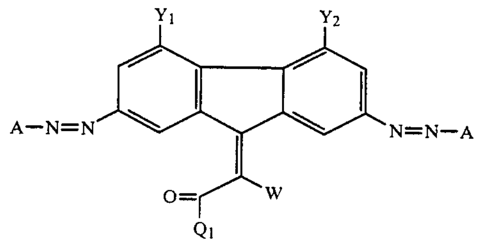
| Compound No. | A | $Q_1$ | W | $Y_1$ | $Y_2$ |
|---|---|---|---|---|---|
| E-(40) | 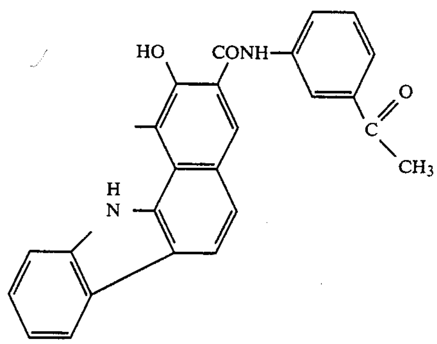 | $-N(CH_3)_2$ | 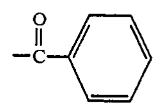 | H | H |
| E-(41) | 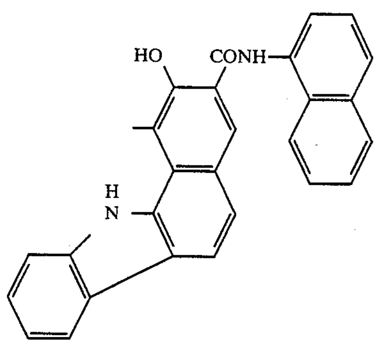 | $C_2H_5$ | 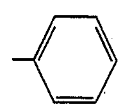 | $CH_3$ | $CH_3$ |
| E-(42) | 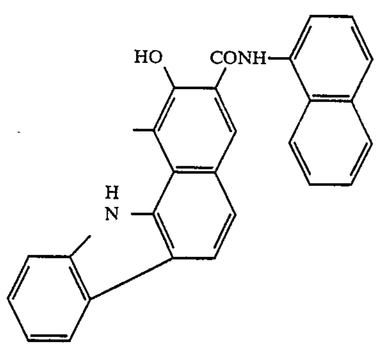 | 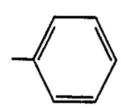 | H | H | H |

-continued
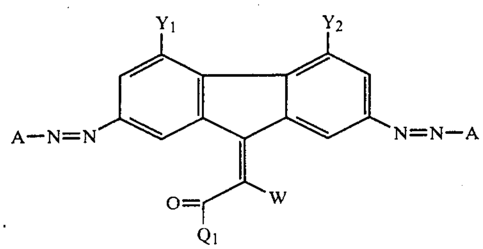
| Compound No. | A | $Q_1$ | W | $Y_1$ | $Y_2$ |
|---|---|---|---|---|---|
| E-(43) | 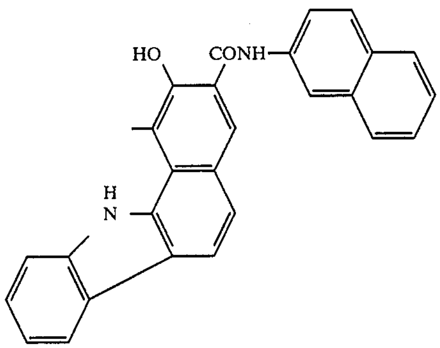 | 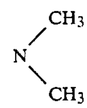 | Cl | H | H |
| E-(44) | 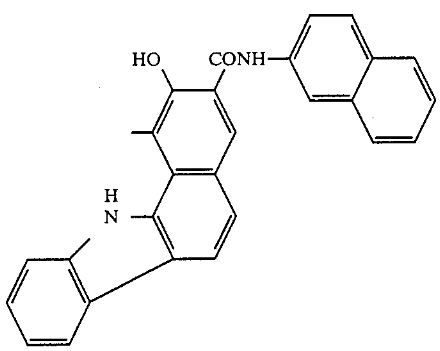 | H | H | H | H |
| E-(45) | 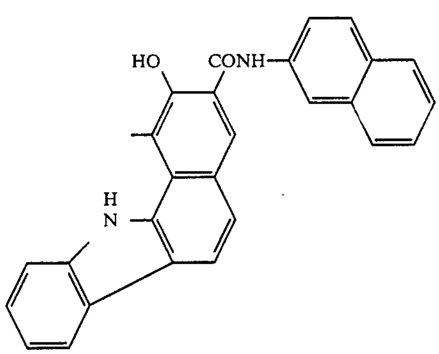 | $CH_3$ | H | H | H |

-continued
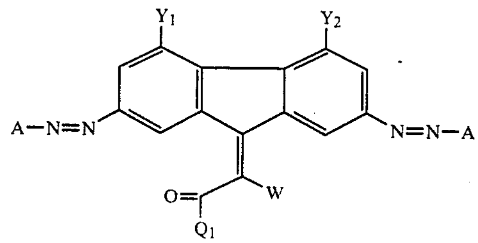
| Compound No. | A | $Q_1$ | W | $Y_1$ | $Y_2$ |
|---|---|---|---|---|---|
| E-(46) | 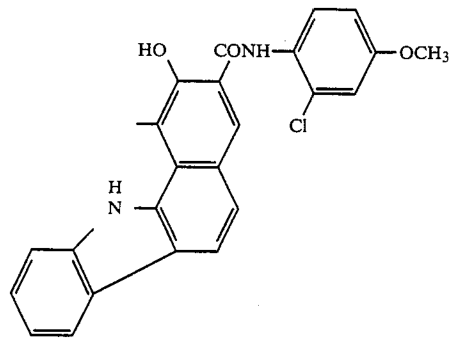 | $CH_3$ | H | H | H |
| E-(47) | 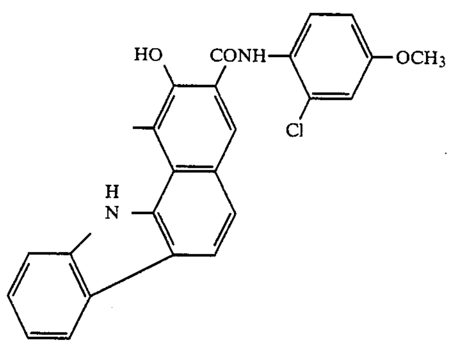 | $C_2H_5$ | $\overset{O}{\|\|}COC_2H_5$ | H | H |
| E-(48) | 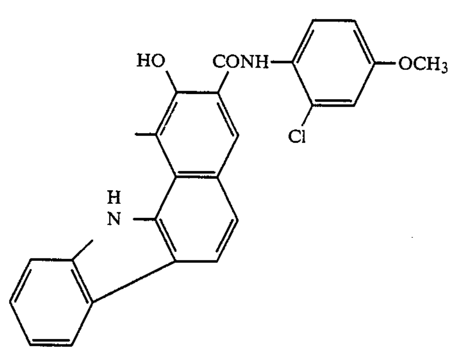 | $C_2H_5$ | Cl | Cl | Cl |

-continued
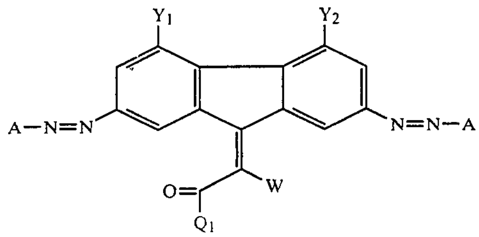
| Compound No. | A | $Q_1$ | W | $Y_1$ | $Y_2$ |
|---|---|---|---|---|---|
| E-(49) | 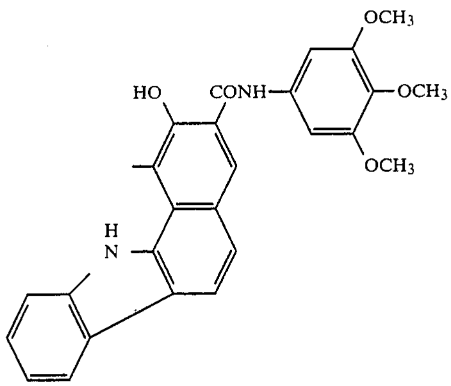 | $CH_3$ | H | H | H |
| E-(50) | 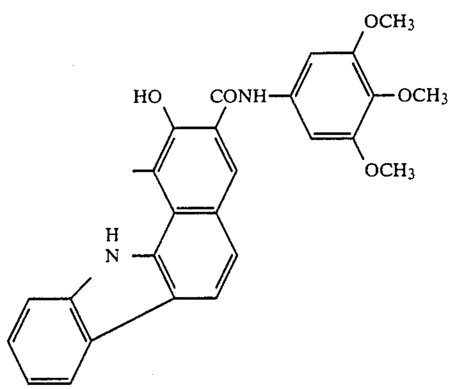 | $CH_3$ | Cl | $OCH_3$ | H |
| E-(51) | 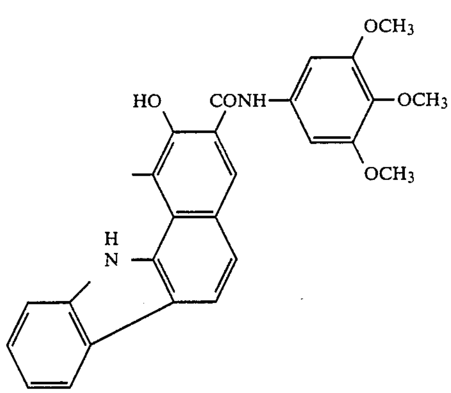 | $C_2H_5$ | H | 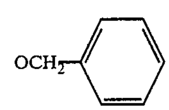 | H |

-continued
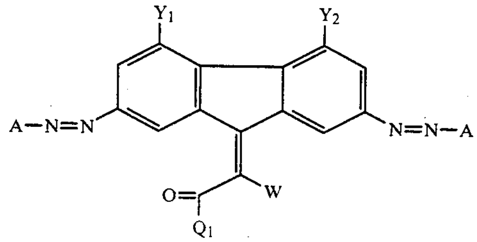
| Compound No. | A | $Q_1$ | W | $Y_1$ | $Y_2$ |
|---|---|---|---|---|---|
| E-(52) | 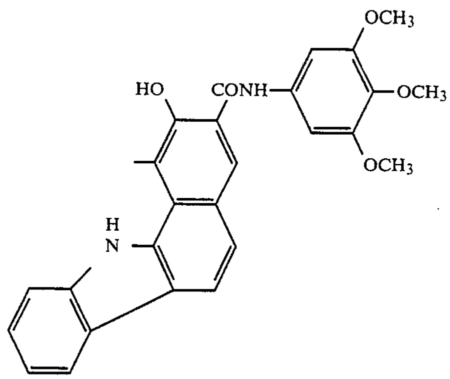 | $-OCH_3$ | $CH_3$ | OH | H |
| E-(53) | 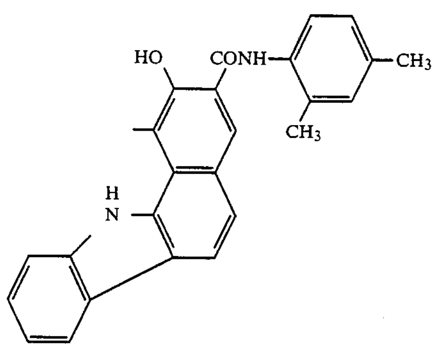 | $CH_3$ | $-\overset{O}{\overset{\parallel}{C}}CH_3$ | H | H |
| E-(54) | 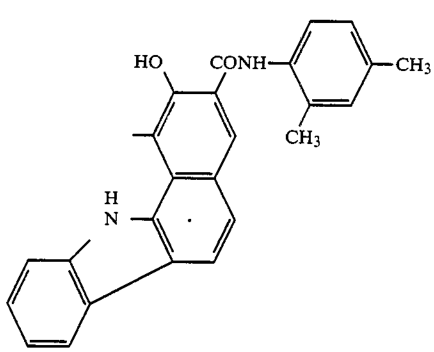 | $CH_3$ | $-\overset{O}{\overset{\parallel}{C}}OCH_3$ | H | H |

-continued
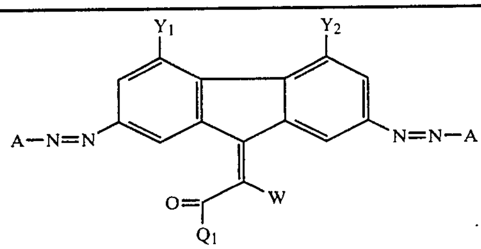
| Compound No. | A | $Q_1$ | W | $Y_1$ | $Y_2$ |
|---|---|---|---|---|---|
| E-(55) | 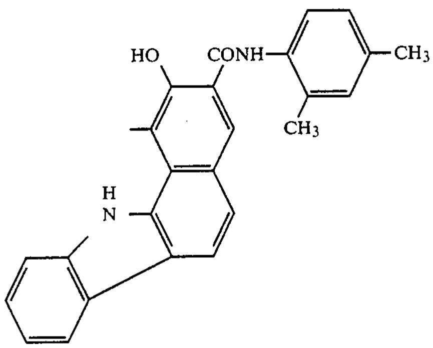 | $CH_3$ | $-\overset{O}{\overset{\|}{C}}NH_2$ | H | H |
| E-(56) | 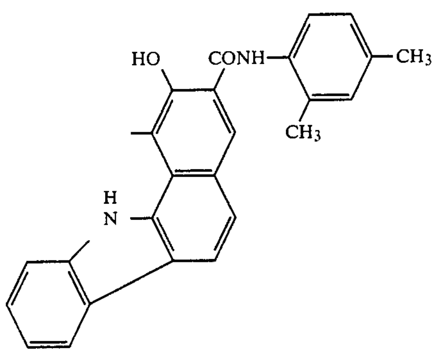 | $CH_3$ | $-\overset{O}{\underset{O}{\overset{\|}{\underset{\|}{S}}}}NH_2$ | H | H |
| E-(57) | 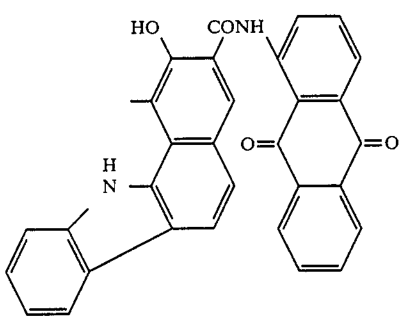 | $CH_3$ | 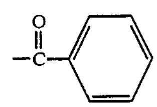 | H | H |
| E-(58) | 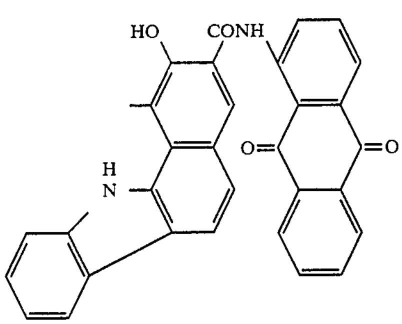 | H | $-\overset{O}{\overset{\|}{C}}H$ | H | H |

-continued
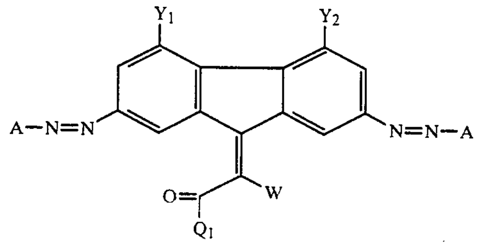
| Compound No. | A | $Q_1$ | W | $Y_1$ | $Y_2$ |
| --- | --- | --- | --- | --- | --- |
| E-(59) | 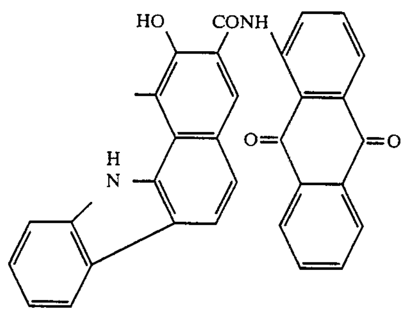 | H | 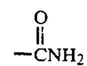 | H | H |
| E-(60) | 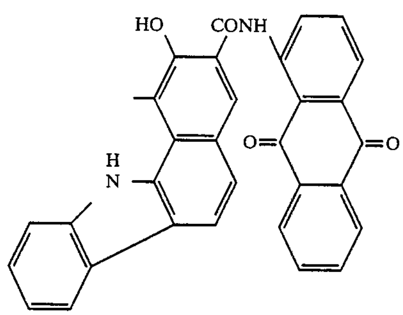 | H | 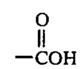 | H | H |
| E-(61) | 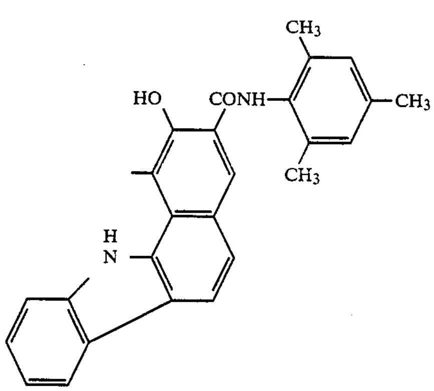 | $CH_3$ | H | H | H |

-continued
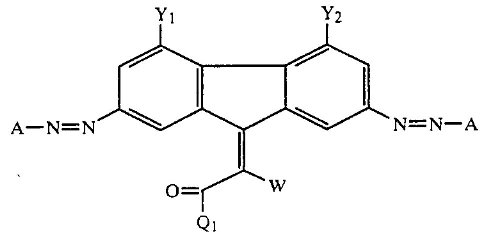
| Compound No. | A | $Q_1$ | W | $Y_1$ | $Y_2$ |
|---|---|---|---|---|---|
| E-(62) | 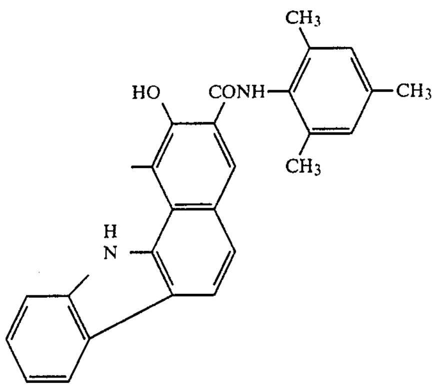 | $CH_3$ | $-C(=O)CH_3$ | H | H |
| E-(63) | 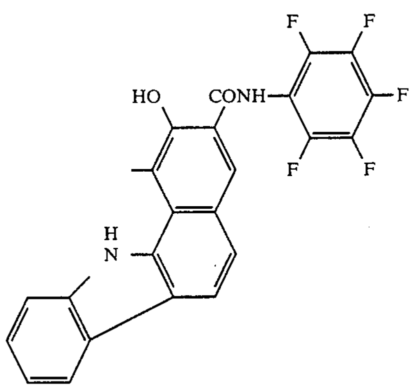 | $CH_3$ | $CH_3$ | H | H |
| E-(64) | 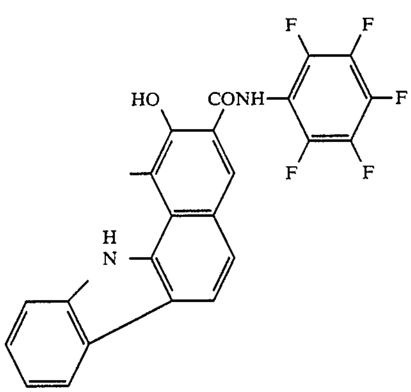 | $CH_3$ | $-OCH_3$ | H | H |

-continued
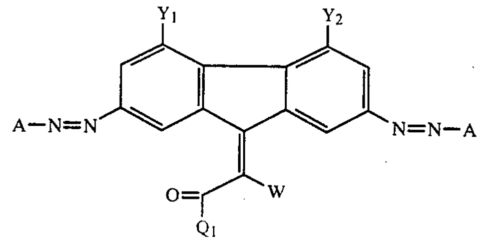
| Compound No. | A | $Q_1$ | W | $Y_1$ | $Y_2$ |
| --- | --- | --- | --- | --- | --- |
| E-(65) | 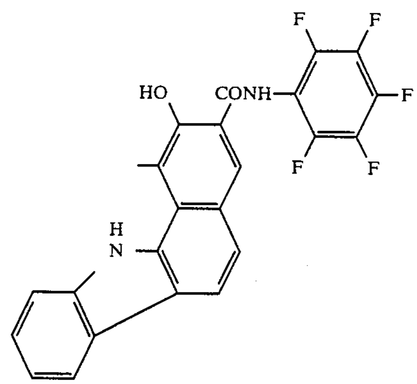 | $CH_3$ | $-C(=O)CH_3$ | H | H |
| E-(66) | 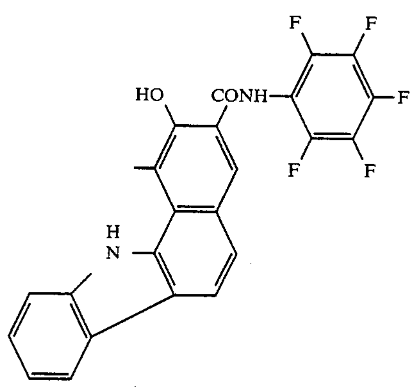 | H | H | H | H |
| E-(67) | 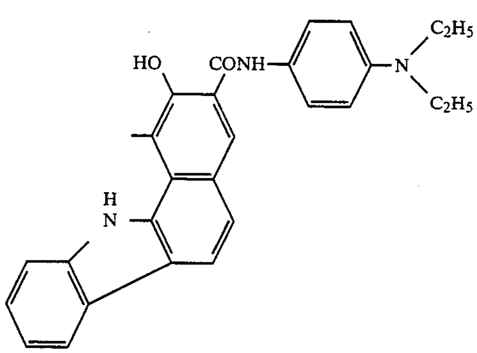 | $CH_3$ | Cl | H | H |

-continued
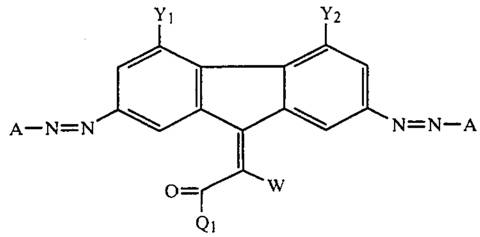
| Compound No. | A | $Q_1$ | W | $Y_1$ | $Y_2$ |
|---|---|---|---|---|---|
| E-(68) | 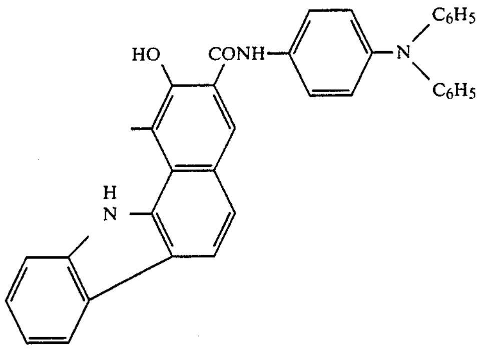 | $CH_3$ | $-\overset{O}{\overset{\|}{C}}OCH_3$ | H | H |
| E-(69) | 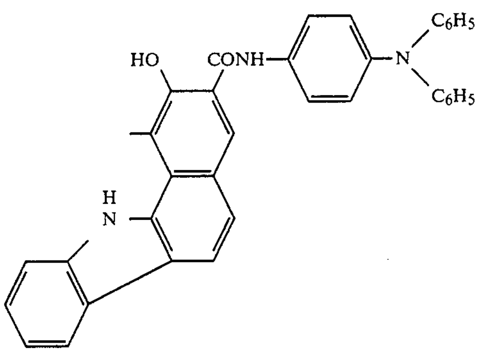 | $OCH_3$ | $C_2H_5$ | H | H |
| E-(70) | 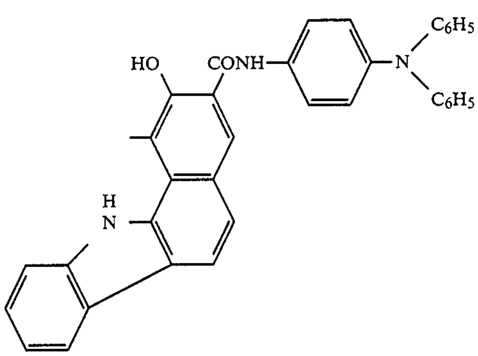 | 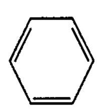 | 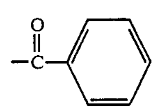 | H | H |

-continued
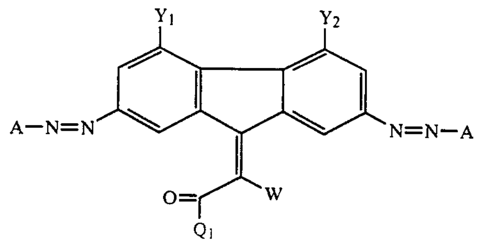
| Compound No. | A | $Q_1$ | W | $Y_1$ | $Y_2$ |
|---|---|---|---|---|---|
| E-(71) | 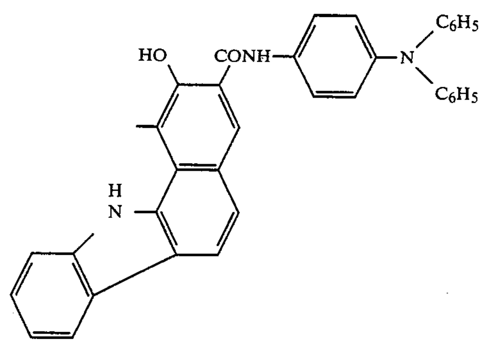 | $CH_3$ | H | H | $CH_3$ |
| E-(72) | 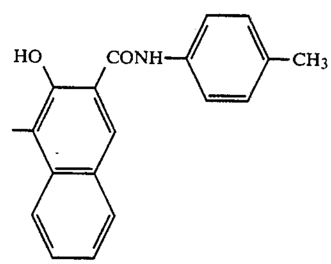 | $CH_3$ | H | H | H |
| E-(73) | 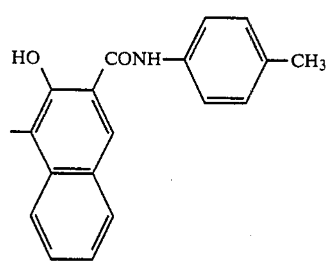 | $CH_3$ | Cl | H | H |
| E-(74) | 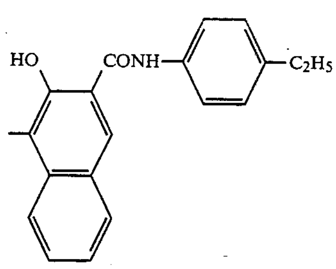 | $-OCH_3$ | $-\overset{O}{\overset{\parallel}{C}}CH_3$ | H | H |

-continued
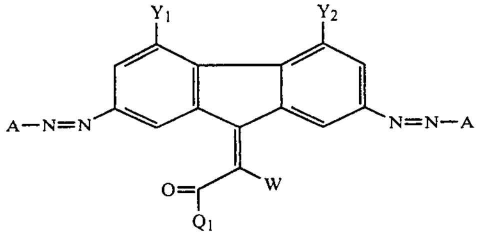
| Compound No. | A | $Q_1$ | W | $Y_1$ | $Y_2$ |
|---|---|---|---|---|---|
| E-(75) | 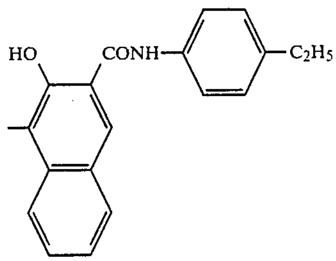 | 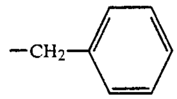 | Cl | H | H |
| E-(76) | 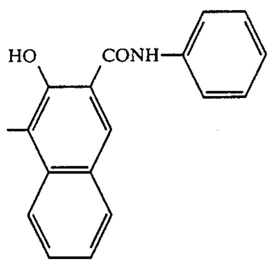 | $CH_3$ | H | H | H |
| E-(77) | 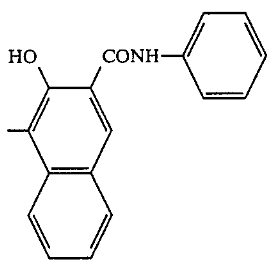 | $C_2H_5$ | $-\overset{O}{\overset{\|}{C}}CH_3$ | $CH_3$ | H |
| E-(78) | 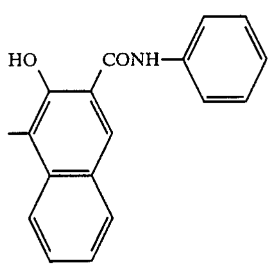 | OH | $CH_3$ | H | H |
| E-(79) | 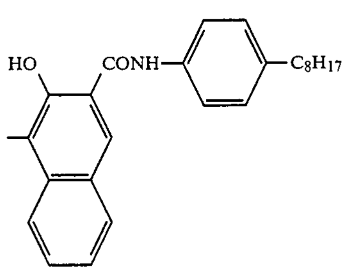 | $CH_3$ | H | OH | H |

-continued
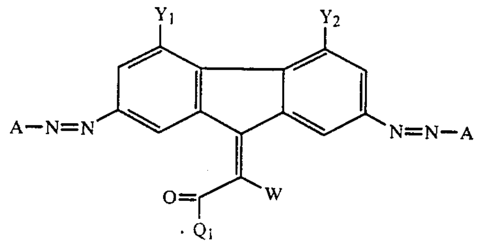
| Compound No. | A | Q1 | W | Y1 | Y2 |
|---|---|---|---|---|---|
| E-(80) | 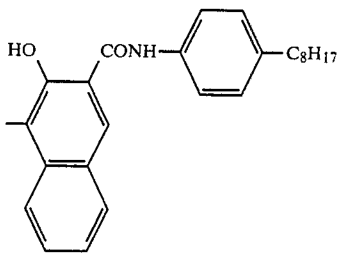 | $CH_3$ | $-\overset{O}{\overset{\|\|}{C}}CH_3$ | $CH_3$ | $CH_3$ |
| E-(81) | 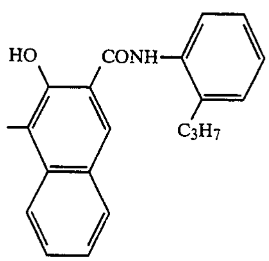 | $CH_3$ | $-\overset{O}{\overset{\|\|}{C}}CH_3$ | $CH_3$ | $CH_3$ |
| E-(82) | 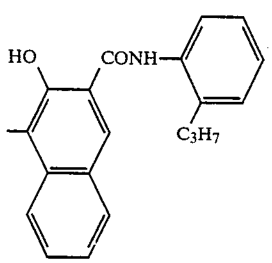 | $C_2H_5$ | $-\overset{O}{\overset{\|\|}{C}}OCH_3$ | H | H |
| E-(83) | 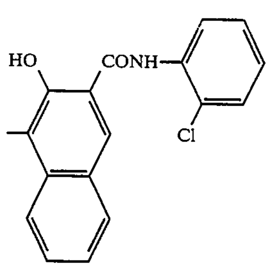 | $CH_3$ | Cl | Cl | Cl |

-continued
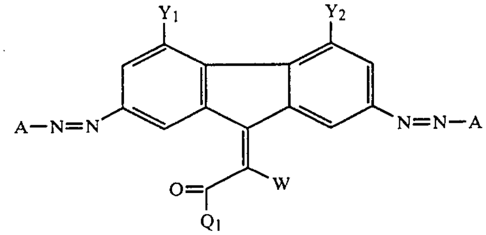
| Compound No. | A | $Q_1$ | W | $Y_1$ | $Y_2$ |
|---|---|---|---|---|---|
| E-(84) | 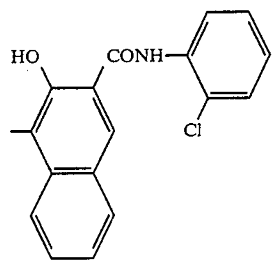 | $CH_3$ | $-C(=O)CH_3$ | H | H |
| E-(85) | 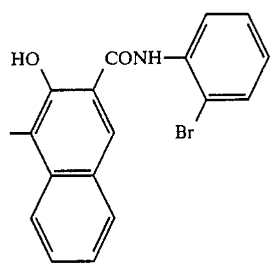 | $CH_3$ | $-S(=O)_2CH_3$ | H | H |
| E-(86) | 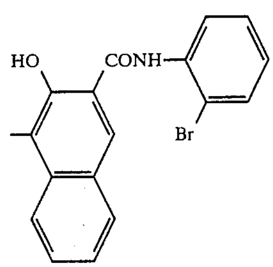 | $C_2H_5$ | H | H | H |
| E-(87) | 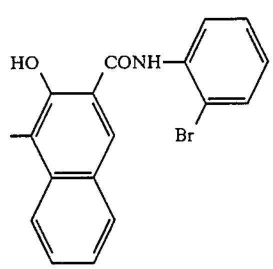 | $C_2H_5$ | H | H | H |
| E-(88) | 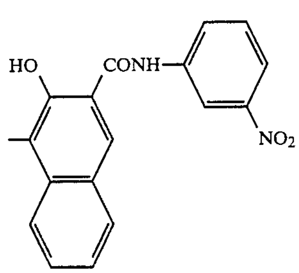 | $CH_3$ | H | H | H |

-continued
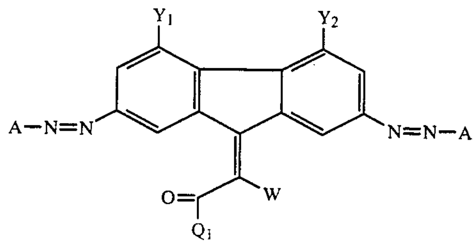
| Compound No. | A | $Q_1$ | W | $Y_1$ | $Y_2$ |
|---|---|---|---|---|---|
| E-(89) | 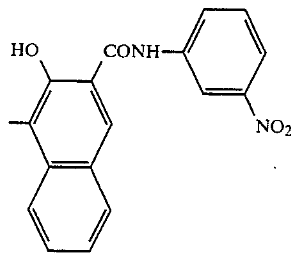 | $C_2H_5$ | H | H | H |
| E-(90) | 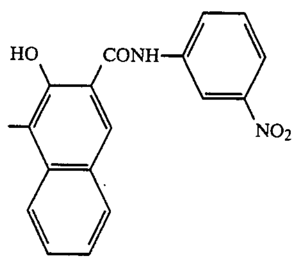 | $CH_3$ | H | H | H |
| E-(91) | 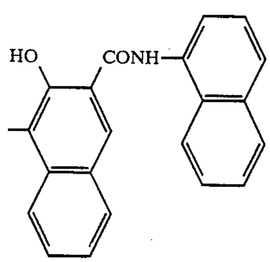 | $CH_3$ | 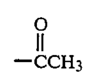 | $-OCH_3$ | H |
| E-(92) | 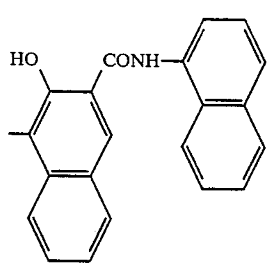 | $CH_3$ | H | H | H |

-continued
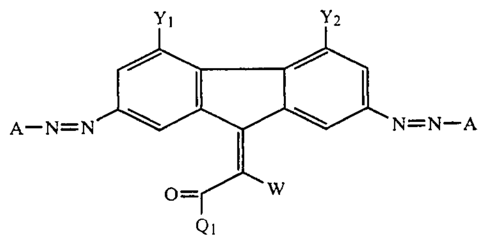
| Compound No. | A | $Q_1$ | W | $Y_1$ | $Y_2$ |
|---|---|---|---|---|---|
| E-(93) | 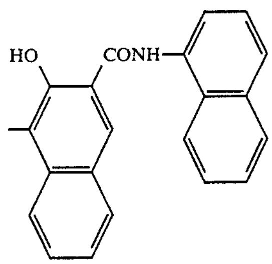 | $CH_3$ | Cl | H | H |
| E-(94) | 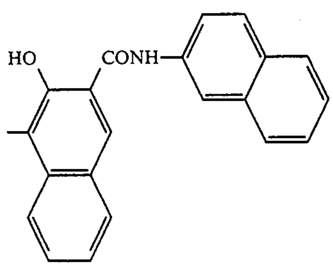 | $C_3H_7$ | H | Br | Br |
| E-(95) | 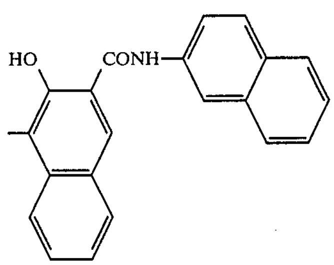 | $C_8H_{17}$ | H | H | H |
| E-(96) | 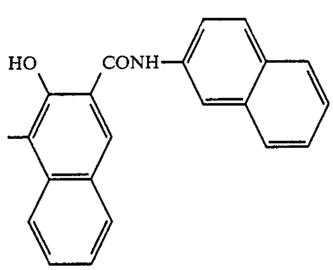 | $C_8H_{17}$ | H | H | H |

-continued
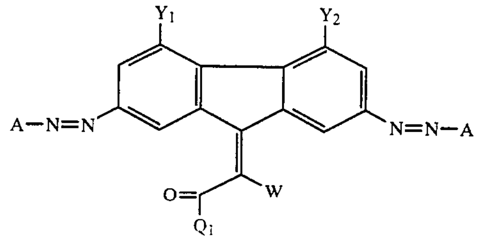
| Compound No. | A | $Q_1$ | W | $Y_1$ | $Y_2$ |
|---|---|---|---|---|---|
| E-(97) | 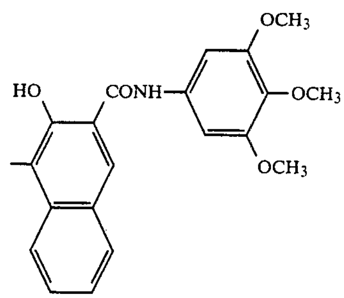 | $CH_3$ | H | H | H |
| E-(98) | 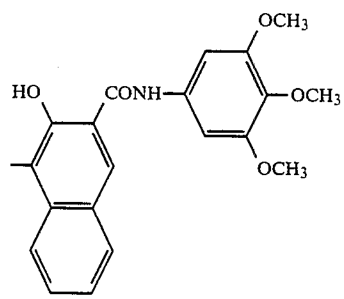 | $C_2H_5$ | H | H | H |
| E-(99) | 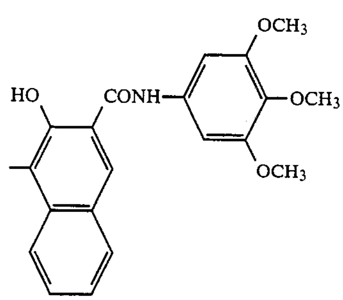 | $CH_3$ | $CH_3$ | H | H |
| E-(100) | 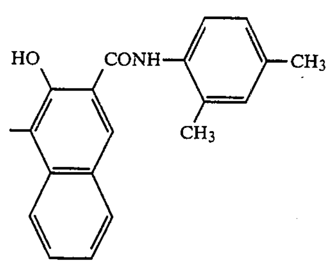 | $CH_3$ | H | H | H |

-continued
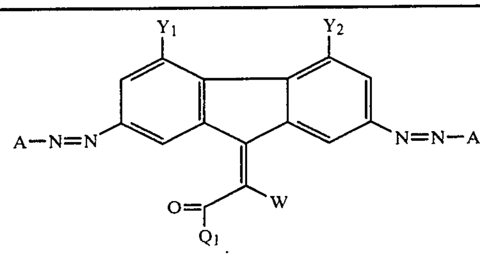
| Compound No. | A | $Q_1$ | W | $Y_1$ | $Y_2$ |
|---|---|---|---|---|---|
| E-(101) | 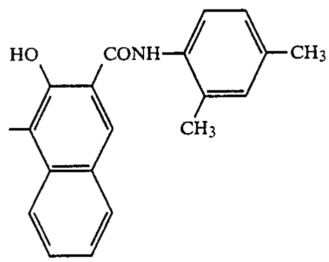 | $C_2H_5$ | H | H | H |
| E-(102) | 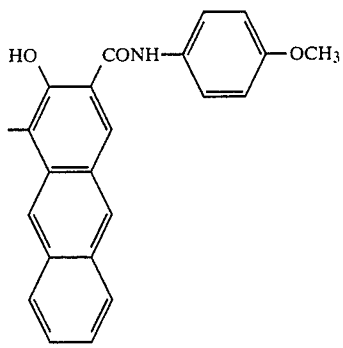 | $CH_3$ | $-\overset{\overset{O}{\|}}{C}CH_3$ | H | H |
| E-(103) | 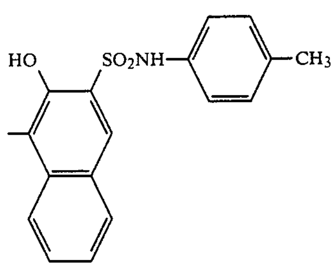 | $CH_3$ | $-\underset{\underset{O}{\|}}{\overset{\overset{O}{\|}}{S}}CH_3$ | H | H |
| E-(104) | 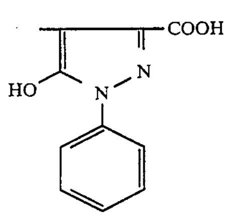 | $CH_3$ | H | $CH_3$ | H |
| E-(105) | 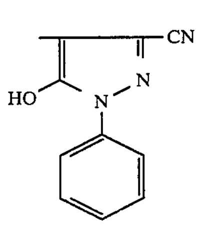 | 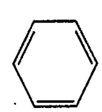 | 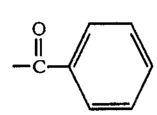 | CN | $CH_3$ |

-continued
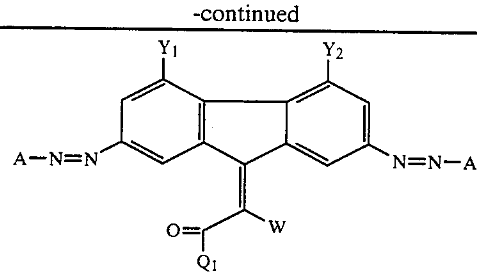
| Compound No. | A | $Q_1$ | W | $Y_1$ | $Y_2$ |
|---|---|---|---|---|---|
| E-(106) | 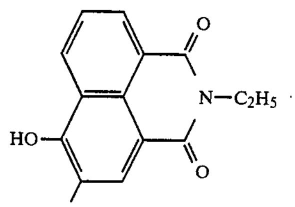 | $CH_3$ | $-\overset{O}{\overset{\|}{C}}CH_3$ | H | H |
| E-(107) | 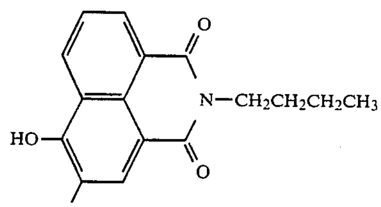 | $CH_3$ | $\overset{O}{\overset{\|}{C}}N(CH_3)_2$ | H | H |
| E-(108) | 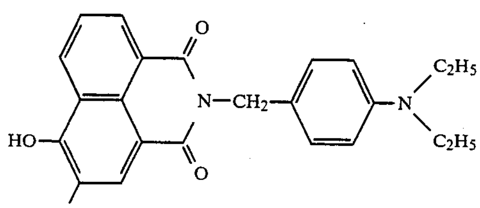 | $-OCH_3$ | Cl | H | H |
| E-(109) | 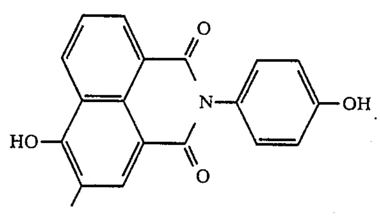 | H | $-\overset{O}{\overset{\|}{C}}CH_3$ | Cl | Cl |
| E-(110) | 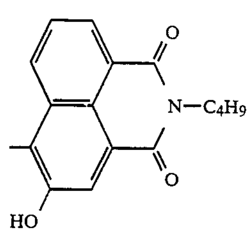 | $CH_3$ | H | H | H |
| E-(111) | 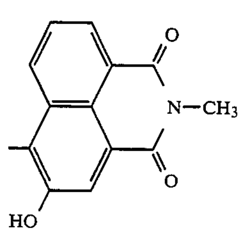 | $C_2H_5$ | H | Br | Br |

-continued
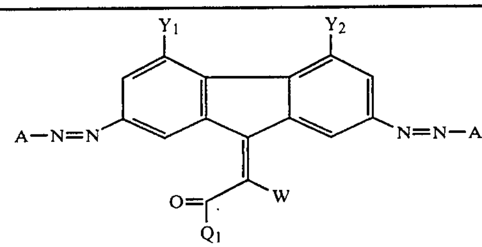
| Compound No. | A | $Q_1$ | W | $Y_1$ | $Y_2$ |
|---|---|---|---|---|---|
| E-(112) | 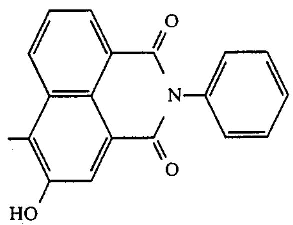 | $OCH_3$ | $-\overset{O}{\overset{\|}{C}}CH_3$ | H | H |
Those having the formula [IE]-III:
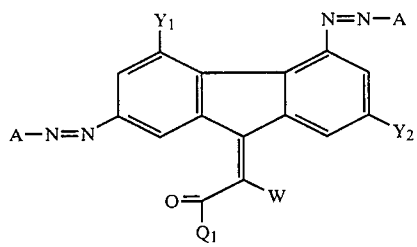
| Compound No. | A | $Q_1$ | W | $Y_1$ | $Y_2$ |
|---|---|---|---|---|---|
| E-(113) | 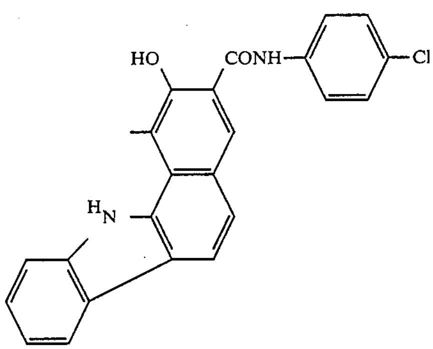 | $CH_3$ | H | H | H |
| E-(114) | 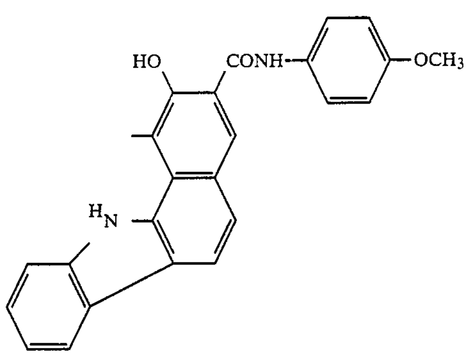 | $C_2H_5$ | $-\overset{O}{\overset{\|}{C}}CH_3$ | H | H |

-continued
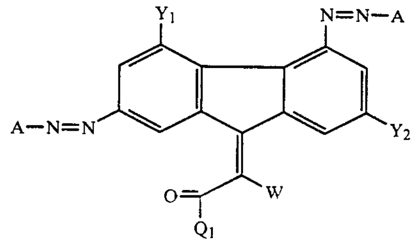
| Compound No. | A | $Q_1$ | W | $Y_1$ | $Y_2$ |
|---|---|---|---|---|---|
| E-(115) | 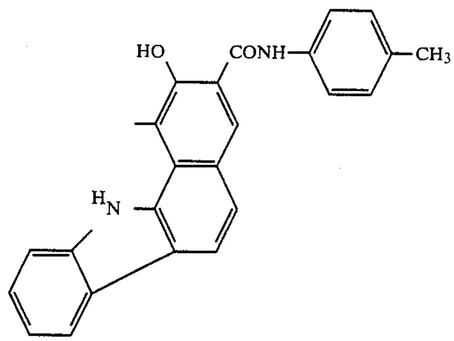 | $CH_3$ | $-\overset{O}{\overset{\parallel}{C}}CH_3$ | H | H |
| E-(116) | 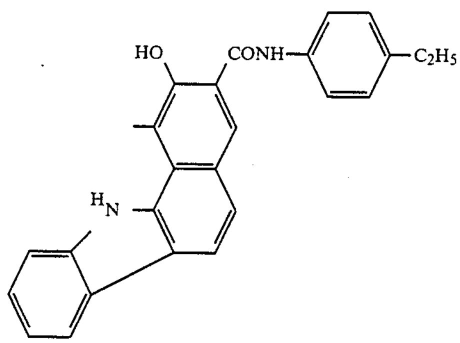 | $CH_3$ | Cl | H | H |
| E-(117) | 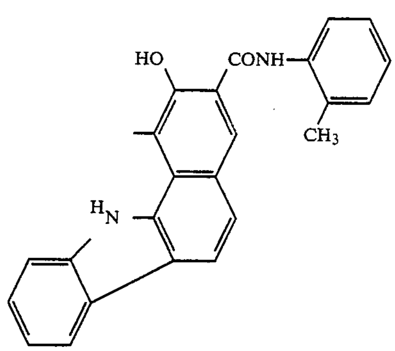 | 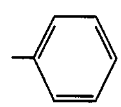 | $-\overset{O}{\overset{\parallel}{C}}OCH_3$ | H | $CH_3$ |

-continued
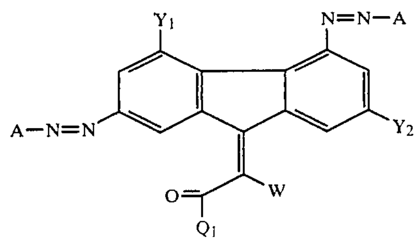
| Compound No. | A | $Q_1$ | W | $Y_1$ | $Y_2$ |
|---|---|---|---|---|---|
| E-(118) | 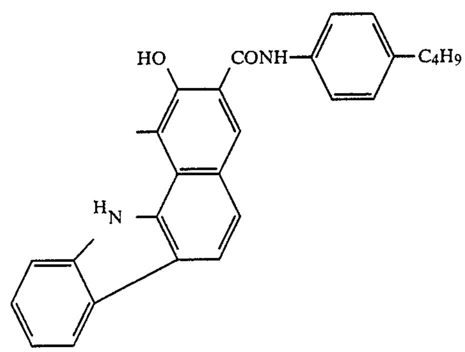 | $CH_3$ | $-\overset{O}{\overset{\|\|}{C}}CH_3$ | H | H |
| E-(119) | 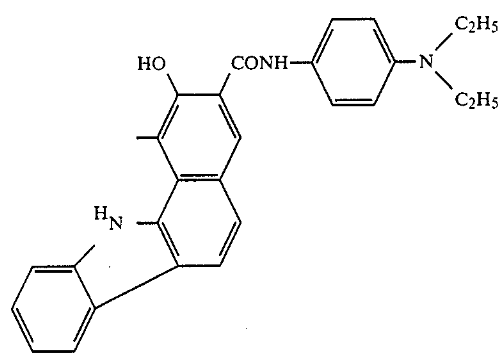 | OH | Cl | $CH_3$ | H |
| E-(120) | 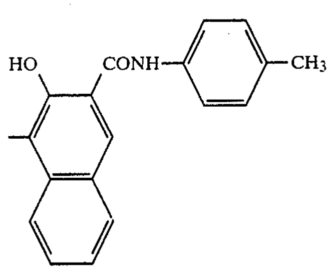 | $CH_3$ | $-\overset{O}{\overset{\|\|}{C}}CH_3$ | H | H |
| E-(121) | 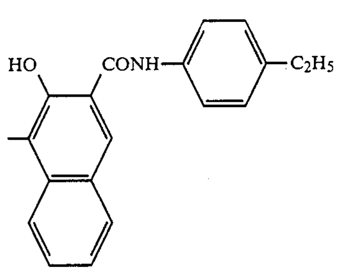 | $CH_3$ | 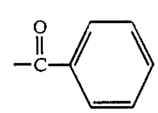 | H | H |

-continued
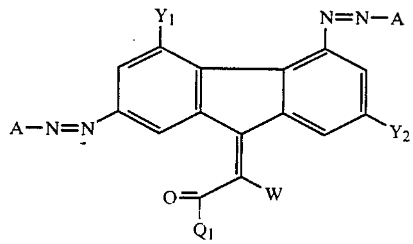
| Compound No. | A | $Q_1$ | W | $Y_1$ | $Y_2$ |
|---|---|---|---|---|---|
| E-(122) | 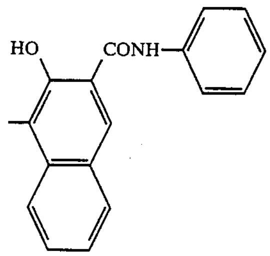 | $CH_3$ | $-\overset{O}{\overset{\|\|}{C}}OCH_3$ | H | H |
| E-(123) | 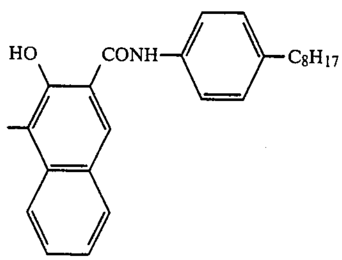 | $C_2H_5$ | $-\overset{O}{\overset{\|\|}{C}}CH_3$ | Br | Br |
| E-(124) | 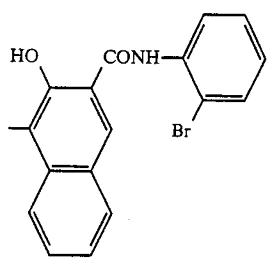 | $C_2H_5$ | H | H | H |
| E-(125) | 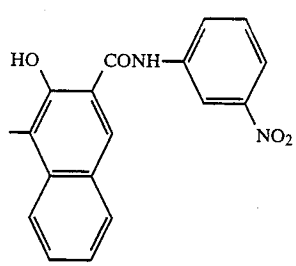 | $OCH_3$ | H | H | H |

-continued
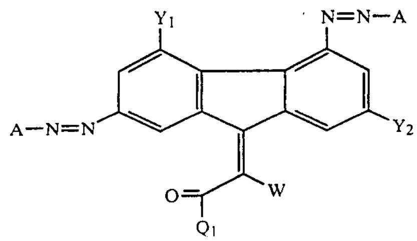
| Compound No. | A | $Q_1$ | W | $Y_1$ | $Y_2$ |
|---|---|---|---|---|---|
| E-(126) | 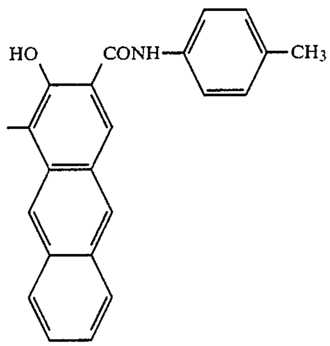 | $CH_3$ | $-C(=O)CH_3$ | H | H |
| E-(127) | 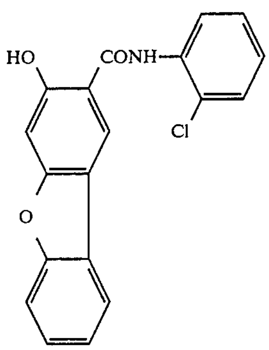 | $C_2H_5$ | $C(=O)OCH_3$ | H | H |
| E-(128) | 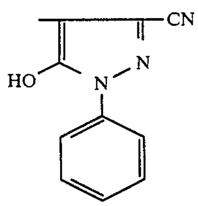 | $CH_3$ | $-C(=O)CH_3$ | H | $CH_3$ |
| E-(129) | 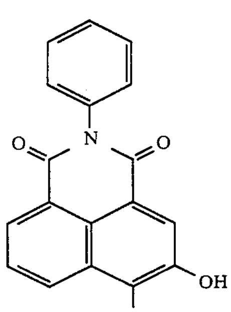 | 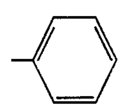 | 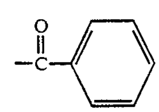 | H | H |

-continued
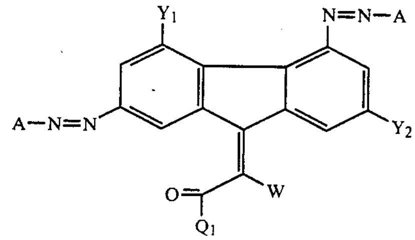
| Compound No. | A | $Q_1$ | W | $Y_1$ | $Y_2$ |
|---|---|---|---|---|---|
| E-(130) | 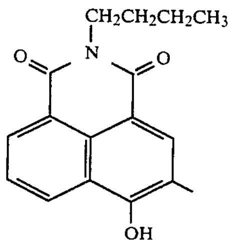 | $CH_3$ | $-\overset{\overset{O}{\parallel}}{C}OCH_3$ | H | H |
Others:
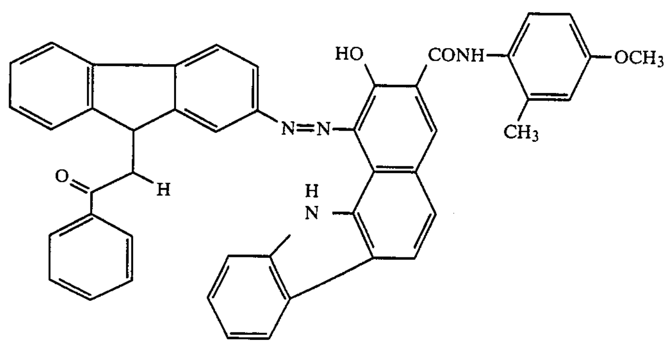
E-(131)
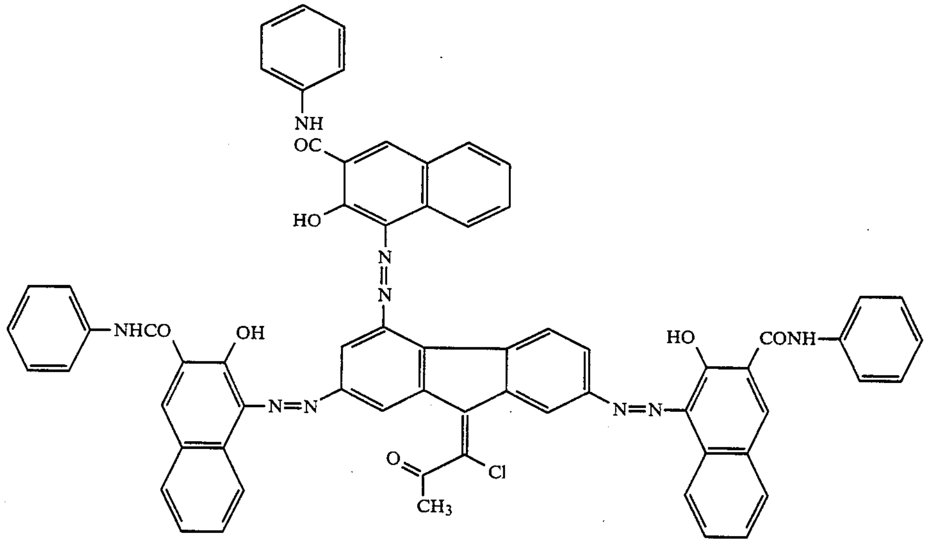
E-(132)

-continued

E-(133)

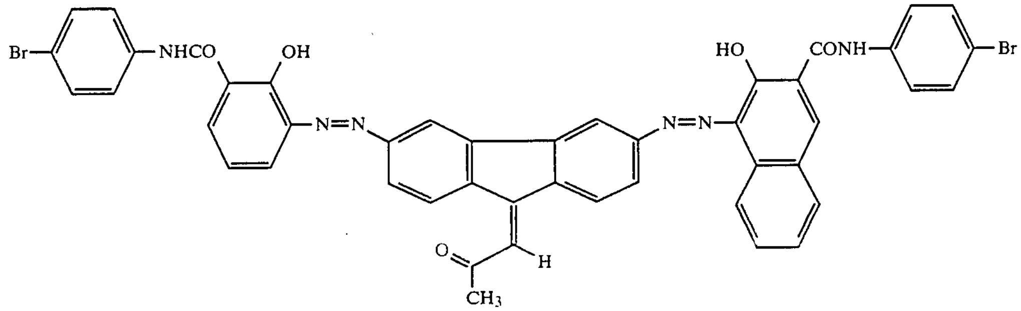

E-(134)

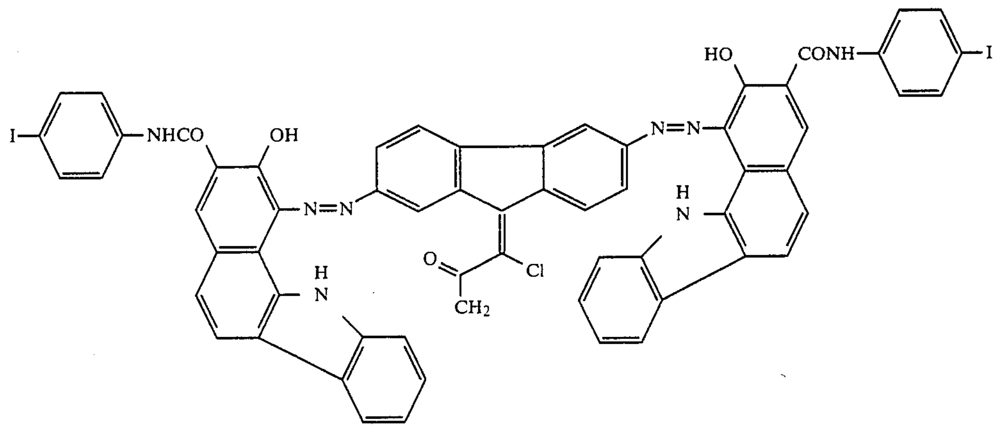

The azo compounds as set forth above can be synthesized easily according to the known method. A typical example is shown below.

EMBODIMENT F

This embodiment is represented by the following formula [IF]:

[IF]

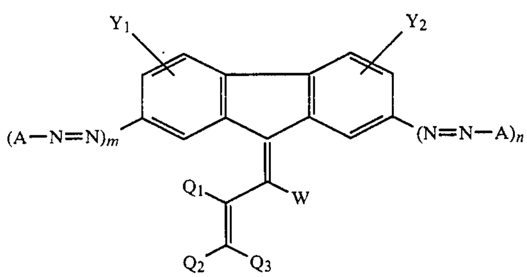

wherein $Q_1$, $Q_2$, $Q_3$, $Y_1$, $Y_2$, m, n and A are the same as defined in the above formula [I] and W is the same as defined in the above formula [ID].

Of the Embodiment F represented by the above formula [IF], particularly preferable compounds with respect to sensitivity and stability to heat and light have the structure as represented by the formula [IF]-II shown below:

[IF]-II

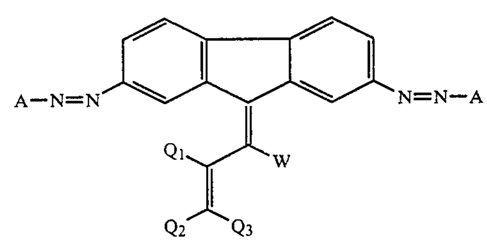

wherein $Q_1$, $Q_2$, $Q_3$, W, $Y_1$, $Y_2$ and A are the same as defined in the above formula [ID].

Specific examples of useful azo compounds represented by the above formula [IF] may include, for example, those having the following formula:

Those having the following formula [IF]-III:

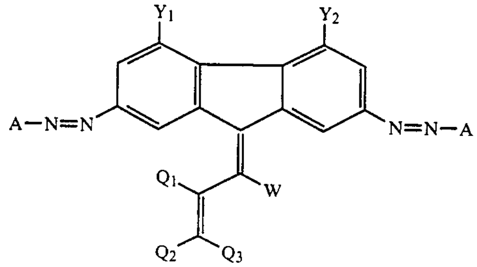
| Compound No. | A | Q1 | Q2 | Q3 | W | Y1 | Y2 |
|---|---|---|---|---|---|---|---|
| F-(1) | 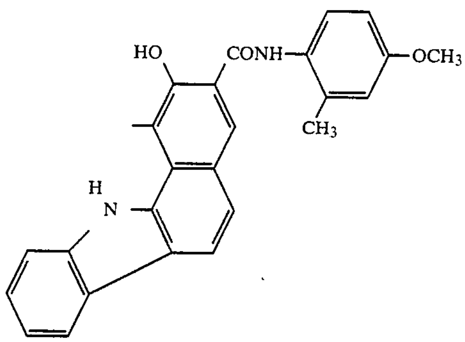 | H | H | H | H | H | H |
| F-(2) | 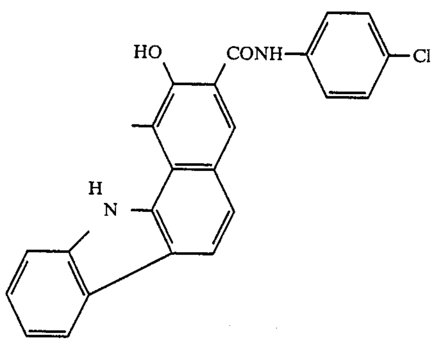 | H | 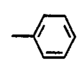 | H | H | H | H |
| F-(3) | 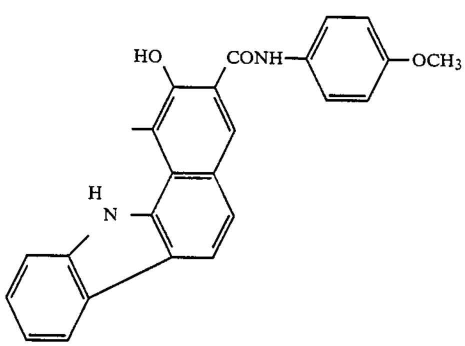 | 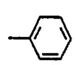 | 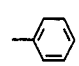 | H | H | H | H |
| F-(4) | ″ | H | $CO_2CH_3$ | H | Cl | H | H |

-continued
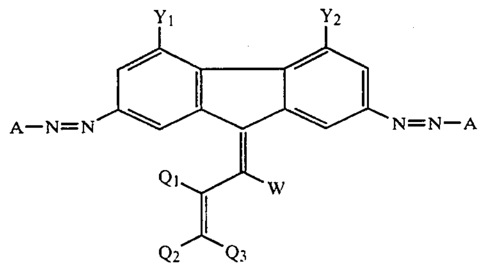
| Compound No. | A | $Q_1$ | $Q_2$ | $Q_3$ | W | $Y_1$ | $Y_2$ |
|---|---|---|---|---|---|---|---|
| F-(5) | 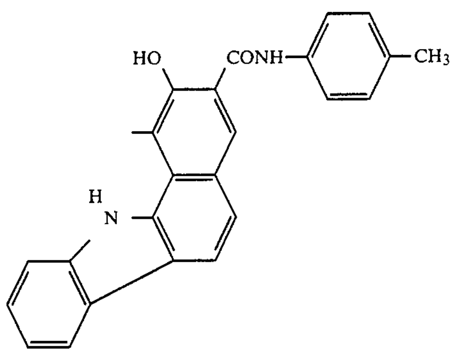 | H | H | H | H | H | H |
| F-(6) | 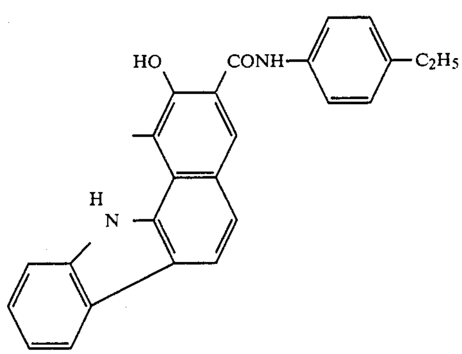 | H | $CH{=}CH{-}CH_2$ | H | H | H | H |
| F-(7) | 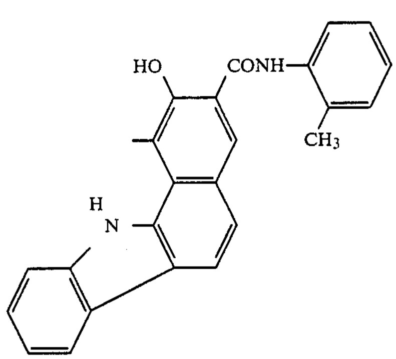 | H | $CO_2CH_3$ | $CH_3$ | H | H | H |

-continued
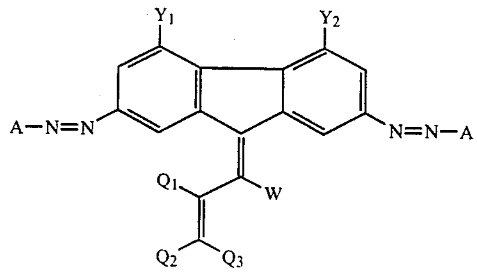
| Compound No. | A | $Q_1$ | $Q_2$ | $Q_3$ | W | $Y_1$ | $Y_2$ |
|---|---|---|---|---|---|---|---|
| F-(8) | 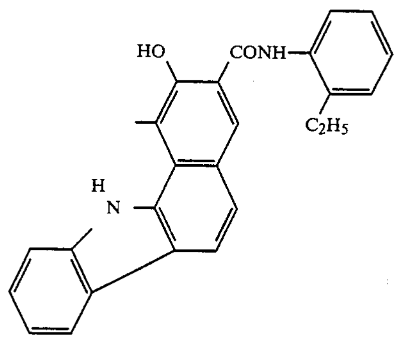 | H | $-CH_2N(CH_3)_2$ | H | H | H | H |
| F-(9) | 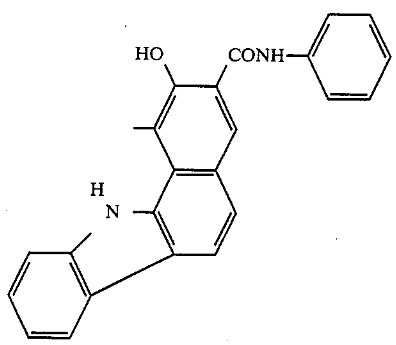 | H | $-NH-C_4H_9-n$ | $CH_3$ | H | H | H |
| F-(10) | 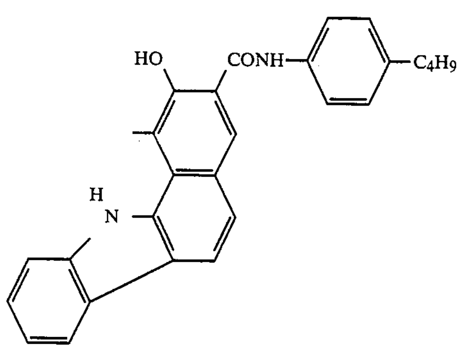 | H | $-OC_2H_5$ | H | H | H | H |

-continued
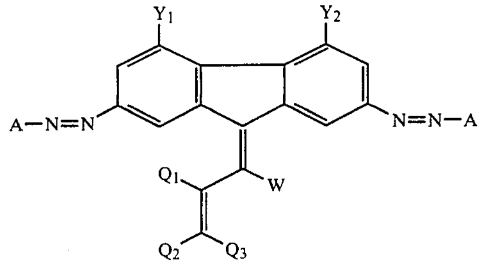
| Compound No. | A | $Q_1$ | $Q_2$ | $Q_3$ | W | $Y_1$ | $Y_2$ |
|---|---|---|---|---|---|---|---|
| F-(11) | 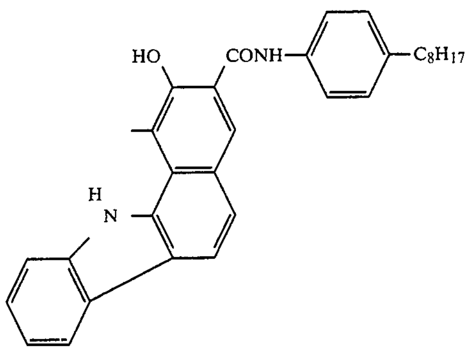 | H | H | H | H | H | H |
| F-(12) | 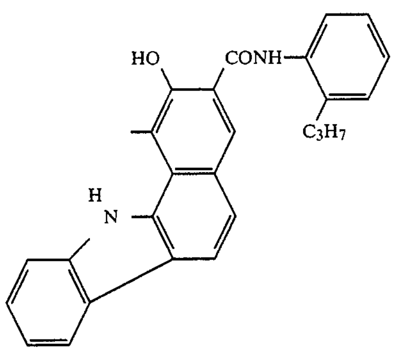 | H | Cl | $CH_3$ | H | H | H |
| F-(13) | 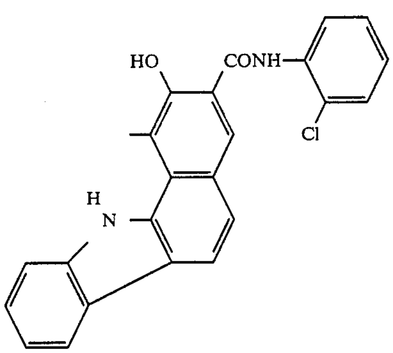 | H | H | H | H | H | H |

-continued
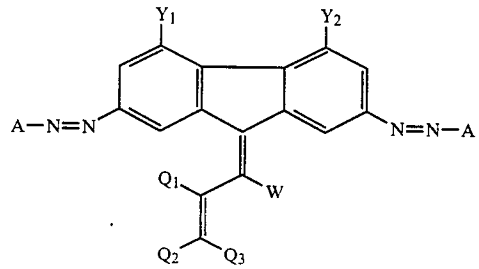
| Compound No. | A | $Q_1$ | $Q_2$ | $Q_3$ | W | $Y_1$ | $Y_2$ |
|---|---|---|---|---|---|---|---|
| F-(14) | 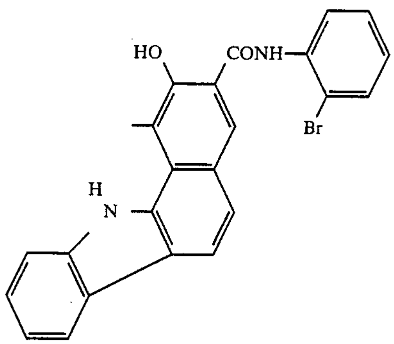 | H | $CH{=}CH{-}CH_3$ | H | H | H | H |
| F-(15) | 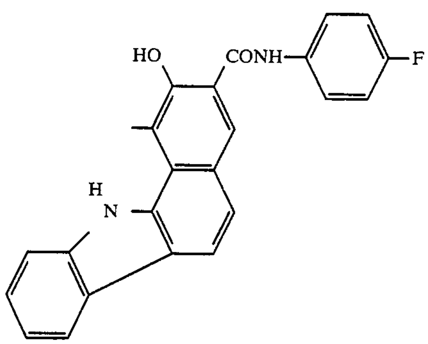 | H | 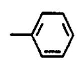 | H | H | H | H |
| F-(16) | 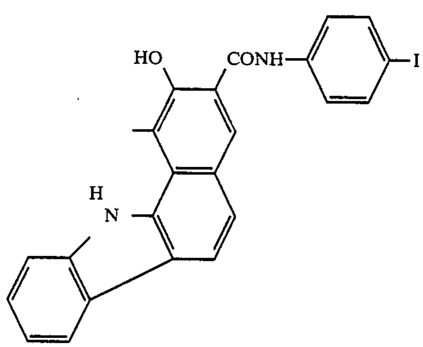 | 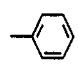 | 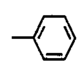 | H | H | H | H |

-continued
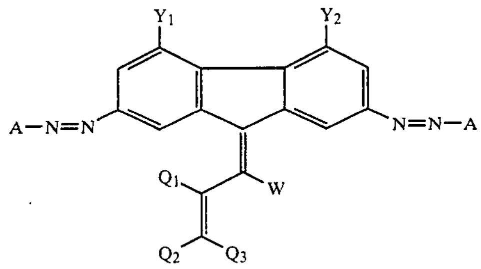
| Compound No. | A | $Q_1$ | $Q_2$ | $Q_3$ | W | $Y_1$ | $Y_2$ |
|---|---|---|---|---|---|---|---|
| F-(17) | 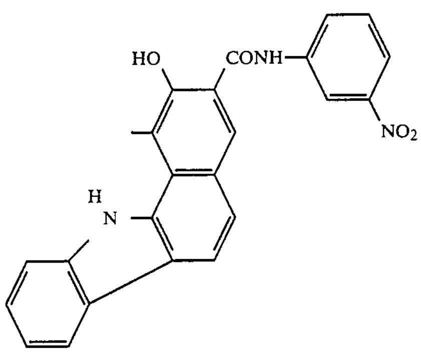 | H | H | $CH_3$ | H | H | $CH_3$ |
| F-(18) | 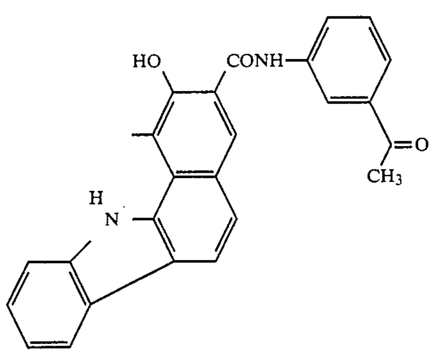 | H | H | H | H | $OCH_3$ | H |
| F-(19) | 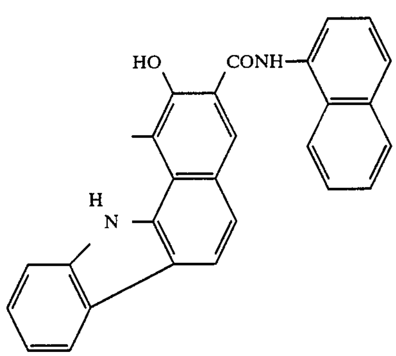 | H | H | H | H | H | H |

-continued
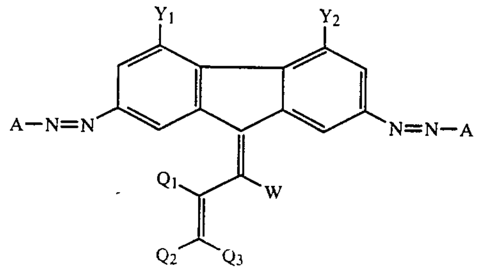
| Compound No. | A | $Q_1$ | $Q_2$ | $Q_3$ | W | $Y_1$ | $Y_2$ |
|---|---|---|---|---|---|---|---|
| F-(20) | 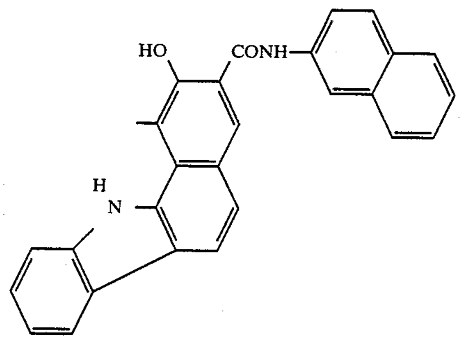 | H | $CO_2CH_3$ | H | H | H | H |
| F-(21) | 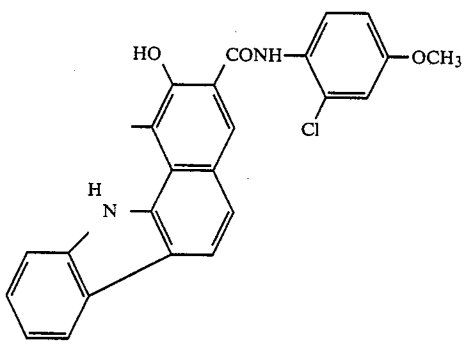 | H | $CO_2CH_3$ | $CH_3$ | H | H | OH |
| F-(22) | 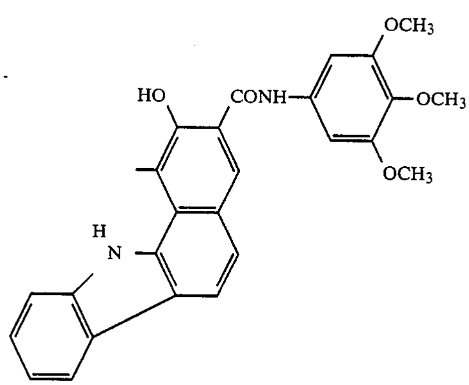 | H | H | H | Cl | H | H |
| F-(23) | " | H | $-CH_2N(CH_3)_2$ | H | $CH_3$ | H | H |

-continued
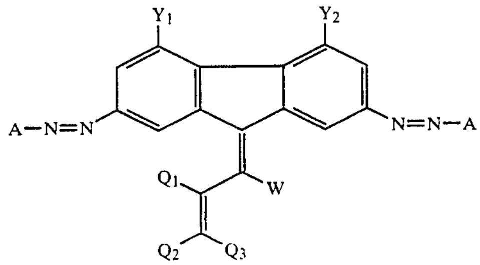
| Compound No. | A | $Q_1$ | $Q_2$ | $Q_3$ | W | $Y_1$ | $Y_2$ |
|---|---|---|---|---|---|---|---|
| F-(24) | 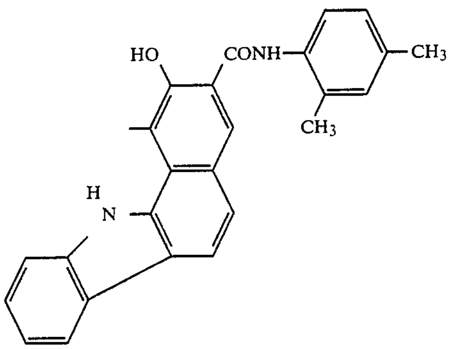 | Cl | Cl | Cl | Cl | H | H |
| F-(25) | 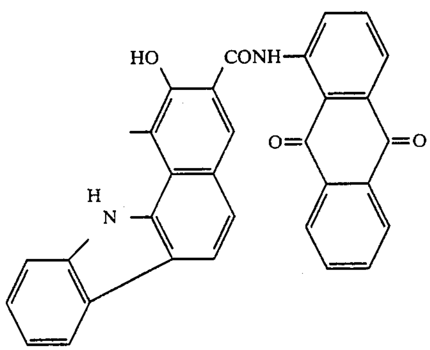 | H | H | H | $\overset{O}{\parallel}$ C—$CH_3$ | H | H |
| F-(26) | 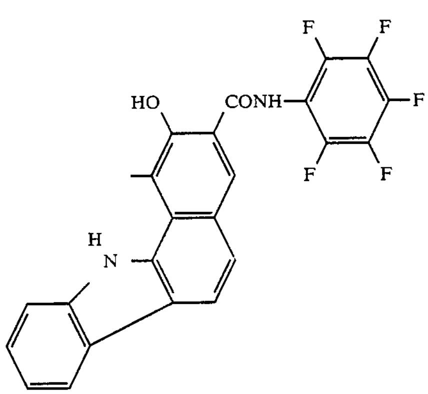 | H | H | H | CH=$CH_2$ | H | H |
| F-(27) | " | H | H | H | $\overset{O}{\parallel}$ $COC_2H_5$ | H | H |

-continued
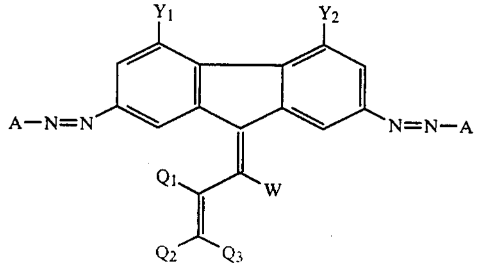
| Compound No. | A | $Q_1$ | $Q_2$ | $Q_3$ | W | $Y_1$ | $Y_2$ |
|---|---|---|---|---|---|---|---|
| F-(28) | 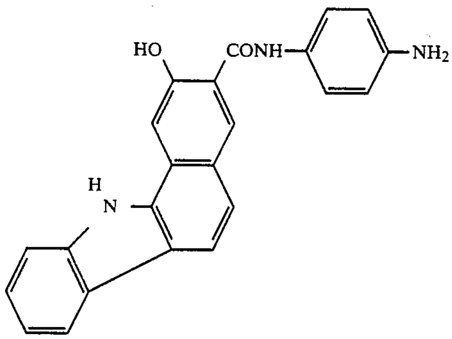 | H | H | H | H | H | Cl |
| F-(29) | 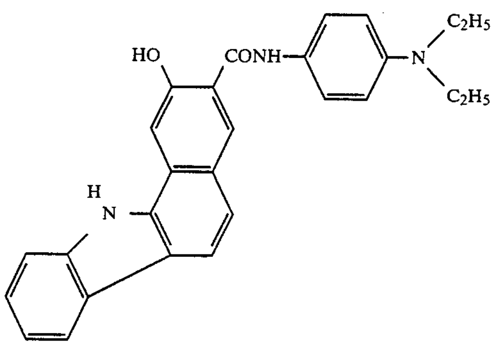 | H | $CH{=}CH_2$ | H | H | H | H |
| F-(30) | 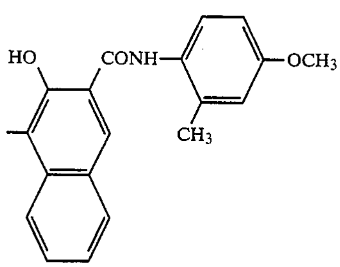 | H | $CH{=}CH{-}CH_3$ | H | H | H | H |
| F-(31) | 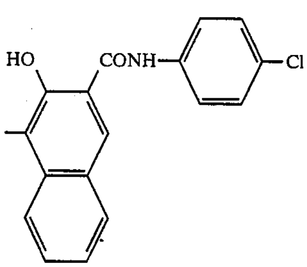 | H | 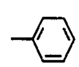 | H | H | H | H |

-continued
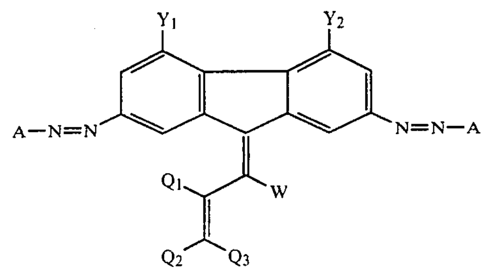
| Compound No. | A | $Q_1$ | $Q_2$ | $Q_3$ | W | $Y_1$ | $Y_2$ |
|---|---|---|---|---|---|---|---|
| F-(32) | 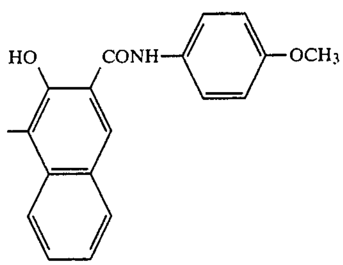 | H | H | H | H | H | H |
| F-(33) | 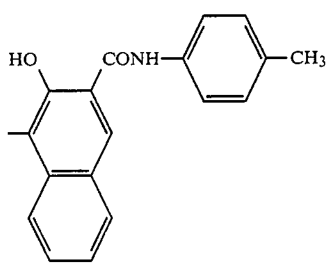 | H | $-OC_2H_5$ | H | H | H | H |
| F-(34) | 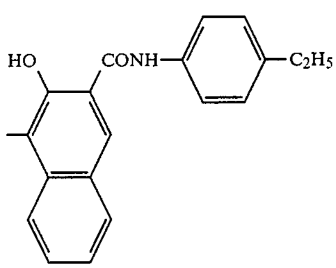 | H | $-OCH_3$ | H | H | H | H |
| F-(35) | 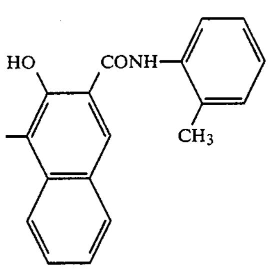 | H | H | H | H | H | H |

-continued
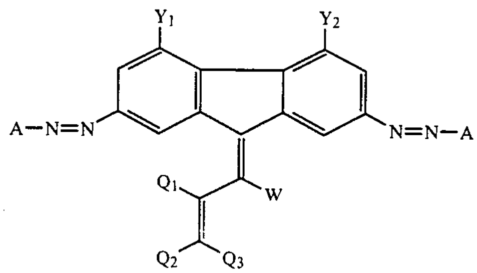
| Compound No. | A | $Q_1$ | $Q_2$ | $Q_3$ | W | $Y_1$ | $Y_2$ |
|---|---|---|---|---|---|---|---|
| F-(36) | 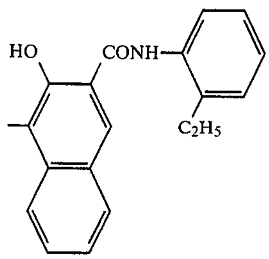 | H | $-OCH_3$ | H | H | H | H |
| F-(37) | 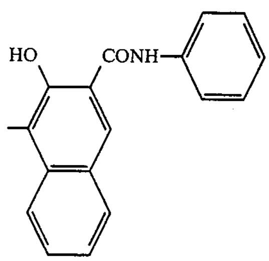 | H | $-OC_2H_5$ | H | H | H | H |
| F-(38) | 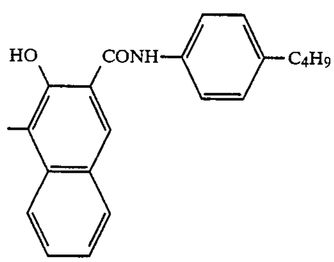 | H | Cl | $CH_3$ | H | H | H |
| F-(39) | 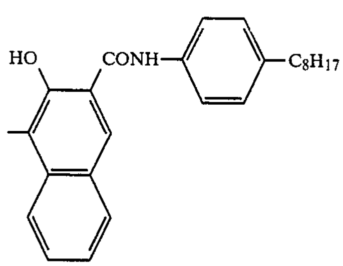 | H | 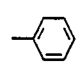 | H | H | H | H |

-continued
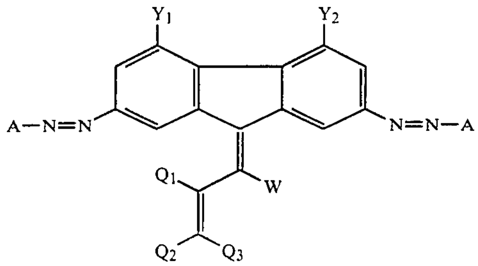
| Compound No. | A | $Q_1$ | $Q_2$ | $Q_3$ | W | $Y_1$ | $Y_2$ |
|---|---|---|---|---|---|---|---|
| F-(40) | 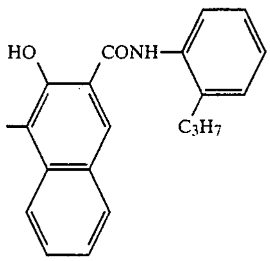 | H | H | H | H | H | H |
| F-(41) | 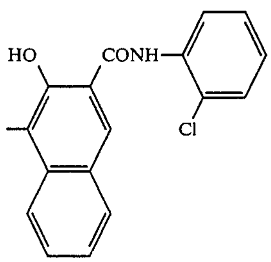 | H | $CH=CH-CH_3$ | H | H | H | H |
| F-(42) | 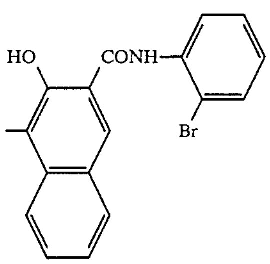 | H | H | H | H | H | $CH_3$ |
| F-(43) | " | H | H | H | Cl | H | $CH_3$ |
| F-(44) | 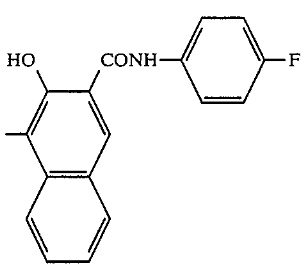 | 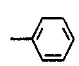 | 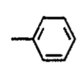 | H | H | H | H |

-continued
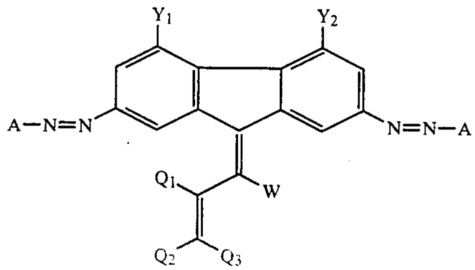
| Compound No. | A | $Q_1$ | $Q_2$ | $Q_3$ | W | $Y_1$ | $Y_2$ |
|---|---|---|---|---|---|---|---|
| F-(45) | 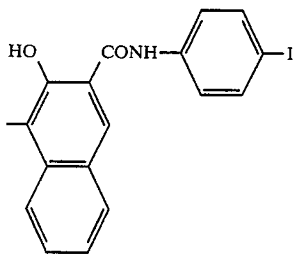 | 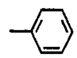 | 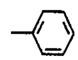 | H | H | H | H |
| F-(46) | 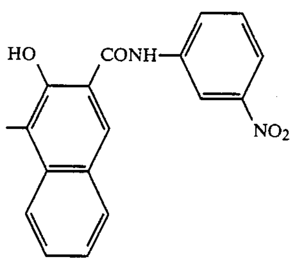 | H | H | H | 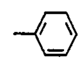 | H | Cl |
| F-(47) | " | H | 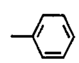 | H | H | H | Cl |
| F-(48) | 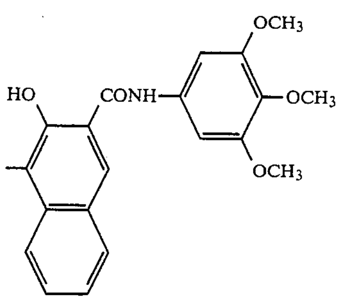 | H | $CH=CH_2$ | H | $C_2H_5$ | H | H |
| F-(49) | " | H | $CH_3$ | $CH_3$ | $CH_3$ | H | H |
| F-(50) | 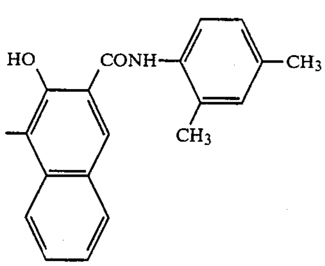 | Cl | $CH_3$ | Cl | H | H | H |

-continued
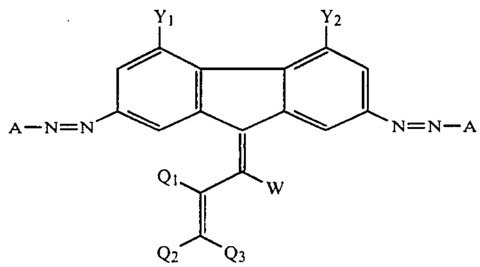
| Compound No. | A | $Q_1$ | $Q_2$ | $Q_3$ | W | $Y_1$ | $Y_2$ |
|---|---|---|---|---|---|---|---|
| F-(51) | 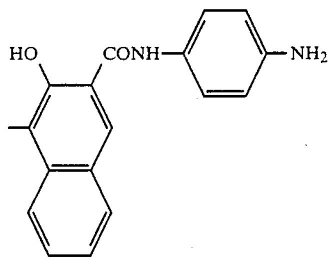 | Cl | Cl | Cl | Cl | Cl | Cl |
| F-(52) | 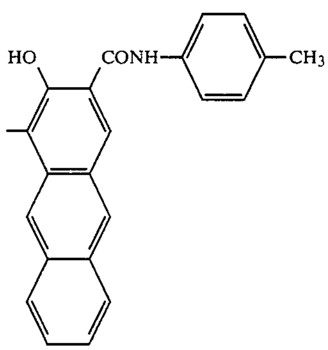 | H | H | H | 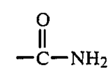 | H | H |
| F-(53) | " | H | H | H | $-SO_2CH_3$ | H | H |
| F-(54) | 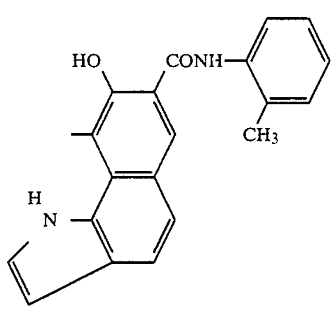 | H | $OCH_3$ | H | H | H | CN |
| F-(55) | " | H | H | H | H | H | H |

-continued
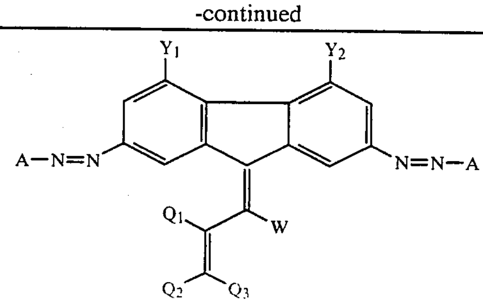
| Compound No. | A | $Q_1$ | $Q_2$ | $Q_3$ | W | $Y_1$ | $Y_2$ |
|---|---|---|---|---|---|---|---|
| F-(56) | 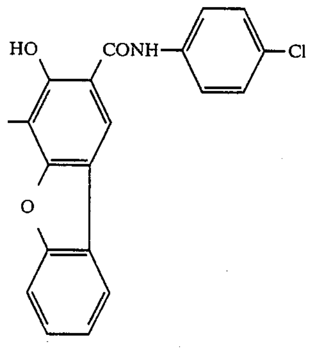 | H | OH | H | H | H | H |
| F-(57) | 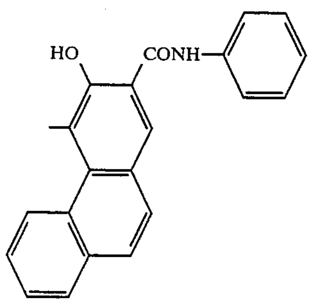 | H | 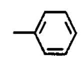 | H | H | H | H |
| F-(58) | 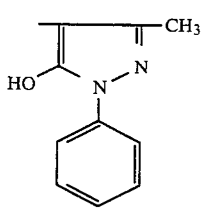 | H | H | H | H | H | H |
| F-(59) | 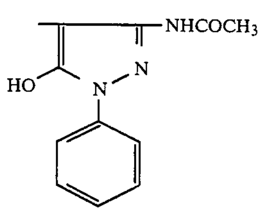 | H | $-CH=CH-CH_3$ | H | H | H | H |
| F-(60) | 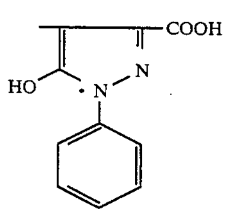 | H | $-OCH_3$ | H | H | H | H |

-continued
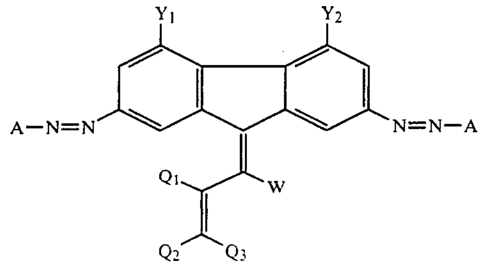
| Compound No. | A | Q1 | Q2 | Q3 | W | Y1 | Y2 |
|---|---|---|---|---|---|---|---|
| F-(61) | 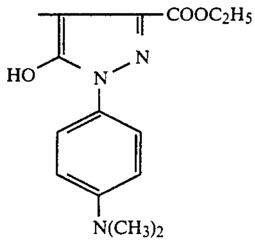 | H | $-CO_2C_2H_5$ | H | H | H | H |
| F-(62) | 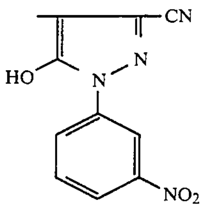 | H | H | H | H | H | H |
| F-(63) | 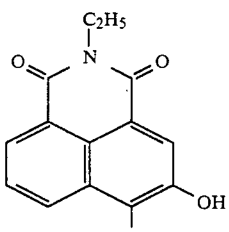 | H | H | H | H | H | H |
| F-(64) | 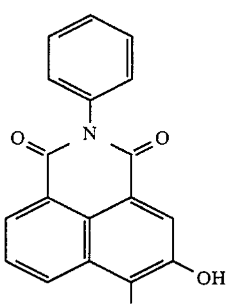 | H | $-NH-C_4H_9-n$ | H | H | H | H |
| F-(65) | 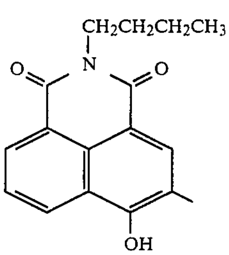 | H | $-OC_2H_5$ | H | H | H | H |

-continued
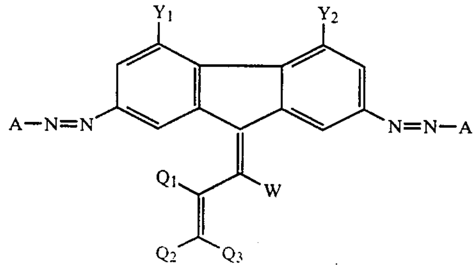
| Compound No. | A | $Q_1$ | $Q_2$ | $Q_3$ | W | $Y_1$ | $Y_2$ |
|---|---|---|---|---|---|---|---|
| F-(66) | 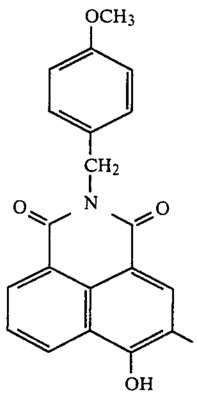 | H | 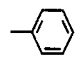 | H | H | H | H |
| F-(67) | 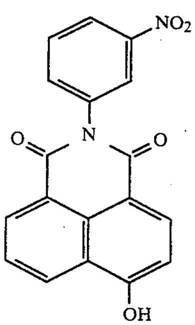 | H | H | H | H | H | H |
Those having the formula [IF]-IV:

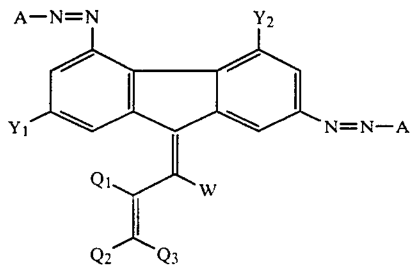
| compound No. | A | $Q_1$ | $Q_2$ | $Q_3$ | W | $Y_1$ | $Y_2$ |
|---|---|---|---|---|---|---|---|
| F-(68) | 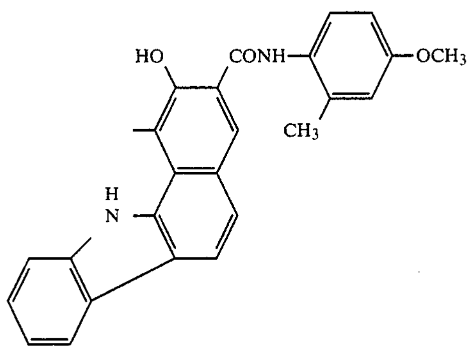 | H | H | H | H | H | H |
| F-(69) | 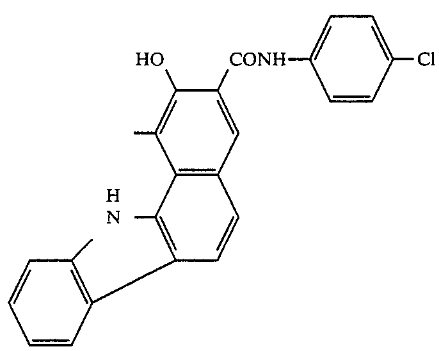 | H | 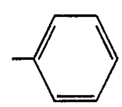 | H | H | H | H |
| F-(70) | 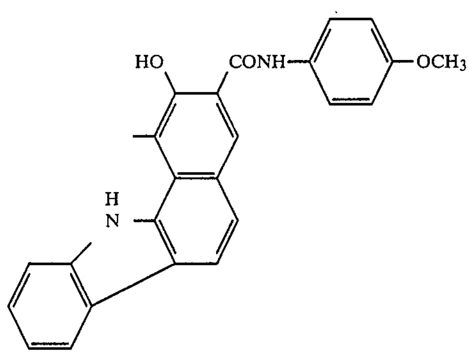 | H | H | H | Cl | H | H |

-continued
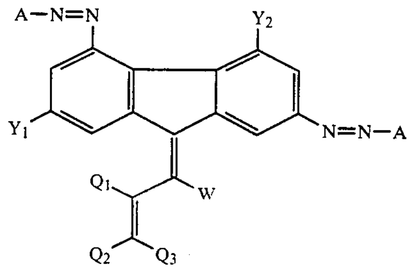
| compound No. | A | $Q_1$ | $Q_2$ | $Q_3$ | W | $Y_1$ | $Y_2$ |
|---|---|---|---|---|---|---|---|
| F-(71) | 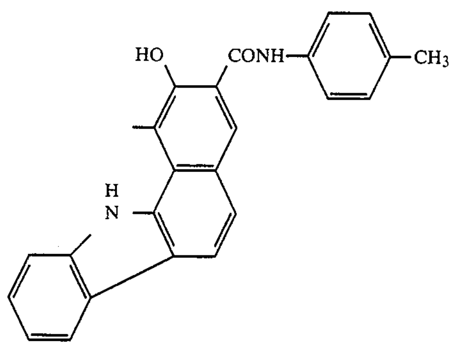 | H | H | H | H | H | H |
| F-(72) | 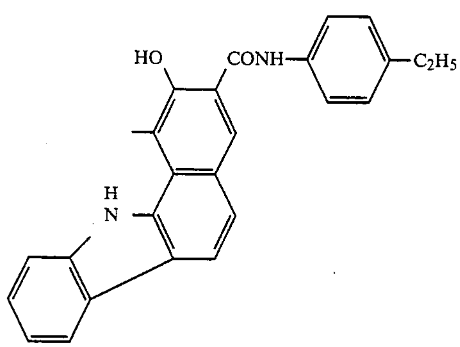 | H | Cl | $CH_3$ | H | H | H |
| F-(73) | 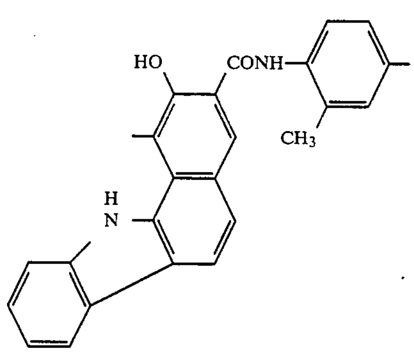 | 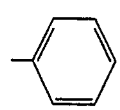 | 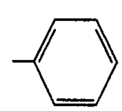 | H | H | H | H |

-continued
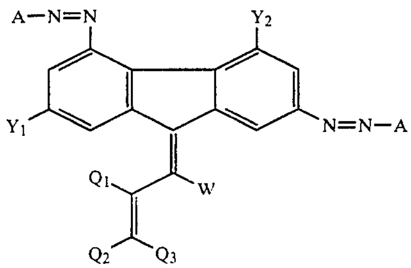
| compound No. | A | $Q_1$ | $Q_2$ | $Q_3$ | W | $Y_1$ | $Y_2$ |
|---|---|---|---|---|---|---|---|
| F-(74) | 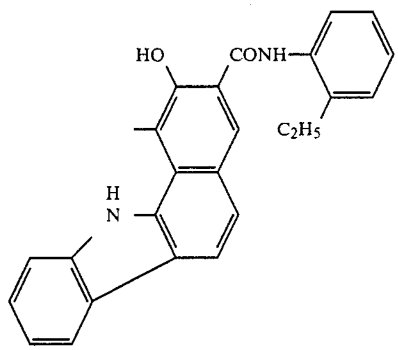 | H | $CO_2C_2H_5$ | H | H | H | H |
| F-(75) | 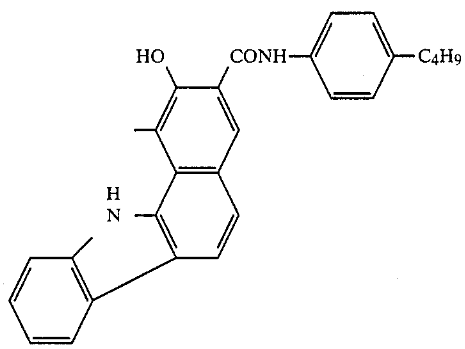 | H | H | H | H | H | H |
| F-(76) | 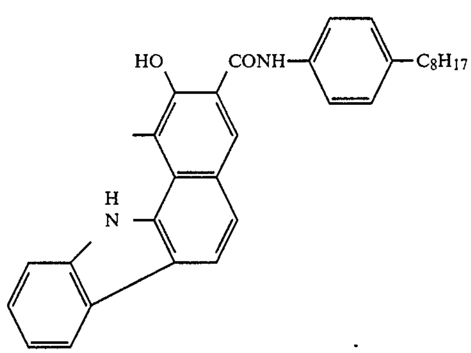 | H | 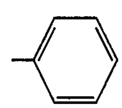 | H | H | H | H |

-continued
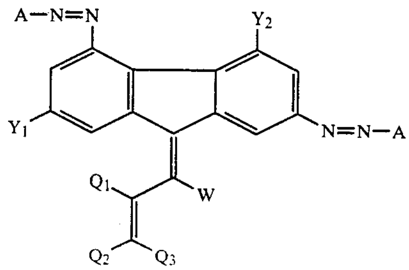
| compound No. | A | $Q_1$ | $Q_2$ | $Q_3$ | W | $Y_1$ | $Y_2$ |
|---|---|---|---|---|---|---|---|
| F-(77) | 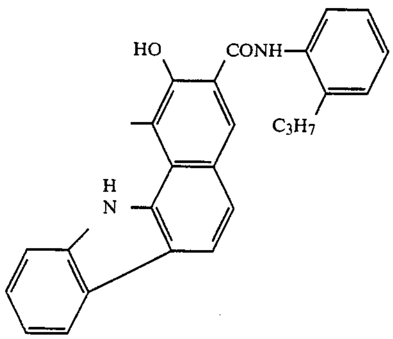 | H | 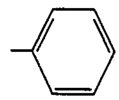 | H | H | H | H |
| F-(78) | 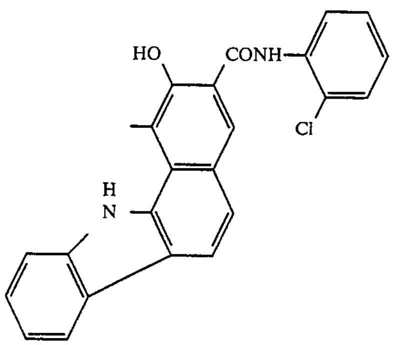 | H | 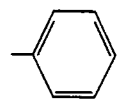 | H | H | H | H |
| F-(79) | 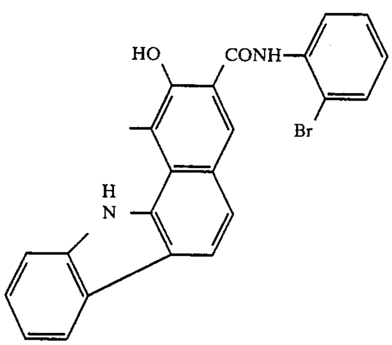 | H | 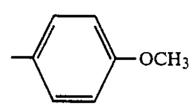 | H | H | H | H |
| F-(80) | 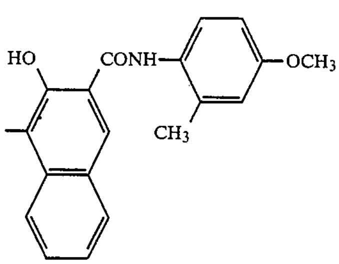 | H | H | H | H | H | H |

-continued
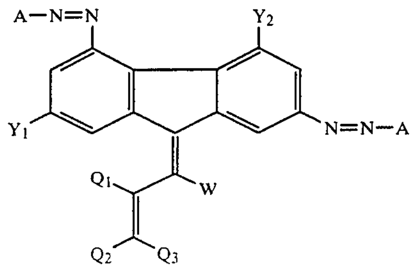
| compound No. | A | $Q_1$ | $Q_2$ | $Q_3$ | W | $Y_1$ | $Y_2$ |
|---|---|---|---|---|---|---|---|
| F-(81) | 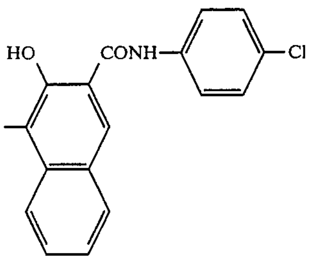 | H | $CH{=}CH{-}CH_3$ | H | H | H | H |
| F-(82) | 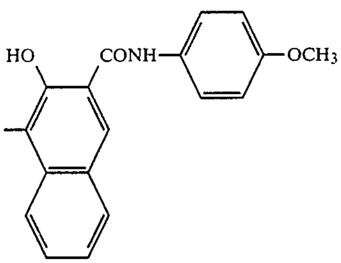 | H | $-OC_2H_5$ | H | H | H | H |
| F-(83) | 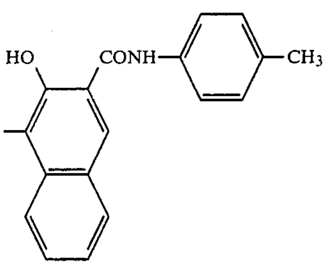 | H | $-OC_2H_5$ | H | H | H | H |
| F-(84) | 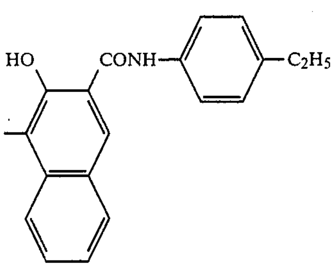 | H | $-OC_2H_5$ | H | H | H | H |
| F-(85) | 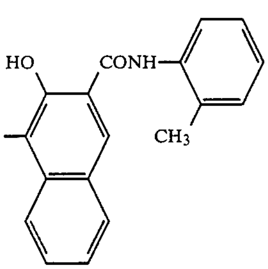 | H | H | H | H | H | H |

-continued
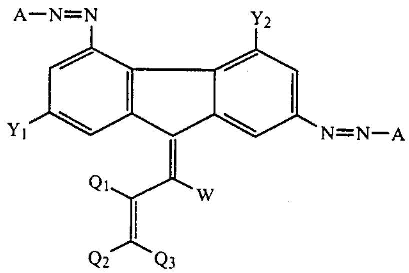
| compound No. | A | Q1 | Q2 | Q3 | W | Y1 | Y2 |
|---|---|---|---|---|---|---|---|
| F-(86) | 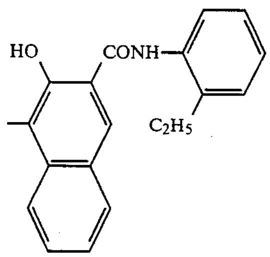 | H | 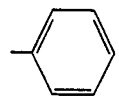 | H | H | H | H |
| F-(87) | 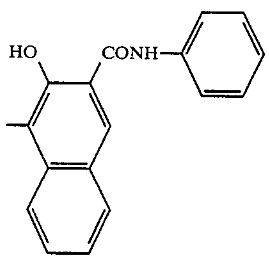 | H | $CH_3$ | $CH_3$ | H | H | H |
| F-(88) | 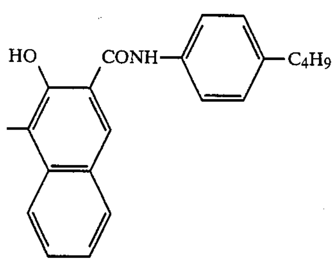 | H | Cl | $CH_3$ | H | H | H |
| F-(89) | 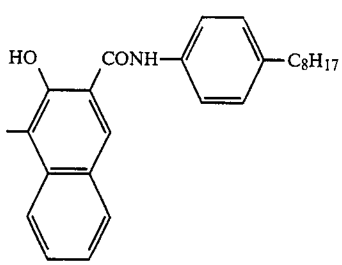 | H | Br | $CH_3$ | H | H | H |

-continued
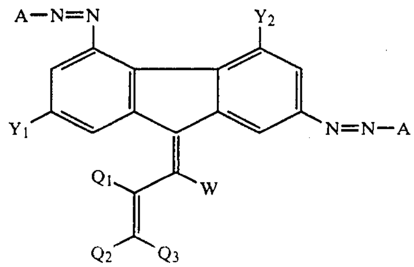
| compound No. | A | $Q_1$ | $Q_2$ | $Q_3$ | W | $Y_1$ | $Y_2$ |
|---|---|---|---|---|---|---|---|
| F-(90) | 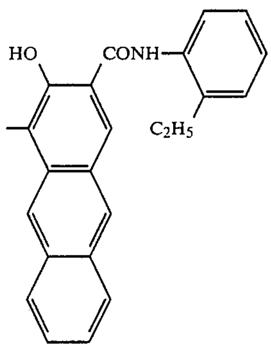 | H | H | H | $-\overset{\overset{\large O}{\|\|}}{C}-NH_2$ | H | H |
| F-(91) | " | H | $CO_2C_2H_5$ | H | $-SO_2CH_3$ | H | H |
| F-(92) | 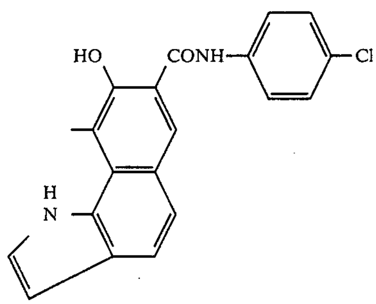 | H | $CO_2C_2H_5$ | H | H | H | H |
| F-(93) | 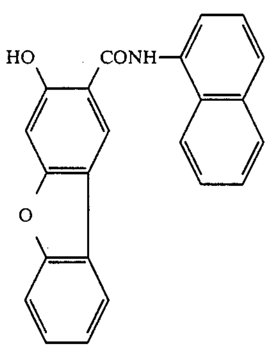 | H | $CO_2C_2H_5$ | H | H | H | H |
| F-(94) | 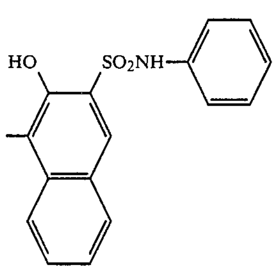 | H | H | H | H | H | H |

-continued
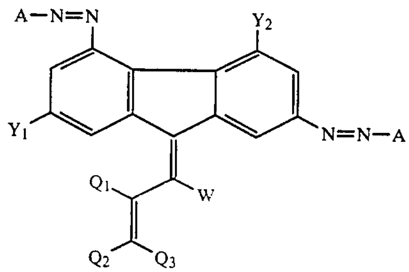
| compound No. | A | Q1 | Q2 | Q3 | W | Y1 | Y2 |
|---|---|---|---|---|---|---|---|
| F-(95) | 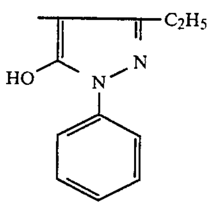 | H | H | H | H | H | H |
| F-(96) | 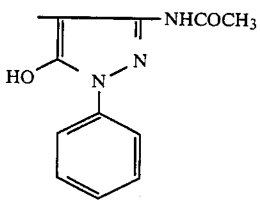 | H | H | H | H | H | H |
| F-(97) | 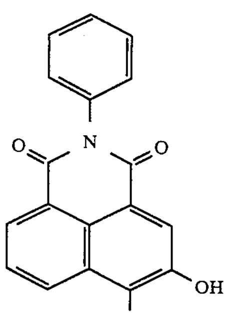 | H | 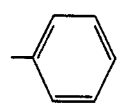 | H | H | H | H |
| F-(98) | 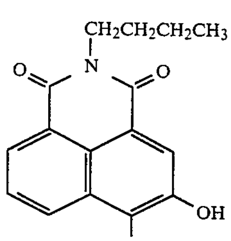 | H | —CH=CH2 | H | H | H | H |

-continued
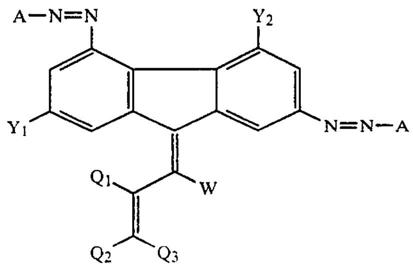
| compound No. | A | Q1 | Q2 | Q3 | W | Y1 | Y2 |
|---|---|---|---|---|---|---|---|
| F-(99) | 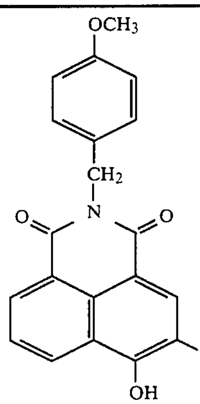 | H | $-OCH_3$ | H | H | H | H |
Those having the following formula [IF]-V:
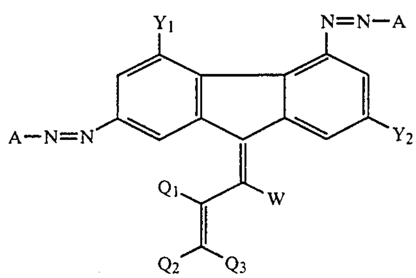
| Compound No. | A | Q1 | Q2 | Q3 | W | Y1 | Y2 |
|---|---|---|---|---|---|---|---|
| F-(100) | 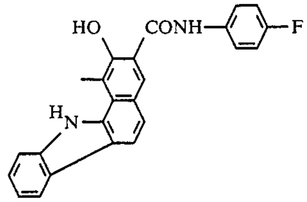 | H | H | H | H | H | H |
| F-(101) | 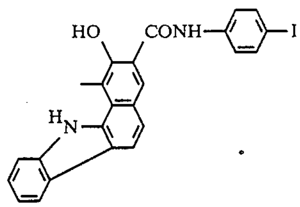 | 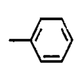 | 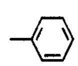 | H | H | H | H |

-continued
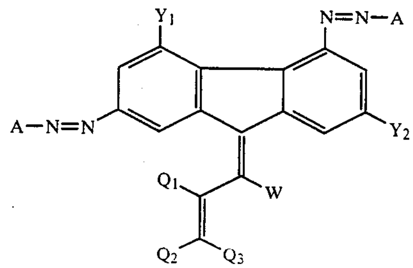
| Compound No. | A | $Q_1$ | $Q_2$ | $Q_3$ | W | $Y_1$ | $Y_2$ |
|---|---|---|---|---|---|---|---|
| F-(102) | 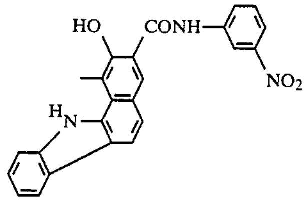 | 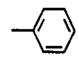 | 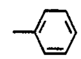 | H | H | $CH_3$ | H |
| F-(103) | 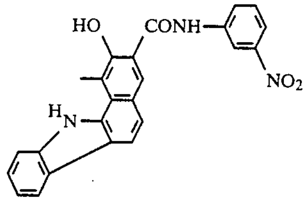 | 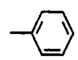 | 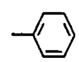 | H | Cl | $CH_3$ | H |
| F-(104) | 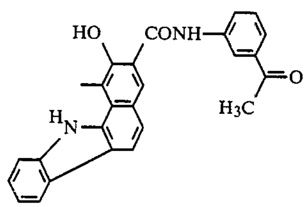 | H | H | H | H | H | H |
| F-(105) | 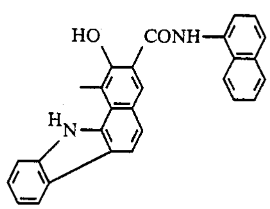 | H | $CH{=}CH{-}CH_3$ | H | H | H | H |
| F-(106) | 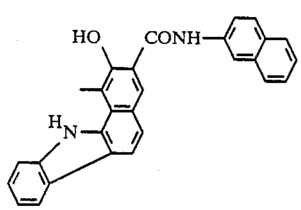 | H | $CH{=}CH{-}CH_3$ | H | H | H | H |
| F-(107) | 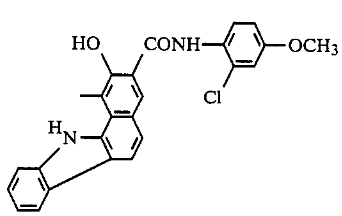 | H | CH=CH— 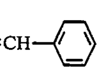 | H | H | OH | H |

-continued
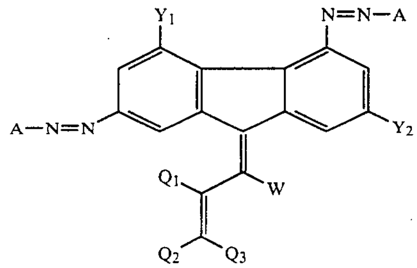
| Compound No. | A | $Q_1$ | $Q_2$ | $Q_3$ | W | $Y_1$ | $Y_2$ |
|---|---|---|---|---|---|---|---|
| F-(108) | 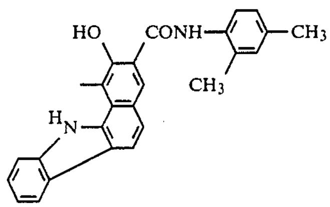 | Cl | Cl | Cl | Cl | H | H |
| F-(109) | 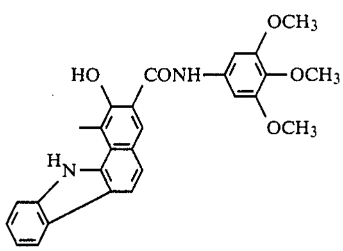 | H | H | H | $\overset{O}{\overset{\parallel}{C}}OCH_3$ | H | H |
| F-(110) | 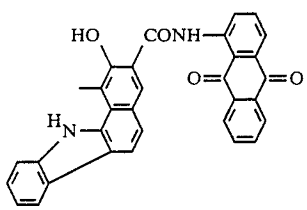 | H | H | H | H | H | H |
| F-(111) | 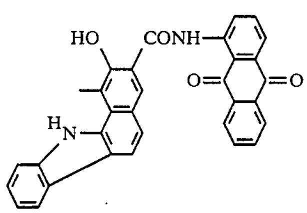 | H | H | H | Cl | H | Cl |
| F-(112) | 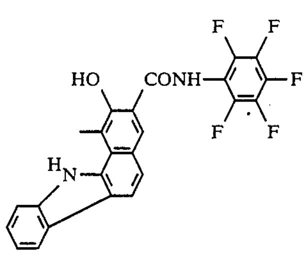 | H | H | H | H | H | H |

-continued
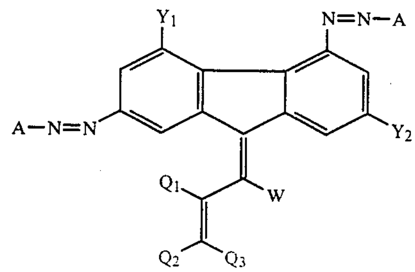
| Compound No. | A | $Q_1$ | $Q_2$ | $Q_3$ | W | $Y_1$ | $Y_2$ |
|---|---|---|---|---|---|---|---|
| F-(113) | 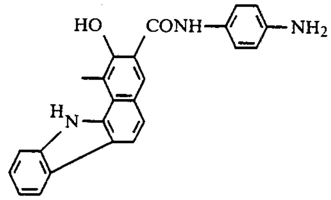 | H | $CH{=}CH_2$ | H | H | H | H |
| F-(114) | 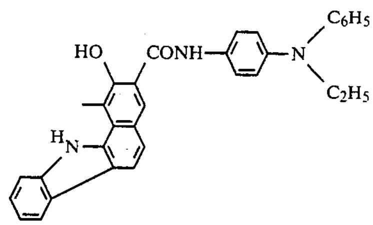 | H | 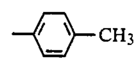 | H | 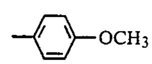 | H | H |
| F-(115) | 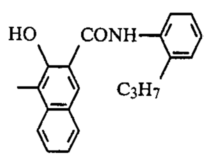 | H | H | H | H | H | H |
| F-(116) | 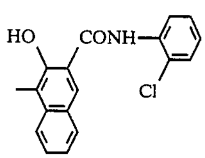 | H | $CH_3$ | $CH_3$ | H | H | H |
| F-(117) | 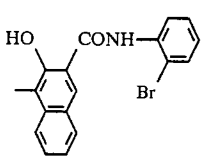 | H | $CH_3$ | $CH_3$ | H | H | H |
| F-(118) | 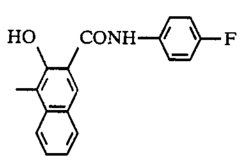 | H | $CH_3$ | $CH_3$ | H | H | H |
| F-(119) | 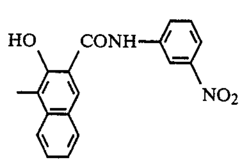 | H | H | H | 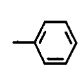 | H | Cl |

-continued
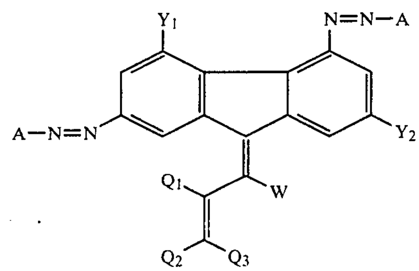
| Compound No. | A | $Q_1$ | $Q_2$ | $Q_3$ | W | $Y_1$ | $Y_2$ |
|---|---|---|---|---|---|---|---|
| F-(120) | 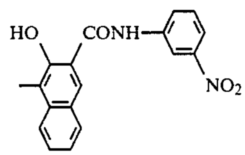 | H | 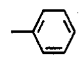 | H | H | H | Cl |
| F-(121) | 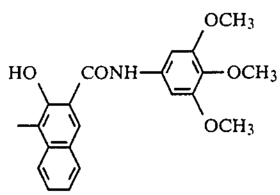 | H | $CH{=}CH_2$ | H | $C_2H_5$ | H | H |
| F-(122) | 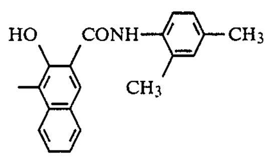 | Cl | $CH_3$ | Cl | H | H | H |
| F-(123) | 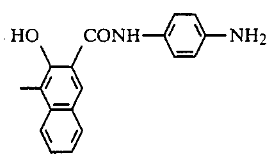 | Cl | Cl | Cl | Cl | Cl | Cl |
| F-(124) | 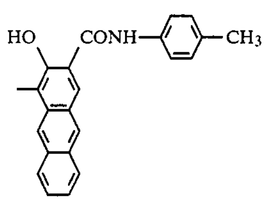 | H | H | H | $-\overset{O}{\overset{\parallel}{C}}-NH_2$ | H | H |
| F-(125) | 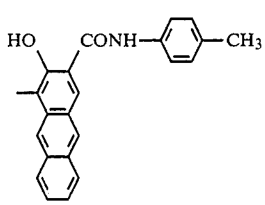 | H | H | H | H | H | H |

-continued
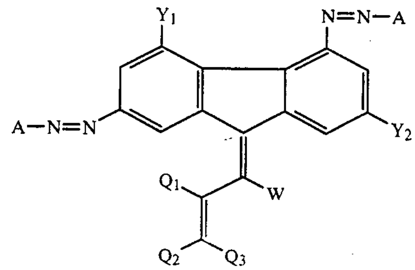
| Compound No. | A | $Q_1$ | $Q_2$ | $Q_3$ | W | $Y_1$ | $Y_2$ |
|---|---|---|---|---|---|---|---|
| F-(126) | 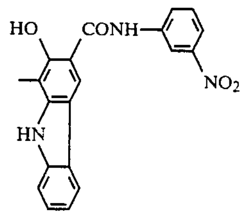 | H | $OCH_3$ | H | H | H | CN |
| F-(127) | 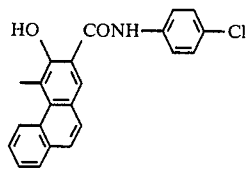 | H | $OCH_3$ | H | H | H | H |
| F-(128) | 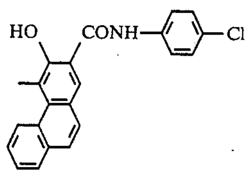 | H | $OC_2H_5$ | H | H | H | H |
| F-(129) | 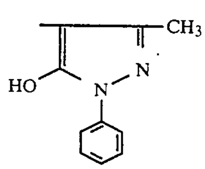 | H | $OC_2H_5$ | H | H | H | H |
| F-(130) | 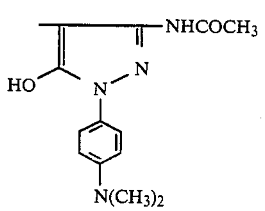 | H | H | H | Br | H | H |
| F-(131) | 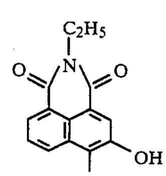 | H | 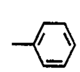 | H | H | H | H |

-continued
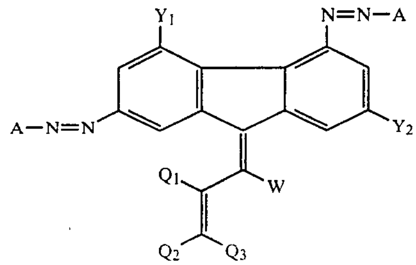
| Compound No. | A | Q1 | Q2 | Q3 | W | Y1 | Y2 |
|---|---|---|---|---|---|---|---|
| F-(132) | 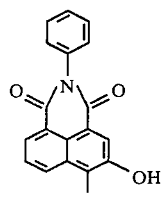 | H | 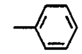 | H | H | H | H |
| F-(133) | 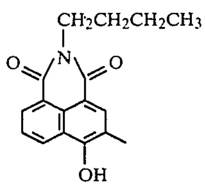 | H | 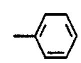 | H | H | H | H |
Those having the formula [IF]-VI:
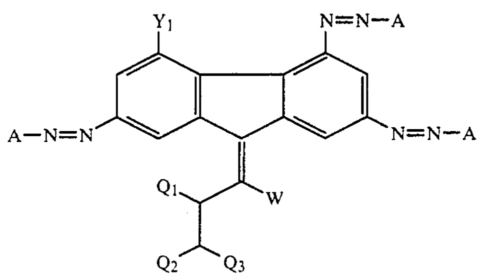
| Compound No. | A | Q1 | Q2 | Q3 | W | Y1 |
|---|---|---|---|---|---|---|
| F-(134) | 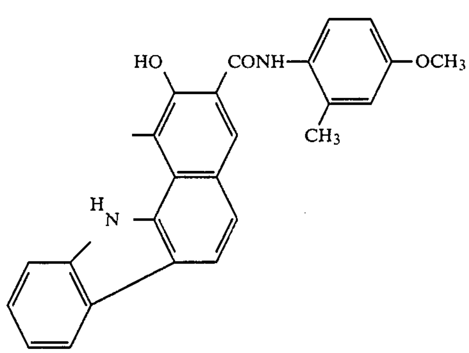 | H | H | H | H | H |

-continued
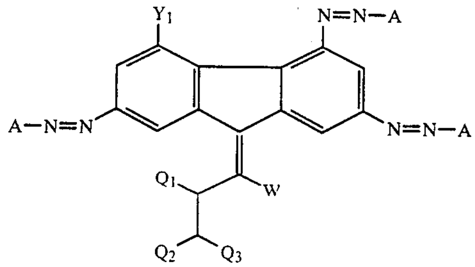
| Compound No. | A | Q1 | Q2 | Q3 | W | Y1 |
|---|---|---|---|---|---|---|
| F-(135) | 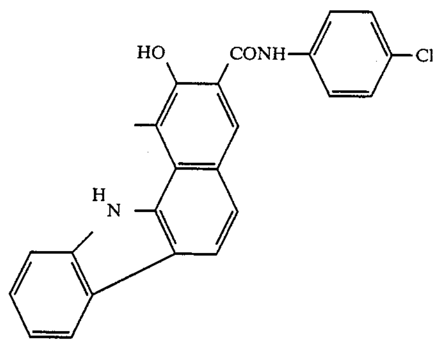 | H | 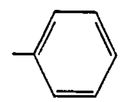 | H | H | H |
| F-(136) | 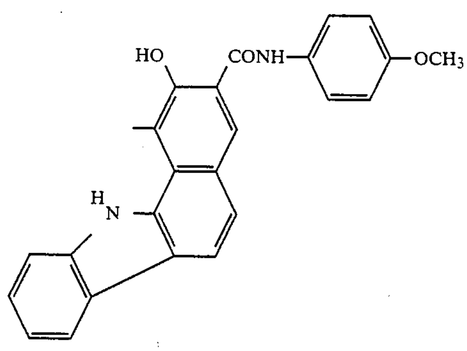 | H | 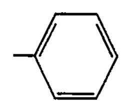 | H | H | H |
| F-(137) | 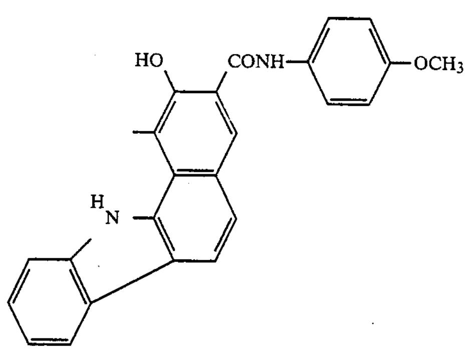 | H | 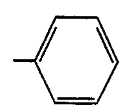 | H | Br | H |

-continued
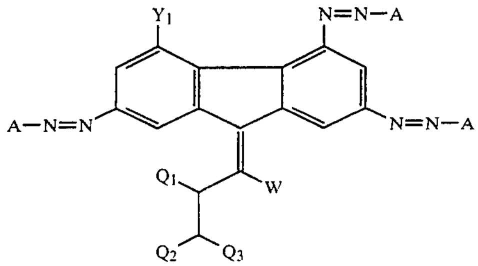
| Compound No. | A | $Q_1$ | $Q_2$ | $Q_3$ | W | $Y_1$ |
|---|---|---|---|---|---|---|
| F-(138) | 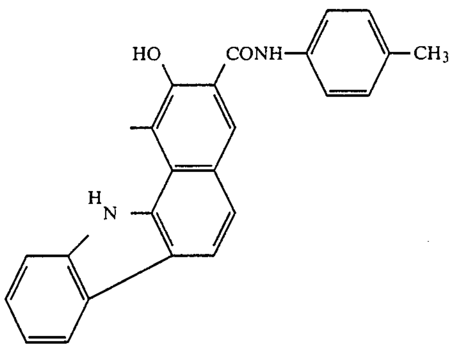 | H | H | H | H | H |
| F-(139) | 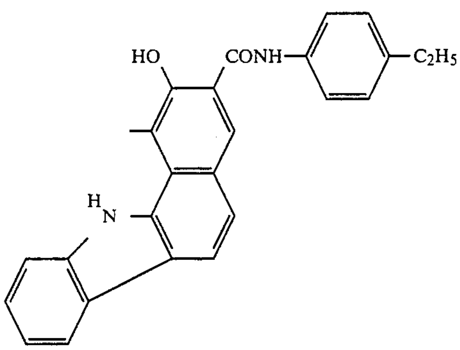 | H | $CO_2CH_3$ | H | H | H |
| F-(140) | 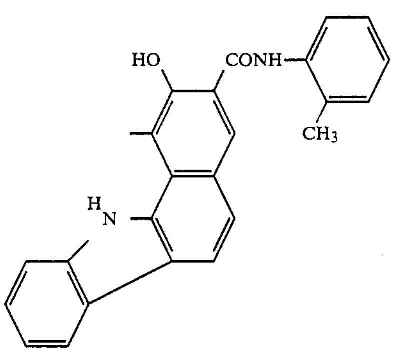 | H | $CO_2CH_3$ | H | H | H |

-continued
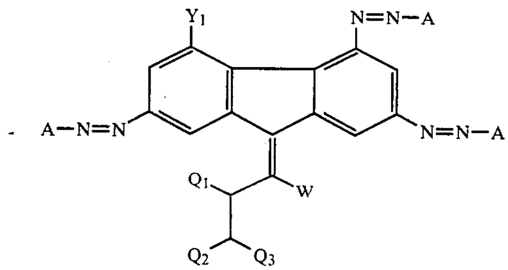
| Compound No. | A | $Q_1$ | $Q_2$ | $Q_3$ | W | $Y_1$ |
|---|---|---|---|---|---|---|
| F-(141) | 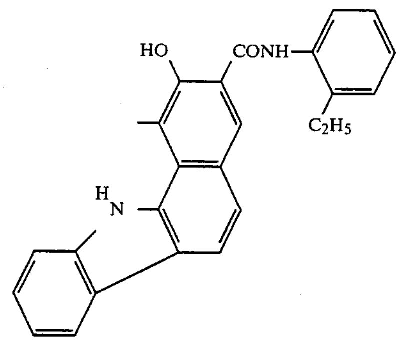 | H | $CO_2CH_3$ | H | H | H |
| F-(142) | 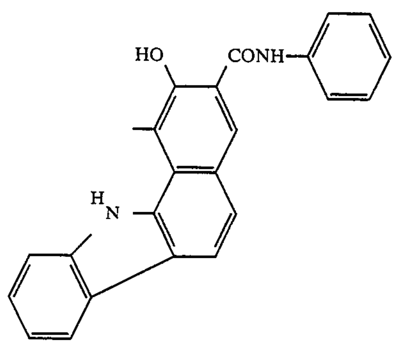 | H | $CO_2CH_3$ | H | H | H |
| F-(143) | 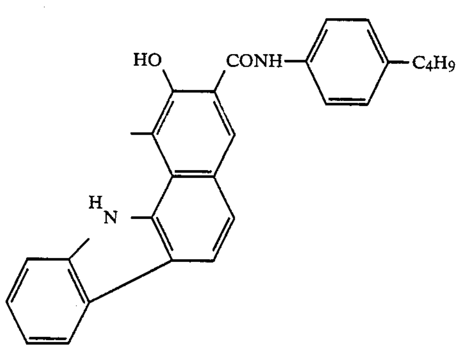 | H | H | H | H | H |

-continued
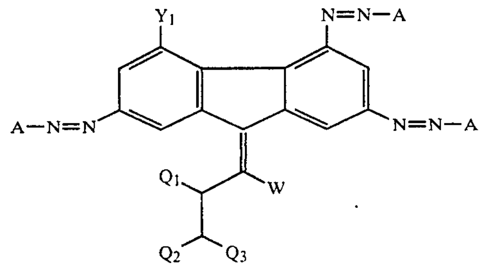
| Compound No. | A | $Q_1$ | $Q_2$ | $Q_3$ | W | $Y_1$ |
|---|---|---|---|---|---|---|
| F-(144) | 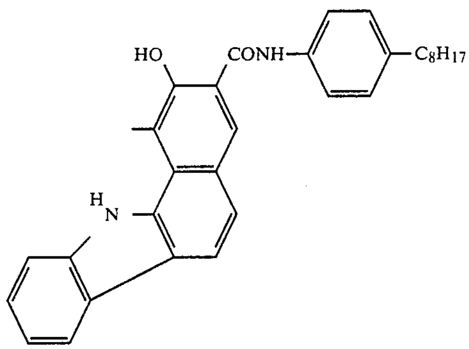 | H | $CH_3$ | $CH_3$ | H | H |
| F-(145) | 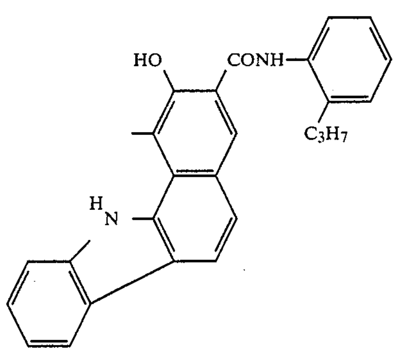 | H | $CH_3$ | $CH_3$ | H | H |
| F-(146) | 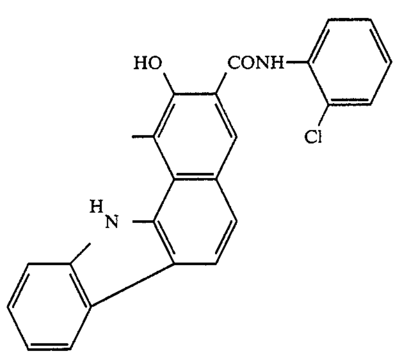 | H | $CH_3$ | $CH_3$ | H | H |

-continued
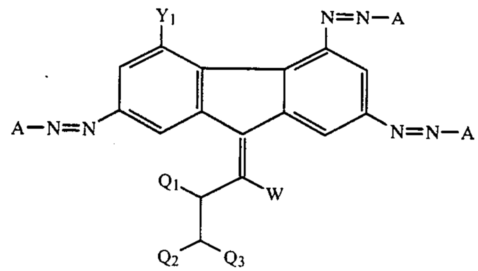
| Compound No. | A | $Q_1$ | $Q_2$ | $Q_3$ | W | $Y_1$ |
|---|---|---|---|---|---|---|
| F-(147) | 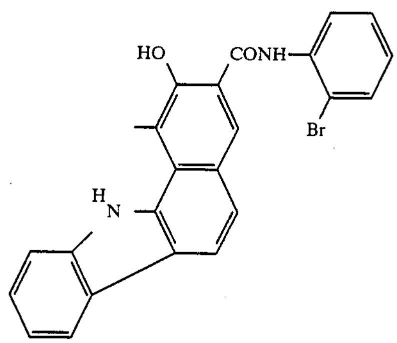 | H | $CH_3$ | $CH_3$ | H | H |
| F-(148) | 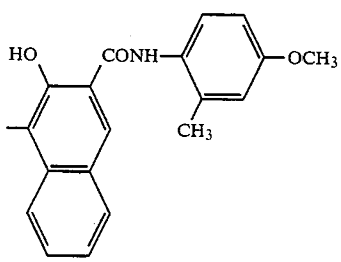 | H | H | H | H | H |
| F-(149) | 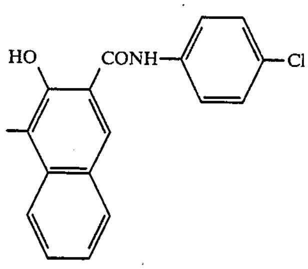 | H | H | H | H | H |
| F-(150) | 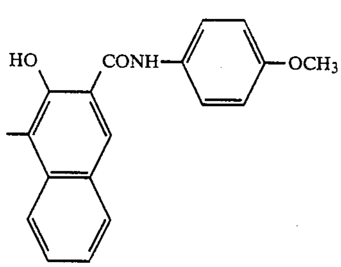 | H | H | H | H | H |

-continued
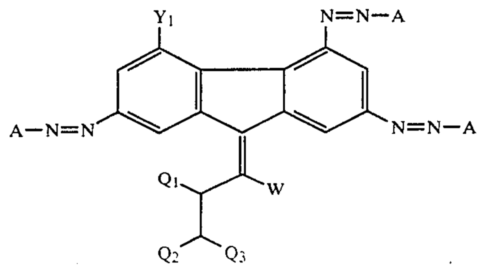
| Compound No. | A | $Q_1$ | $Q_2$ | $Q_3$ | W | $Y_1$ |
|---|---|---|---|---|---|---|
| F-(151) | 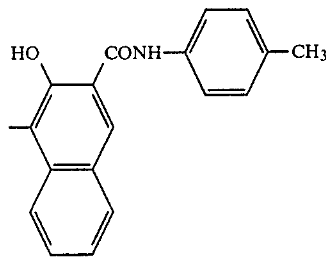 | H | H | H | H | H |
| F-(152) | 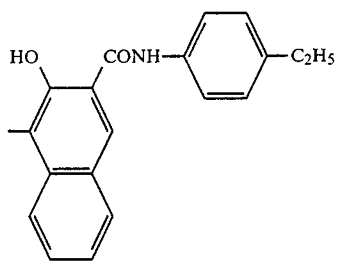 | H | H | H | H | H |
| F-(153) | 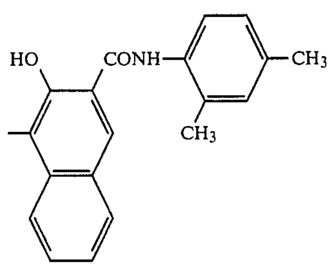 | H | 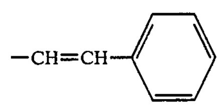 | H | H | H |
| F-(154) | 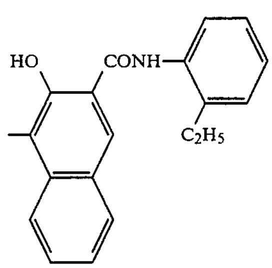 | H | 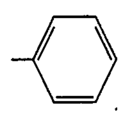 | H | H | H |
| F-(155) | 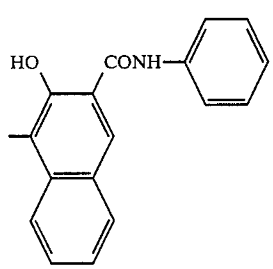 | H | $CO_2C_2H_5$ | H | H | H |

-continued
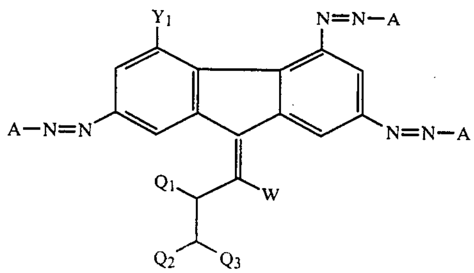
| Compound No. | A | $Q_1$ | $Q_2$ | $Q_3$ | W | $Y_1$ |
|---|---|---|---|---|---|---|
| F-(156) | 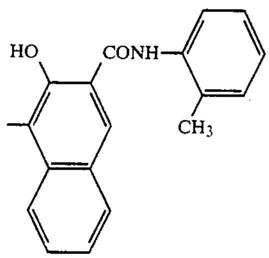 | H | $-OC_2H_5$ | H | H | H |
| F-(157) | 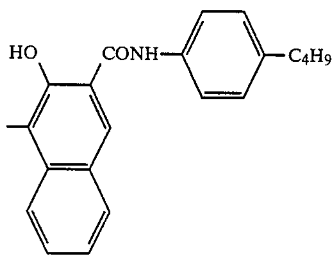 | H | Cl | $CH_3$ | H | H |
| F-(158) | 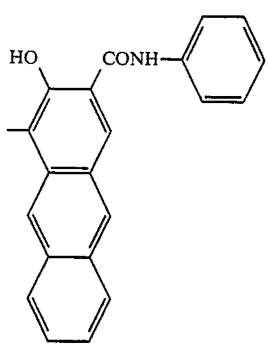 | H | H | H | H | H |
| F-(159) | 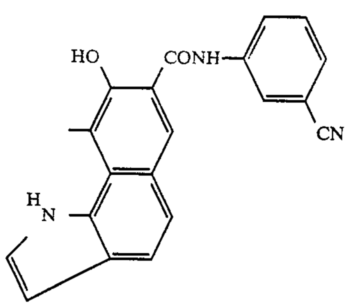 | H | H | H | H | H |

-continued
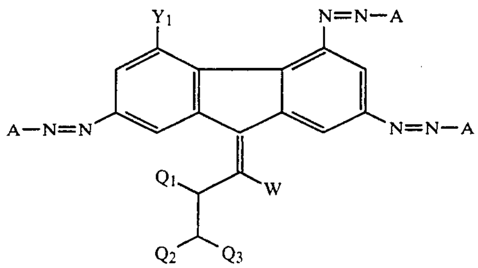
| Compound No. | A | $Q_1$ | $Q_2$ | $Q_3$ | W | $Y_1$ |
|---|---|---|---|---|---|---|
| F-(160) | 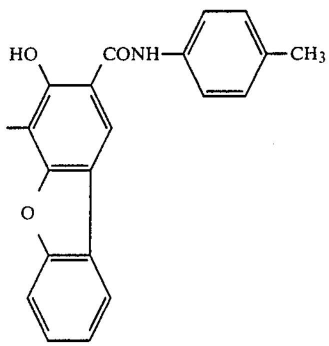 | H | $OCH_3$ | H | H | OH |
| F-(161) | 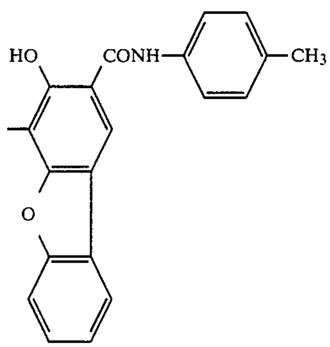 | H | H | H | H | OH |
| F-(162) | 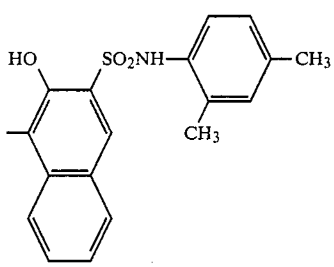 | H | H | H | H | H |
| F-(163) | 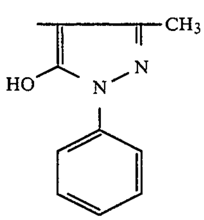 | H | H | H | H | H |

-continued
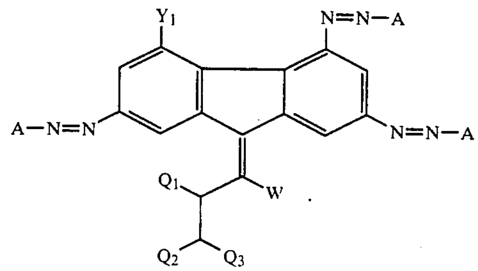
| Compound No. | A | $Q_1$ | $Q_2$ | $Q_3$ | W | $Y_1$ |
|---|---|---|---|---|---|---|
| F-(164) | 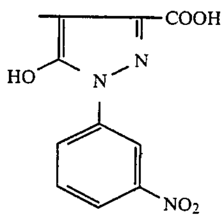 | H | 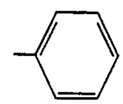 | H | H | H |
| F-(165) | 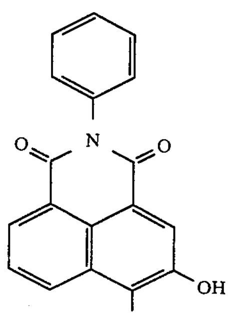 | H | 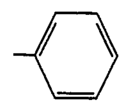 | H | H | H |
| F-(166) | 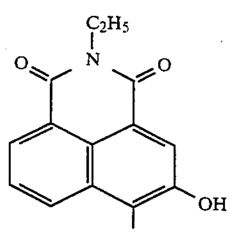 | H | 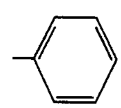 | H | H | H |
| F-(167) | 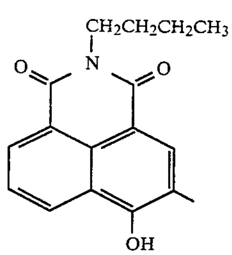 | H | 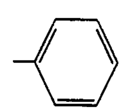 | H | H | H |

-continued
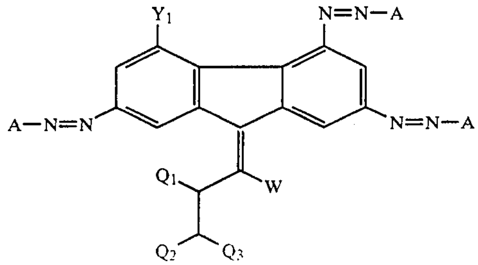
| Compound No. | A | Q1 | Q2 | Q3 | W | Y1 |
|---|---|---|---|---|---|---|
| F-(168) | 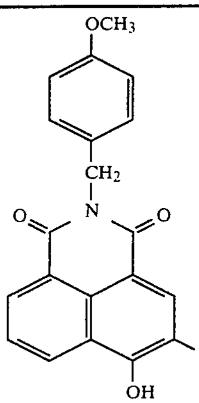 | H | 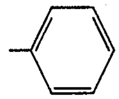 | H | H | H |
| F-(169) | 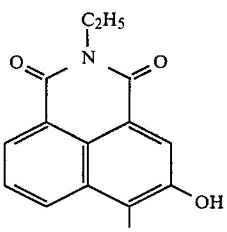 | H | 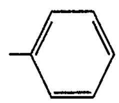 | H | H | H |
| F-(170) | 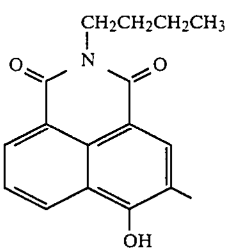 | H | 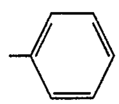 | H | H | H |
| F-(171) | 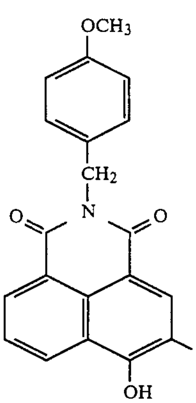 | H | 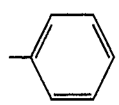 | H | H | H |
Others:

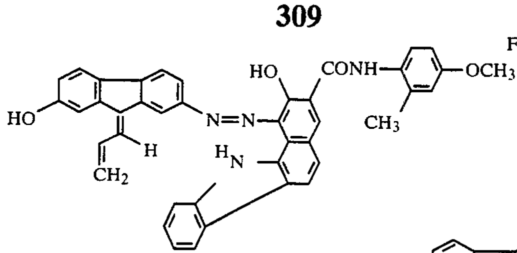

F-(172)

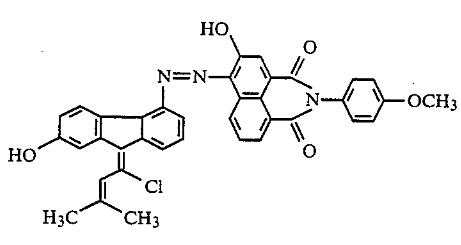

F-(173)

The azo compounds as set forth above can be synthesized easily according to the known method. A typical example is shown below.

SYNTHESIS EXAMPLE 4

[Synthesis of the exemplary compound F-(1)]

The synthesis route is schematically shown below:

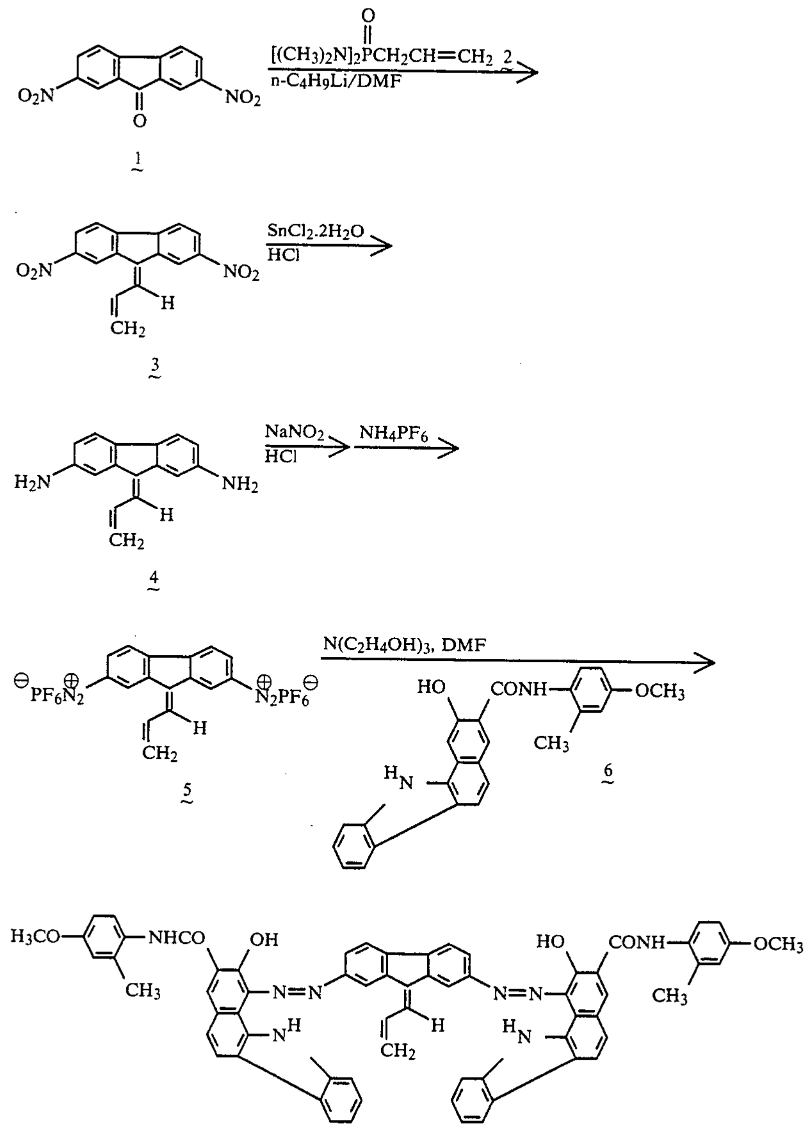

F-(1)

That is, 2,7-dinitrofluorenone 1 (produced by Tokyo Kasei K.K.) was allowed to react with a vinyl derivative 2 to be converted to a dinitro derivative 3 (Journal of Organic Chemistry, 34, 3053 (1969)), which was then reduced with stannous chloride to form a diamino derivative 4 (Journal of Chemical Society, 870 (1954)). The diamino derivative 4 (25.9 g, 0.1 mole) was dispersed by adding into a mixture of 1 liter of conc. HCl and 1 liter of water and a solution of 13.8 g (0.2 mole) of sodium nitrate dissolved in 0.1 liter of water was added dropwise at 5° C. under ice-cooling. After completion of the addition, the reaction mixture was filtered, and 1 liter of an aqueous 50% ammonium hexafluorophosphate solution was added to the filtrate. The resultant precipitate was recovered by filtration, washed with water and thoroughly dried. The salt obtained was dissolved in 1.5 liters of N,N-dimethylformamide (DMF) to provide a tetrazonium salt solution to be used in the subsequent reaction.

As the next step, 79.3 g (0.2 mole) of 2-hydroxy-3-(4-methoxy-2-methylphenylcarbamoyl)-benzo[a]carbazole (Naphthol AS-SR, produced by Hoechst AG) and 60 g of triethanolamine were dissolved in 4 liters of N,N-dimethylformamide, and the tetrazonium salt solution as prepared above was added dropwise under ice-cooling to the resultant solution, followed further by stirring for 2 hours to carry out the reaction. The crystal formed was recovered by filtration, and the crystal was washed twice with 5 liters of N,N-dimethylformamide and twice with 5 liters of acetone, followed by drying, to obtain 82.7 g of the desired bisazo compound F-(1) (77%). From the analytical results of m.p. 300° C. or higher, FD-MS spectrum which indicates a peak of $M^+$ at m/Z 1073, and the elemental analysis of C=47.82%, N=11.65%, H=4.44% (Calcd. values, C=47.91%, N=11.73%, H=4.41%), it was confirmed that the desired substance was synthesized.

The above azo compounds of this invention have excellent photoconductivity and, when a photoreceptor is to be prepared by use of this, it can be prepared by providing a photosensitive member dispersing the azo compound of this invention in a binder on an electroconductive support. A particularly excellent effect can be obtained when the photoreceptor of the so-called function separation type is constituted by use of the azo compound of this invention as the carrier generating material through utilization of the particularly excellent carrier generating ability of the photoconductivity possessed by the azo compound of this invention, together with a carrier transporting material which can act effectively in combination therewith. The function separation type photoreceptor may be a dispersion type, but it is more preferred to be a lamination type photoreceptor in which the carrier generating layer containing the carrier generating material and the carrier transporting layer containing the carrier transporting material are laminated.

The azo compound to be used invention may be employed either alone or as a combination of two or more compounds selected from the azo compounds represented by the above formula [I], or it can also be used in combination with other azo compounds.

Various forms have been known for mechanical constitution of photoreceptors, and any one of them can be used for the photoreceptor of this invention.

Figure 2:
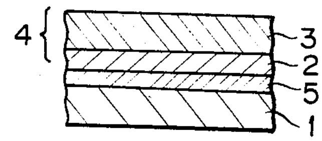
Figure 3:
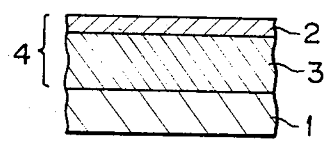
Figure 4:
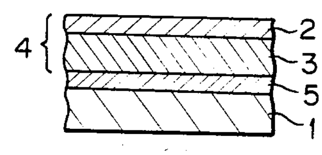
Figure 5:
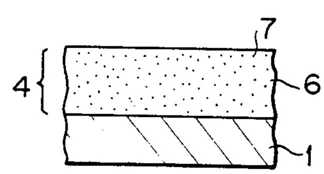
Figure 6:
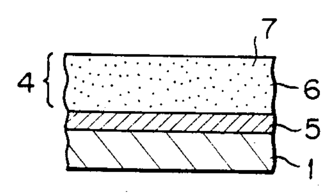

Generally, photoreceptors take the forms as shown in FIGS. 1 through 6. In FIG. 1 and FIG. 3, a photosensitive layer comprising a laminated product of a carrier generating layer 2 containing the above-described azo compound as the main component and a carrier transporting layer 3 containing a carrier transporting material as the main component is provided on an electroconductive support 1. As shown in FIG. 2 and FIG. 4, the photosensitive layer 4 may be provided also through an intermediate layer 5 provided on the electroconductive support. A photoreceptor with the most excellent electrophotographic characteristics can be obtained when the photosensitive layer 4 is thus constituted of the two layers. Also, in the present invention, as shown in FIG. 5 and FIG. 6, a photosensitive layer 4 comprising the above carrier generating material 7 dispersed in the layer 6 containing the carrier transporting material as the main component directly or through the intermediate layer 5.

When the azo compound of this invention is employed as the carrier generating material, the carrier transporting material which can be used in combination therewith may include, for example, electron acceptors which can readily transport electrons such as trinitrofluorenone or tetranitrofluorenone, and otherwise electron donors which can readily transport positive holes such as polymers having heterocyclic compounds as the side chains, typically poly-N-vinylcarbazole, triazole derivatives, oxadiazole derivatives, imidazole derivatives, pyrazoline derivatives, polyarylalkane derivatives, phenylenediamine derivatives, hydrazone derivatives, amino-substituted chalcone derivatives, triarylamine derivatives, carbazole derivatives, stilbene derivatives, and phenothiazine derivatives, but the carrier transporting material to be used in the present invention is not limited to these.

The carrier generating layer 2 constituting the photosensitive layer 4 with a double-layer constitution may be formed directly on the electroconductive support 1 or the carrier transporting layer 3, or on the intermediate layer such as an adhesive layer or a barrier layer optionally provided, according to the method as described below.

(M-1) The method in which a solution of an azo compound dissolved in an appropriate solvent, optionally mixed and dissolved with a binder, is coated.

(M-2) The method in which an azo compound is micropulverized in a dispersing medium by means of a ball mill or a homomizer, optionally together with a binder, and the resultant dispersion is coated.

The solvent or dispersing medium to be used for formation of the carrier generating layer may include n-butylamine, diethylamine, ethylenediamine, isopropanolamine, triethanolamine, triethylenediamine, N,N-dimethylformamide, acetone, methyl ethyl ketone, cyclohexanone, benzene, toluene, xylene, chloroform, 1,2-dichloroethane, dichloromethane, tetrahydrofuran, dioxane, methanol, ethanol, isopropanol, ethyl acetate, butyl acetate, dimethyl sulfoxide, etc.

When a binder is used in the carrier generating layer or the carrier transporting layer, any kind of materials may be available, but it is preferred to employ a film-forming polymer which is hydrophobic, high in dielectric constant and electrically insulating. Such polymers may include those as enumerated below, which are not limitative of this invention.

(P-1) Polycarbonate;
(P-2) Polyester;
(P-3) Methacrylic resin;
(P-4) Acrylic resin;
(P-5) Polyvinyl chloride;
(P-6) Polyvinylidene chloride;
(P-7) Polystyrene;
(P-8) Polyvinyl acetate;
(P-9) Styrene-butadiene copolymer;
(P-10) Vinylidene chloride-acrylonitrile copolymer;
(P-11) Vinyl chloride-vinyl acetate copolymer;
(P-12) Vinyl chloride-vinyl acetate-maleic anhydride copolymer;
(P-13) Silicone resin;
(P-14) Silicone-alkyd resin;
(P-15) Phenol-formaldehyde resin;
(P-16) Styrene-alkyd resin;
(P-17) Poly-N-vinylcarbazole.

These binders may be used either singly or as a mixture of two or more species.

The carrier generating layer 2 thus formed may have a thickness preferably of 0.01 μm to 20 μm, more preferably of 0.05 μm to 5 μm. When the carrier generating layer or the photosensitive layer is a dispersion system, the azo compound should preferably have particle sizes of 5 μm or less, more preferably 1 μm or less.

The electroconductive support to be used for the photoreceptor of this invention may include a material selected from plates or drums of metals or alloys, or papers or plastic films made electroconductive by coating, vapor deposition or lamination of metal thin films or thin films of electroconductive compounds or alloys thereon. As the intermediate layer such as adhesive layer or barrier layer, in addition to the polymers to be used as the aforesaid binder, it is also possible to employ organic polymeric materials such as polyvinyl alcohol, ethyl cellulose, carboxymethyl cellulose, etc. or aluminum oxide.

The photoreceptor of this invention has a constitution as described above and is excellent in charging characteristic, sensitivity characteristic and image forming characteristic, particularly excellent in durability without fatigue deteriortion when used repeatedly, as can also clearly be seen from the Examples as hereinafter described.

This invention is described in detail by referring to the following Examples, by which the embodiments of this invention are not limited.

EXAMPLE 1

To 110 ml of 1,2-dichloroethane were added 2 g of the exemplary compound A-(14) and 2 g of a polycarbonate resin "Panlite L-1250" (trade name, produced by Teijin Kasei K.K.) and dispersed therein in a ball mill for 12 hours. The resultant dispersion was applied on a polyester film with aluminum vapor deposited thereon to a dried film thickness of 1 μm to provide a carrier generating layer, followed further by coating thereon with a solution of 6 g of 4,4'-dimethyl-4''-styryl-triphenylamine (having the formula K-(1) shown below) and 10 g of a polycarbonate resin "Panlite L-1250" dissolved in 110 ml of 1,2-dichloroethane to a dried film thickness of 15 μm to form a carrier transporting layer, thus preparing a photoreceptor of this invention.

K-(1)

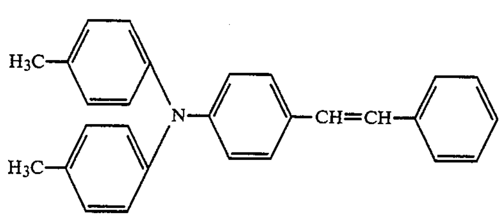

By use of the photoreceptor as described above, the following characteristic evaluations were conducted by means of an electrical paper testing machine Model SP-428 produced by Kawaguchi Denki Seisakusho K.K. After charging at a charged voltage of −6 KV for 5 seconds, the member was left to stand in dark for 5 seconds and then irradiated with a halogen lamp light to the luminosity of 35 lux on the surface of the photoreceptor, and the dose required for attenuating the surface potential to the half value (half-reduction dosage) $E_{\frac{1}{2}}$ was determined. Also, the surface potential after exposure at a dose of 30 lux·sec (residual potential) $V_R$ was determined. Further, similar measurements were repeated for 100 times. The results are shown in Table 1.

TABLE 1

| | First measurement | 100th measurement |
|---|---|---|
| $E_{\frac{1}{2}}$ (lux · sec) | 1.4 | 1.4 |
| $V_R$ (V) | 0 | 0 |

COMPARATIVE EXAMPLE 1

A photoreceptor for comparative purpose was prepared in the same manner as in Example 1 except for employing the bisazo compound L-(1) shown below as the carrier generating material.

L-(1)

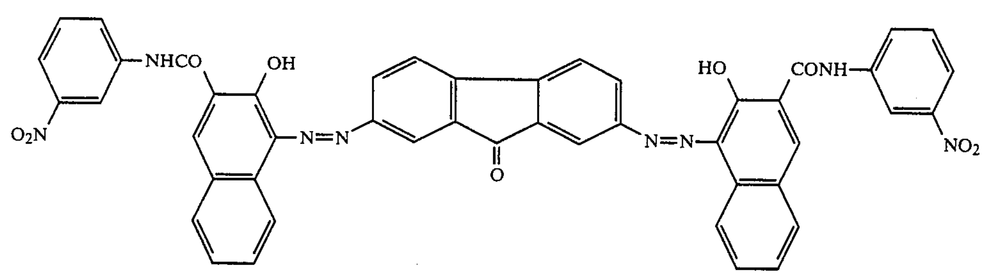

For this photoreceptor for comparative purpose, measurements were conducted similarly as in Example 1 to obtain the results as shown in Table 2.

TABLE 2

| | First measurement | 100th measurement |
|---|---|---|
| $E_{\frac{1}{2}}$ (lux · sec) | 6.8 | 12.7 |
| $V_R$ (V) | −10 | −130 |

As apparently seen from the above results, the photosensitive member of this invention is very superior to the photoreceptor for comparative purpose with respect to sensitivity, residual potential and stability in repeated uses.

EXAMPLES 2–4

Using the exemplary compounds A-(20), A-(22) and A-(25) as the carrier generating material, and 1-[4-(N,N-diethylamino)benzylidene]-amino-1,2,3,4-tetrahydroquinoline (the compound K-(2) shown below), 4-methoxy-4'-(4-methyl)styryl-triphenylamine (the compound K-(3) shown below) and 4-methyl-4'-(4-chloro)styryl-triphenylamine (the compound K-(4) shown below), respectively, following otherwise the same procedure as described in Example 1, photoconductive members of this invention were prepared and subjected to similar measurements to obtain the results shown in Table 3.

K-(2)

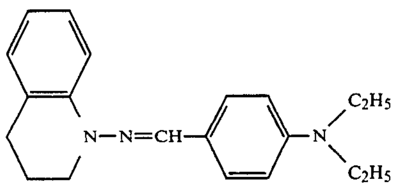

K-(3)

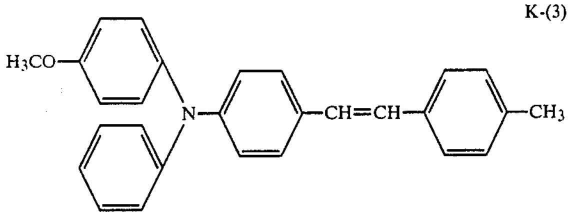

K-(4)

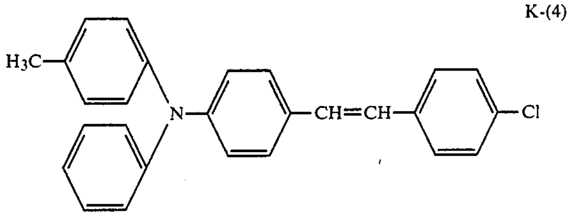

TABLE 3

| Example | Azo compound | First measurement $E_{\frac{1}{2}}$ (lux · sec) | $V_R$ (V) | 100th measurement $E_{\frac{1}{2}}$ (lux · sec) | $V_R$ (V) |
|---|---|---|---|---|---|
| 2 | Exemplary compound A - (20) | 1.4 | 0 | 1.4 | 0 |
| 3 | Exemplary compound A - (22) | 1.5 | 0 | 1.5 | 0 |
| 4 | Exemplary compound A - (25) | 1.7 | 0 | 1.7 | 2 |

EXAMPLE 5

On an electroconductive support comprising a polyester film on which aluminum foil is laminated, an intermediate layer with a thickness of 0.05 μm comprising a vinyl chloride-vinyl acetate-maleic anhydride copolymer "Ethlec MF-10" (trade name, produced by Sekisui Kagaku K.K.) was provided, and on the intermediate layer was further formed a carrier generating layer by coating with a dispersion prepared by dispersing a mixture of 2 g of the exemplary compound A-(5) and 110 ml of 1,2-dichloroethane in a ball mill for 24 hours to a dried film thickness of 0.5 μm. On the carrier generating layer, a solution of 6 g of 4-methyl-4'-styryl-triphenylamine and 10 g of a methacrylic resin "Acrypet" (trade name, produced by Mitsubishi Rayon K.K.) dissolved in 70 ml of 1,2-dichloroethane was applied to a dried film thickness of 10 μm to form a carrier transporting layer, thus preparing an electrophotographic photoreceptor of this invention.

For this photoreceptor, the same measurements as in Example 1 were conducted to obtain the results of $E_{\frac{1}{2}}$=2.2 lux·sec and $V_R$=0 V.

EXAMPLE 6

On the electroconductive support having the intermediate layer employed in Example 5 provided thereon, a 1% solution of the exemplary compound A-(32) in ethylenediamine was applied to a dried film thickness of 0.3 μm to form a carrier generating layer.

Subsequently, on the carrier generating layer was further applied a solution of 6 g of 1-phenyl-3-(p-diethylaminostyryl)-5-(p-diethylaminophenyl)pyrazoline (the compound K-(5) shown below) and 10 g of a polyester resin "Byron 200" (trade name, produced by Toyo Boseki K.K.) dissolved in 70 ml of 1,2-dichloroethane to a dried film thickness of 12 μm to form a carrier transporting layer. Thus, a photosensitive member of this invention was prepared.

K-(5)

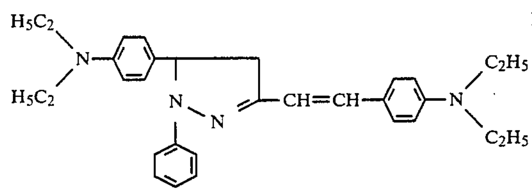

For this photoreceptor, the same measurements as in Example 1 were conducted to obtain the results as shown in Table 4.

COMPARATIVE EXAMPLE 2

Example 6 was repeated except for substituting the bisazo compound L-(2) represented by the formula shown below for the exemplary compound A-(32) to prepare an electrophotographic photoreceptor for comparative purpose.

For this photoreceptor, the same measurements as in Example 1 were conducted to obtain the results as shown in Table 4.

L-(2)

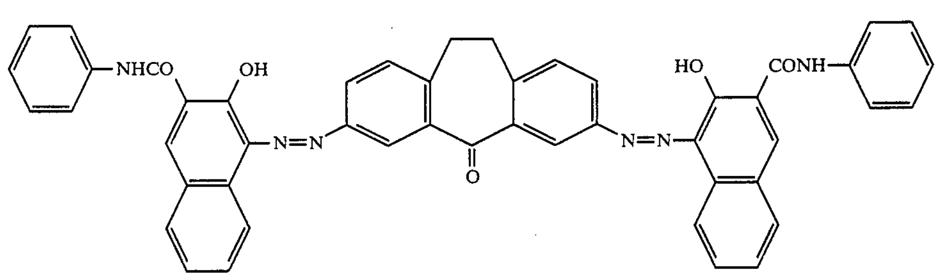

TABLE 4

| | First measurement $E_{\frac{1}{2}}$ (lux · sec) | $V_R$ (V) | 100th measurement $E_{\frac{1}{2}}$ (lux · sec) | $V_R$ (V) |
|---|---|---|---|---|
| Example 6 | 1.4 | 0 | 1.5 | 0 |
| Comparative example 2 | 7.2 | 0 | 13.4 | −50 |

EXAMPLE 7

A carrier generating layer was formed in the same manner as in Example 5 except for employing the exemplary compound A-(38) in place of the exemplary compound A-(5). On this layer was applied a solution of 6 g of p-(N,N-diethylamino)benzaldehyde-1,1-diphenylhydrazone (Compound K-(6)) and 10 g of a polycarbonate "Panlite L-1250" (trade name, produced by Teijin Kasei K.K.) dissolved in 70 ml of 1,2-dichloroethane to a dried film thickness of 10 μm to form a carrier transporting layer, thus preparing a photoreceptor of this invention.

For this photoreceptor, the same measurements as in Example 1 were conducted to obtain the results of $E_{\frac{1}{2}}=1.8$ lux·sec and $V_R=0$ V.

EXAMPLE 8

On the surface of an aluminum drum of 100 mm in diameter was provided an intermediate layer with a thickness of 0.05 μm made of a vinyl choloride-vinyl acetate-maleic anhydride copolymer "Ethlec MF-10" (trade name, produced by Sekisui Kagaku K.K.), followed by coating thereon with a dispersion prepared by dispersing a mixture of 4 g of the exemplary compound A-(39) and 400 ml of 1,2-dichloroethane in a ball mill for 24 hours to a dried film thickness of 0.6 μm to form a carrier generating layer.

Further, on the carrier generating layer was applied a solution of 30 g of p-(N,N-diethylamino)benzaldehyde-1,1-diphenylhydrazone (the compound K-(6) shown below) and 50 g of a polycarbonate resin "Copiron S-1000" (trade name, produced by Mitsubishi Gas Kagaku K.K.) dissolved in 400 ml of 1,2-dichloroethane to a dried film thickness of 13 μm to form a carrier transporting layer, thus preparing a drum-shaped electrophotographic photoreceptor.

K-(6)

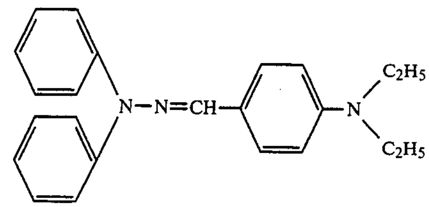

The photoreceptor thus prepared was mounted on a modified electrophotographic copying machine "U-Bix 1600 MR" (trade name, produced by Konishiroku Photo Industry Co., Ltd.) and images were copied to obtain copied images which are high in contrast, faithful to original image and also clear. The quality was not changed at all even when repeated for 10,000 times.

COMPARATIVE EXAMPLE 3

A drum-shaped photoreceptor for comparative purpose was prepared similarly as in Example 8, except for using the triazo compound L-(3) represented by the structural formula shown below in place of the exemplary compound A-(39), and the copied images were evaluated similarly as in Example 8. As the result, only images with much fogging were obtained. Further, as copying was repeated, the copied images were lowered in contrast, until substantially no copied image was obtained after repetition for 2,000 times.

L-(3)

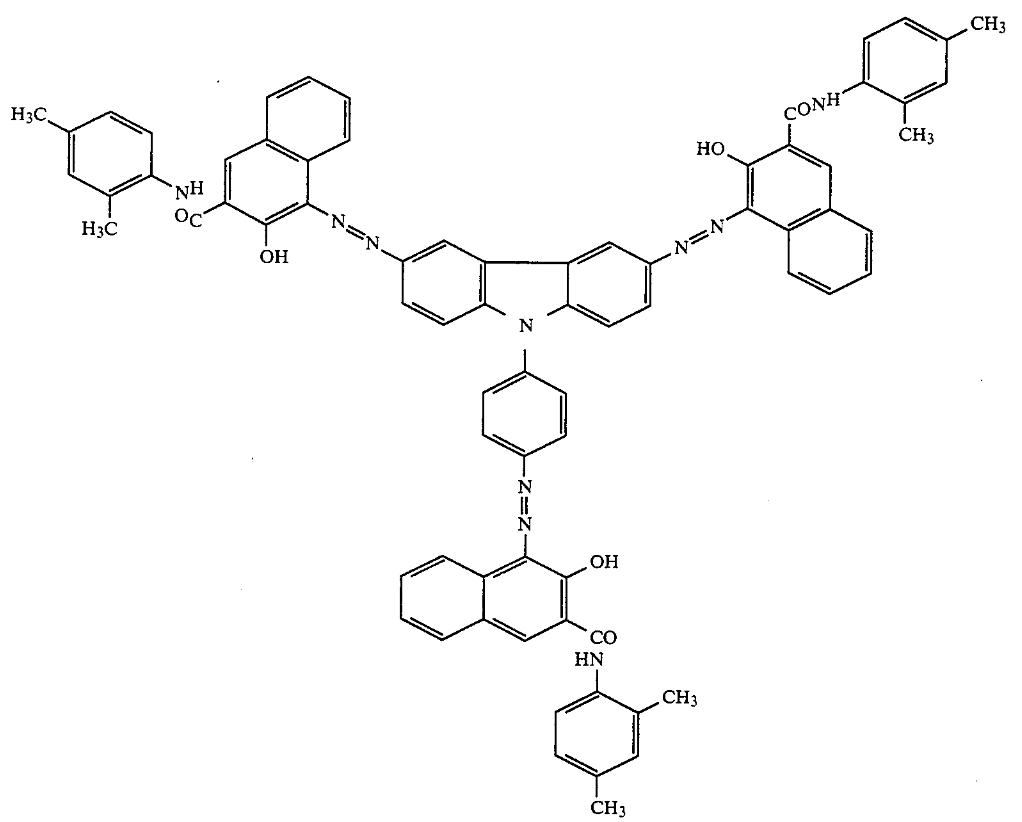

EXAMPLE 9

On an electroconductive support comprising a polyester film on which aluminum foil is laminated, an intermediate layer with a thickness of 0.05 μm comprising a vinyl chloride-vinyl acetate-maleic anhydride copolymer "Ethlec MF-10" (trade name, produced by Sekisui Kagaku K.K.) was provided, and on the intermediate layer was further formed a carrier generating layer by coating with a dispersion prepared by dispersing a mixture of 5 g of tthe exemplary compound A-(4) and 3.3 g of a polycarbonate resin "Panlite L-1250" (trade name, produced by Teijin Kasei K.K.) in 100 ml of dichloromethane in a ball mill for 24 hours to a dried film thickness of 10 μm, to prepare a photoreceptor.

For the thus obtained photoreceptor, $E_{\frac{1}{2}}$ and $V_R$ were measured similarly as in Example 1 except for changing the charging voltage to +6 KV. The results of the first measurement were $E_{\frac{1}{2}}$=21 lux·sec and $V_R$=+3 V.

EXAMPLE 10

On a polyester film on which aluminum was vapor deposited, a solution of 6 g of of 1-[4-(N,N-di-(p-tolyl-)amino)benzylidene-amino]indoline and 10 g of a polyester resin "Byron 200" (trade name, produced by Toyo Boseki K.K.) dissolved in 70 ml of 1,2-dichloroethane was applied as the carrier transporting layer to a dried film thickness of 10 μm.

Subsequetly, on this layer was further formed a carrier generating layer by coating with a diepersion prepared by dispersing a mixture of 1 g of the exemplary compoung A-(16) and 1 g of the exemplary compound A-(18) with 110 ml of 1,2-dichloroethane in a ball mill for 24 hours to a dried film thickness of 0.5 μm to prepare a photoreceptor of this invention.

The thus obtained photoreceptor was evaluated similarly as in Example 9 to obtain the results of $E_{\frac{1}{2}}$=2.2 lux·sec and $V_R$=+5 V.

EXAMPLE 11

A 2% solution of the exemplary compound A-(10) in ethylenediamine was applied on a polyester film laminated with aluminum to a dried film thickness of 0.5 μm to form a carrier generating layer. Further, a carrier transporting layer was formed on the carrier generating layer by coating with a solution of about 10 g of 6-methyl-1-(1-ethyl-4-carbazolyl)methylideneamino-1,2,3,4-tetrahydroquinoline (the compound K-(7) shown below) and 4-methoxy-4'-styryl-triphenylamine (the compound K-(8) shown below) or 4-methoxy-triphenylamine (the compound K-(9) shown below) dissolved separately together with 14 g of a polycarbonate resin (trade name, Panlite L-1250, produced by Teijin Kasei K.K.) in 140 ml of 1,2-dichloromethane to a dried film thickness of 12 μm, followed by drying, to prepare photoreceptors with three kinds of different carrier transporting materials.

K-(7)

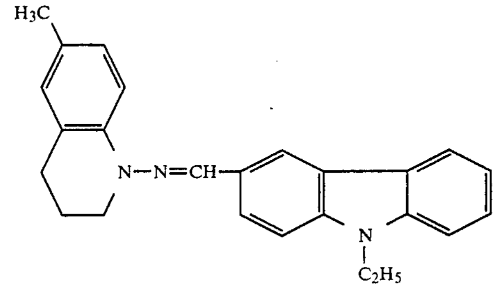

K-(8)

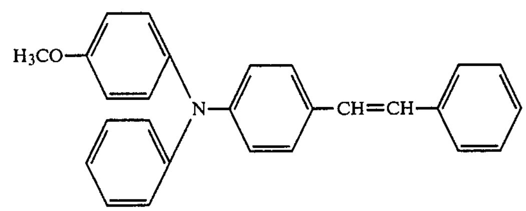

K-(9)

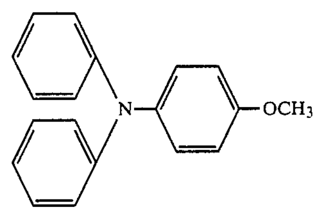

The three kinds of photoreceptors were subjected to the following characteristic evaluations by means of an electrical paper testing machine Model SP-428 produced by Kawaguchi Denki Seisakusho K.K. After charging at a charged voltage of −6 KV for 5 seconds, the member was left to stand in dark for 5 seconds and then irradiated with a halogen lamp light to the luminosity of 35 lux·on the surface of the photoreceptor, and the dose required for attenuating the surface potential to the half value (half-dosage) $E_{\frac{1}{2}}$ was determined. Also, the surface potential after exposure at a dose of 30 lux·sec (residual potential) $V_R$ was determined. The results are shown in Table 5, which shows that good results can be obtained in each combination with any one of the carrier transporting materials.

TABLE 5

| Carrier transporting material combined with exemplary compound A - (10) | $E_{\frac{1}{2}}$ (lux · sec) | $V_R$ (V) |
|---|---|---|
| K - (7) | 1.4 | 0 |
| K - (8) | 1.6 | 0 |
| K - (9) | 1.8 | 0 |

COMPARATIVE EXAMPLE 4

A comparative photoreceptor was prepared in the same manner as in Example 11 except for substituting the bisazo compound shown below (L-(4)) for the exemplary compound A-(10) and subjected to characteristic evaluation.

L-(4)

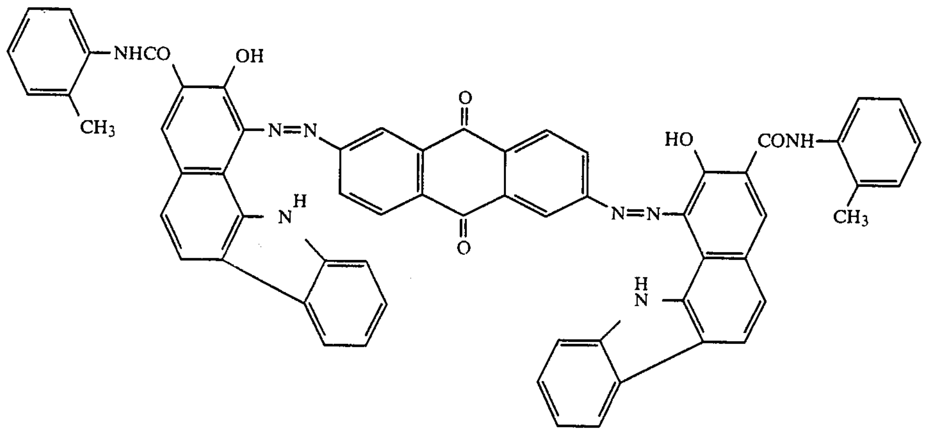

As shown in Table 6, the results were found to be varied depending on the carrier transporting material.

TABLE 6

| Carrier transporting material combined with the compound L - (4) | $E_{\frac{1}{2}}$ (lux · sec) | $V_R$ (V) |
|---|---|---|
| K - (7) | 5.5 | 6 |
| K - (8) | 9.2 | 17 |
| K - (9) | 15.4 | 43 |

EXAMPLE 12

On the electroconductive support having an intermediate layer provided thereon as employed in Example 5, a dispersion prepared by mixing well 2 g of the exemplary compound A-(12) and 100 ml of 1,2-dichloroethane was applied to a dried film thickness of 0.3 μm to prepare a carrier generating layer.

Subsequently, a carrier transporting layer was formed on the carrier generating layer by coating with a solution of carrier transporting materials of 6 g of 3-(p-methoxystyryl)-p-(p-methoxyphenyl)carbazole (the compound K-(10) shown below) and 10 g of a polycarbonate resin "Panlite L-1250" (trade name, produced by Teijin Kasei K.K.) dissolved in 90 g of 1,2-dichloroethane to a dried film thickness of 10 μm to prepare a photoreceptor of this invention.

For this photoreceptor, electrophotographic characteristics at room temperatures of 25° C. and 60° C. were measured similarly as in Example 7. The results are shown in Table 7.

K-(10)

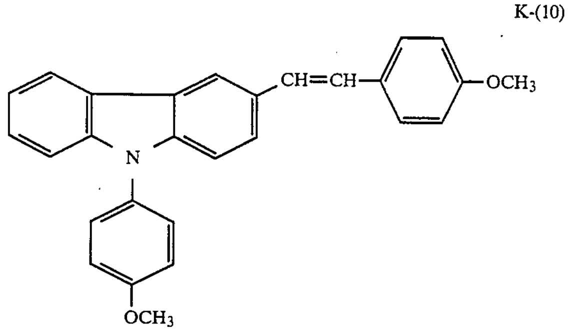

TABLE 7

| | 25° C. | 60° C. |
|---|---|---|
| VA (V) | −1020 | −1040 |
| $E_{\frac{1}{2}}$ (lux · sec) | 1.2 | 1.2 |
| $V_R$ (V) | 0 | 0 |

As apparently seen from the above results, the electrophotographic photoreceptor has good sensitivity and residual potential characteristic even at higher temperature, indicating good stability to heat.

EXAMPLE 13

On the electroconductive support having an intermediate layer provided thereon as employed in Example 5, a dispersion prepared by mixing well 2 g of the exemplary compound A-(8) with 110 ml of 1,2-dichloroethane was applied to a dried film thickness of 0.3 μm to prepare a carrier generating layer.

For testing durability of the carrier generating layer against UV-ray, it was placed at a position at a distance of 30 cm from a ultra-high pressure mercury lamp (produced by Tokyo Shibaura Denki K.K.) and UV-ray was irradiated at 1500 cd/cm³ for 10 minutes.

Next, a carrier transporting layer was formed on the UV-ray irradiated by coating with a solution of carrier transporting materials of 7 g of 4,4'-dimethyl-4''-(4-chloro)-styryl-triphenylamine (the compound K-(11) shown below) and 10 g of a polycarbonate resin (Panlite L-1250, trade name, produced by Teijin Kasei K.K.) dissolved in 90 g of 1,2-dichloroethane to a dried film thickness of 12 μm to prepare a photoreceptor of this invention.

K-(11)

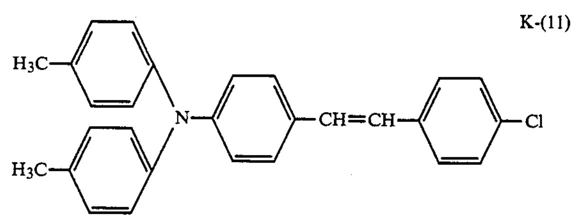

For this photoreceptor, measurements were conducted similarly as in Example 5. The results are shown in Table 8.

EXAMPLE 14

Example 13 was repeated except for effecting no irradiation of UV-ray after formation of the carrier generating layer to prepare a photoreceptor, for which the same measurements as in Example 5 were conducted. The results are shown in Table 8.

TABLE 8

| | Example 13 | Example 14 |
|---|---|---|
| $V_A$ (V) | −980 | −950 |
| $E_{1/2}$ (lux · sec) | 1.3 | 1.3 |
| $V_R$ (V) | 0 | 0 |

As apparently seen from the above results, it can be understood that the electrophotographic photoreceptor of this invention is excellent in sensitivity and residual potential characteristic relative to UV-ray irradiation, small in amount of variation of the receptor potential and also stable to light.

COMPARATIVE EXAMPLE 5

Photoreceptors were prepared in the same manner as in Example 13 and Example 14, except for changing the compound A-(8) to the bisazo compound (L-(5)) as shown below, and the same measurements as in Example 5 were conducted.

L-(5)

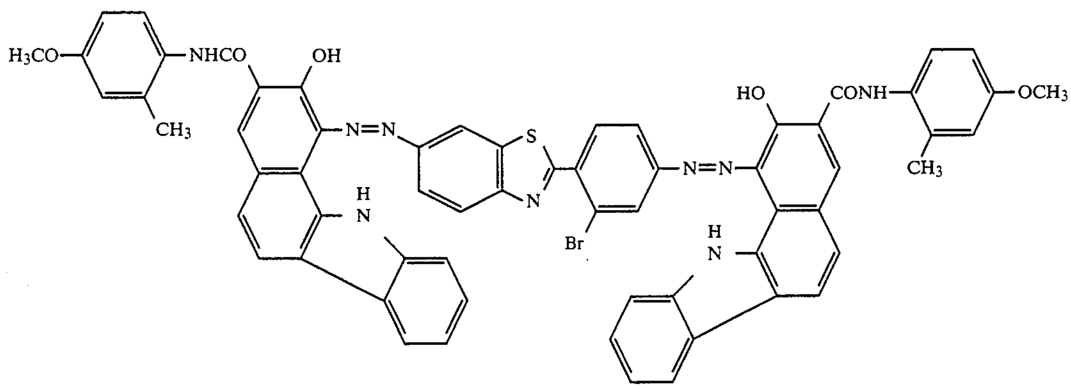

The results are shown in Table 9.

TABLE 9

| | With UV-ray irradiation | Without UV-ray irradiation |
|---|---|---|
| $V_A$ (V) | −890 | −850 |
| $E_{1/2}$ (lux · sec) | 13.2 | 6.2 |
| $V_R$ (V) | −20 | −7 |

As apparently seen from the above results, the photoreceptor prepared by use of the above compound is deteriorated in sensitivity and residual potential characteristic by UV-ray irradiation with greater amount of variation of the receptor potential.

EXAMPLE 15

A drum-shaped photoreceptor was prepared in the same manner as in Example 5 except for using the exemplary compound A-(1) in place of the exemplary compound A-(5). The photoreceptor was found to have a spectral sensitivity of 0.50 $\mu J/cm^3$ (half-reduction dosage). Practical copying test was conducted by means of a testing machine in which a semiconductor laser (780 nm) with a laser beam intensity of 0.85 mW on the surface of the photoreceptor of this invention was mounted.

After charging the surface of the photoreceptor to −6 KV, the member was exposed to laser beam and subjected to reversal development by a bias voltage of −250 V, whereby good images without fogging were obtained.

COMPARATIVE EXAMPLE 6

Example 14 was repeated except for employing the comparative bisazo compound L-(6) shown below in place of the exemplary compound A-(1) to obtain a comparative photoreceptor.

L-(6)

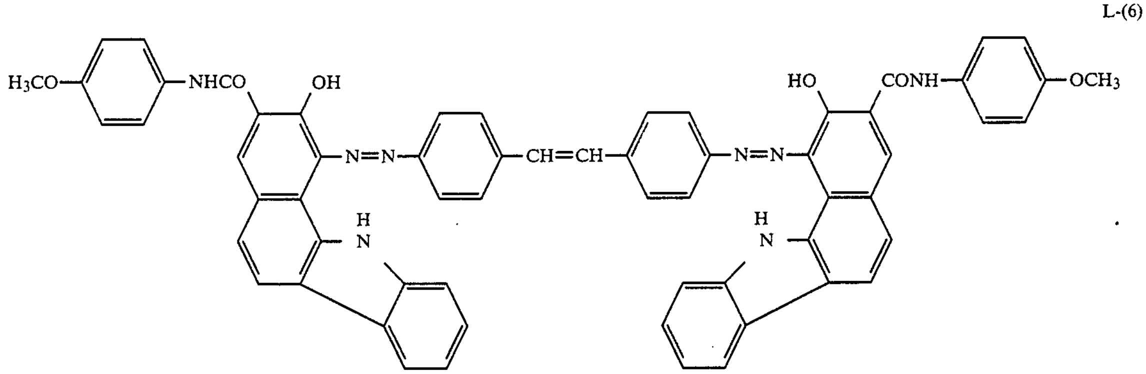

The photoreceptor was found to have a spectral sensitivity of 4.7 μJ/cm³ (half-reduction dosage). When practical copying test by the semiconductor laser was conducted similarly as in Example 14, much fogging occurred to give no good image.

EXAMPLE 16

Example 1 was repeated except that the exemplary compound A-(14) was replaced with the exemplary compound B-(8) and 4,4'-dimethyl-4''-styryl-triphenylamine was replaced with 1-methyl-3-(p-diethylaminostyryl)-5-(p-methoxystyryl)pyrazoline (having the formula K-(12) shown below).

K-(12)

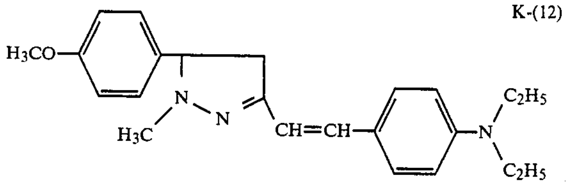

The results are shown in Table 10.

TABLE 10

| | First measurement | 100th measurement |
|---|---|---|
| $E_{\frac{1}{2}}$ (lux · sec) | 1.7 | 1.7 |
| $V_R$ (V) | 0 | 0 |

COMPARATIVE EXAMPLE 7

A photoreceptor for comparative purpose was prepared in the same manner as in Example 16 except for employing the bisazo compound L-(7) shown below as the carrier generating material.

L-(7)

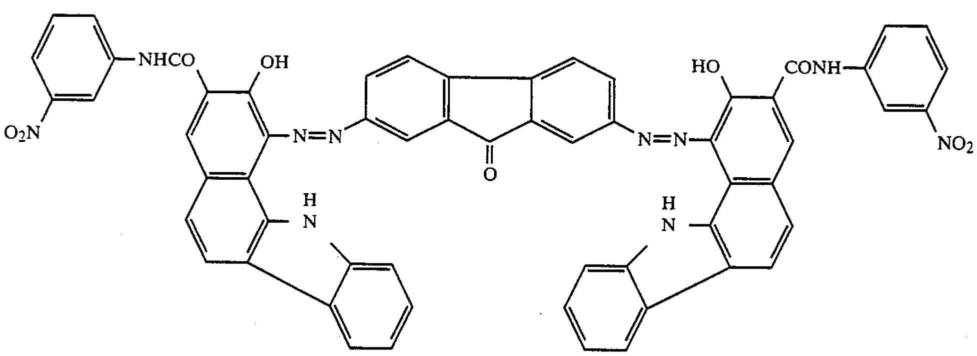

For this photoreceptor for comparative purpose, measurements were conducted similarly as in Example 1 to obtain the results as shown in Table 11.

TABLE 11

| | First measurement | 100th measurement |
|---|---|---|
| $E_{\frac{1}{2}}$ (lux · sec) | 10.9 | 13.2 |
| $V_R$ (V) | −40 | −180 |

As apparently seen from the above results, the photosensitive member of this invention is very superior to the photoreceptor for comparative purpose with respect to sensitivity, residual potential and stability in repeated uses.

EXAMPLES 17–19

Using the exemplary compounds B-(10), B-(12) and B-(12) as the carrier generating material, and 3-(p-methoxystyryl)-6-methoxy-9-(p-methoxyphenyl)carbazole (the compound K-(13) shown below), 3-(p-methoxystyryl)-9-(p-methoxyphenyl)carbazole (the compound K-(14) shown below) and 3-styryl-9-phenylcarbazole (the compound K-(15) shown below), respectively, as the carrier transporting material following otherwise the same procedure as described in Example 16, photoconductive members of this invention were prepared and subjected to similar measurements to obtain the results shown in Table 12.

K-(13)

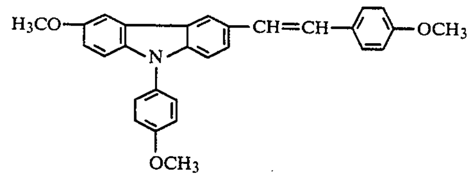

K-(14)

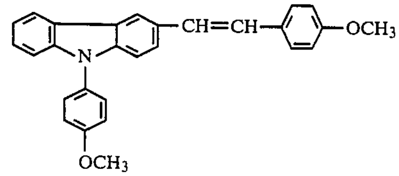

K-(15)

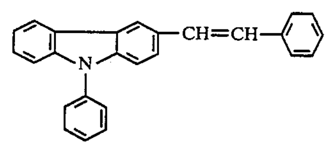

TABLE 12

| Example | Bisazo compound | First measurement $E_{\frac{1}{2}}$ (lux · sec) | First measurement $V_R$ (V) | 100th measurement $E_{\frac{1}{2}}$ (lux · sec) | 100th measurement $V_R$ (V) |
|---|---|---|---|---|---|
| 17 | Exemplary compound B - (10) | 1.3 | 0 | 1.3 | 0 |
| 18 | Exemplary compound B - (11) | 1.5 | 0 | 1.5 | 0 |
| 19 | Exemplary compound B - (12) | 1.7 | 0 | 1.7 | 2 |

EXAMPLE 20

Example 5 was repeated except that the exemplary compound A-(5) was replaced with the exemplary compound B-(13), and 4-methyl-4'-styryl-triphenylamine with 4-methyltriphenylamine.

For this photoreceptor, the same measurements as in Example 1 were conducted to obtain the results of $E_{\frac{1}{2}}=2.2$ lux·sec and $V_R=0$ V.

EXAMPLE 21

Example 6 was repeated except that the exemplary compound A-(32) was replaced with the exemplary compound B-(22), and 1-phenyl-3-(p-diethylaminostyryl)-5-(p-diethylaminophenyl)pyrozoline was replaced with 4-methoxy-4'-styryl-triphenylamine (the compound K-(16) shown below) to obtain the results shown in Table 13.

K-(16)

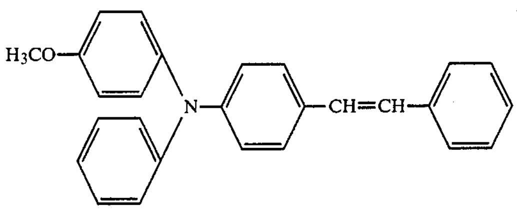

COMPARATIVE EXAMPLE 8

Example 21 was repeated except for substituting the bisazo compound L-(8) represented by the formula shown below for the exemplary compound B-(22) to prepare an electrophotographic photoreceptor for comparative purpose.

L-(8)

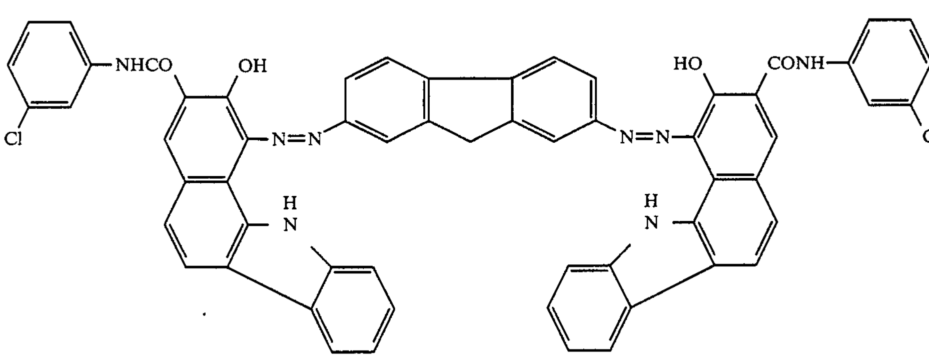

For this photoreceptor, the same measurements as in Example 1 were conducted to obtain the results as shown in Table 13.

TABLE 13

| | First measurement | | 100th measurement | |
|---|---|---|---|---|
| | $E_{\frac{1}{2}}$ (lux · sec) | $V_R$ (V) | $E_{\frac{1}{2}}$ (lux · sec) | $V_R$ (V) |
| Example 21 | 1.7 | 0 | 1.8 | 0 |
| Comparative example 8 | 9.0 | 0 | 15.2 | −80 |

EXAMPLE 22

Example 7 was repeated except that the exemplary compound A-(38) was replaced with the exemplary compound B-(27) and p-(N,N-diethylamino)benzaldehyde-1,1-diphenylhydrazone was replaced with 4-methyl-4'-styryl-triphenylamine (the compound K-(17) shown below) to prepare a photoreceptor of this invention.

For this photoreceptor, the same measurements as in Example 16 were conducted to obtain the results of $E_{\frac{1}{2}}=1.9$ lux·sec and $V_R=0$ V.

EXAMPLE 23

Example 8 was repeated except that the exemplary compound A-(39) was replaced with the exemplary compound B-(30), and p-(N,N-diethylamino)benzaldehyde-1,1-diphenylhydrazone was replaced with 4-methyl-4'-styryl-triphenylamine (the compound K-(17) shown below). Similar results as in Example 8 were obtained.

K-(17)

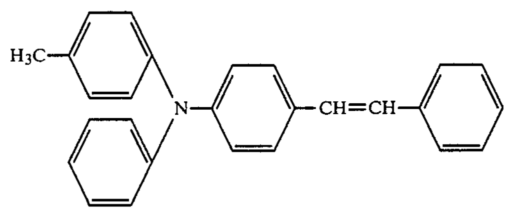

COMPARATIVE EXAMPLE 9

Example 23 was repeated except for using the bisazo compound L-(9) represented by the structural formula shown below in place of the examplary compound B-(30), and the copied images were evaluated similarly as in Example 23. As the result, only images with much fogging were obtained. Further, as copying was repeated, the copied images were lowered in contrast, until substantially no copied image was obtained after repetition for 2,000 times.

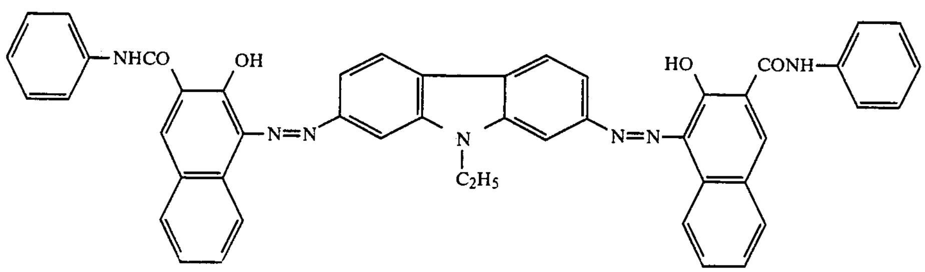

L-(9)

EXAMPLE 24

Example 9 was repeated except that the exemplary compound A-(4) was replaced with the exemplary compound B-(3) to prepare a photoreceptor.

For the thus obtained photoreceptor, $E_{\frac{1}{2}}$ and $V_R$ were measured similarly as in Example except for changing the charging voltage to +6 KV. The results of the first measurement were $E_{\frac{1}{2}}=2.5$ lux·sec and $V_R=+0$ V.

EXAMPLE 25

Example 10 was repeated except that 1-[4-(N,N-di-(p-tolyl)amino)benzylidene-amino]indoline was replaced with 4,4'-dimethyltriphenylamine, and the exemplary compounds A-(16) and A-(18) replaced with the exemplary compounds B-(14) and B-(15), respectively.

The thus obtained photoreceptor was evaluated similarly as in Example 24 to obtain the results of $E_{\frac{1}{2}}=3.0$ lux·sec and $V_R=+10$ V.

EXAMPLE 26

Example 11 was repeated except that the exemplary compound A-(10) was replaced with the exemplary compound B-(4), 6-methyl-1-(1-ethyl-4-carbazolyl)-methylideneamino-1,2,3,4-tetrahydroquinoline with 1-[4-N,N-diethylamino)-benzylidene]-amino-1,2,3,4-tetrahydroquinoline (the compound K-(18) shown below), 4-methoxy-4'-styryltriphenylamine with 4,4'-dimethyl-4''-styryltriphenylamine (the compound K-(19) shown below) and 4-methoxy-triphenylamine with 4,4'-dimethyl-4'-(4-chloro)-styryl-triphenylamine (the compound-(20) shown below) dissolved separately together with 14 g of to obtain the results shown in Table 14.

K-(18)

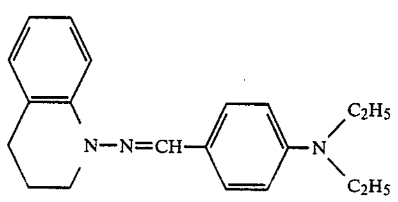

-continued

K-(19)

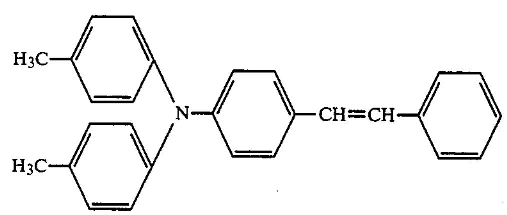

K-(20)

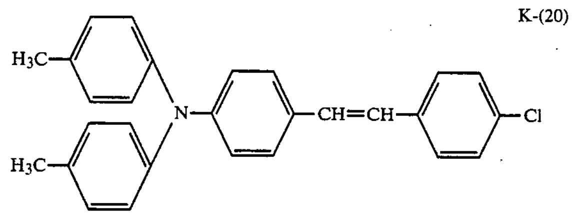

As shown in Table 14, good results can be obtained in each combinaiton with any one of the carrier transporting materials.

TABLE 14

| Carrier transporting material combined with exemplary compound B - (4) | $E_{\frac{1}{2}}$ (lux · sec) | $V_R$ (V) |
|---|---|---|
| K - (18) | 1.5 | 0 |
| K - (19) | 1.7 | 0 |
| K - (20) | 1.9 | 0 |

COMPARATIVE EXAMPLE 10

A comparative photoreceptor was prepared in the same manner as in Example 26 except for substituting the bisazo compound shown below (L-(10)) shown below for the exemplary compound B-(4) and subjected to characteristic evaluation.

L-(10)

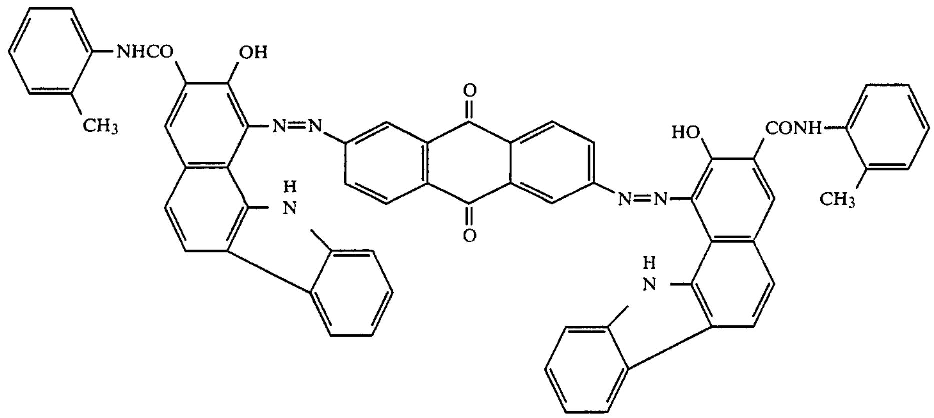

As shown in Table 15, the results were found to be varied depending on the carrier transporting material.

TABLE 15

| Carrier transporting material combined with exemplary compound L - (10) | $E_{\frac{1}{2}}$ (lux · sec) | $V_R$ (V) |
|---|---|---|
| K - (18) | 5.8 | 2 |
| K - (19) | 12.4 | 19 |
| K - (20) | 17.1 | 90 |

EXAMPLE 27

Example 12 was repeated except that the exemplary compound A-(12) was replaced with the exemplary compound B-(1), and 3-(p-methoxystyryl)-p-methoxyphenyl)carbazole with p-(N,N-diethylamino)benzaldehyde-1,1-diphenylhydrazone (the compound K-(21) shown below) to obtain the results shown in Table 16.

K-(21)

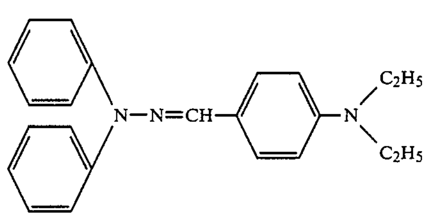

TABLE 16

| | 25° C. | 60° C. |
|---|---|---|
| VA (V) | −900 | −905 |
| $E_{\frac{1}{2}}$ (lux · sec) | 2.0 | 2.1 |
| $V_R$ (V) | 0 | 0 |

As apparently seen from the above results, the electrophotographic photoreceptor has good sensitivity and residual potential characteristic even at higher temperature, indicating good stability to heat.

EXAMPLE 28

Example 13 was repeated except that the exemplary compound A-(8) was replaced with the exemplary compound B-(3), and 4,4'-dimethyl-4"-(4-chloro)-styryltriphenylamine with 1-[1-(p-anisoyl)-4-carbazolyl]methylideneamino-indoline (the compound K-(22) shown below), to obtain the results as shown in Table 17.

K-(22)

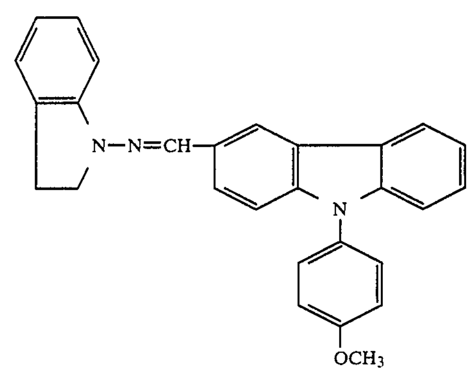

EXAMPLE 29

Example 28 was repeated except for effecting no irradiation of UV-ray after formation of the carrier generating layer to obtain the results shown in Table 17.

TABLE 17

| | Example 28 | Example 29 |
|---|---|---|
| VA (V) | −910 | −910 |
| $E_{\frac{1}{2}}$ (lux · sec) | 2.0 | 2.0 |
| $V_R$ (V) | 0 | 0 |

As apparently seen from the above results, it can be understood that the electrophotographic photoreceptor of this invention is excellent in sensitivity and residual potential characteristic relative to UV-ray irradiation, small in amount of variation of the receptor potential and also stable to light.

COMPARATIVE EXAMPLE 11

Photoreceptors were prepared in the same manner as in Example 28 and Example 29, except for changing the compound B-(3) to the bisazo compound (L-(11)) as shown below, and the same measurements as in Example 5 were conducted.

L-(11)

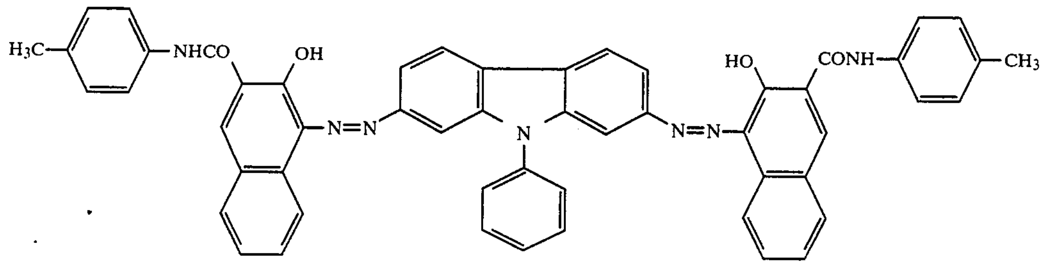

The results are shown in Table 18.

TABLE 18

| | With UV-ray irradiation | Without UV-ray irradiation |
|---|---|---|
| VA (V) | −1100 | −900 |
| $E_{1/2}$ (lux · sec) | 11.3 | 6.2 |
| $V_R$ (V) | −15 | −8 |

As apparently seen from the above results, the photoreceptor prepared by use of the above compound is deteriorated in sensitivity and residual potential characteristic by UV-ray irradiation with greater amount of variation of the receptor potential.

EXAMPLE 30

Example 15 was repeated except for using the exemplary compound B-(2) in place of the exemplary compound A-(1). Similar results as in Example 15 were obtained.

COMPARATIVE EXAMPLE 12

Example 30 was repeated except for employing the comparative bisazo compound L-(12) shown below in place of the exemplary compound B-(2) to obtain a comparative photoreceptor.

EXAMPLE 31

Example 1 was repeated except that the exemplary compound A-(14) was replaced with the exemplary compound C-(21) and 4,4'-dimethyl-4''-styryl-triphenylamine with 1-phenyl-(p-methylstyryl)-5-(p-methoxyphenyl)-pyrazoline (having the formula K-(23) shown below).

K-(23)

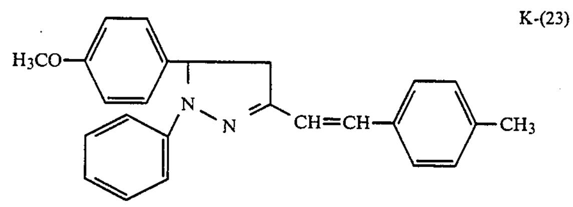

The results are shown in Table 19.

TABLE 19

| | First measurement | 100th measurement |
|---|---|---|
| $E_{1/2}$ (lux · sec) | 1.6 | 1.6 |
| $V_R$ (V) | 0 | 0 |

L-(12)

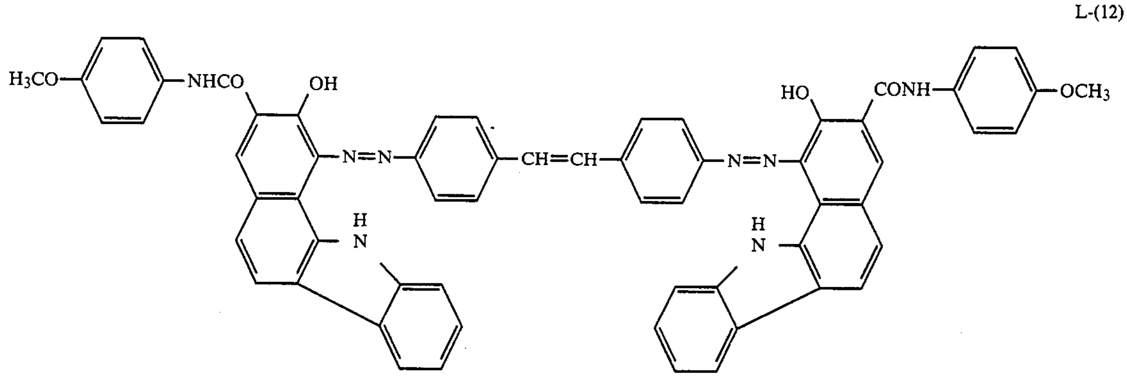

The photoreceptor was found to have a spectral sensitivity of 5.2 $\mu J/cm^2$ (half-reduction dosage). When practical copying test by the semiconductor laser was conducted similarly as in Example 30, much fogging occurred to give no good image.

COMPARATIVE EXAMPLE 13

A photoreceptor for comparative purpose was prepared in the same manner as in Example 31 except for employing the bisazo compound L-(13) shown below as the carrier generating material.

L-(13)

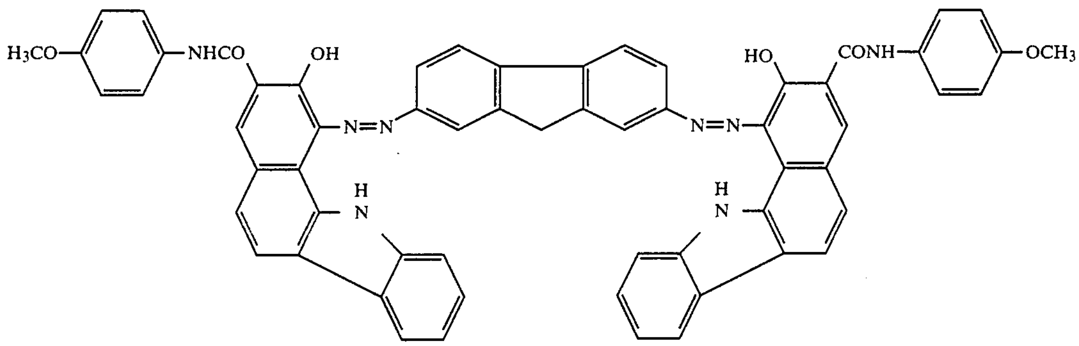

For this photoreceptor for comparative purpose, measurements were conducted similarly as in Example 31 to obtain the results as shown in Table 20.

TABLE 20

| | First measurement | 100th measurement |
|---|---|---|
| $E_{\frac{1}{2}}$ (lux · sec) | 9.5 | 12.3 |
| $V_R$ (V) | −25 | −140 |

As apparently seen from the above results, the photosensitive member of this invention is very superior to the photoreceptor for comparative purpose with respect to sensitivity, rsidual potential and stability in repeated uses.

EXAMPLES 32–34

Using the exemplary compounds C-(5), C-(6) and C-(6) as the carrier generating material, and 6-methyl-1-(1-ethyl-4-carbazolyl)methylideneamino-1,2,3,4-tetrahydroquinoline (the compound K-(24) shown below), 1-(1-ethyl-4-carbazolyl)methylideneamino-1,2,3,4-tetrahydroquinoline (the compound K-(25) shown below) and 4,4'-dimethyl-4''-(4-chloro)-styryltriphenylamine (the compound K-(26) shown below), respectively, as the carrier transporting material following otherwise the same procedure as described in Example 31, photoconductive members of this invention were prepared and subjected to similar measurements to obtain the results shown in Table 21.

K-(24)

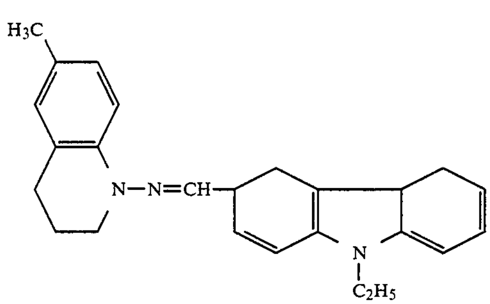

-continued

K-(25)

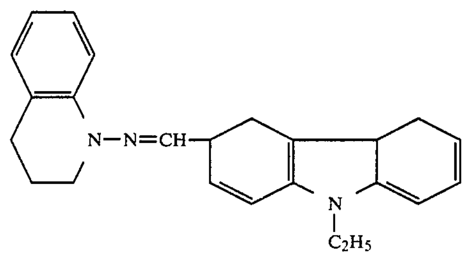

K-(26)

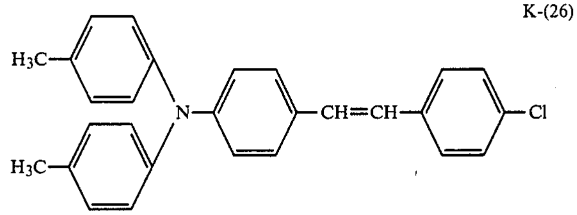

TABLE 21

| Example | Bisazo compound | First measurement $E_{\frac{1}{2}}$ (lux · sec) | First measurement $V_R$ (V) | 100th measurement $E_{\frac{1}{2}}$ (lux · sec) | 100th measurement $V_R$ (V) |
|---|---|---|---|---|---|
| 32 | Exemplary compound C - (5) | 1.2 | 0 | 1.2 | 0 |
| 33 | Exemplary compound C - (6) | 1.4 | 0 | 1.4 | 0 |
| 34 | Exemplary compound C - (7) | 1.6 | 0 | 1.6 | 0 |

EXAMPLE 35

Example 5 was repeated except that the exemplary compound A-(5) was replaced with the exemplary compound C-(11), and 4-methyl-4'-styryl-triphenylamine with 3,3',4-trimethyl-triphenylamine.

For this photoreceptor, the same measurements as in Example 31 were conducted to obtain the results of $E_{\frac{1}{2}}$=2.6 lux.sec and $V_R$=0 V.

EXAMPLE 36

Example 6 was repeated except that the exemplary compound A-(32) was replaced with the exemplary compound C-(33), and 1-phenyl-3-(p-diethylaminostyryl)-5-(p-diethylaminophenyl)pyrozoline replaced with 4-methoxy-4'-styryltriphenylamine (the compound K-(16) shown above) to obtain the results shown in Table 22.

COMPARATIVE EXAMPLE 14

Example 36 was repeated except for substituting the bisazo compound L-(14) represented by the formula shown below for the exemplary compound C-(33) to prepare an electrophotographic photoreceptor for comparative purpose.

EXAMPLE 38

Example 8 was repeated except that the exemplary compound A-(39) was replaced with the exemplary compound C-(39), and p-(N,N-diethylamino)benzaldehyde-1,1-diphenylhydrazone replaced with 3-(p-methoxystyryl)-9-(p-methoxyphenyl)carbazole (the compound K-(27) shown below). Similar results as in Example 8 were obtained.

L-(14)

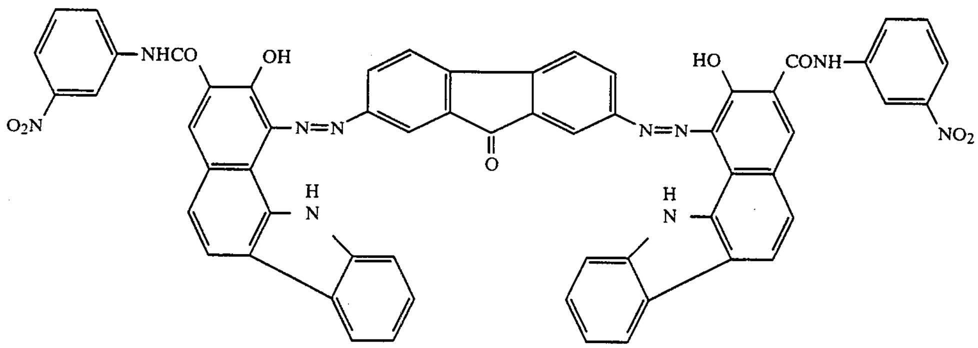

For this photoreceptor, the same measurements as in Example 31 were conducted to obtain the results as shown in Table 22.

TABLE 22

| | First measurement | | 100th measurement | |
|---|---|---|---|---|
| | $E_{\frac{1}{2}}$ (lux · sec) | $V_R$ (V) | $E_{\frac{1}{2}}$ (lux · sec | $V_R$ (V) |
| Example 36 | 1.6 | 0 | 1.7 | 0 |
| Comparative example 14 | 7.0 | 0 | 11.3 | −70 |

EXAMPLE 37

Example 7 was repeated except that the exemplary compound A-(5) was replaced with the exemplary compound C-(13) and p-(N,N-diethylamino)benzaldehyde-1,1-diphenylhydrazone with 3-(p-methoxystyryl)-9-(p-methoxyphenyl)carbazole (the compound K-(27) shown below) to prepare a photoreceptor of this invention.

For this photoreceptor, the same measurements as in Example 31 were conducted to obtain the results of $E_{\frac{1}{2}}$=1.9 lux·sec and $V_R$=0 V.

K-(27)

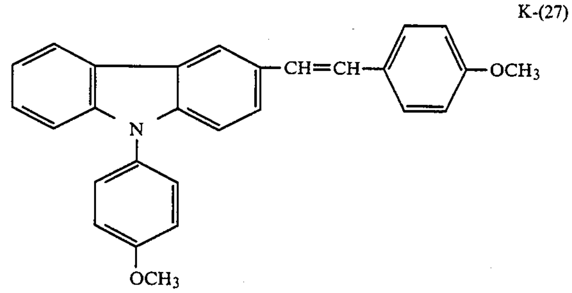

COMPARATIVE EXAMPLE 15

Example 38 was repeated except for using the bisazo compound L-(15) represented by the structural formula shown below in place of the examplary compound C-(39), and the copied images were evaluated similarly as in Example 38. As the result, only images with much fogging were obtained. Further, as copying was repeated, the copied images were lowered in contrast, until substantially no copied image was obtained after repetition for 2,000 times.

L-(15)

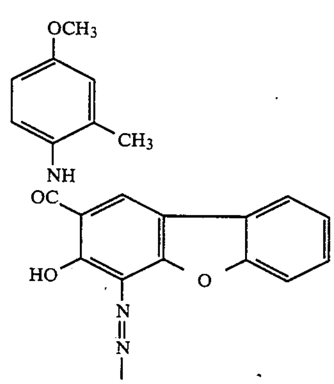

-continued

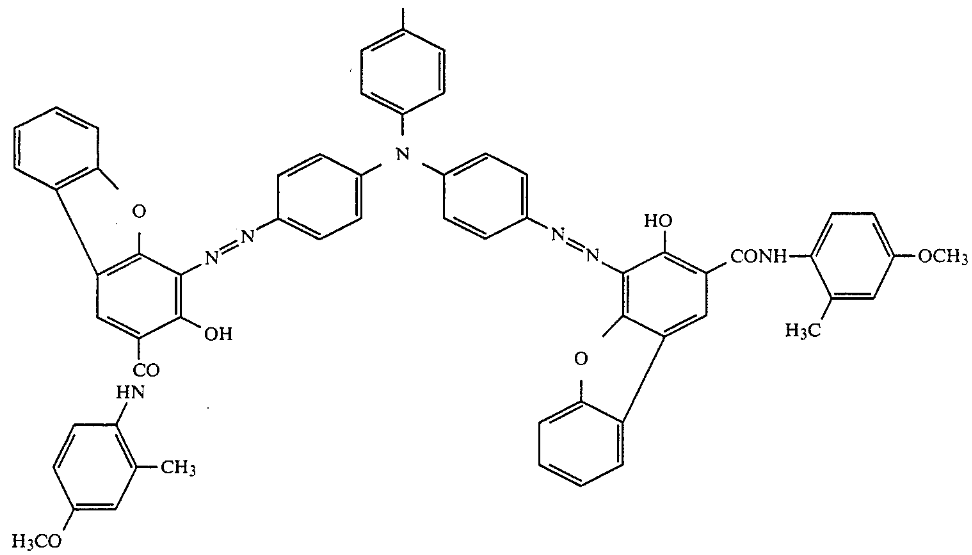

K-(28)

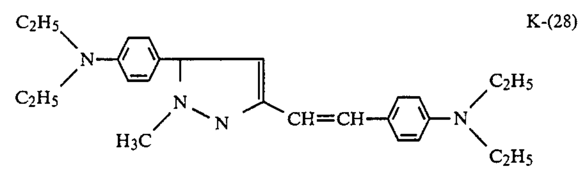

K-(29)

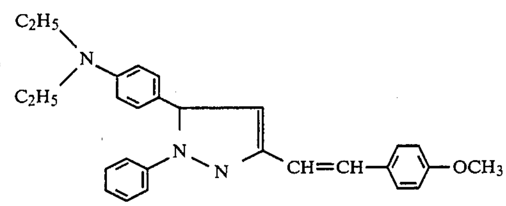

K-(30)

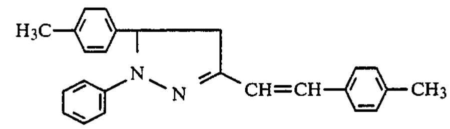

EXAMPLE 39

Example 9 was repeated except that exemplary compound A-(4) was replaced with the exemplary compound C-(17) to prepare a photoreceptor.

For the thus obtained photoreceptor, $E_{\frac{1}{2}}$ and $V_R$ were measured similarly as in Example 31 except for changing the charging voltage to +6 KV. The results of the first measurement were $E_{\frac{1}{2}}$=2.2 lux·sec and $V_R$=+2 V.

EXAMPLE 40

Example 10 was repeacted except that 1-[4-(N,N-di-(p-tolyl)amino)benzylidene-amino]indoline was replaced with 4-methoxytriphenylamine, and the exemplary compounds A-(16) and A-(18) were replaced with the exemplary compounds C-(12) and C-(14), respectively.

The thus obtained photoreceptor was evaluated similarly as in Example 39 to obtain the results of $E_{\frac{1}{2}}$=2.5 lux·sec and $V_R$=+7 V.

EXAMPLE 41

Example 11 was repeated except that the exemplary compound A-(10) was replaced with the exemplary compound C-(10), 6-methyl-1-(1-ethyl-4-carbazolyl)-methylideneamino-1,2,3,4-tetrahydroquinoline with 1-methyl-3-(p-diethylaminophenyl)-5-(p-diethylamino-phenyl)pyrazoline (the compound K-(28), 4-methoxy-4'-styryl-triphenylamine with 1-phenyl-(p-methoxystyryl)-5-(p-diethylaminophenyl)pyrazoline (the compound K-(29) shown below) and 4-methoxy-triphenylamine with 1-phenyl-(p-methylstyryl)-5-(p-methylphenyl)pyrazoline (the compound K-(30) shown below) to obtain the results shown in Table 23.

TABLE 23

| Carrier transporting material combined with exemplary compound C - (10) | $E_{\frac{1}{2}}$ (lux · sec) | $V_R$ (V) |
|---|---|---|
| K - (28) | 1.4 | 0 |
| K - (29) | 1.5 | 0 |
| K - (30) | 1.7 | 0 |

COMPARATIVE EXAMPLE 16

A comparative photoreceptor was prepared in the same manner as in Example 41 except for substituting the bisazo compound shown below (L-(16)) shown below for the exemplary compound C-(10) and subjected to characteristic evaluation.

L-(16)

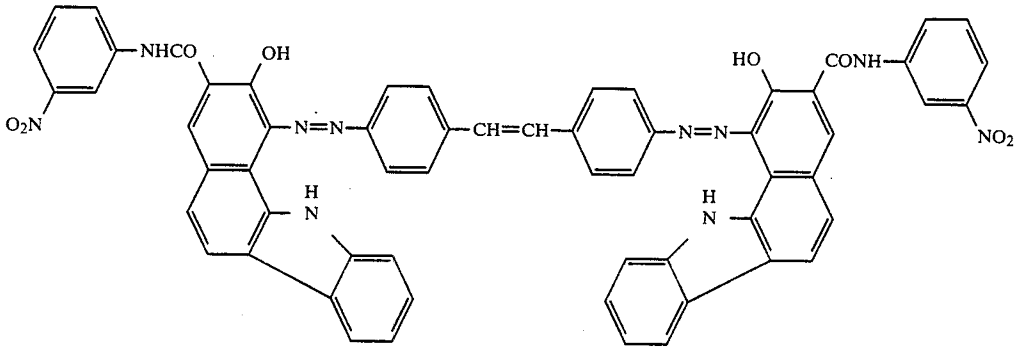

As shown in Table 24, the results were found to be varied depending on the carrier transporting material.

TABLE 24

| Carrier transporting material combined with exemplary compound L - (16) | $E_{\frac{1}{2}}$ (lux · sec) | $V_R$ (V) |
|---|---|---|
| K - (28) | 4.1 | 2 |
| K - (29) | 7.8 | 10 |
| K - (30) | 12.3 | 50 |

EXAMPLE 42

Example 12 was repeated except that the exemplary compound A-(12) was replaced with the exemplary compound C-(2), and 3-(p-methoxystyryl)-p-methoxyphenyl)carbazole with 4-methyl-4'-styryl-triphenylamine (the compound K-(17) shown above) to obtain the results shown in Table 25.

TABLE 25

| | 25° C. | 60° C. |
|---|---|---|
| VA (V) | −870 | −890 |
| $E_{\frac{1}{2}}$ (lux · sec) | 1.9 | 1.9 |
| $V_R$ (V) | 0 | 0 |

As apparently seen from the above results, the electrophotographic photoreceptor has good sensitivity and residual potential characteristics even at higher temperature, indicating good stability to heat.

EXAMPLE 43

Example 13 was repeated except that the exemplary compound A-(8) was replaced with the exemplary compound C-(3), and 4,4'-dimethyl-4''-(4-chloro)-styryl-triphenylamine with 4-methoxy-4'-(4-methylstyryl)-triphenylamine (the compound K-(3) shown above), to obtain the results as shown in Table 26.

EXAMPLE 44

Example 43 was repeated except for effecting no irradiation of UV-ray after formation of the carrier generating layer to obtain the results shown in Table 26.

TABLE 26

| | Example 43 | Example 44 |
|---|---|---|
| VA (V) | −1000 | −980 |
| $E_{\frac{1}{2}}$ (lux · sec) | 1.4 | 1.3 |
| $V_R$ (V) | 0 | 0 |

As apparently seen from the above results, it can be understood that the electrophotographic photoreceptor of this invention is excellent in sensitivity and residual potential characteristic relative to UV-ray irradiation, small in amount of variation of the receptor potential and also stable to light.

COMPARATIVE EXAMPLE 17

Photoreceptors were prepared in the same manner as in Example 43 and Example 44, except for changing the compound C-(1) to the bisazo compound (L-(17)) as shown below, and the same measurements as in Example 35 were conducted.

L-(17)

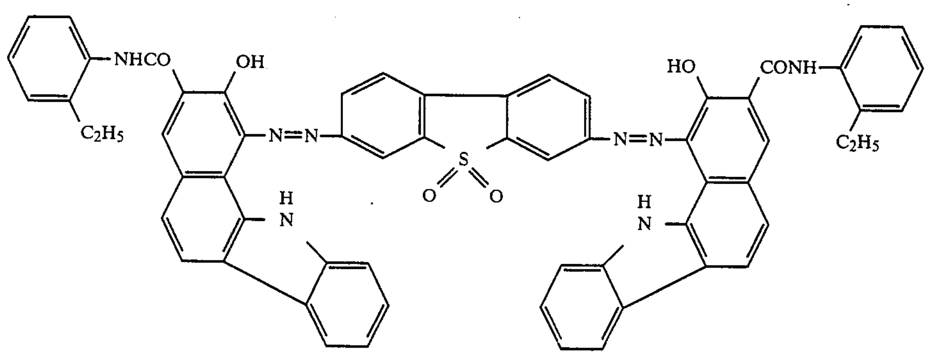

The results are shown in Table 27.

TABLE 27

| | With UV-ray irradiation | Without UV-ray irradiation |
|---|---|---|
| VA (V) | −1000 | −920 |
| $E_{\frac{1}{2}}$ (lux · sec) | 12.6 | 9.3 |
| $V_R$ (V) | −14 | −5 |

As apparently seen from the above results, the photoreceptor prepared by use of the above compound is deteriorated in sensitivity and residual potential characteristic by UV-ray irradiation with greater amount of variation of the receptor potential.

EXAMPLE 45

Example 15 was repeated except for using the exemplary compound C-(3) in place of the exemplary compound A-(1) to obtain a photoreceptor having a spectral sensitivity of 0.47 μJ/cm² (half-reduction dosage) at 790 nm. Similar results as in Example 15 were obtained.

COMPARATIVE EXAMPLE 18

Example 45 was repeated except for employing the comparative bisazo compound L-(18) shown below in place of the exemplary compound C-(3) to obtain a comparative photoreceptor.

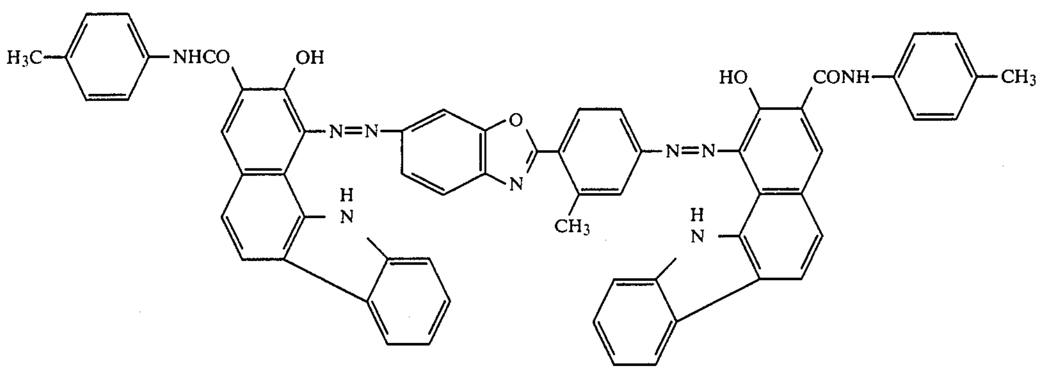

L-(18)

The photoreceptor was found to have a spectral sensitivity of 6.8 μJ/cm² (half-reduction dosage). When practical copying test by the semiconductor laser was conducted similarly as in Example 30, much fogging occurred to give no good image.

EXAMPLE 46

Example 1 was repeated except that the exemplary compound A-(14) was replaced with the exemplary compound D-(105) and 4,4'-dimethyl-4''-styryl-triphenylamine with 4,4'-dimethyl-4''-(4-methyl)-styryl-triphenylamine (the compound K-(32) shown below).

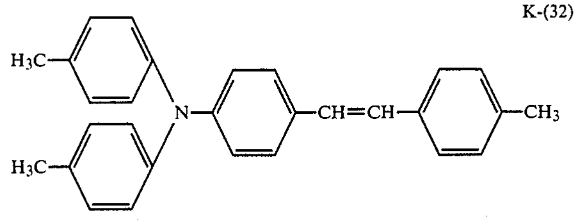

K-(32)

The results are shown in Table 28.

TABLE 28

| | First measurement | 100th measurement |
|---|---|---|
| $E_{\frac{1}{2}}$ (lux · sec) | 1.2 | 1.2 |
| $V_R$ (V) | 0 | 0 |

COMPARATIVE EXAMPLE 19

A photoreceptor for comparative purpose was prepared in the same manner as in Example 46 except for employing the bisazo compound L-(19) shown below as the carrier generating material.

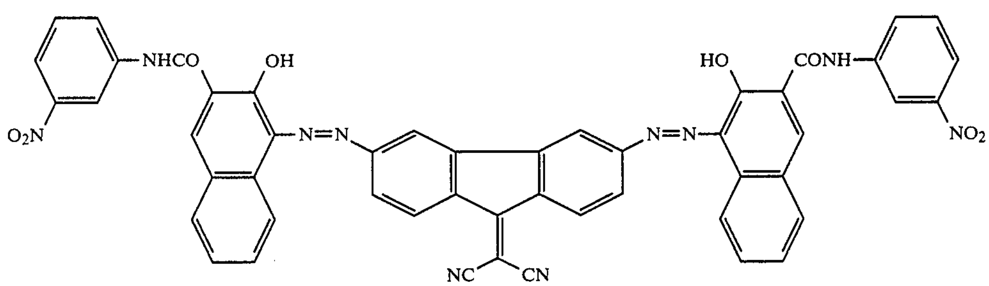

L-(19)

For this photoreceptor for comparative purpose, measurements were conducted similarly as in Example 46 to obtain the results as shown in Table 29.

TABLE 29

| | First measurement | 100th measurement |
|---|---|---|
| $E_{\frac{1}{2}}$ (lux · sec) | 6.5 | 10.2 |
| $V_R$ (V) | −12 | −100 |

As apparently seen from the above results, the photoreceptor of this invention is very superior to the photoreceptor for comparative purpose with respect to sensitivity, residual potential and stability in repeated uses.

EXAMPLE 47

Using the exemplary compound D-(105) as the carrier generating material, and the compound shown below K-(33) as the carrier transporting material following otherwise the same procedure as described in Example 46, photoconductive members of this invention were prepared and subjected to similar measurements to obtain the results shown in Table 30.

K-(33)

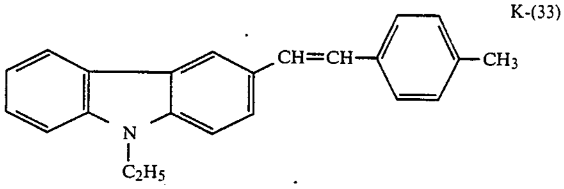

TABLE 30

| Example | Bisazo compound | First measurement $E_{\frac{1}{2}}$ (lux · sec) | First measurement $V_R$ (V) | 100th measurement $E_{\frac{1}{2}}$ (lux · sec) | 100th measurement $V_R$ (V) |
|---|---|---|---|---|---|
| 47 | Exemplary compound D - (105) | 1.3 | 0 | 1.3 | 0 |

EXAMPLE 48

Example 5 was repeated except that the exemplary compound A-(5) was replaced with the exemplary compound D-(139), and the compound shown below K-(34) was employed as the carrier transporting material.

K - (34)

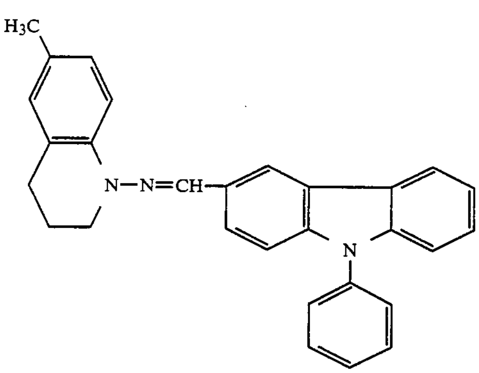

For this photoreceptor, the same measurements as in Example 1 were conducted to obtain the results of the first measurement of $E_{\frac{1}{2}}$=1.5 lux·sec and $V_R$=0 V.

EXAMPLE 48

Example 6 was repeated except that the exemplary compound A-(32) was replaced with the exemplary compound D-(78) and the compound K-(35) shown below was employed as the carrier transporting material to obtain the results shown in Table 31.

K - (35)

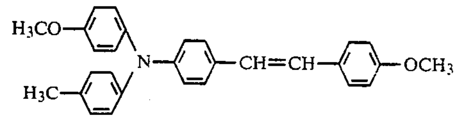

COMPARATIVE EXAMPLE 20

Example 48 was repeated except for substituting the bisazo compound L-(20) represented by the formula shown below for the exemplary compound D-(78) to prepare an electrophotographic photoreceptor for comparative purpose.

L - (20)

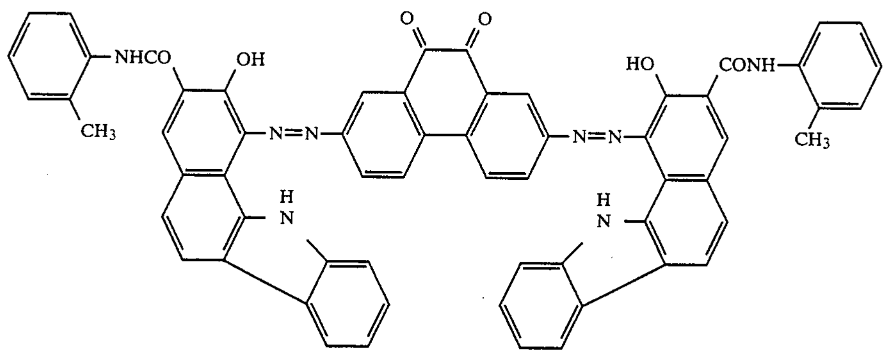

For this photoreceptor, the same measurements as in Example 46 were conducted to obtain the results as shown in Table 31.

TABLE 31

| | First measurement $E_{\frac{1}{2}}$ (lux · sec) | First measurement $V_R$ (V) | 100th measurement $E_{\frac{1}{2}}$ (lux · sec) | 100th measurement $V_R$ (V) |
|---|---|---|---|---|
| Example 46 | 1.4 | 0 | 1.5 | 0 |
| Comparative example 20 | 6.2 | 0 | 11.0 | −40 |

EXAMPLE 47

Example 8 was repeated except that the exemplary compound A-(39) was replaced with the exemplary compound D-(138), and the compound K-(36) shown below was employed as the carrier transporting material. Similar results as in Example 8 were obtained.

K - (36)

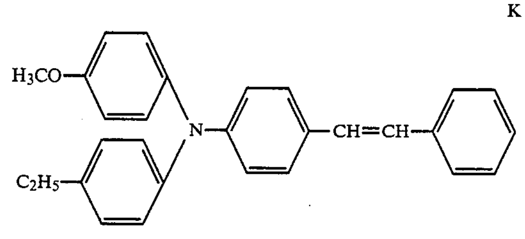

COMPARATIVE EXAMPLE 21

Example 47 was repeated except for using the bisazo compound L-(21) represented by the structural formula shown below in place of the exemplary compound D-(138), and the copied images were evaluated similarly as in Example 47. As the result, only images with much fogging were obtained. Further, as copying was repeated, the copied images were lowered in contrast, until substantially no copied image was obtained after repetition for 2,000 times.

L-(21)

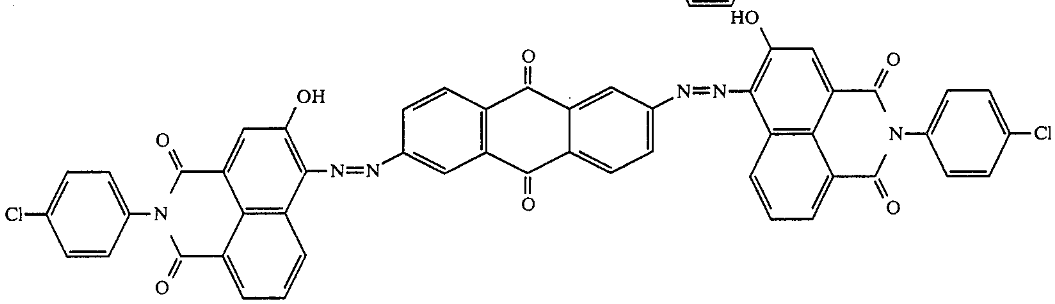

EXAMPLE 48

Example 9 was repeated except that exemplary compound A-(4) was replaced with the exemplary compound D-(48) to prepare a photoreceptor.

For the thus obtained photoreceptor, $E_{1/2}$ and $V_R$ were measured similarly as in Example 91 except for changing the charging voltage to +6 KV. The results of the first measurement were $E_{1/2}-1.7$ lux·sec and $V_R=+3$ V.

EXAMPLE 49

Example 10 was repeated except that the compound K-(37) shown below was employed as the carrier transporting material, and the exemplary compounds D-(93) and D-(94) were employed as the carrier generating materials, respectively.

K - (37)

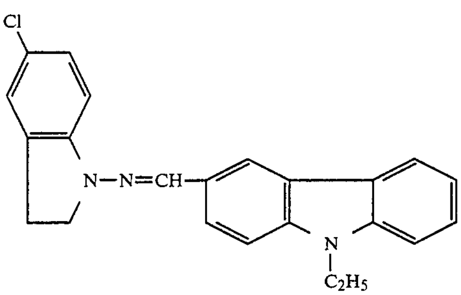

The thus obtained photoreceptor was evaluated similarly as in Example 48 to obtain the results of $E_{1/2}=1.9$ lux·sec and $V_R=+6$ V.

EXAMPLE 49

On an electroconductive support having aluminum foil laminated on a polyester film was provided an intermediate layer with a thickness of 0.05 μm made of a vinyl choloride-vinyl acetate-maleic anhydride copolymer "Ethlec MF-10" (trade name, produced by Sekisui Kagaku K.K.), followed by coating thereon with a dispersion prepared by dispersing a mixture of 4 g of the exemplary compound D-(128) and 8 g of the compound K-(38) shown below), 3 g of a polycarbonate resin "Panlite L-1250" (trade name, produced by Teijin Kasei K.K.) in 100 ml of dichloroethane in a sand grinder for 24 hours to prepare a photoreceptor.

K - (38)

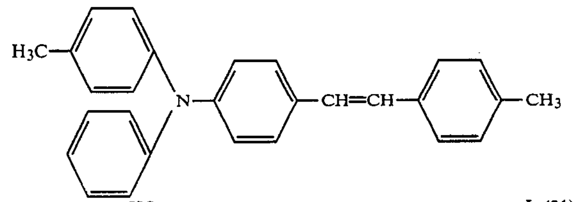

For this photoreceptor, $E_{1/2}$ and $V_R$ were measured in the same manner as in Example 46 except for changing the charged voltage to +6 KV to obtain the results of the first measurement of $E_{178}=1.0$ lux·sec and $V_R=0$ V.

EXAMPLE 50

Example 11 was repeated except that the exemplary compound A-(10) was replaced with the exemplary compound D-(64) and the carrier transporting materials were changed to the compounds shown below K-(39), K-(40) and K-(41), respectively, to obtain the results shown in Table 32.

K-(39)

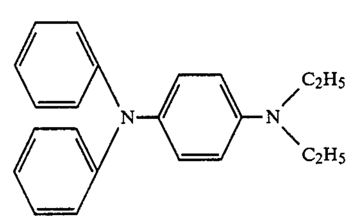

K-(40)

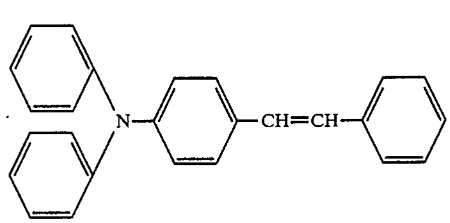

-continued

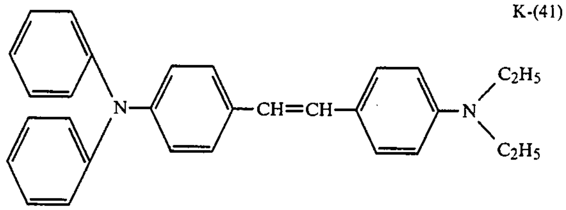

K-(41)

TABLE 32

| Carrier transporting material combined with exemplary compound D - (64) | $E_{\frac{1}{2}}$ (lux · sec) | $V_R$ (V) |
|---|---|---|
| K - (39) | 1.6 | 0 |
| K - (40) | 1.4 | 0 |
| K - (41) | 1.2 | 0 |

COMPARATIVE EXAMPLE 22

A comparative photoreceptor was prepared in the same manner as in Example 50 except for substituting the bisazo compound shown below (L-(22)) shown below for the exemplary compound D-(64) and subjected to characteristic evaluation.

TABLE 34

| Example No. | Charge generating material | Charge transporting material | Spectral sensitivity volt · cm$^2$ · $\mu W^{-1}$ · $sec^{-1}$ |
|---|---|---|---|
| Example 51 | Exemplary compound D-(1) | Compound K-(42) | 990 |
| Example 52 | Exemplary compound D-(2) | Compound K-(43) | 920 |
| Example 53 | Exemplary compound D-(6) | Compound K-(44) | 940 |
| Example 54 | Exemplary compound D-(27) | Compound K-(45) | 820 |
| Example 55 | Exemplary compound D-(40) | Compound K-(46) | 730 |
| Example 56 | Exemplary compound D-(43) | Compound K-(47) | 610 |
| Example 57 | Exemplary compound D-(46) | Compound K-(48) | 520 |
| Example 58 | Exemplary compound D-(58) | Compound K-(49) | 890 |
| Example 59 | Exemplary compound D-(70) | Compound K-(50) | 540 |

Compound K-(42)

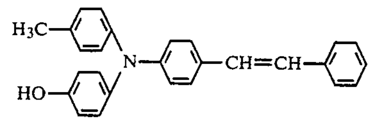

Compound K-(43)

L - (22)

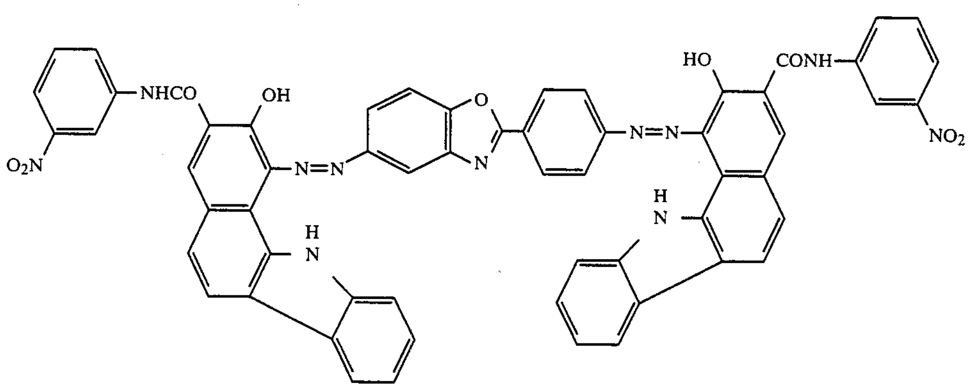

As shown in Table 33, the results were found to be varied depending on the carrier transporting material.

TABLE 33

| Carrier transporting material combined with the compound L - (22) | $E_{\frac{1}{2}}$ (lux · sec) | $V_R$ (V) |
|---|---|---|
| K - (39) | 10.3 | 40 |
| K - (40) | 9.1 | 25 |
| K - (41) | 5.5 | 10 |

EXAMPLES 51-59

In Example 48, the exemplary compound D-(200) (charge generating material) and the compound K-(34) (charge transportin material) were changed, respectively, to those as shown in Table 34, under otherwise the same conditions to prepare drum-shaped photoreceptors. These photoreceptors were found to have spectral sensitivities at 790 nm as shown in Table 34. In any of the copying tests conducted similarly as in Example 106 by use of these photoreceptors (Examples 51-59), good images without fog were obtained.

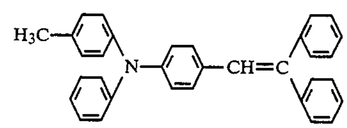

Compound K-(44)

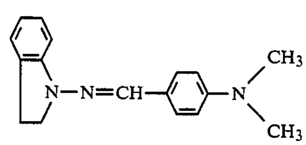

Compound K-(45)

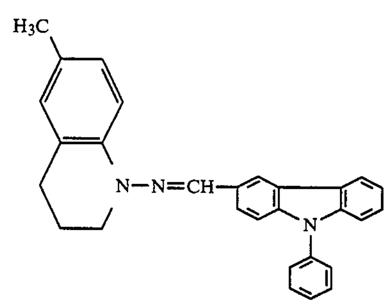

TABLE 34-continued

Compound K-(46)

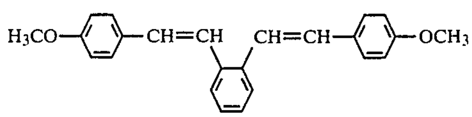

Compound K-(47)

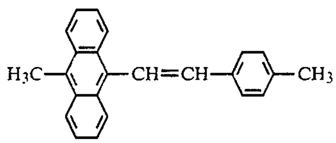

Compound K-(48)

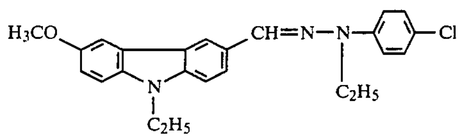

Compound K-(49)

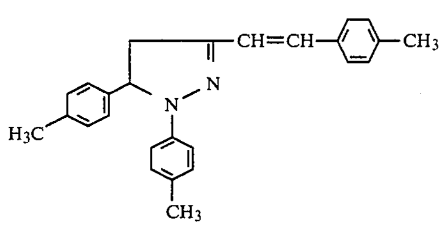

Compound K-(50)

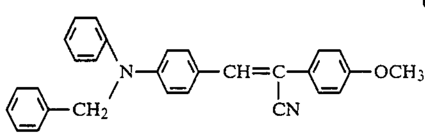

EXAMPLE 60

Example 1 was repeated except that the exemplary compound A-(14) was replaced with the exemplary compound E-(63) and 4,4'-dimethyl-4''-styryl-triphenylamine with the compound of the formula K-(51) shown below.

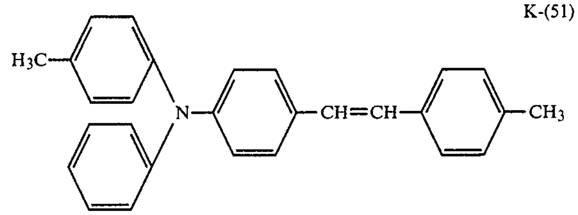

K-(51)

The results are shown in Table 35.

TABLE 35

| | First measurement | 100th measurement |
|---|---|---|
| $E_{1/2}$ (lux · sec) | 1.1 | 1.1 |
| $V_R$ (V) | 0 | 0 |

COMPARATIVE EXAMPLE 23

A photoreceptor for comparative purpose was prepared in the same manner as in Example 60 except for employing the bisazo compound L-(23) shown below as the carrier generating material.

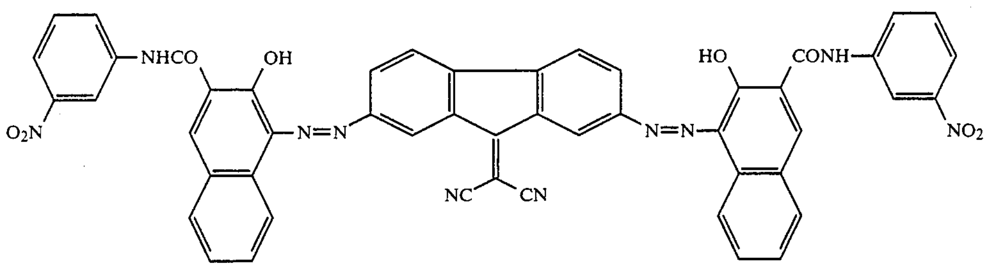

L - (23)

For this photoreceptor for comparative purpose, measurements were conducted similarly as in Example 60 to obtain the results as shown in Table 36.

TABLE 36

| | First measurement | 100th measurement |
|---|---|---|
| $E_{1/2}$ (lux · sec) | 6.5 | 10.2 |
| $V_R$ (V) | −12 | −100 |

As apparently seen from the above results, the photoreceptor of this invention is very superior to the photoreceptor for comparative purpose with respect to sensitivity, residual potential and stability in repeated uses.

EXAMPLE 61

Using the exemplary compound E-(128) as the carrier generating material, and the compound shown below (K-(52)) as the carrier transporting material following otherwise the same procedure as described in Example 46, photoconductive members of this invention were prepared and subjected to similar measurements to obtain the results shown in Table 37.

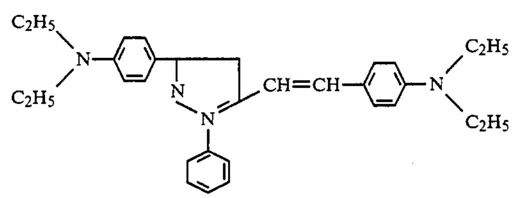

K-(52)

TABLE 37

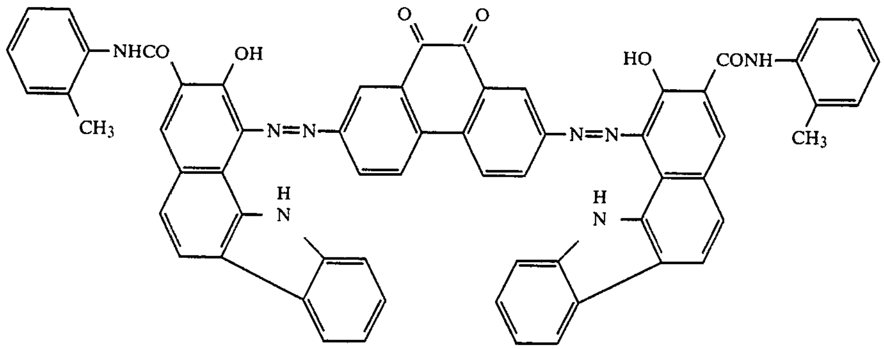

| Example | Bisazo compound | First measurement $E_{\frac{1}{2}}$ (lux · sec) | First measurement $V_R$ (V) | 100th measurement $E_{\frac{1}{2}}$ (lux · sec) | 100th measurement $V_R$ (V) |
|---|---|---|---|---|---|
| 61 | Exemplary compound E - (128) | 1.3 | 0 | 1.3 | 0 |

EXAMPLE 62

Example 5 was repeated except that the exemplary compound A-(5) was replaced with the exemplary compound E-(113), and the compound K-(53) shown below was employed as the carrier transporting material.

K-(53)

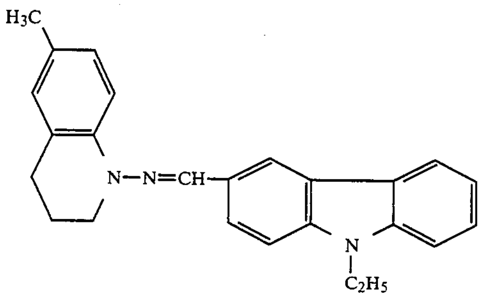

For this photoreceptor, the same measurements as in Example 1 were conducted to obtain the results of $E_{178}=1.7$ lux·sec and $V_R=0$ V.

EXAMPLE 63

Example 6 was repeated except that the exemplary compound A-(32) was replaced with the exemplary compound E-(72) and the compound K-(54) shown below was employed as the carrier transporting material to obtain the results shown in Table 38.

K-(54)

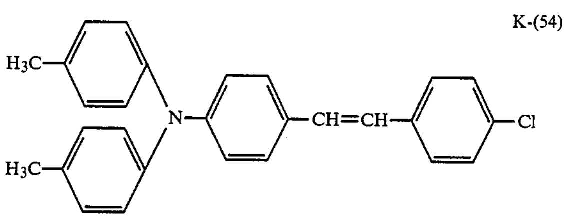

COMPARATIVE EXAMPLE 24

Example 63 was repeated except for substituting the bisazo compound L-(24) represented by the formula shown below for the exemplary compound E-(72) to prepare an electrophotographic photoreceptor for comparative purpose.

L-(24)

For this photoreceptor, the same measurements as in Example 1 were conducted to obtain the results as shown in Table 38.

TABLE 38

| | First measurement $E_{\frac{1}{2}}$ (lux · sec) | First measurement $V_R$ (V) | 100th measurement $E_{\frac{1}{2}}$ (lux · sec) | 100th measurement $V_R$ (V) |
|---|---|---|---|---|
| Example 63 | 1.4 | 0 | 1.5 | 0 |
| Comparative example 24 | 6.2 | 0 | 11.0 | −40 |

EXAMPLE 64

Example 7 was repeated except that the exemplary compound A-(5) was replaced with the exemplary compound E-(103) and the compound K-(55) shown below was employed as the carrier transporting material to prepare a photoreceptor of this invention.

K-(55)

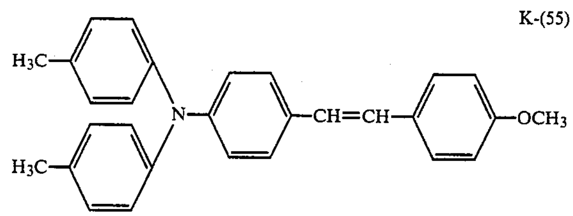

For this photoreceptor, the same measurements as in Example 1 were conducted to obtain the results of $E_{178}=1.6$ lux·sec and $V_R=0$ V.

EXAMPLE 65

Example 8 was repeated except that the exemplary compound A-(39) was replaced with the exemplary compound E-(109), and the compound K-(56) shown below was employed as the carrier transporting material. Similar results as in Example 8 were obtained.

K-(56)

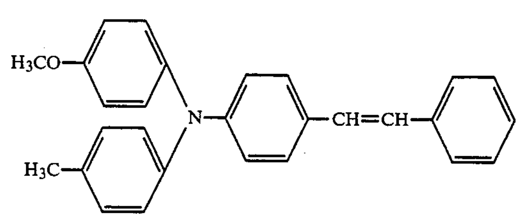

COMPARATIVE EXAMPLE 25

Example 65 was repeated except for using the bisazo compound L-(25) represented by the structural formula shown below in place of the examplary compound E-(109), and the copied images were evaluated similarly as in Example 65. As the result, only images with much fogging were obtained. Further, as copying was repeated, the copied images were lowered in contrast, until substantially no copied image was obtained after repetition for 2,000 times.

L-(25)

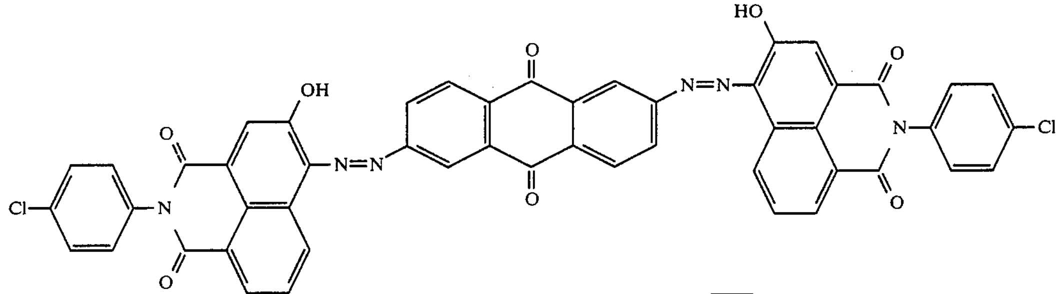

EXAMPLE 66

Example 10 was repeated except that the compound K-(57) shown below was employed as the carrier transporting material, and the exemplary compound E-(76) and the following bisazo compound were employed as the carrier generating materials.

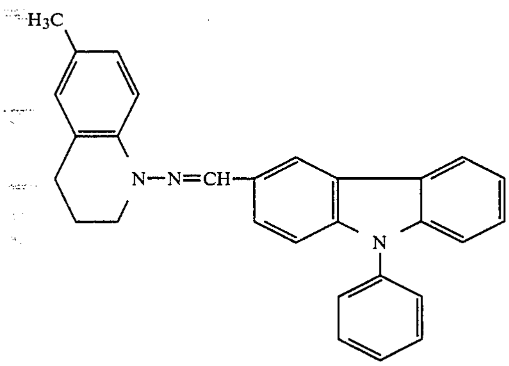

K-(57)

Bisazo compound

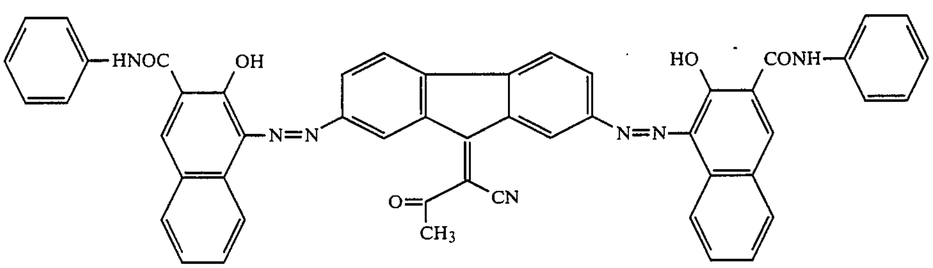

The thus obtained photoreceptor was evaluated similarly as in Example 65 to obtain the results of $E_{1/2}$=2.0 lux·sec and $V_R$=+7 V.

EXAMPLE 67

On an electroconductive support having aluminum foil laminated on a polyester film was provided an intermediate layer with a thickness of 0.05 μm made of a vinyl chloride-vinyl acetate-maleic anhydride copolymer "Ethlec MF-10" (trade name, produced by Sekisui Kagaku K.K.), followed by coating thereon with a dispersion prepared by dispersing a mixture of 4 g of the exemplary compound E-(100) and 8 g of the compound K-(58) shown below), 3 g of a polycarbonate resin "Panlite L-1250" (trade name, produced by Teijin Kasei K.K.) in 100 ml of dichloroethane in a sand grinder for 24 hours to prepare a photoreceptor.

K-(58)

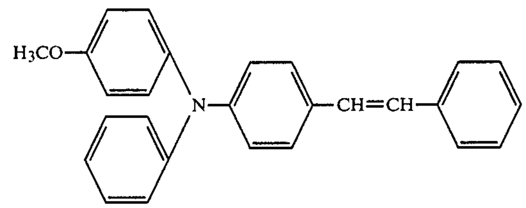

For this photoreceptor, $E_{1/2}$ and $V_R$ were measured in the same manner as in Example 1 except for changing the charged voltage to +6 KV to obtain the results of the first measurement of $E_{1/2}$=1.5 lux·sec and $V_R$=0 V.

EXAMPLE 68

Example 11 was repeated except that the exemplary compound A-(10) was replaced with the exemplary compound E-(52), and the carrier transporting materials were changed to the compounds shown below K-(59), K-(60) and K-(61), respectively, to obtain the results shown in Table 39.

K-(98)

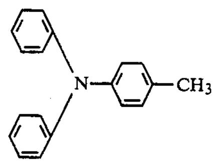

K-(99)

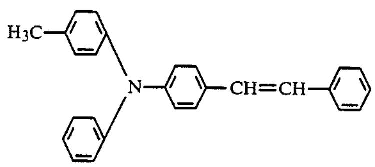

K-(100)

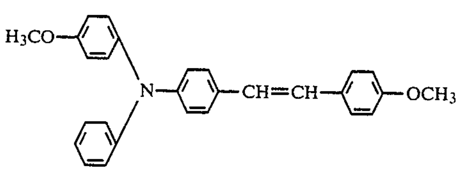

TABLE 39

| Carrier transporting material combined with exemplary compound E - (52) | $E_{1/2}$ (lux · sec) | $V_R$ (V) |
|---|---|---|
| K - (59) | 1.7 | 0 |
| K - (60) | 1.5 | 0 |
| K - (61) | 1.2 | 0 |

COMPARATIVE EXAMPLE 26

A comparative photoreceptor was prepared in the same manner as in Example 68 except for substituting the bisazo compound shown below (L-(26)) shown below for the exemplary compound E-(52) and subjected to characteristic evaluation.

L-(26)

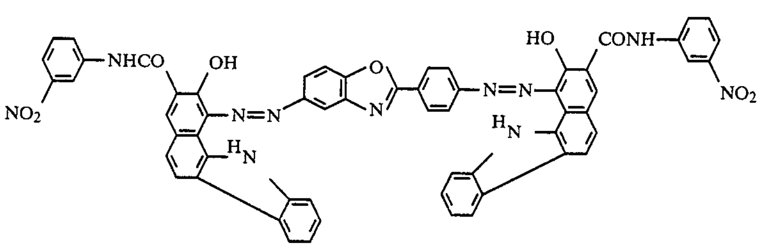

As shown in Table 40, the results were found to be varied depending on the carrier transporting material.

TABLE 40

| Carrier transporting material combined with the compound L - (26) | $E_{1/2}$ (lux · sec) | $V_R$ (V) |
|---|---|---|
| K - (59) | 11.2 | 30 |
| K - (60) | 8.2 | 20 |
| K - (61) | 6.5 | 10 |

EXAMPLE 69

Example 12 was repeated except that the exemplary compound A-(12) was replaced with the exemplary compound E-(105) and the compound K-(62) shown below was used as the carrier transporting material to obtain the results shown in Table 41.

K-(62)

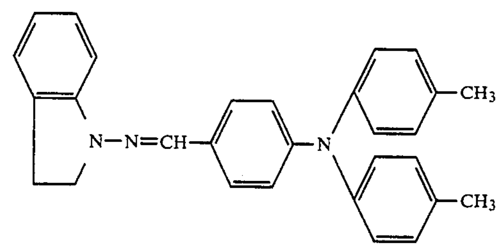

TABLE 41

| | 25° C. | 60° C. |
|---|---|---|
| VA (V) | −980 | −1000 |
| $E_{1/2}$ (lux · sec) | 1.1 | 1.1 |
| $V_R$ (V) | 0 | 0 |

As apparently seen from the above results, the electrophotographic photoreceptor has good sensitivity and residual potential characteristic even at higher temperature, indicating good stability to heat.

EXAMPLE 70

Example 13 was repeated except that the exemplary compound A-(8) was replaced with the exemplary compound E-(102) and the compound K-(63) shown below was employed as the carrier transporting material to obtain the results as shown in Table 42.

K-(63)

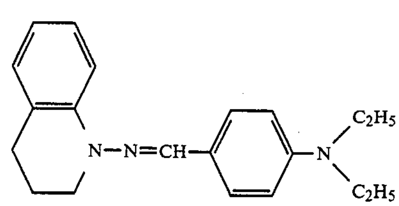

EXAMPLE 71

Example 70 was repeated except for effecting no irradiation of UV-ray after formation of the carrier generating layer to obtain the results shown in Table 42.

TABLE 42

| | Example 70 | Example 71 |
|---|---|---|
| VA (V) | −1000 | −970 |
| $E_{\frac{1}{2}}$ (lux · sec) | 1.4 | 1.4 |
| $V_R$ (V) | 0 | 0 |

As apparently seen from the above results, it can be understood that the electrophotographic photoreceptor of this invention is excellent in sensitivity and residual potential characteristic relative to UV-ray irradiation, small in amount of variation of the receptor potential and also stable to light.

COMPARATIVE EXAMPLE 27 photoreceptors were prepared in the same manner as in Example 70 and Example 71, except for changing the compound E-(102) to the bisazo compound (L-(27)) as shown below, and the same measurements as in Example 5 were conducted.

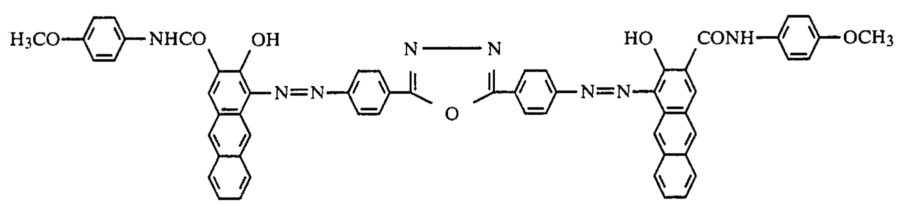

L-(27)

The results are shown in Table 43.

TABLE 43

| | With UV-ray irradiation | Without UV-ray irradiation |
|---|---|---|
| VA (V) | −880 | −800 |
| $E_{\frac{1}{2}}$ (lux · sec) | 10.2 | 4.2 |
| $V_R$ (V) | −30 | −6 |

As apparently seen from the above results, the photoreceptor prepared by use of the above compound is deteriorated in sensitivity and residual potential characteristic by UV-ray irradiation with greater amount of variation of the receptor potential.

EXAMPLE 72

Example 62 was repeated except for using the exemplary compound E-(1) in place of the exemplary compound E-(72). The drum-shaped photoreceptor obtained was found to have a spectral sensitivity at 790 nm of 920 volt·cm². μW⁻¹·sec⁻¹ (half-reduction rate). Copying test was conducted by means of a testing machine in which a semiconductor laser (790 nm) was mounted to give a laser beam intensity of 0.85 mW on the surface of the photoreceptor of this invention.

After charging the surface of the photoreceptor to −6 KV, the member was subjected to exposure to laser beam, followed by reversal development with a bias voltage of −250 V, whereby good images without fogging were obtained.

COMPARATIVE EXAMPLE 28

Example 72 was repeated except for employing the comparative bisazo compound L-(28) shown below in place of the exemplary compound E-(1) to obtain a comparative photoreceptor.

L-(28)

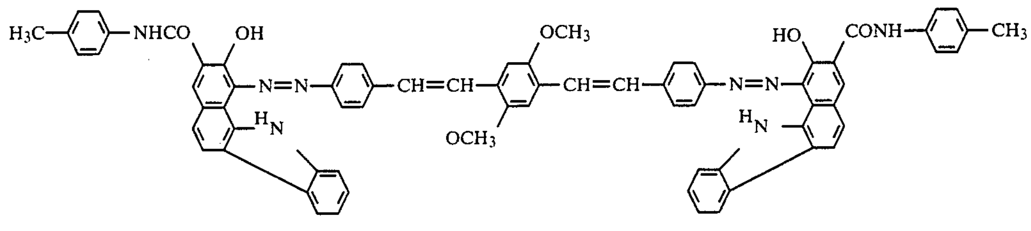

The photoreceptor was found to have a spectral sensitivity at 790 nm of 70 volt·cm²·μW⁻¹·sec⁻¹ (half-reduction rate). When copying test by the semiconductor laser was conducted similarly as in Example 136, much fogging occurred to give no good image.

EXAMPLES 73-82

In Example 62, the exemplary compound E-(72) (charge generating material) and the compound K-(53) (charge transportin material) were changed, respectively, to those as shown in Table 44, under otherwise the same conditions to prepare drum-shaped photoreceptors. These photoreceptors were found to have spectral sensitivities at 790 nm as shown in Table 44. In any of the copying tests conducted similarly as in Example 72 by use of these photoreceptors (Examples 73-82), good images without fog were obtained.

TABLE 44

| Example No. | Charge generating material | Charge transporting material | Spectral sensitivity volt · cm² · μW⁻¹ · sec⁻¹ |
|---|---|---|---|
| Example 73 | Exemplary compound E-(9) | Compound K-(64) | 920 |
| Example 74 | Exemplary compound E-(19) | Compound K-(65) | 820 |
| Example 75 | Exemplary compound E-(25) | Compound K-(66) | 800 |
| Example 76 | Exemplary compound E-(28) | Compound K-(67) | 780 |
| Example 77 | Exemplary compound E-(30) | Compound K-(68) | 720 |
| Example 78 | Exemplary compound E-(29) | Compound K-(69) | 910 |
| Example 79 | Exemplary com- | Compound K-(70) | 905 |

TABLE 44-continued

| | | | |
|---|---|---|---|
| | pound E-(49) | | |
| Example 80 | Exemplary compound E-(56) | Compound K-(71) | 975 |
| Example 81 | Exemplary compound E-(57) | Compound K-(72) | 1005 |
| Example 82 | Exemplary compound E-(70) | Compound K-(73) | 1000 |

Compound K-(64)

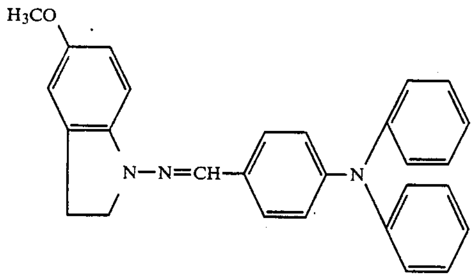

Compound K-(65)

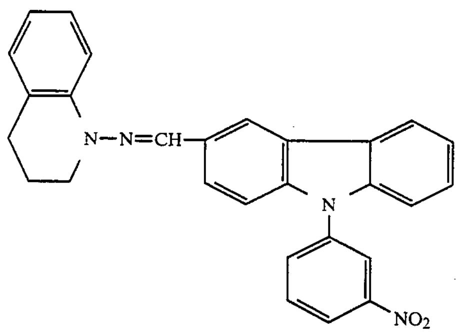

Compound K-(66)

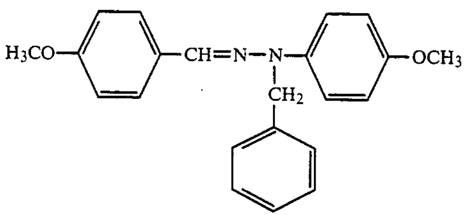

Compound K-(67)

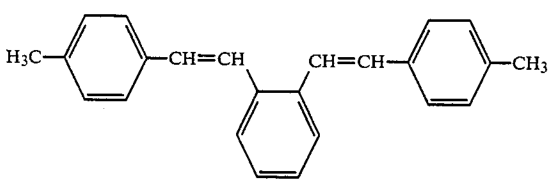

Compound K-(68)

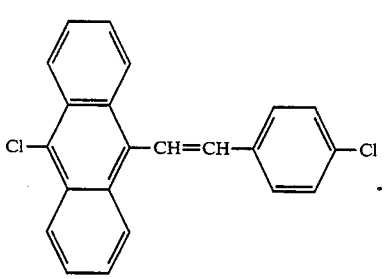

Compound K-(69)

TABLE 44-continued

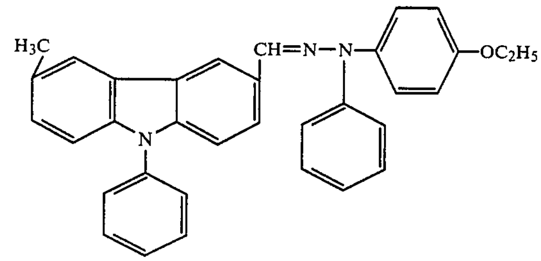

Compound K-(70)

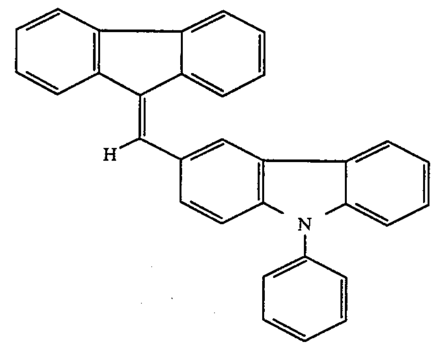

Compound K-(71)

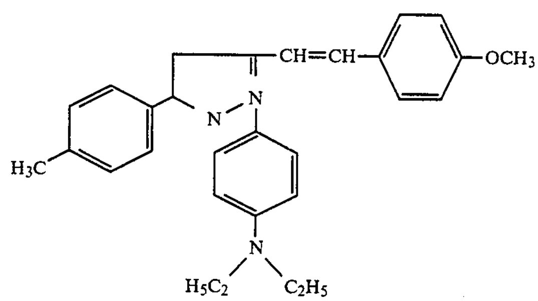

Compound K-(72)

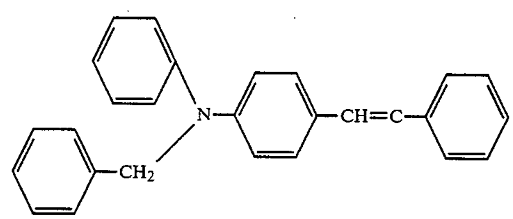

Compound K-(73)

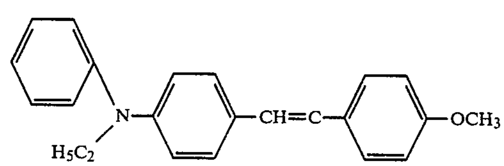

EXAMPLE 83

Example 1 was repeated except that the exemplary compound A-(14) was replaced with the exemplary compound F-(65) and 4,4'-dimethyl-4''-styryl-triphenylamine with the compound of the formula K-(74) shown below.

K-(74)

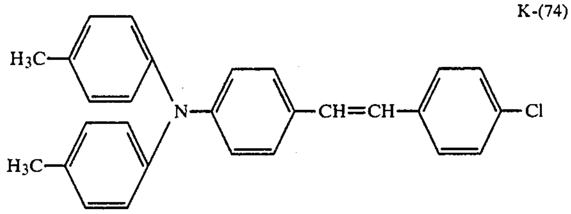

The results are shown in Table 45.

TABLE 45

| | First measurement | 100th measurement |
|---|---|---|
| $E_{\frac{1}{2}}$ (lux · sec) | 1.3 | 1.3 |
| $V_R$ (V) | 0 | 0 |

COMPARATIVE EXAMPLE 29

A photoreceptor for comparative purpose was prepared in the same manner as in Example 83 except for employing the bisazo compound L-(29) shown below as the carrier generating material.

L-(29)

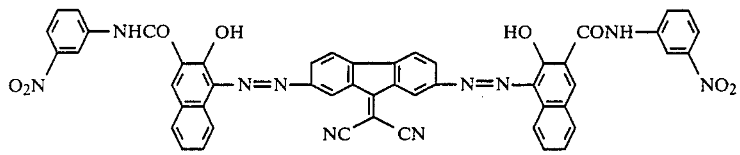

For this photoreceptor for comparative purpose, measurements were conducted similarly as in Example 83 to obtain the results as shown in Table 46.

TABLE 46

| | First measurement | 100th measurement |
|---|---|---|
| $E_{\frac{1}{2}}$ (lux · sec) | 6.5 | 10.2 |
| $V_R$ (V) | −12 | −100 |

As apparently seen from the above results, the photoreceptor of this invention is very superior to the photoreceptor for comparative purpose with respect to sensitivity, residual potential and stability in repeated uses.

EXAMPLES 84–86

Using the exemplary compounds F-(150), F-(85) and F-(19) as the carrier generating material, and the compounds shown below K-(75), K-(76) and K-(77), respectively, as the carrier transporting material following otherwise the same procedure as described in Example 83, photoconductive members of this invention were prepared and subjected to similar measurements to obtain the results shown in Table 47.

K-(75)

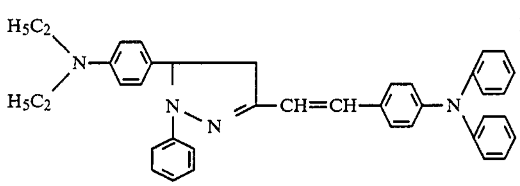

-continued

K-(76)

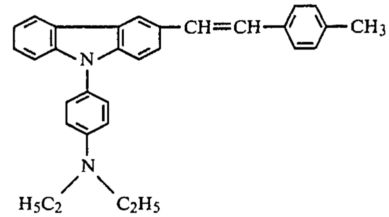

K-(77)

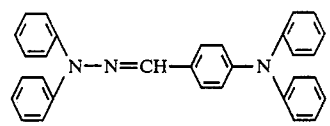

TABLE 47

| Example | Bisazo compound | First measurement $E_{\frac{1}{2}}$ (lux · sec) | First measurement $V_R$ (V) | 100th measurement $E_{\frac{1}{2}}$ (lux · sec) | 100th measurement $V_R$ (V) |
|---|---|---|---|---|---|
| 84 | Exemplary compound F - (150) | 1.2 | 0 | 1.2 | 0 |
| 85 | Exemplary compound F - (85) | 1.2 | 0 | 1.2 | 0 |
| 86 | Exemplary compound F - (19) | 1.4 | 0 | 1.4 | 0 |

EXAMPLE 87

Example 5 was repeated except that the exemplary compound A-(5) was replaced with the exemplary compound F-(126), and the compound K-(78) shown below was employed as the carrier transporting material.

K-(78)

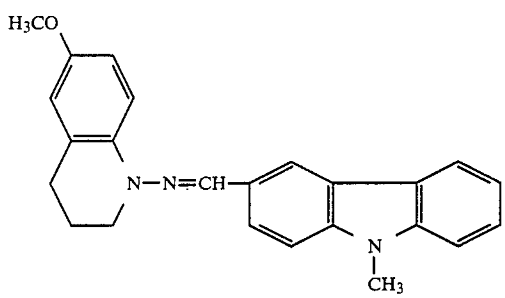

For this photoreceptor, the same measurements as in Example 1 were conducted to obtain the results of $E_{\frac{1}{2}}=1.6$ lux·sec and $V_R=0$ V.

EXAMPLE 88

Example 6 was repeated except that the exemplary compound A-(32) was replaced with the exemplary compound F-(71) and the compound K-(79) shown below was employed as the carrier transporting material to obtain the results shown in Table 48.

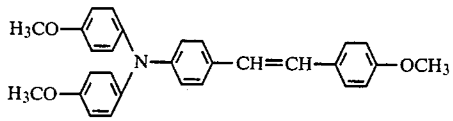

K-(79)

COMPARATIVE EXAMPLE 30

Example 88 was repeated except for substituting the bisazo compound L-(30) represented by the formula shown below for the exemplary compound F-(71) to prepare an electrophotographic photoreceptor for comparative purpose.

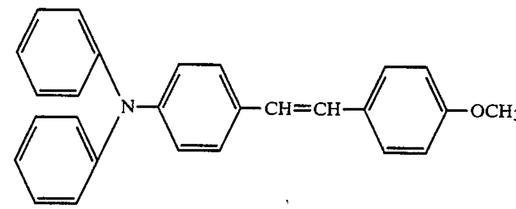

K-(80)

For this photoreceptor, the same measurements as in Example 1 were conducted to obtain the results of $E_{\frac{1}{2}}=1.7$ lux·sec and $V_R=0$ V.

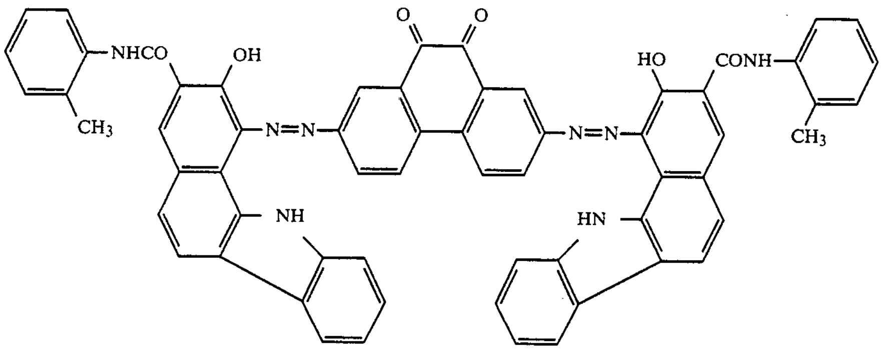

L-(44)

For this photoreceptor, the same measurements as in Example 1 were conducted to obtain the results as shown in Table 48.

TABLE 48

| | First measurement | | 100th measurement | |
|---|---|---|---|---|
| | $E_{\frac{1}{2}}$ (lux · sec) | $V_R$ (V) | $E_{\frac{1}{2}}$ (lux · sec) | $V_R$ (V) |
| Example 88 | 1.3 | 0 | 1.4 | 0 |
| Comparative example 30 | 6.0 | 0 | 10.0 | 0 |

EXAMPLE 89

Example 7 was repeated except that the exemplary compound A-(5) was replaced with the exemplary compound F-(119) and the compound K-(80) shown below was employed as the carrier transporting material to prepare a photoreceptor of this invention.

EXAMPLE 90

Example 8 was repeated except that the exemplary compound A-(39) was replaced with the exemplary compound F-(97), and the compound K-(81) shown below was employed as the carrier transporting material. Similar results as in Example 8 were obtained.

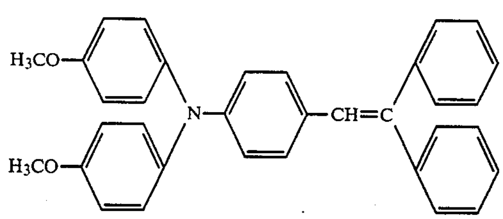

K-(81)

COMPARATIVE EXAMPLE 31

Example 90 was repeated except for using the bisazo compound L-(31) represented by the structural formula shown below in place of the examplary compound F-(97), and the copied images were evaluated similarly as in Example 90. As the result, only images with much fogging were obtained. Further, as copying was repeated, the copied images were lowered in contrast, until substantially no copied image was obtained after repetition for 2,000 times.

L-(31)

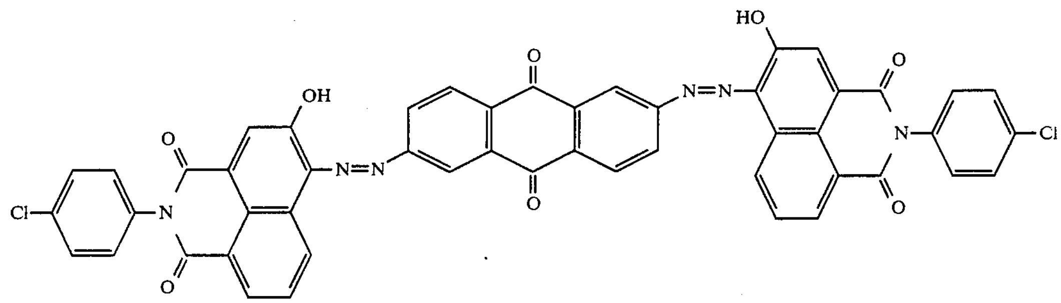

EXAMPLE 91

Example 10 was repeated except that the compound K-(78) shown below was employed as the carrier transporting material, and the exemplary compounds F-(78) and F-(78) were employed as the carrier generating materials, respectively.

K-(78)

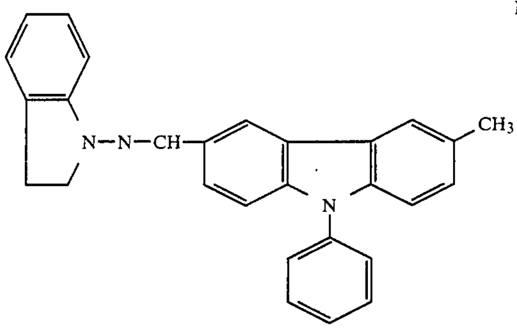

The thus obtained photoreceptor was evaluated similarly as in Example 10 to obtain the results of $E_{\frac{1}{2}}=2.1$ lux·sec and $V_R=+10$ V.

EXAMPLE 92

On an electroconductive support having aluminum foil laminated on a polyester film was provided an intermediate layer with a thickness of 0.05 μm made of a vinyl choloride-vinyl acetate-maleic anhydride copolymer "Ethlec MF-10" (trade name, produced by Sekisui Kagaku K.K.), followed by coating thereon with a dispersion prepared by dispersing a mixture of 4 g of the exemplary compound F-(118) and 8 g of the compound K-(79) shown below), 3 g of a polycarbonate resin "Panlite L-1250" (trade name, produced by Teijin Kasei K.K.) in 100 ml of dichloroethane in a sand grinder for 24 hours to prepare a photoreceptor.

K-(79)

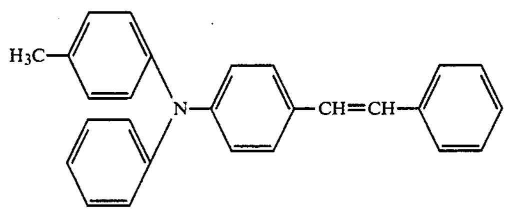

For this photoreceptor, $E_{178}$ and $V_R$ were measured in the same manner as in Example 1 except for changing the charged voltage to +6 KV to obtain the results of the first measurement of $E_{\frac{1}{2}}=1.4$ lux·sec and $V_R=0$ V.

EXAMPLE 93

Example 87 was repeated except for using the exemplary compound F-(1) in place of the exemplary compound F-(127). The drum-shaped photoreceptor obtained was found to have a spectral sensitivity at 790 nm of 920 volt·cm$^2$·μW$^{-1}$·sec$^{-1}$ (half-reduction rate). Copying test was conducted by means of a testing machine in which a semiconductor laser (790 nm) was mounted to give a laser beam intensity of 0.85 mW on the surface of the photoreceptor of this invention.

After charging the surface of the photoreceptor to −6 KV, the member was subjected to exposure to laser beam, followed by reversal development with a bias voltage of −250 V, whereby good images without fogging were obtained.

COMPARATIVE EXAMPLE 32

Example 93 was repeated except for employing the comparative bisazo compound L-(32) shown below in place of the exemplary compound F-(1) to obtain a comparative photoreceptor.

L-(32)

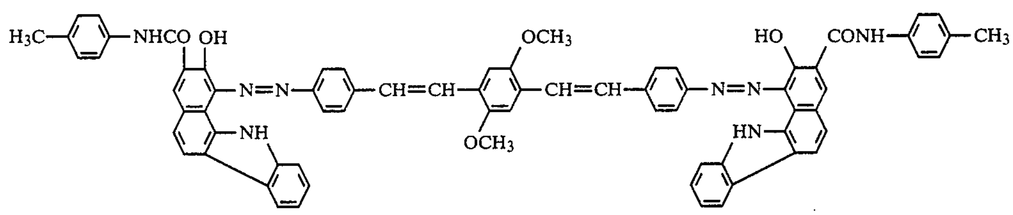

The photoreceptor was found to have a spectral sensitivity at 790 nm of 50 volt·cm$^2$·μW$^{-1}$·sec$^{-1}$ (half-reduction rate). When copying test by the semiconductor laser was conducted similarly as in Example 93, much fogging occurred to give no good image.

EXAMPLES 94–102

In Example 87, the exemplary compound F-(127) (charge generating material) and the compound K-(78) (charge transportin material) were changed, respectively, to those as shown in Table 49, under otherwise the same conditions to prepare drum-shaped photoreceptors. These photoreceptors were found to have spectral sensitivities at 790 nm as shown in Table 49. In any of the copying tests conducted similarly as in Example 93 by use of these photoreceptors (Examples 94–102), good images without fog were obtained.

TABLE 49

| Example No. | Charge generating material | Charge transporting material | Spectral sensitivity volt · $cm^2$ · $\mu W^{-1}$ · $sec^{-1}$ |
|---|---|---|---|
| Example 94 | Exemplary compound F-(2) | Compound K-(80) | 1005 |
| Example 95 | Exemplary compound F-(12) | Compound K-(81) | 920 |
| Example 96 | Exemplary compound F-(13) | Compound K-(82) | 970 |
| Example 97 | Exemplary compound F-(29) | Compound K-(83) | 920 |
| Example 98 | Exemplary compound F-(33) | Compound K-(84) | 980 |
| Example 99 | Exemplary compound F-(38) | Compound K-(85) | 990 |
| Example 100 | Exemplary compound F-(45) | Compound K-(86) | 880 |
| Example 101 | Exemplary compound F-(68) | Compound K-(87) | 905 |
| Example 102 | Exemplary compound F-(72) | Compound K-(88) | 1000 |

Compound K-(80)

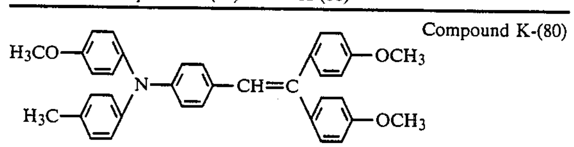

Compound K-(81)

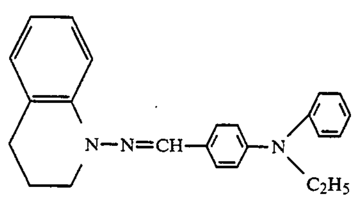

Compound K-(82)

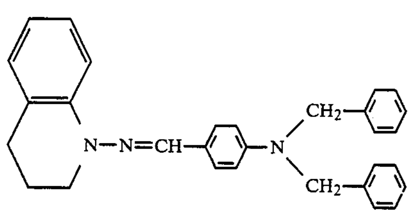

Compound K-(83)

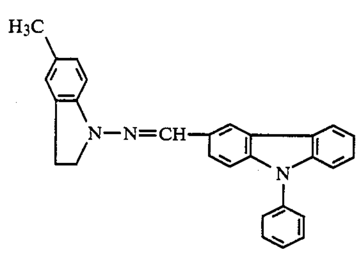

TABLE 49-continued

Compound K-(84)

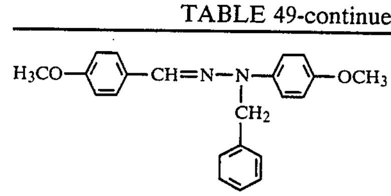

Compound K-(85)

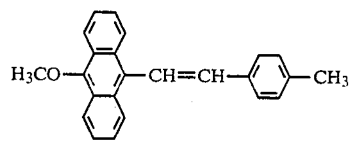

Compound K-(86)

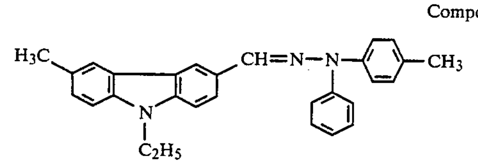

Compound K-(87)

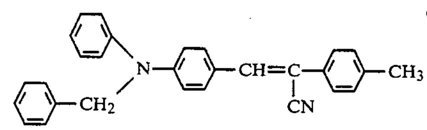

Compound K-(88)

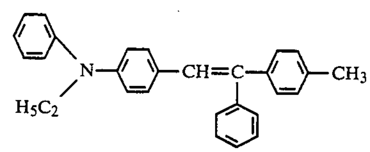

As apparently seen from the Examples and Comparative examples, the photoreceptors of this invention are markedly excellent in characteristics such as stability, sensitivity, durability, combination with a wide variety of carrier transporting materials.

By use of the azo compounds represented by the above formula [I] as the photoconductive material constituting the photosensitive layer of the photoreceptor according to this invention, it is possible to prepare a photoreceptor as intended by this invention, which is stable to heat and light, excellent in electrophotographic characteristics such as charge retentive force, sensitivity, residual potential, etc., also small in fatigue deterioration when used repeatedly, and further has sufficient sensitivity in the long wavelength region of 780 nm or longer.

We claim:

1. A photoreceptor comprising a support and a photosensitive layer which contains an azo compound of the formula [I]:

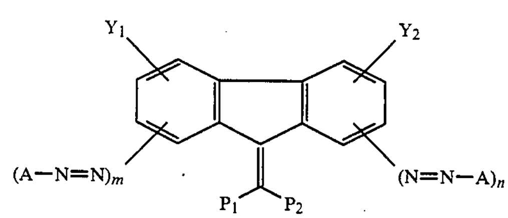

[I]

wherein $P_1$ and $P_2$ are independently a halogen atom, a hydrogen atom, an alkyl group, an alkoxy group, an aryl group, an acetylamido group, an alkylsulfonyl group,

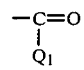

($Q_1$ is an alkyl group, an alkoxy group, a phenyl group, an amino group, a hydroxy group or a hydrogen atom) or

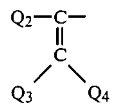

($Q_2$, $Q_3$ and $Q_4$ independently are a halogen atom, a hydrogen atom, an alkyl group, an alkoxy group, a phenyl group, an acyl group, an ester group, a hydroxy group or a vinyl group), said alkyl group, alkoxy group, aryl group, amino group and vinyl group may have a substituent; $Y_1$ and $Y_2$ independently are a hydrogen atom, a halogen atom, a cyano group, a hydroxy group, an alkyl group or an alkoxy group; m and n each represent an integer of 0 to 2, and m and n cannot be both 0; A represents a group represented by any one of the following formulae:

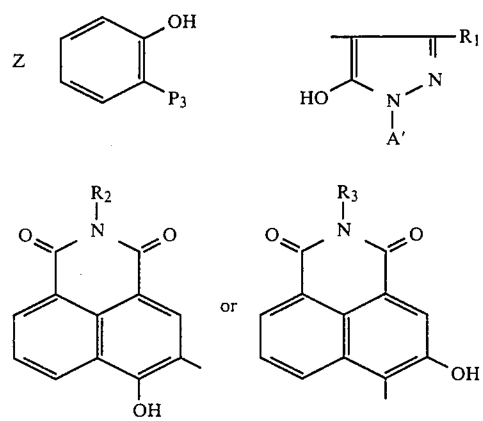

wherein Z is a group of atoms necessary for constituting a substituted or unsubstituted aromatic carbon ring or an aromatic heterocyclic ring, $P_3$ is a substituted or unsubstituted carbamoyl group or a substituted or unsubstituted sulfamoyl group, $R_1$ is a hydrogen eatom, a substituted or unsubstituted alkyl group, a substituted or unsubstituted amino group, a substituted or unsubstituted carbamoyl group, a carboxyl group and its ester group or a cyano group, A' is a substituted or unsubstituted aryl group, $R_2$ and $R_3$ independently are a substituted or unsubstituted alkyl group, a substituted or unsubstituted aralkyl group or a substituted or unsubstituted aryl group.

2. A photoreceptor according to claim 1, wherein the azo compound is represented by the formula [IA]:

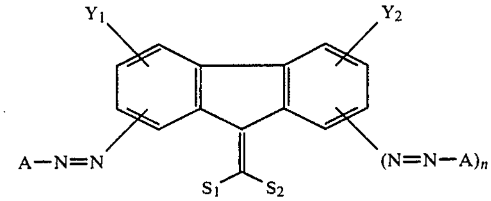

[IA]

wherein $S_1$ and $S_2$ independently are an alkyl group, an ester group or a substituted or unsubstituted benzene ring; and $Y_1$, $Y_2$, n and A are the same as defined in claim 1.

3. A photoreceptor according to claim 2, wherein the azo compound is represented by the formula [IA]-II:

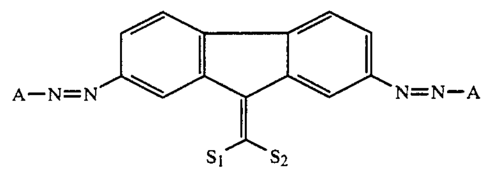

[IA]-II wherein $S_1$, $S_2$ and A are the same as defined in claim 2.

4. A photoreceptor according to claim 1, wherein the azo compound is represented by the formula [IB]:

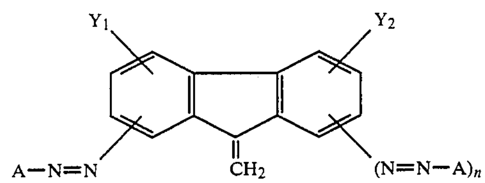

[IB]

wherein $Y_1$, $Y_2$, n and A are the same as defined in claim 1.

5. A photoreceptor according to claim 4, wherein the azo compound is represented by the formula [IB]-II:

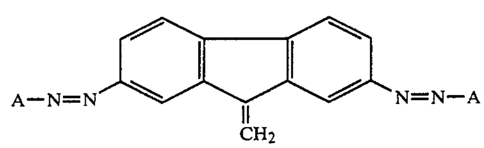

[IB]-II wherein A is the same as defined in claim 4.

6. A photoreceptor according to claim 1, wherein the azo compound is represented by the formula [IC]:

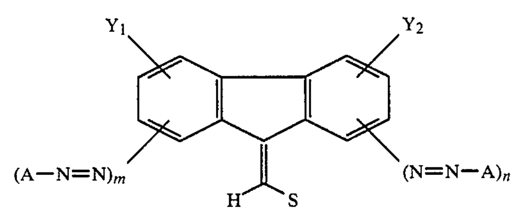

[IC]

wherein S is a substituted or unsubstituted benzene ring or an alkyl group; $Y_1$, $Y_2$, m, n and A are the same as defined in claim 1.

7. A photoreceptor according to claim 6, wherein the azo compound is represented by the formula [IC]-II:

[IC]-II

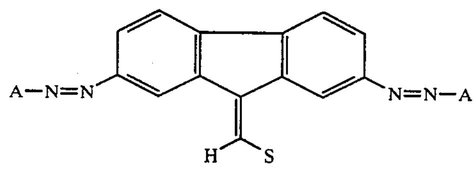

wherein S and A are the same as defined in claim 6.

8. A photoreceptor according to claim 1, wherein the azo compound is represented by the formula [ID]:

[ID]

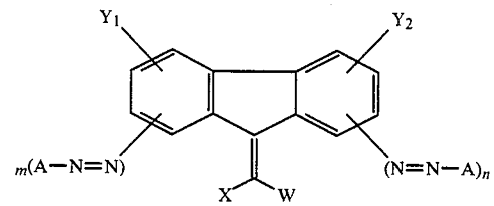

wherein X is a halogen atom; W is a halogen atom, a hydrogen atom, an alkyl group, a phenyl group which may have substituents, an ester group, an acyl group, an acetylamido group, an alkylsulfone group or a vinyl group; $Y_1$, $Y_2$, m, n and A are the same as defined in claim 1.

9. A photoreceptor according to claim 8, wherein the azo compound is represented by the formula [ID]-II:

[ID]-II

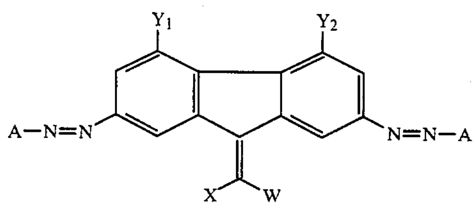

wherein X, W, $Y_1$, Y and A are the same as defined in claim 8.

10. A photoreceptor according to claim 1, wherein the azo compound is represented by the formula [IE]:

[IE]

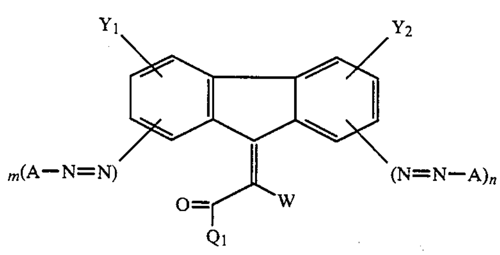

wherein W is a halogen atom, a hydrogen atom, an alkyl group, a phenyl group which may have substituents, an ester group, an acyl group, an acetylamido group, an alkylsulfone group or a vinyl group; and $Q_1$, $Y_1$, $Y_2$, m, n and A are the same as defined in claim 1.

11. A photoreceptor according to claim 10, wherein the azo compound is represented by the formula [IE]-II:

[IE]-II

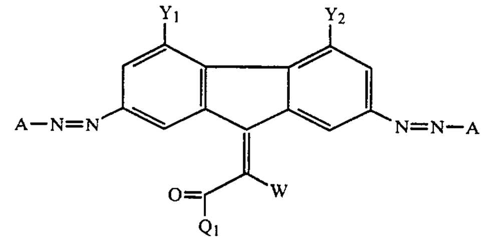

wherein $Q_1$, W, $Y_1$, $Y_2$ and A are the same as defined in claim 10.

12. A photoreceptor according to claim 1, wherein the azo compound is represented by the formula [IF]:

[IF]

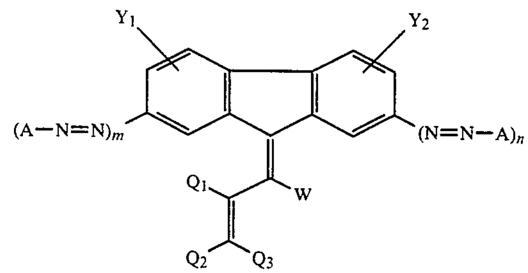

wherein W is a halogen atom, a hydrogen atom, an alkyl group, a phenyl group which may have substituents, an ester group, an acyl group, an acetylamido group, an alkylsulfone group or a vinyl group; and $Q_1$, $Q_2$, $Q_3$, $Y_1$, $Y_2$, m, n and A are the same as defined in claim 1.

13. A photoreceptor according to claim 12, wherein the azo compound is represented by the formula [IF]-II:

[IF]-II

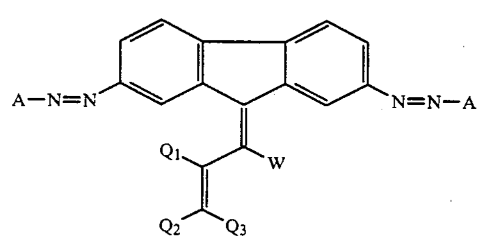

wherein $Q_1$, $Q_2$, $Q_3$, W and A are the same as defined in claim 12.

14. A photoreceptor according to any one of claims 1, 2, 4, 6, 8, 10 and 12, wherein said photosensitive layer contains a carrier transporting material and said azo compound as a carrier generating material.

15. A photoreceptor according to claim 14, wherein said photosensitive layer comprises a carrier transport layer with contains said carrier transporting material and a carrier generation layer which contains said carrier generating material.

16. A photoreceptor according to claim 15, wherein said photoreceptor has an intermediate layer between said photosensitive layer and said support.

17. A photoreceptor according to claim 15, wherein said carrier generation layer has a thickness within the range of from 0.01 μm to 20 μm.

18. A photoreceptor according to claim 14, wherein said carrier transporting material is selected from the group consisting of electron acceptors of trinitrofluorenone or tetranitrofluorenone and electron donors of polymers having heterocyclic compounds as the side chains, selected from poly-N-vinylcarbazole, triazole derivatives, oxadiazole derivatives, imidazole derivatives, pyrazoline derivatives, polyarylalkane derivatives, phenylenediamine derivatives, hydrazone derivatives, amino-substituted chalcone derivatives, triarylamine derivatives, carbazole derivatives, stilbene derivatives and phenothiazine derivatives.

19. A photoreceptor according to claim 14, wherein said support is composed of a material selected from plates or drums of metals or alloys, or papers or plastic films made electroconductive by coating, vapor deposition or lamination of metal thin films or thin films of electroconductive compounds or alloys thereon.

20. A photoreceptor according to claim 14, wherein said photosensitive layer is a single layer in which said carrier generating material and carrier transporting material are dispersed.

* * * * *